United States Patent
Kwak et al.

(10) Patent No.: US 11,575,491 B2
(45) Date of Patent: Feb. 7, 2023

(54) WIRELESS RESOURCE SWITCHING

(71) Applicant: Comcast Cable Communications, LLC, Philadelphia, PA (US)

(72) Inventors: Youngwoo Kwak, Vienna, VA (US); Esmael Dinan, McLean, VA (US); Hyoungsuk Jeon, Centreville, VA (US); Hua Zhou, Herndon, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 70 days.

(21) Appl. No.: 17/125,213

(22) Filed: Dec. 17, 2020

(65) Prior Publication Data

US 2021/0184824 A1 Jun. 17, 2021

Related U.S. Application Data

(60) Provisional application No. 62/948,941, filed on Dec. 17, 2019.

(51) Int. Cl.
*H04L 5/00* (2006.01)
*H04L 27/26* (2006.01)

(52) U.S. Cl.
CPC ......... *H04L 5/0098* (2013.01); *H04L 5/0082* (2013.01); *H04L 5/0092* (2013.01); *H04L 27/26025* (2021.01)

(58) Field of Classification Search
CPC ......... H04W 72/042; H04L 27/26025; H04L 27/2602; H04L 27/2603; H04L 27/26035; H04L 5/003; H04L 5/0098; H04L 5/0096; H04L 5/0092; H04L 5/0091; H04L 5/0094; H04L 5/0082; H04L 5/0078; H04L 5/0085; H04L 5/0087
See application file for complete search history.

(56) References Cited

U.S. PATENT DOCUMENTS

| | | | |
|---|---|---|---|
| 2019/0090299 A1* | 3/2019 | Ang | H04L 5/001 |
| 2019/0104543 A1* | 4/2019 | Park | H04L 1/1854 |
| 2019/0132109 A1* | 5/2019 | Zhou | H04L 5/001 |
| 2019/0182716 A1 | 6/2019 | Futaki et al. | |
| 2019/0312635 A1* | 10/2019 | Ang | H04B 7/005 |
| 2019/0313343 A1 | 10/2019 | MolavianJazi et al. | |

(Continued)

FOREIGN PATENT DOCUMENTS

| | | | | |
|---|---|---|---|---|
| CN | 111165061 A | * | 5/2020 | ........... H04L 5/0007 |
| WO | WO-2020096987 A2 | * | 5/2020 | ............. H04L 5/001 |
| WO | WO-2022026663 A2 | * | 2/2022 | |

OTHER PUBLICATIONS

R1-1912783 3GPP TSG RAN WG1 Meeting #99, Reno, USA, Nov. 18-22, 2019, Source: Ericsson, Title: Other aspects of UE power saving.

(Continued)

*Primary Examiner* — Phong La
(74) *Attorney, Agent, or Firm* — Banner & Witcoff, Ltd.

(57) ABSTRACT

Wireless communications may comprise communications between a base station and a wireless device. Wireless resources, such as bandwidth parts, may be used for the wireless communications. Based on a determination to switch a wireless resource, another wireless resource may be activated within a time duration. The time duration may be based on whether the wireless resource to be activated and the wireless device to be switched are in a same group of wireless resources.

21 Claims, 30 Drawing Sheets

(56) References Cited

U.S. PATENT DOCUMENTS

| | | | | |
|---|---|---|---|---|
| 2019/0342907 | A1* | 11/2019 | Huang | H04L 5/0053 |
| 2019/0357292 | A1* | 11/2019 | Cirik | H04W 24/08 |
| 2020/0029298 | A1 | 1/2020 | Lin | |
| 2020/0037260 | A1* | 1/2020 | Fu | H04W 80/08 |
| 2020/0280337 | A1 | 9/2020 | Yi | |
| 2020/0314946 | A1* | 10/2020 | Tsuboi | H04W 24/10 |
| 2021/0184824 | A1* | 6/2021 | Kwak | H04L 5/0098 |
| 2021/0289536 | A1* | 9/2021 | Liu | H04L 5/0094 |
| 2022/0110128 | A1* | 4/2022 | Takahashi | H04W 72/1273 |
| 2022/0124692 | A1* | 4/2022 | Kim | H04W 72/0446 |

OTHER PUBLICATIONS

R1-1912827 3GPP TSG RAN WG1 Meeting #99, Reno, USA, Nov. 18-22, 2019, Source: Apple Inc., Title: PDCCH based power saving channel design for UE power saving.
R1-1912828 3GPP TSG RAN WG1 Meeting #99, Reno, USA, Nov. 18-22, 2019, Source: Apple Inc., Title: Cross slot scheduling design for UE power saving.
R1-1912829 3GPP TSG RAN WG1 Meeting #99, Reno, USA, Nov. 18-22, 2019, Source: Apple Inc., Title: Maximum MIMO layer adaptation for UE power saving.
R1-1912830 3GPP TSG RAN WG1 Meeting #99, Reno, USA, Nov. 18-22, 2019, Source: Apple Inc., Title: Power saving techniques with UE assistance.
R1-1912856 3GPP TSG RAN WG1 Meeting #99, Reno, USA, Nov. 18-22, 2019, Source: Motorola Mobility, Lenovo, Title: Cross-slot scheduling for power saving.
R1-1912857 3GPP TSG RAN WG1 Meeting #99, Reno, USA, Nov. 18-22, 2019, Source: Motorola Mobility, Lenovo, Title: UE adaptation to maximum number of MIMO layers.
R1-1912863 3GPP TSG RAN WG1 Meeting #99, Reno, USA, Nov. 18-22, 2019, Source: ASUSTeK, Title: PDCCH-based power saving signal/channel for UE adaptation.
R1-1912897 3GPP TSG RAN WG1 Meeting #99, Reno, USA, Nov. 18-22, 2019, Source: NTT Docomo, Inc., Title: Discussion on PDCCH-based power saving signal/channel.
R1-1912898 3GPP TSG RAN WG1 Meeting #99, Reno, USA, Nov. 18-22, 2019, Source: NTT Docomo, Inc., Title: Discussion on procedure of cross-slot scheduling power saving techniques.
R1-1912915 3GPP TSG RAN WG1 Meeting #99, Reno, USA, Nov. 18-22, 2019, Source: Huawei, HiSilicon, Title: PDCCH-based power saving signal/channel.
R1-1912916 3GPP TSG RAN WG1 Meeting #99, Reno, USA, Nov. 18-22, 2019, Source: Huawei, HiSilicon, Title: UE dynamic adaptation to the maximum number of MIMO layers.
R1-1912970 3GPP TSG RAN WG1 Meeting #99, Reno, USA, Nov. 18-22, 2019, Source: Qualcomm Incorporated, Title: PDCCH-based power saving channel design.
R1-1912971 3GPP TSG RAN WG1 Meeting #99, Reno, USA, Nov. 18-22, 2019, Source: Qualcomm Incorporated, Title: Cross-slot scheduling power saving techniques.
R1-1912972 3GPP TSG RAN WG1 Meeting #99, Reno, USA, Nov. 18-22, 2019, Source: Qualcomm Incorporated, Title: Adaptation of maximum number of MIMO layers.
R1-1913050 3GPP TSG RAN WG1 Meeting #99, Reno, USA, Nov. 18-22, 2019, Source: Panasonic, Title: Discussion on PDCCH-based power saving signal/channel (PoSS).
R1-1913051 3GPP TSG RAN WG1 Meeting #99, Reno, USA, Nov. 18-22, 2019, Source: Panasonic, Title: Discussion on procedure of cross-slot scheduling power saving techniques.
R1-1913111 3GPP TSG RAN WG1 Meeting #99, Reno, USA, Nov. 18-22, 2019, Source: Nokia, Nokia Shanghai Bell, Title: On PDCCH-based power saving techniques.
R1-1913112 3GPP TSG RAN WG1 Meeting #99, Reno, USA, Nov. 18-22, 2019, Source: Nokia, Nokia Shanghai Bell, Title: Procedure of cross-slot scheduling power saving techniques.
R1-1913113 3GPP TSG RAN WG1 Meeting #99, Reno, USA, Nov. 18-22, 2019, Source: Nokia, Nokia Shanghai Bell, Title: On open issues for per-BWP DL MIMO layers.
R1-1913144 3GPP TSG RAN WG1 Meeting #99, Reno, USA, Nov. 18-22, 2019, Source: Convida Wireless, Title: On power saving using PDCCH skipping.
R1-1908395 3GPP TSG RAN WG1 Meeting #98, Prague, Czech Republic, Aug. 26-30, 2019, Source: MediaTek Inc., Title: Adaptation of maximum number of MIMO layers for UE power saving.
R1-1908364 3GPP TSG RAN WG4 Meeting #92, Ljubljana, Slovenia, Aug. 26-30, 2019, Source: MediaTek Inc., Title: Discussion on UE dynamic adaptation to the maximum number of MIMO layers.
3GPP TS 38.211 V15.6.0 (Jun. 2019), Technical Specification, 3rd Generation Partnership Project; Technical Specification Group Radio Access Network; NR; Physical channels and modulation (Release 15).
3GPP TS 38.212 V15.6.0 (Jun. 2019), Technical Specification; 3rd Generation Partnership Project; Technical Specification Group Radio Access Network; NR; Multiplexing and channel coding (Release 15).
3GPP TS 38.213 V15.6.0 (Jun. 2019) 3rd Generation Partnership Project; Technical Specification Group Radio Access Network; NR; Physical layer procedures for control (Release 15).
3GPP TS 38.214 V15.6.0 (Jun. 2019) 3rd Generation Partnership Project; Technical Specification Group Radio Access Network; NR; Physical layer procedures for data (Release 15).
3GPP TS 38.215 V15.4.0 (Dec. 2018) 3rd Generation Partnership Project; Technical Specification Group Radio Access Network; NR; Physical layer measurements (Release 15).
R1-1911873 3GPP TSG RAN WG1 Meeting #99, Reno, USA, Nov. 18-22, 2019, Source: Huawei, HiSilicon, Title: Procedure of cross-slot scheduling for UE power saving.
R1-1911874 3GPP TSG RAN WG1 Meeting #99, Reno, USA, Nov. 18-22, 2019, Source: Huawei, HiSilicon, Title: Other considerations on UE power saving.
R1-1911925 3GPP TSG RAN WG1 Meeting #99, Reno, USA, Nov. 18-22, 2019, Source: ZTE, Title: Discussion on PDCCH-based power saving signal.
R1-1911926 3GPP TSG RAN WG1 Meeting #99, Reno, USA, Nov. 18-22, 2019, Source: ZTE, Title: Procedure of cross-slot scheduling power saving techniques.
R1-1911927 3GPP TSG RAN WG1 Meeting #99, Reno, USA, Nov. 18-22, 2019, Source: ZTE, Title: On UE adaptation to maximum number of MIMO layer.
R1-1911928 3GPP TSG RAN WG1 Meeting #99, Reno, USA, Nov. 18-22, 2019, Source: ZTE, Title: Discussion on potential techniques for UE power saving.
R1-1912049 3GPP TSG RAN WG1 Meeting #99, Reno, USA, Nov. 18-22, 2019, Source: vivo, Title: Remaining aspects of PDCCH-based power saving signal.
R1-1912050 3GPP TSG RAN WG1 Meeting #99, Reno, USA, Nov. 18-22, 2019, Source: vivo, Title: Remaining aspects of cross-slot scheduling power saving techniques.
R1-1912051 3GPP TSG RAN WG1 Meeting #99, Reno, USA, Nov. 18-22, 2019, Source: vivo, Title: Remaining aspects of maximum number of MIMO layers.
R1-1912053 3GPP TSG RAN WG1 Meeting #99, Reno, USA, Nov. 18-22, 2019, Source: vivo, Title: Discussion on other issues and UE features for power saving.
R1-1912095 3GPP TSG RAN WG1 Meeting #99, Reno, USA, Nov. 18-22, 2019, Source: MediaTek Inc., Title: Remaining details on power saving signal.
R1-1912096 3GPP TSG RAN WG1 Meeting #99, Reno, USA, Nov. 18-22, 2019, Source: MediaTek Inc., Title: Remaining details on cross-slot scheduling adaptation.
R1-1912097 3GPP TSG RAN WG1 Meeting #99, Reno, USA, Nov. 18-22, 2019, Source: MediaTek Inc., Title: Adaptation of maximum number of MIMO layers for UE power saving.
R1-1912098 3GPP TSG RAN WG1 Meeting #99, Reno, USA, Nov. 18-22, 2019, Source: MediaTek Inc., Title: Considerations of UE power saving enhancements for Rel-17.

(56) References Cited

OTHER PUBLICATIONS

R1-1912179 3GPP TSG RAN WG1 Meeting #99, Reno, USA, Nov. 18-22, 2019, Source: CATT, Title: Power saving signal/channel design and performance.
R1-1912180 3GPP TSG RAN WG1 Meeting #99, Reno, USA, Nov. 18-22, 2019, Source: CATT, Title: Power saving scheme with cross-slot scheduling.
R1-1912225 3GPP TSG RAN WG1 Meeting #99, Reno, USA, Nov. 18-22, 2019, Source: Intel Corporation, Title: Considerations on PDCCH-based power saving signal.
R1-1912226 3GPP TSG RAN WG1 Meeting #99, Reno, USA, Nov. 18-22, 2019, Source: Intel Corporation, Title: On cross-slot scheduling operation for power saving.
R1-1912227 3GPP TSG RAN WG1 Meeting #99, Reno, USA, Nov. 18-22, 2019, Source: Intel Corporation, Title: Discussion on UE adaptation to maximum number of MIMO layers.
R1-1912357 3GPP TSG RAN WG1 Meeting #99, Reno, USA, Nov. 18-22, 2019, Source: Sony, Title: On PDCCH-based power saving channel for UE power saving.
R1-1912358 3GPP TSG RAN WG1 Meeting #99, Reno, USA, Nov. 18-22, 2019, Source: Sony, Title: On cross-slot scheduling for UE power saving.
R1-1912359 3GPP TSG RAN WG1 Meeting #99, Reno, USA, Nov. 18-22, 2019, Source: Sony, Title: UE assistance information and UE capability for UE power saving.
R1-1912404 3GPP TSG RAN WG1 Meeting #99, Reno, USA, Nov. 18-22, 2019, Source: LG Electronics, Title: Discussion on PDCCH-based power saving signal/channel.
R1-1912405 3GPP TSG RAN WG1 Meeting #99, Reno, USA, Nov. 18-22, 2019, Source: LG Electronics, Title: Discussion on cross-slot scheduling for power saving.
R1-1912406 3GPP TSG RAN WG1 Meeting #99, Reno, USA, Nov. 18-22, 2019, Source: LG Electronics, Title: Discussion on UE adaptation to maximum number of MIMO layers.
R1-1912486 3GPP TSG RAN WG1 Meeting #99, Reno, USA, Nov. 18-22, 2019, Source: Samsung, Title: Remaining issues for PDCCH-based power saving signal/channel.
R1-1912487 3GPP TSG RAN WG1 Meeting #99, Reno, USA, Nov. 18-22, 2019, Source: Samsung, Title: Procedure of cross-slot scheduling power saving techniques.
R1-1912488 3GPP TSG RAN WG1 Meeting #99, Reno, USA, Nov. 18-22, 2019, Source: Samsung, Title: UE adaptation to maximum number of MIMO layers.
R1-1912489 3GPP TSG RAN WG1 Meeting #99, Reno, USA, Nov. 18-22, 2019, Source: Samsung, Title: On UE assistance information.
R1-1912545 3GPP TSG RAN WG1 Meeting #99, Reno, USA, Nov. 18-22, 2019, Source: CMCC, Title: Discussion on PDCCH-based power saving signal/channel design.
R1-1912546 3GPP TSG RAN WG1 Meeting #99, Reno, USA, Nov. 18-22, 2019, Source: CMCC, Title: Discussion on cross-slot scheduling procedure.
R1-1912547 3GPP TSG RAN WG1 Meeting #99, Reno, USA, Nov. 18-22, 2019, Source: CMCC, Title: Discussion on UE assistance information.
R1-1912568 3GPP TSG RAN WG1 Meeting #99, Reno, USA, Nov. 18-22, 2019, Source: Spreadtrum Communications, Title: Discussion on cross-slot scheduling for UE power saving.
R1-1912569 3GPP TSG RAN WG1 Meeting #99, Reno, USA, Nov. 18-22, 2019, Source: Spreadtrum Communications, Title: Consideration on UE adaptation to maximum number of MIMO layers.
R1-1912573 3GPP TSG RAN WG1 Meeting #99, Reno, USA, Nov. 18-22, 2019, Source: Spreadtrum Communications, Title: Discussion on PDCCH-based power saving channel.
R1-1912626 3GPP TSG RAN WG1 Meeting #99, Reno, USA, Nov. 18-22, 2019, Source: Futurewei, Title: PDCCH-based power saving signal/channel.
R1-1912627 3GPP TSG RAN WG1 Meeting #99, Reno, USA, Nov. 18-22, 2019, Source: Futurewei, Title: On assistance information for UE power saving.
R1-1912648 3GPP TSG RAN WG1 Meeting #99, Reno, USA, Nov. 18-22, 2019, Source: OPPO, Title: Discussion on PDCCH-based power saving signal/channel.
R1-1912649 3GPP TSG RAN WG1 Meeting #99, Reno, USA, Nov. 18-22, 2019, Source: OPPO, Title: Further considerations on cross-slot scheduling for power saving.
R1-1912736 3GPP TSG RAN WG1 Meeting #99, Reno, USA, Nov. 18-22, 2019, Source: InterDigital, Inc., Title: PDCCH-based power saving signal design.
R1-1912737 3GPP TSG RAN WG1 Meeting #99, Reno, USA, Nov. 18-22, 2019, Source: InterDigital, Inc., Title: On cross-slot scheduling for UE power saving.
R1-1912773 3GPP TSG RAN WG1 Meeting #99, Reno, USA, Nov. 18-22, 2019, Source: NEC, Title: Remaining details on wake up signal outside active time.
R1-1912780 3GPP TSG RAN WG1 Meeting #99, Reno, USA, Nov. 18-22, 2019, Source: Ericsson, Title: Design of PDCCH-WUS.
R1-1912781 3GPP TSG RAN WG1 Meeting #99, Reno, USA, Nov. 18-22, 2019, Source: Ericsson, Title: Procedure for cross-slot scheduling enhancement.
R1-1912782 3GPP TSG RAN WG1 Meeting #99, Reno, USA, Nov. 18-22, 2019, Source: Ericsson, Title: Remaining aspects of MIMO layers configuration per BWP.
Huawei et al. "On switching time of MIMO layer/antenna number adaption", 3GPP Draft; vol. RAN WG4, No. Ljublijana, Slovenia; Aug. 16, 2019.
May 14, 2021—European Search Report—EP 20215078.5.

* cited by examiner

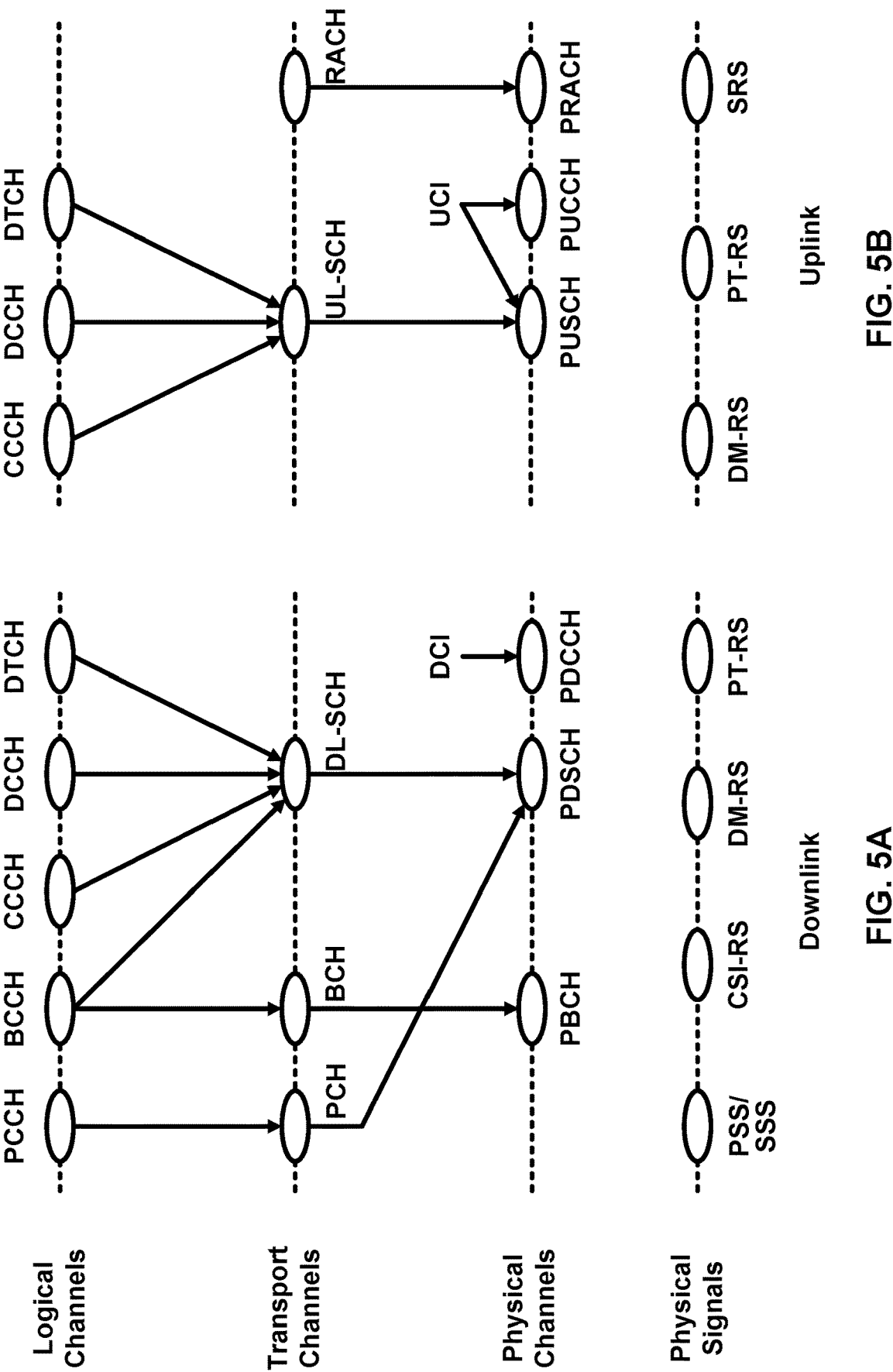

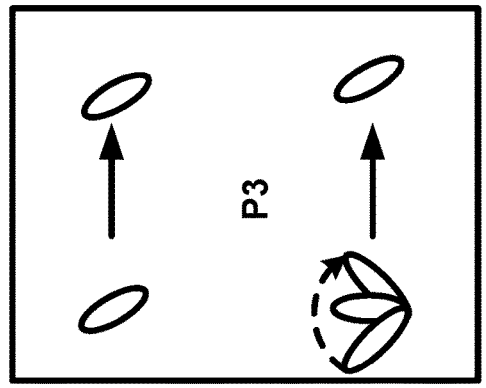
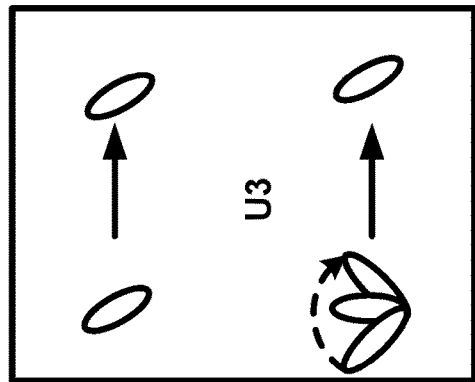
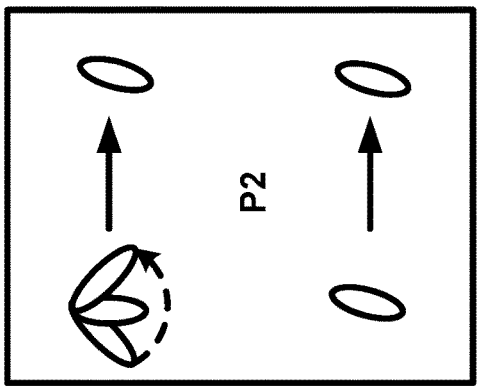
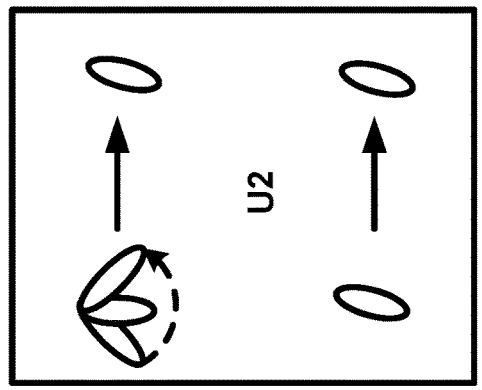
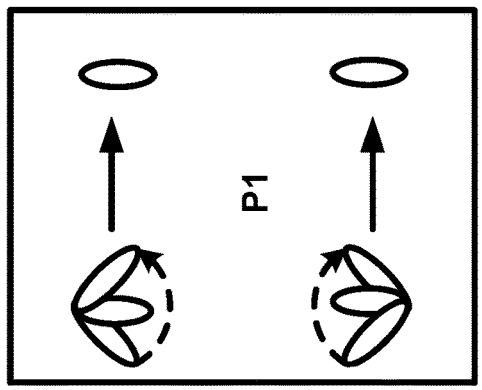
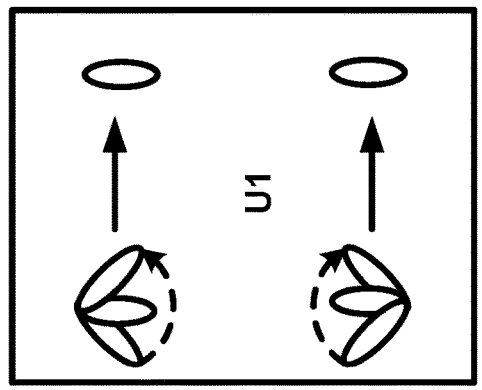
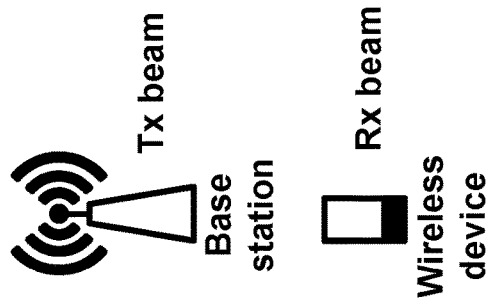
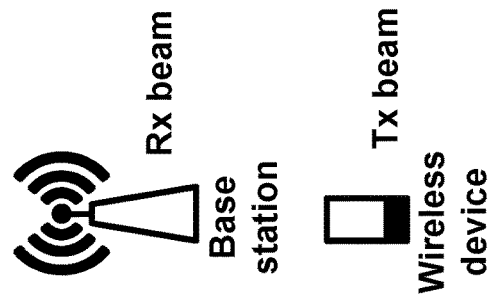
FIG. 12A
FIG. 12B

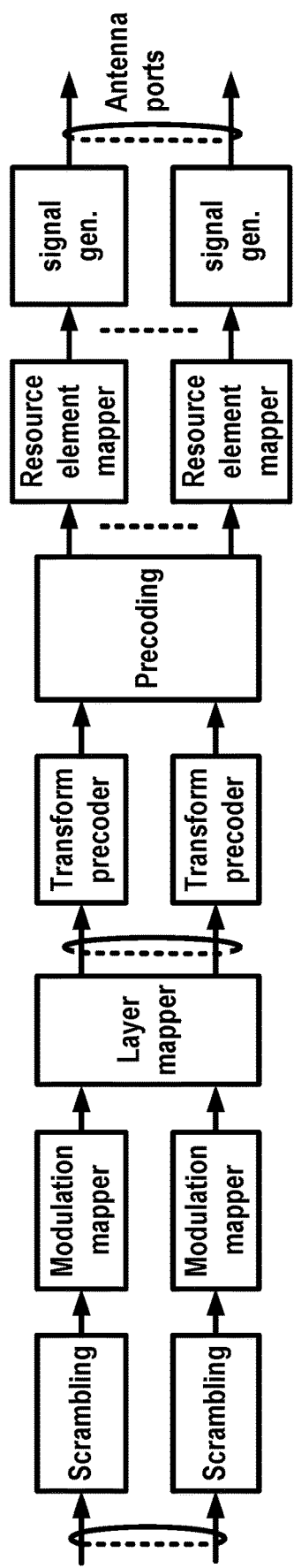
FIG. 16A
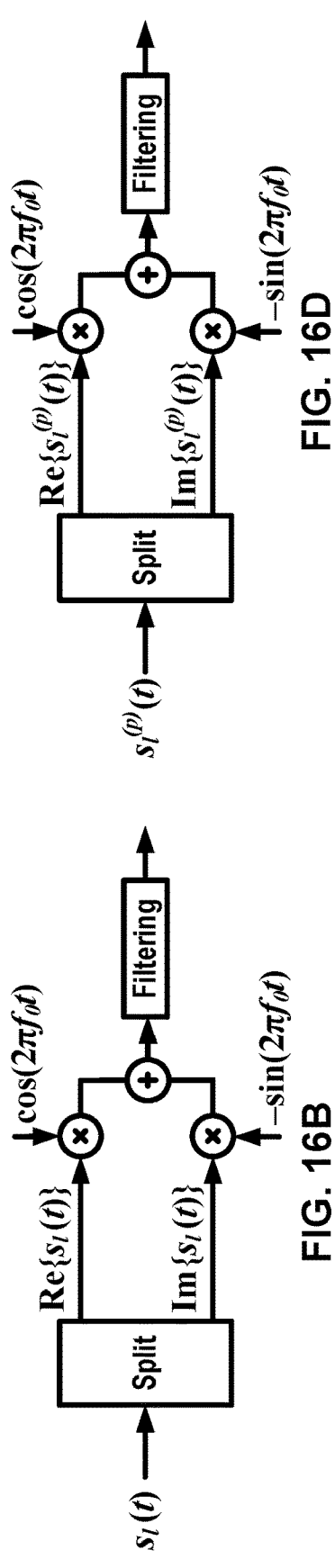
FIG. 16B
FIG. 16D
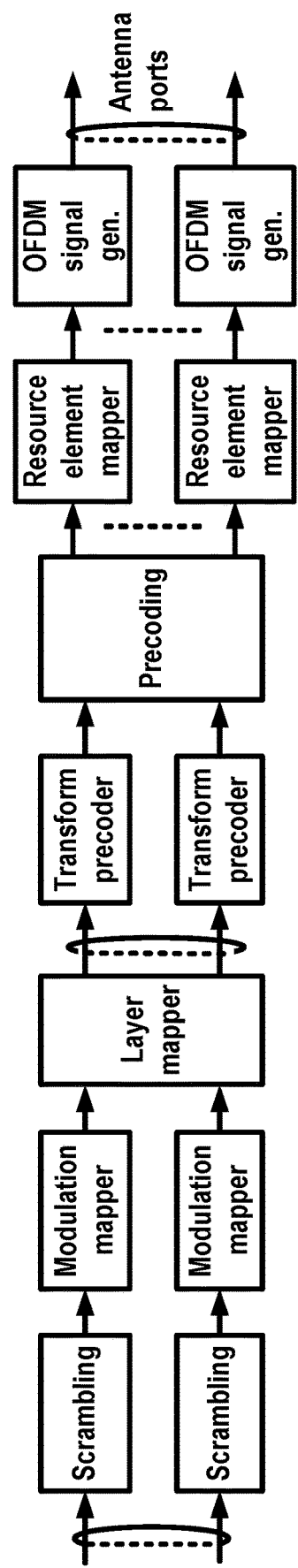
FIG. 16C

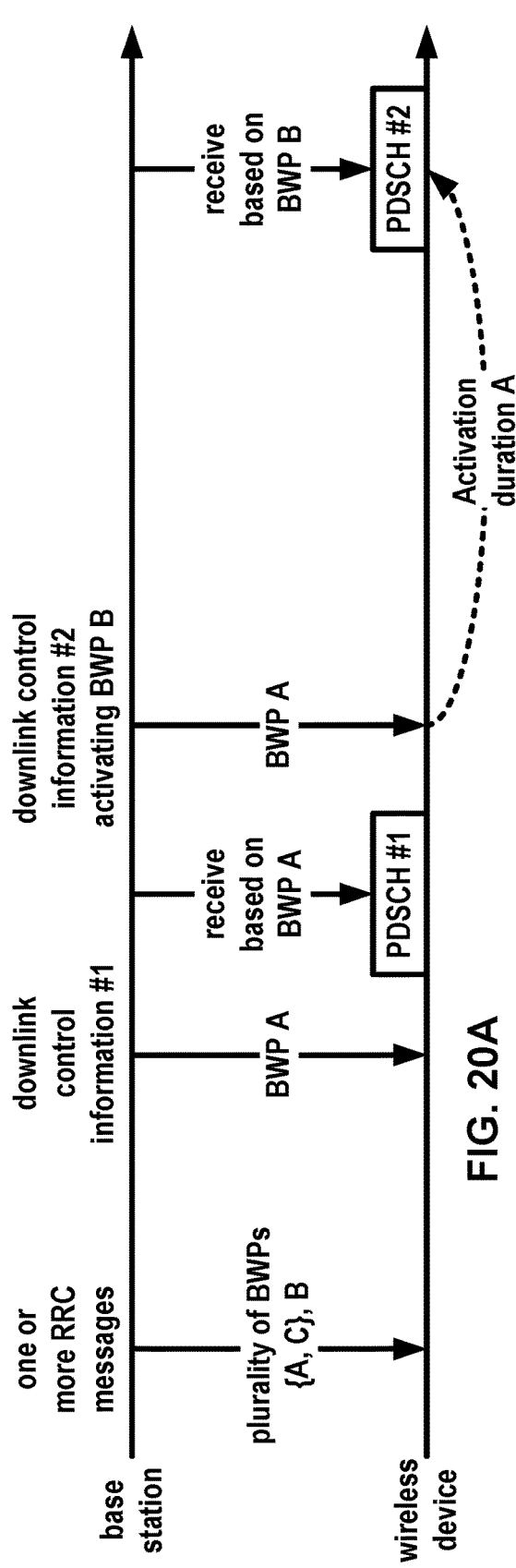
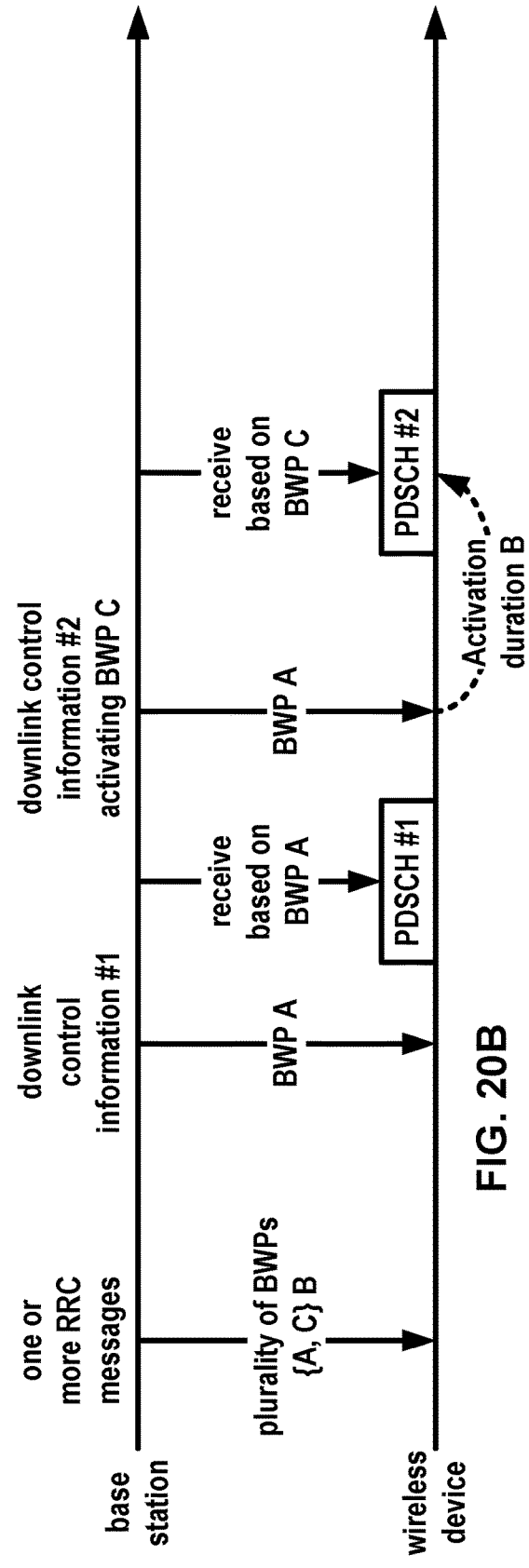
FIG. 20A
FIG. 20B

| Value of BWP indicator field | Bandwidth part |
|---|---|
| 2 bits | |
| 00 | Configured BWP with BWP-Id = 1 |
| 01 | Configured BWP with BWP-Id = 2 |
| 10 | Configured BWP with BWP-Id = 3 |
| 11 | Configured BWP with BWP-Id = 4 |

FIG. 23

| μ (subcarrier spacing) | NR Slot length (ms) | BWP switch delay $T_{BWPswitchDelay}$ (slots) | |
|---|---|---|---|
| | | Type 1 | Type 2 |
| 0 (15 kHz) | 1 | 1 | 3 |
| 1 (30 kHz) | 0.5 | 2 | 5 |
| 2 (60 kHz) | 0.25 | 3 | 9 |
| 3 (120 kHz) | 0.125 | 6 | 18 |

FIG. 24

| μ (subcarrier spacing) | NR Slot length (ms) | BWP switch delay $T_{BWPswitchDelay}$ (slots) | |
| --- | --- | --- | --- |
| | | Type 1 | Type 2 |
| 0 (15 kHz) | 1 | 0 | 1 |
| 1 (30 kHz) | 0.5 | 1 | 3 |
| 2 (60 kHz) | 0.25 | 2 | 5 |
| 3 (120 kHz) | 0.125 | 3 | 9 |

FIG. 25

| μ (subcarrier spacing) | NR Slot length (ms) | BWP switch delay $T_{BWPswitchDelay}$ (slots) | | | |
|---|---|---|---|---|---|
| | | Type 1 | | Type 2 | |
| | | Different group | Same group | Different group | Same group |
| 0 (15 kHz) | 1 | 1 | 0 | 3 | 1 |
| 1 (30 kHz) | 0.5 | 2 | 1 | 5 | 3 |
| 2 (60 kHz) | 0.25 | 3 | 2 | 9 | 5 |
| 3 (120 kHz) | 0.125 | 6 | 3 | 18 | 9 |

FIG. 26

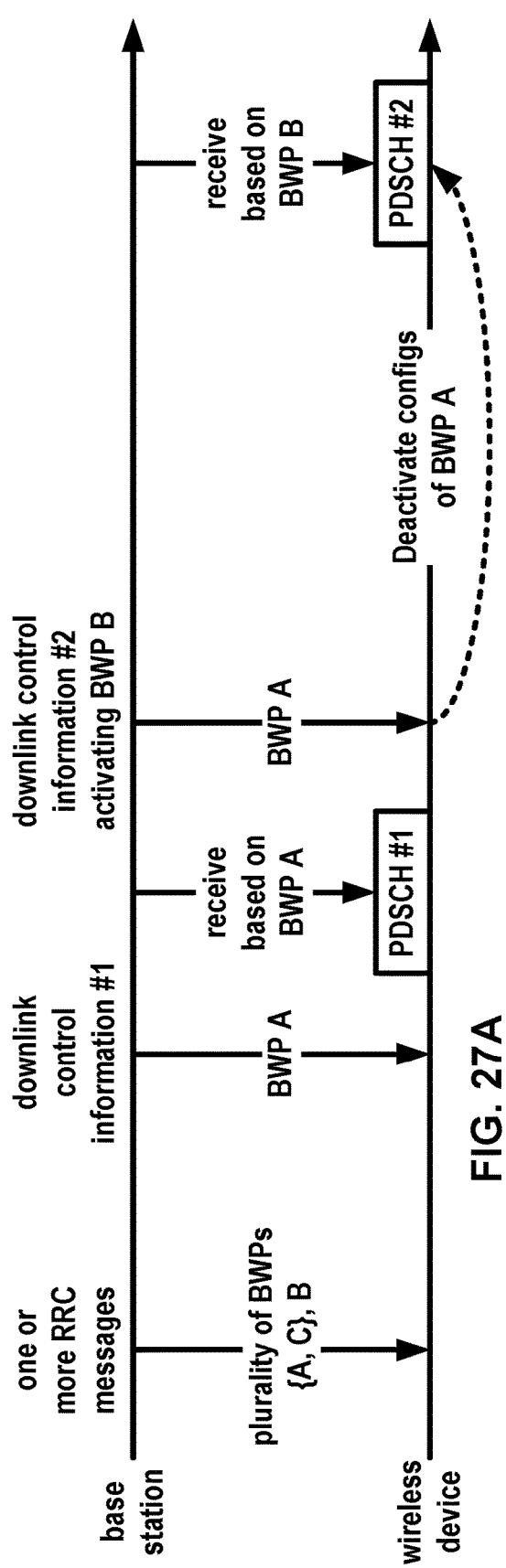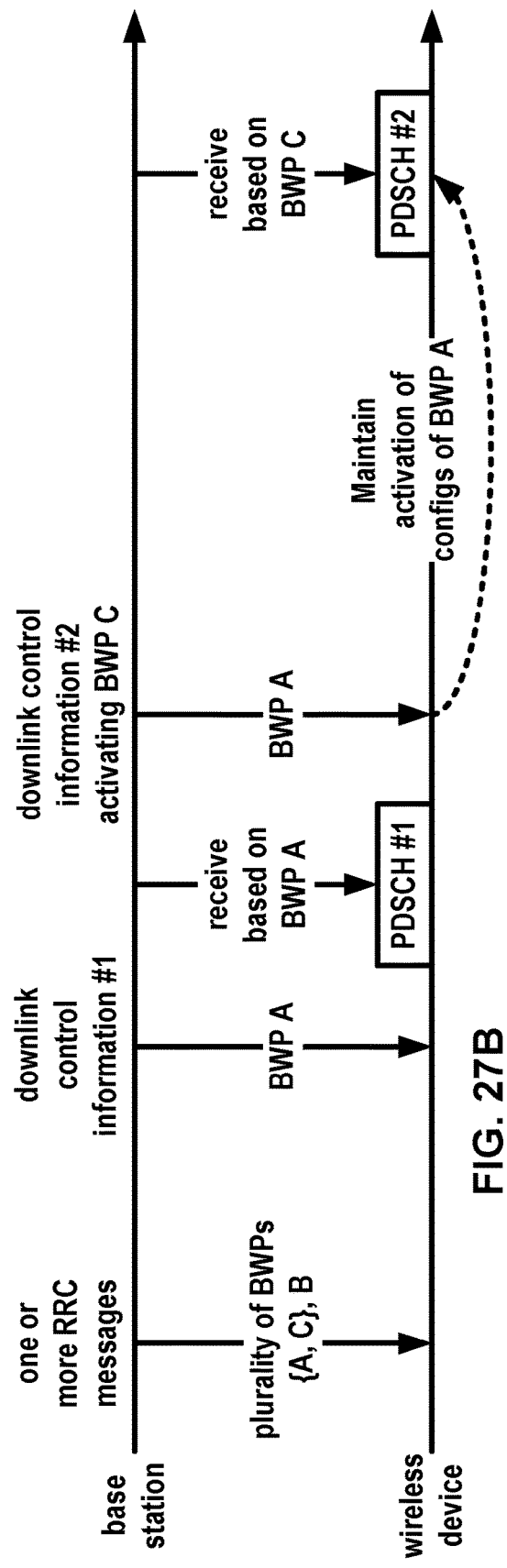
FIG. 27A
FIG. 27B

WIRELESS RESOURCE SWITCHING

CROSS-REFERENCE TO RELATED APPLICATIONS

This application claims the benefit of U.S. Provisional Application No. 62/948,941, filed on Dec. 17, 2019. The above-referenced application is hereby incorporated by reference in its entirety.

BACKGROUND

A base station and a wireless device communicate via uplink and/or downlink communication. A wireless device activates configuration parameters of a cell based on receiving control information from a base station.

SUMMARY

The following summary presents a simplified summary of certain features. The summary is not an extensive overview and is not intended to identify key or critical elements.

Wireless communications may comprise communications between a base station and a wireless device. A wireless resource, such as a bandwidth part (BWP), may be configured as an active wireless resource (e.g., active BWP). Wireless resources of a same group may comprise one or more common configuration parameters. Deactivation of an active wireless resource, and/or activation of another wireless resource, may be associated with a delay (e.g., a switching delay). A device (e.g., a wireless device, a base station, etc.) may incur different delay for different operations. For example, switching between a first BWP and a second BWP, based on maintaining at least some configuration parameters of the first BWP, may require a smaller delay than switching without maintaining the configuration parameters. Rather than applying a default delay, a wireless resource to be activated may be activated within a different delay (e.g., smaller delay) that may be determined based on whether the wireless resource to be activated and a wireless resource to be deactivated/switched are in a same group (e.g., a same BWP group).

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 5A shows an example mapping for downlink channels.

FIG. 5B shows an example mapping for uplink channels.

FIG. 12A shows examples of downlink beam management procedures.

FIG. 12B shows examples of uplink beam management procedures.

FIG. 16A, FIG. 16B, FIG. 16C, and FIG. 16D show examples of uplink and downlink signal transmission.

FIG. 20A and FIG. 20B show examples of bandwidth part (BWP) switching.

FIG. 23 shows an example BWP indication field.

FIG. 24 shows an example table of activation time duration for BWP switching.

FIG. 25 shows an example table of activation time duration for BWP switching.

FIG. 26 shows an example table of activation time duration for BWP switching.

FIG. 27A and FIG. 27B show examples of BWP switching.

DETAILED DESCRIPTION

Figure 1A:
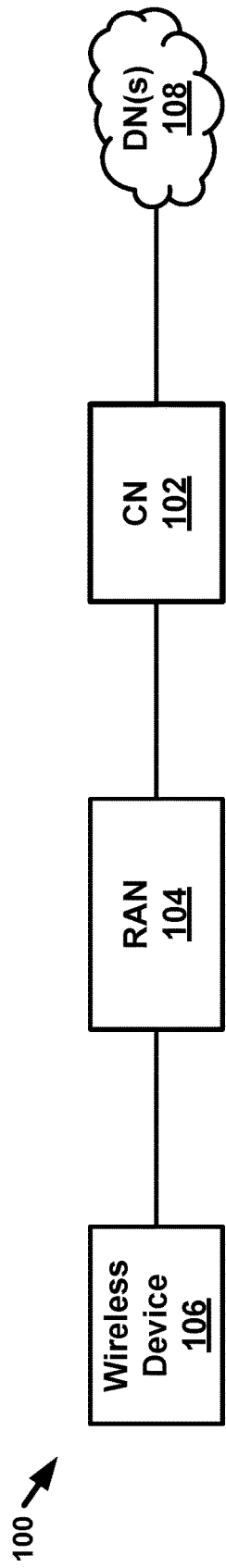
FIG. 1A and FIG. 1B show example communication networks.

The accompanying drawings and descriptions provide examples. It is to be understood that the examples shown in the drawings and/or described are non-exclusive, and that features shown and described may be practiced in other examples. Examples are provided for operation of wireless communication systems, which may be used in the technical field of multicarrier communication systems. More particularly, the technology disclosed herein may relate to wireless resource switching.

FIG. 1A shows an example communication network 100. The communication network 100 may comprise a mobile communication network). The communication network 100 may comprise, for example, a public land mobile network (PLMN) operated/managed/run by a network operator. The communication network 100 may comprise one or more of a core network (CN) 102, a radio access network (RAN) 104, and/or a wireless device 106. The communication network 100 may comprise, and/or a device within the communication network 100 may communicate with (e.g., via CN 102), one or more data networks (DN(s)) 108. The wireless device 106 may communicate with one or more DNs 108, such as public DNs (e.g., the Internet), private DNs, and/or intra-operator DNs. The wireless device 106 may communicate with the one or more DNs 108 via the RAN 104 and/or via the CN 102. The CN 102 may provide/configure the wireless device 106 with one or more interfaces to the one or more DNs 108. As part of the interface functionality, the CN 102 may set up end-to-end connections between the wireless device 106 and the one or more DNs 108, authenticate the wireless device 106, provide/configure charging functionality, etc.

The wireless device 106 may communicate with the RAN 104 via radio communications over an air interface. The RAN 104 may communicate with the CN 102 via various communications (e.g., wired communications and/or wireless communications). The wireless device 106 may establish a connection with the CN 102 via the RAN 104. The RAN 104 may provide/configure scheduling, radio resource management, and/or retransmission protocols, for example, as part of the radio communications. The communication direction from the RAN 104 to the wireless device 106 over/via the air interface may be referred to as the downlink and/or downlink communication direction. The communication direction from the wireless device 106 to the RAN 104 over/via the air interface may be referred to as the uplink and/or uplink communication direction. Downlink transmissions may be separated and/or distinguished from uplink transmissions, for example, based on at least one of: frequency division duplexing (FDD), time-division duplexing (TDD), any other duplexing schemes, and/or one or more combinations thereof.

As used throughout, the term "wireless device" may comprise one or more of: a mobile device, a fixed (e.g., non-mobile) device for which wireless communication is configured or usable, a computing device, a node, a device capable of wirelessly communicating, or any other device capable of sending and/or receiving signals. As non-limiting examples, a wireless device may comprise, for example: a telephone, a cellular phone, a Wi-Fi phone, a smartphone, a tablet, a computer, a laptop, a sensor, a meter, a wearable device, an Internet of Things (IoT) device, a hotspot, a cellular repeater, a vehicle road side unit (RSU), a relay node, an automobile, a wireless user device (e.g., user equipment (UE), a user terminal (UT), etc.), an access terminal (AT), a mobile station, a handset, a wireless transmit and receive unit (WTRU), a wireless communication device, and/or any combination thereof.

The RAN 104 may comprise one or more base stations (not shown). As used throughout, the term "base station" may comprise one or more of: a base station, a node, a Node B (NB), an evolved NodeB (eNB), a gNB, an ng-eNB, a relay node (e.g., an integrated access and backhaul (IAB) node), a donor node (e.g., a donor eNB, a donor gNB, etc.), an access point (e.g., a Wi-Fi access point), a transmission and reception point (TRP), a computing device, a device capable of wirelessly communicating, or any other device capable of sending and/or receiving signals. A base station may comprise one or more of each element listed above. For example, a base station may comprise one or more TRPs. As other non-limiting examples, a base station may comprise for example, one or more of: a Node B (e.g., associated with Universal Mobile Telecommunications System (UMTS) and/or third-generation (3G) standards), an Evolved Node B (eNB) (e.g., associated with Evolved-Universal Terrestrial Radio Access (E-UTRA) and/or fourth-generation (4G) standards), a remote radio head (RRH), a baseband processing unit coupled to one or more remote radio heads (RRHs), a repeater node or relay node used to extend the coverage area of a donor node, a Next Generation Evolved Node B (ng-eNB), a Generation Node B (gNB) (e.g., associated with NR and/or fifth-generation (5G) standards), an access point (AP) (e.g., associated with, for example, Wi-Fi or any other suitable wireless communication standard), any other generation base station, and/or any combination thereof. A base station may comprise one or more devices, such as at least one base station central device (e.g., a gNB Central Unit (gNB-CU)) and at least one base station distributed device (e.g., a gNB Distributed Unit (gNB-DU)).

A base station (e.g., in the RAN 104) may comprise one or more sets of antennas for communicating with the wireless device 106 wirelessly (e.g., via an over the air interface). One or more base stations may comprise sets (e.g., three sets or any other quantity of sets) of antennas to respectively control multiple cells or sectors (e.g., three cells, three sectors, any other quantity of cells, or any other quantity of sectors). The size of a cell may be determined by a range at which a receiver (e.g., a base station receiver) may successfully receive transmissions from a transmitter (e.g., a wireless device transmitter) operating in the cell. One or more cells of base stations (e.g., by alone or in combination with other cells) may provide/configure a radio coverage to the wireless device 106 over a wide geographic area to support wireless device mobility. A base station comprising three sectors (e.g., or n-sector, where n refers to any quantity n) may be referred to as a three-sector site (e.g., or an n-sector site) or a three-sector base station (e.g., an n-sector base station).

One or more base stations (e.g., in the RAN 104) may be implemented as a sectored site with more or less than three sectors. One or more base stations of the RAN 104 may be implemented as an access point, as a baseband processing device/unit coupled to several RRHs, and/or as a repeater or relay node used to extend the coverage area of a node (e.g., a donor node). A baseband processing device/unit coupled to RRHs may be part of a centralized or cloud RAN architecture, for example, where the baseband processing device/unit may be centralized in a pool of baseband processing devices/units or virtualized. A repeater node may amplify and send (e.g., transmit, retransmit, rebroadcast, etc.) a radio signal received from a donor node. A relay node may perform the substantially the same/similar functions as a repeater node. The relay node may decode the radio signal received from the donor node, for example, to remove noise before amplifying and sending the radio signal.

The RAN 104 may be deployed as a homogenous network of base stations (e.g., macrocell base stations) that have similar antenna patterns and/or similar high-level transmit powers. The RAN 104 may be deployed as a heterogeneous network of base stations (e.g., different base stations that have different antenna patterns). In heterogeneous networks, small cell base stations may be used to provide/configure small coverage areas, for example, coverage areas that overlap with comparatively larger coverage areas provided/configured by other base stations (e.g., macrocell base stations). The small coverage areas may be provided/configured in areas with high data traffic (or so-called "hotspots") or in areas with a weak macrocell coverage. Examples of small cell base stations may comprise, in order of decreasing coverage area, microcell base stations, picocell base stations, and femtocell base stations or home base stations.

Examples described herein may be used in a variety of types of communications. For example, communications may be in accordance with the Third-Generation Partnership Project (3GPP) (e.g., one or more network elements similar to those of the communication network 100), communications in accordance with Institute of Electrical and Electronics Engineers (IEEE), communications in accordance with International Telecommunication Union (ITU), communications in accordance with International Organization for Standardization (ISO), etc. The 3GPP has produced specifications for multiple generations of mobile networks: a 3G network known as UMTS, a 4G network known as Long-Term Evolution (LTE) and LTE Advanced (LTE-A), and a 5G network known as 5G System (5GS) and NR system. 3GPP may produce specifications for additional generations of communication networks (e.g., 6G and/or any other generation of communication network). Examples may be described with reference to one or more elements (e.g., the RAN) of a 3GPP 5G network, referred to as a next-generation RAN (NG-RAN), or any other communication network, such as a 3GPP network and/or a non-3GPP network. Examples described herein may be applicable to other communication networks, such as 3G and/or 4G networks, and communication networks that may not yet be finalized/specified (e.g., a 3GPP 6G network), satellite communication networks, and/or any other communication network. NG-RAN implements and updates 5G radio access technology referred to as NR and may be provisioned to implement 4G radio access technology and/or other radio access technologies, such as other 3GPP and/or non-3GPP radio access technologies.

Figure 1B:
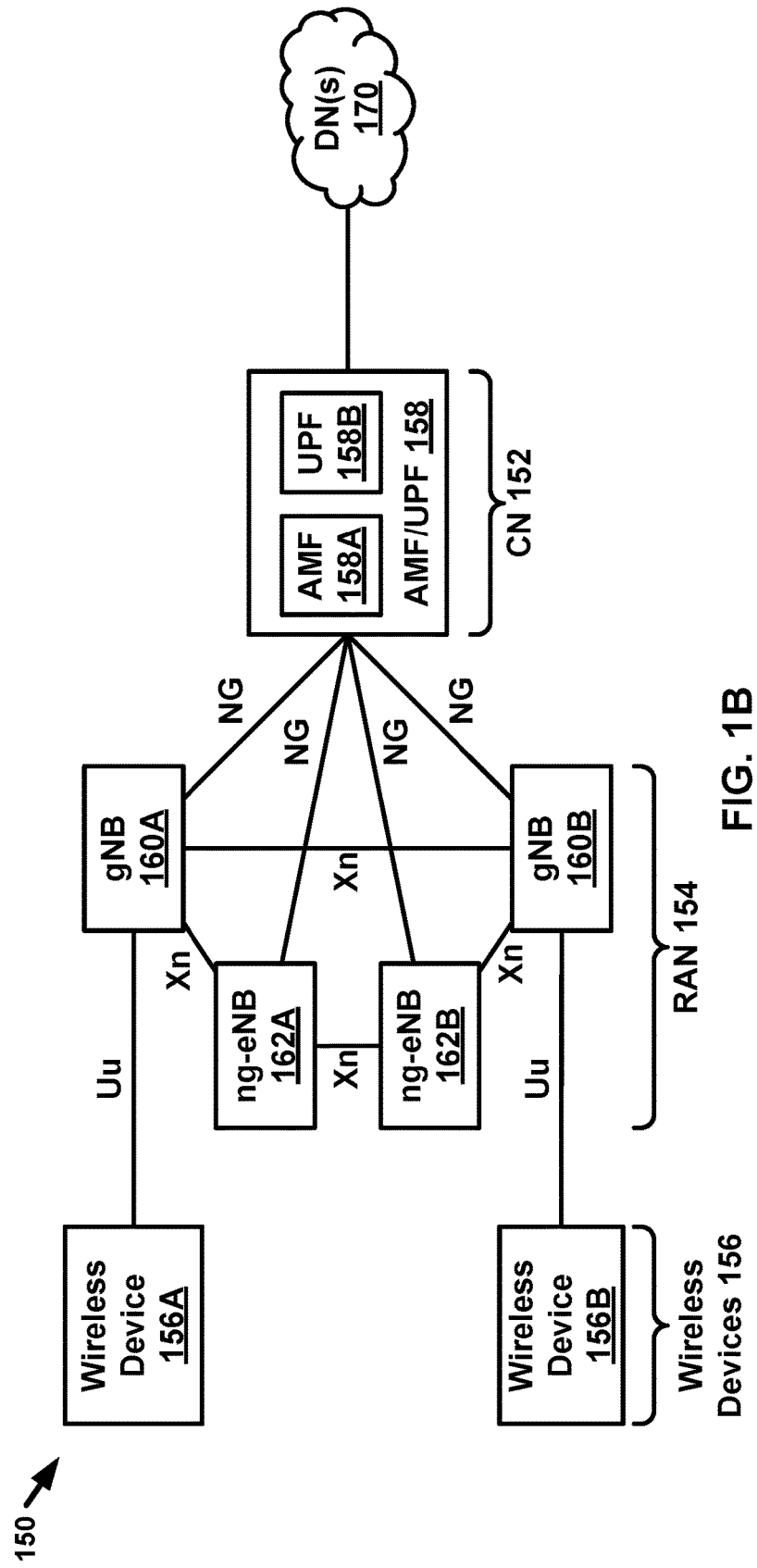

FIG. 1B shows an example communication network 150. The communication network may comprise a mobile communication network. The communication network 150 may comprise, for example, a PLMN operated/managed/run by a network operator. The communication network 150 may comprise one or more of: a CN 152 (e.g., a 5G core network (5G-CN)), a RAN 154 (e.g., an NG-RAN), and/or wireless devices 156A and 156B (collectively wireless device(s) 156). The communication network 150 may comprise, and/or a device within the communication network 150 may communicate with (e.g., via CN 152), one or more data networks (DN(s)) 170. These components may be implemented and operate in substantially the same or similar manner as corresponding components described with respect to FIG. 1A.

The CN 152 (e.g., 5G-CN) may provide/configure the wireless device(s) 156 with one or more interfaces to one or more DNs 170, such as public DNs (e.g., the Internet), private DNs, and/or intra-operator DNs. As part of the interface functionality, the CN 152 (e.g., 5G-CN) may set up end-to-end connections between the wireless device(s) 156 and the one or more DNs, authenticate the wireless device(s) 156, and/or provide/configure charging functionality. The CN 152 (e.g., the 5G-CN) may be a service-based architecture, which may differ from other CNs (e.g., such as a 3GPP 4G CN). The architecture of nodes of the CN 152 (e.g., 5G-CN) may be defined as network functions that offer services via interfaces to other network functions. The network functions of the CN 152 (e.g., 5G CN) may be implemented in several ways, for example, as network elements on dedicated or shared hardware, as software instances running on dedicated or shared hardware, and/or as virtualized functions instantiated on a platform (e.g., a cloud-based platform).

The CN 152 (e.g., 5G-CN) may comprise an Access and Mobility Management Function (AMF) device 158A and/or a User Plane Function (UPF) device 158B, which may be separate components or one component AMF/UPF device 158. The UPF device 158B may serve as a gateway between a RAN 154 (e.g., NG-RAN) and the one or more DNs 170. The UPF device 158B may perform functions, such as: packet routing and forwarding, packet inspection and user plane policy rule enforcement, traffic usage reporting, uplink classification to support routing of traffic flows to the one or more DNs 170, quality of service (QoS) handling for the user plane (e.g., packet filtering, gating, uplink/downlink rate enforcement, and uplink traffic verification), downlink packet buffering, and/or downlink data notification triggering. The UPF device 158B may serve as an anchor point for intra-/inter-Radio Access Technology (RAT) mobility, an external protocol (or packet) data unit (PDU) session point of interconnect to the one or more DNs, and/or a branching point to support a multi-homed PDU session. The wireless device(s) 156 may be configured to receive services via a PDU session, which may be a logical connection between a wireless device and a DN.

The AMF device 158A may perform functions, such as: Non-Access Stratum (NAS) signaling termination, NAS signaling security, Access Stratum (AS) security control, inter-CN node signaling for mobility between access networks (e.g., 3GPP access networks and/or non-3GPP networks), idle mode wireless device reachability (e.g., idle mode UE reachability for control and execution of paging retransmission), registration area management, intra-system and inter-system mobility support, access authentication, access authorization including checking of roaming rights, mobility management control (e.g., subscription and policies), network slicing support, and/or session management function (SMF) selection. NAS may refer to the functionality operating between a CN and a wireless device, and AS may refer to the functionality operating between a wireless device and a RAN.

The CN 152 (e.g., 5G-CN) may comprise one or more additional network functions that may not be shown in FIG. 1B. The CN 152 (e.g., 5G-CN) may comprise one or more devices implementing at least one of: a Session Management Function (SMF), an NR Repository Function (NRF), a Policy Control Function (PCF), a Network Exposure Function (NEF), a Unified Data Management (UDM), an Application Function (AF), an Authentication Server Function (AUSF), and/or any other function.

The RAN 154 (e.g., NG-RAN) may communicate with the wireless device(s) 156 via radio communications (e.g., an over the air interface). The wireless device(s) 156 may communicate with the CN 152 via the RAN 154. The RAN 154 (e.g., NG-RAN) may comprise one or more first-type base stations (e.g., gNBs comprising a gNB 160A and a gNB 160B (collectively gNBs 160)) and/or one or more second-type base stations (e.g., ng eNBs comprising an ng-eNB 162A and an ng-eNB 162B (collectively ng eNBs 162)). The RAN 154 may comprise one or more of any quantity of types of base station. The gNBs 160 and ng eNBs 162 may be referred to as base stations. The base stations (e.g., the gNBs 160 and ng eNBs 162) may comprise one or more sets of antennas for communicating with the wireless device(s) 156 wirelessly (e.g., an over an air interface). One or more base stations (e.g., the gNBs 160 and/or the ng eNBs 162) may comprise multiple sets of antennas to respectively control multiple cells (or sectors). The cells of the base stations (e.g., the gNBs 160 and the ng-eNBs 162) may provide a radio coverage to the wireless device(s) 156 over a wide geographic area to support wireless device mobility.

The base stations (e.g., the gNBs 160 and/or the ng-eNBs 162) may be connected to the CN 152 (e.g., 5G CN) via a first interface (e.g., an NG interface) and to other base stations via a second interface (e.g., an Xn interface). The NG and Xn interfaces may be established using direct physical connections and/or indirect connections over an underlying transport network, such as an internet protocol (IP) transport network. The base stations (e.g., the gNBs 160 and/or the ng-eNBs 162) may communicate with the wireless device(s) 156 via a third interface (e.g., a Uu interface). A base station (e.g., the gNB 160A) may communicate with the wireless device 156A via a Uu interface. The NG, Xn, and Uu interfaces may be associated with a protocol stack. The protocol stacks associated with the interfaces may be used by the network elements shown in FIG. 1B to exchange data and signaling messages. The protocol stacks may comprise two planes: a user plane and a control plane. Any other quantity of planes may be used (e.g., in a protocol stack). The user plane may handle data of interest to a user. The control plane may handle signaling messages of interest to the network elements.

One or more base stations (e.g., the gNBs 160 and/or the ng-eNBs 162) may communicate with one or more AMF/UPF devices, such as the AMF/UPF 158, via one or more interfaces (e.g., NG interfaces). A base station (e.g., the gNB 160A) may be in communication with, and/or connected to, the UPF 158B of the AMF/UPF 158 via an NG-User plane (NG-U) interface. The NG-U interface may provide/perform delivery (e.g., non-guaranteed delivery) of user plane PDUs between a base station (e.g., the gNB 160A) and a UPF device (e.g., the UPF 158B). The base station (e.g., the gNB 160A) may be in communication with, and/or connected to, an AMF device (e.g., the AMF 158A) via an NG-Control plane (NG-C) interface. The NG-C interface may provide/perform, for example, NG interface management, wireless device context management (e.g., UE context management), wireless device mobility management (e.g., UE mobility management), transport of NAS messages, paging, PDU session management, configuration transfer, and/or warning message transmission.

A wireless device may access the base station, via an interface (e.g., Uu interface), for the user plane configuration and the control plane configuration. The base stations (e.g., gNBs 160) may provide user plane and control plane protocol terminations towards the wireless device(s) 156 via the Uu interface. A base station (e.g., the gNB 160A) may provide user plane and control plane protocol terminations toward the wireless device 156A over a Uu interface associated with a first protocol stack. A base station (e.g., the ng-eNBs 162) may provide Evolved UMTS Terrestrial Radio Access (E UTRA) user plane and control plane protocol terminations towards the wireless device(s) 156 via a Uu interface (e.g., where E UTRA may refer to the 3GPP 4G radio-access technology). A base station (e.g., the ng-eNB 162B) may provide E UTRA user plane and control plane protocol terminations towards the wireless device 156B via a Uu interface associated with a second protocol stack. The user plane and control plane protocol terminations may comprise, for example, NR user plane and control plane protocol terminations, 4G user plane and control plane protocol terminations, etc.

The CN 152 (e.g., 5G-CN) may be configured to handle one or more radio accesses (e.g., NR, 4G, and/or any other radio accesses). It may also be possible for an NR network/device (or any first network/device) to connect to a 4G core network/device (or any second network/device) in a non-standalone mode (e.g., non-standalone operation). In a non-standalone mode/operation, a 4G core network may be used to provide (or at least support) control-plane functionality (e.g., initial access, mobility, and/or paging). Although only one AMF/UPF 158 is shown in FIG. 1B, one or more base stations (e.g., one or more gNBs and/or one or more ng-eNBs) may be connected to multiple AMF/UPF nodes, for example, to provide redundancy and/or to load share across the multiple AMF/UPF nodes.

An interface (e.g., Uu, Xn, and/or NG interfaces) between network elements (e.g., the network elements shown in FIG. 1B) may be associated with a protocol stack that the network elements may use to exchange data and signaling messages. A protocol stack may comprise two planes: a user plane and a control plane. Any other quantity of planes may be used (e.g., in a protocol stack). The user plane may handle data associated with a user (e.g., data of interest to a user). The control plane may handle data associated with one or more network elements (e.g., signaling messages of interest to the network elements).

The communication network 100 in FIG. 1A and/or the communication network 150 in FIG. 1B may comprise any quantity/number and/or type of devices, such as, for example, computing devices, wireless devices, mobile devices, handsets, tablets, laptops, internet of things (IoT) devices, hotspots, cellular repeaters, computing devices, and/or, more generally, user equipment (e.g., UE). Although one or more of the above types of devices may be referenced herein (e.g., UE, wireless device, computing device, etc.), it should be understood that any device herein may comprise any one or more of the above types of devices or similar devices. The communication network, and any other network referenced herein, may comprise an LTE network, a 5G network, a satellite network, and/or any other network for wireless communications (e.g., any 3GPP network and/or any non-3GPP network). Apparatuses, systems, and/or methods described herein may generally be described as implemented on one or more devices (e.g., wireless device, base station, eNB, gNB, computing device, etc.), in one or more networks, but it will be understood that one or more features and steps may be implemented on any device and/or in any network.

Figure 2A:
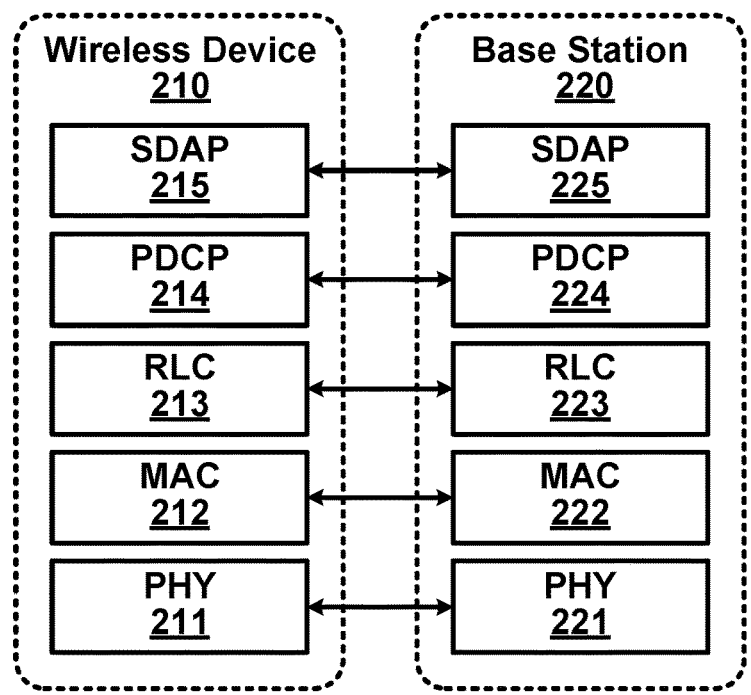
FIG. 2A shows an example user plane.
Figure 2B:
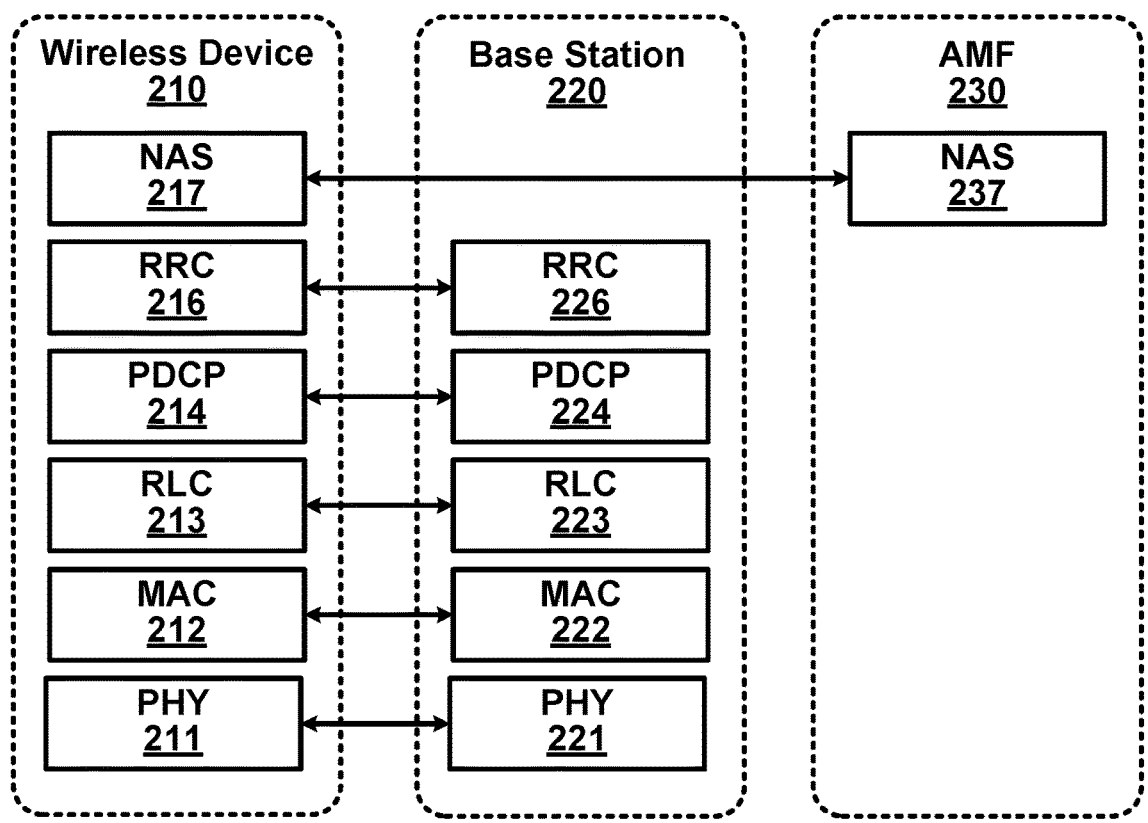
FIG. 2B shows an example control plane configuration.

FIG. 2A shows an example user plane configuration. The user plane configuration may comprise, for example, an NR user plane protocol stack. FIG. 2B shows an example control plane configuration. The control plane configuration may comprise, for example, an NR control plane protocol stack. One or more of the user plane configuration and/or the control plane configuration may use a Uu interface that may be between a wireless device 210 and a base station 220. The protocol stacks shown in FIG. 2A and FIG. 2B may be substantially the same or similar to those used for the Uu interface between, for example, the wireless device 156A and the base station 160A shown in FIG. 1B.

A user plane configuration (e.g., an NR user plane protocol stack) may comprise multiple layers (e.g., five layers or any other quantity of layers) implemented in the wireless device 210 and the base station 220 (e.g., as shown in FIG.

2A). At the bottom of the protocol stack, physical layers (PHYs) 211 and 221 may provide transport services to the higher layers of the protocol stack and may correspond to layer 1 of the Open Systems Interconnection (OSI) model. The protocol layers above PHY 211 may comprise a medium access control layer (MAC) 212, a radio link control layer (RLC) 213, a packet data convergence protocol layer (PDCP) 214, and/or a service data application protocol layer (SDAP) 215. The protocol layers above PHY 221 may comprise a medium access control layer (MAC) 222, a radio link control layer (RLC) 223, a packet data convergence protocol layer (PDCP) 224, and/or a service data application protocol layer (SDAP) 225. One or more of the four protocol layers above PHY 211 may correspond to layer 2, or the data link layer, of the OSI model. One or more of the four protocol layers above PHY 221 may correspond to layer 2, or the data link layer, of the OSI model.

Figure 3:
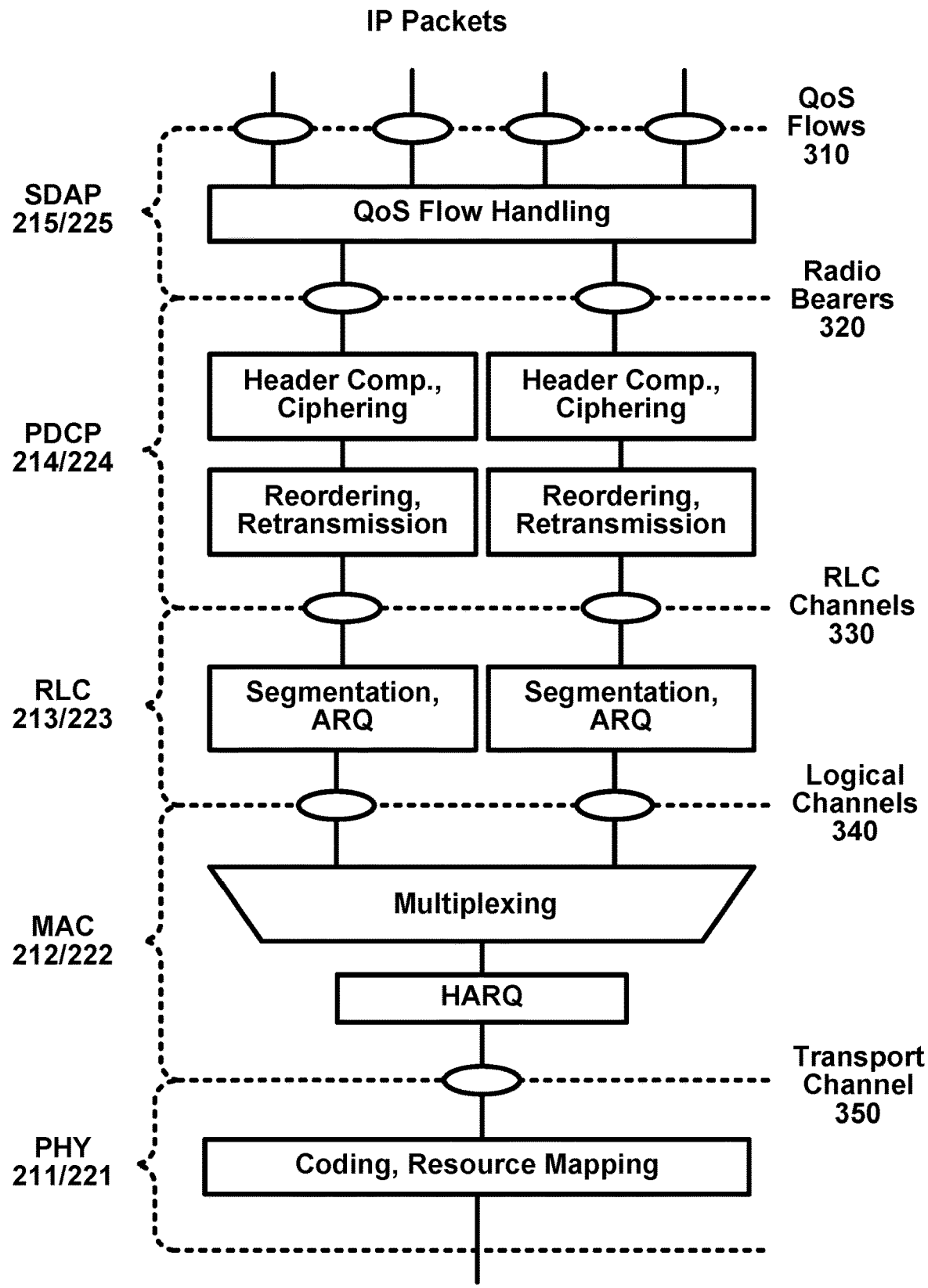
FIG. 3 shows example of protocol layers.

FIG. 3 shows an example of protocol layers. The protocol layers may comprise, for example, protocol layers of the NR user plane protocol stack. One or more services may be provided between protocol layers. SDAPs (e.g., SDAPS 215 and 225 shown in FIG. 2A and FIG. 3) may perform Quality of Service (QoS) flow handling. A wireless device (e.g., the wireless devices 106, 156A, 156B, and 210) may receive services through/via a PDU session, which may be a logical connection between the wireless device and a DN. The PDU session may have one or more QoS flows 310. A UPF (e.g., the UPF 158B) of a CN may map IP packets to the one or more QoS flows of the PDU session, for example, based on one or more QoS requirements (e.g., in terms of delay, data rate, error rate, and/or any other quality/service requirement). The SDAPs 215 and 225 may perform mapping/de-mapping between the one or more QoS flows 310 and one or more radio bearers 320 (e.g., data radio bearers). The mapping/de-mapping between the one or more QoS flows 310 and the radio bearers 320 may be determined by the SDAP 225 of the base station 220. The SDAP 215 of the wireless device 210 may be informed of the mapping between the QoS flows 310 and the radio bearers 320 via reflective mapping and/or control signaling received from the base station 220. For reflective mapping, the SDAP 225 of the base station 220 may mark the downlink packets with a QoS flow indicator (QFI), which may be monitored/detected/identified/indicated/observed by the SDAP 215 of the wireless device 210 to determine the mapping/de-mapping between the one or more QoS flows 310 and the radio bearers 320.

PDCPs (e.g., the PDCPs 214 and 224 shown in FIG. 2A and FIG. 3) may perform header compression/decompression, for example, to reduce the amount of data that may need to be transmitted over the air interface, ciphering/deciphering to prevent unauthorized decoding of data transmitted over the air interface, and/or integrity protection (e.g., to ensure control messages originate from intended sources). The PDCPs 214 and 224 may perform retransmissions of undelivered packets, in-sequence delivery and reordering of packets, and/or removal of packets received in duplicate due to, for example, a handover (e.g., an intra-gNB handover). The PDCPs 214 and 224 may perform packet duplication, for example, to improve the likelihood of the packet being received. A receiver may receive the packet in duplicate and may remove any duplicate packets. Packet duplication may be useful for certain services, such as services that require high reliability.

The PDCP layers (e.g., PDCPs 214 and 224) may perform mapping/de-mapping between a split radio bearer and RLC channels (e.g., RLC channels 330) (e.g., in a dual connectivity scenario/configuration). Dual connectivity may refer to a technique that allows a wireless device to communicate with multiple cells (e.g., two cells) or, more generally, multiple cell groups comprising: a master cell group (MCG) and a secondary cell group (SCG). A split bearer may be configured and/or used, for example, if a single radio bearer (e.g., such as one of the radio bearers provided/configured by the PDCPs 214 and 224 as a service to the SDAPs 215 and 225) is handled by cell groups in dual connectivity. The PDCPs 214 and 224 may map/de-map between the split radio bearer and RLC channels 330 belonging to the cell groups.

RLC layers (e.g., RLCs 213 and 223) may perform segmentation, retransmission via Automatic Repeat Request (ARQ), and/or removal of duplicate data units received from MAC layers (e.g., MACs 212 and 222, respectively). The RLC layers (e.g., RLCs 213 and 223) may support multiple transmission modes (e.g., three transmission modes: transparent mode (TM); unacknowledged mode (UM); and acknowledged mode (AM)). The RLC layers may perform one or more of the noted functions, for example, based on the transmission mode an RLC layer is operating. The RLC configuration may be per logical channel. The RLC configuration may not depend on numerologies and/or Transmission Time Interval (TTI) durations (or other durations). The RLC layers (e.g., RLCs 213 and 223) may provide/configure RLC channels as a service to the PDCP layers (e.g., PDCPs 214 and 224, respectively), such as shown in FIG. 3.

The MAC layers (e.g., MACs 212 and 222) may perform multiplexing/demultiplexing of logical channels and/or mapping between logical channels and transport channels. The multiplexing/demultiplexing may comprise multiplexing/demultiplexing of data units/data portions, belonging to the one or more logical channels, into/from Transport Blocks (TBs) delivered to/from the PHY layers (e.g., PHYs 211 and 221, respectively). The MAC layer of a base station (e.g., MAC 222) may be configured to perform scheduling, scheduling information reporting, and/or priority handling between wireless devices via dynamic scheduling. Scheduling may be performed by a base station (e.g., the base station 220 at the MAC 222) for downlink/or and uplink. The MAC layers (e.g., MACs 212 and 222) may be configured to perform error correction(s) via Hybrid Automatic Repeat Request (HARQ) (e.g., one HARQ entity per carrier in case of Carrier Aggregation (CA)), priority handling between logical channels of the wireless device 210 via logical channel prioritization and/or padding. The MAC layers (e.g., MACs 212 and 222) may support one or more numerologies and/or transmission timings. Mapping restrictions in a logical channel prioritization may control which numerology and/or transmission timing a logical channel may use. The MAC layers (e.g., the MACs 212 and 222) may provide/configure logical channels 340 as a service to the RLC layers (e.g., the RLCs 213 and 223).

The PHY layers (e.g., PHYs 211 and 221) may perform mapping of transport channels to physical channels and/or digital and analog signal processing functions, for example, for sending and/or receiving information (e.g., via an over the air interface). The digital and/or analog signal processing functions may comprise, for example, coding/decoding and/or modulation/demodulation. The PHY layers (e.g., PHYs 211 and 221) may perform multi-antenna mapping. The PHY layers (e.g., the PHYs 211 and 221) may provide/configure one or more transport channels (e.g., transport channels 350) as a service to the MAC layers (e.g., the MACs 212 and 222, respectively).

Figure 4A:
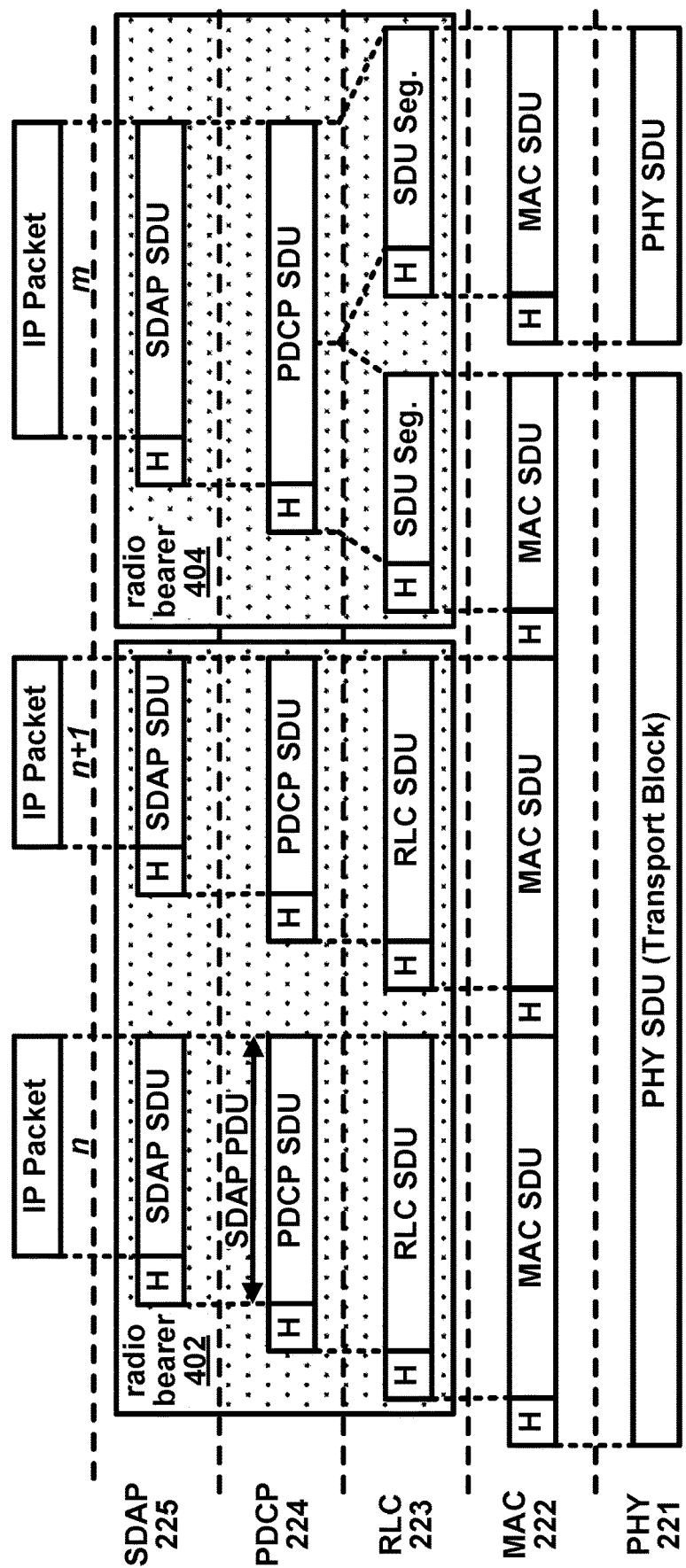
FIG. 4A shows an example downlink data flow for a user plane configuration.

FIG. 4A shows an example downlink data flow for a user plane configuration. The user plane configuration may comprise, for example, the NR user plane protocol stack shown in FIG. 2A. One or more TBs may be generated, for example, based on a data flow via a user plane protocol stack. As shown in FIG. 4A, a downlink data flow of three IP packets (n, n+1, and m) via the NR user plane protocol stack may generate two TBs (e.g., at the base station 220). An uplink data flow via the NR user plane protocol stack may be similar to the downlink data flow shown in FIG. 4A. The three IP packets (n, n+1, and m) may be determined from the two TBs, for example, based on the uplink data flow via an NR user plane protocol stack. A first quantity of packets (e.g., three or any other quantity) may be determined from a second quantity of TBs (e.g., two or another quantity).

The downlink data flow may begin, for example, if the SDAP 225 receives the three IP packets (or other quantity of IP packets) from one or more QoS flows and maps the three packets (or other quantity of packets) to radio bearers (e.g., radio bearers 402 and 404). The SDAP 225 may map the IP packets n and n+1 to a first radio bearer 402 and map the IP packet m to a second radio bearer 404. An SDAP header (labeled with "H" preceding each SDAP SDU shown in FIG. 4A) may be added to an IP packet to generate an SDAP PDU, which may be referred to as a PDCP SDU. The data unit transferred from/to a higher protocol layer may be referred to as a service data unit (SDU) of the lower protocol layer, and the data unit transferred to/from a lower protocol layer may be referred to as a protocol data unit (PDU) of the higher protocol layer. As shown in FIG. 4A, the data unit from the SDAP 225 may be an SDU of lower protocol layer PDCP 224 (e.g., PDCP SDU) and may be a PDU of the SDAP 225 (e.g., SDAP PDU).

Each protocol layer (e.g., protocol layers shown in FIG. 4A) or at least some protocol layers may: perform its own function(s) (e.g., one or more functions of each protocol layer described with respect to FIG. 3), add a corresponding header, and/or forward a respective output to the next lower layer (e.g., its respective lower layer). The PDCP 224 may perform an IP-header compression and/or ciphering. The PDCP 224 may forward its output (e.g., a PDCP PDU, which is an RLC SDU) to the RLC 223. The RLC 223 may optionally perform segmentation (e.g., as shown for IP packet m in FIG. 4A). The RLC 223 may forward its outputs (e.g., two RLC PDUs, which are two MAC SDUs, generated by adding respective subheaders to two SDU segments (SDU Segs)) to the MAC 222. The MAC 222 may multiplex a number of RLC PDUs (MAC SDUs). The MAC 222 may attach a MAC subheader to an RLC PDU (MAC SDU) to form a TB. The MAC subheaders may be distributed across the MAC PDU (e.g., in an NR configuration as shown in FIG. 4A). The MAC subheaders may be entirely located at the beginning of a MAC PDU (e.g., in an LTE configuration). The NR MAC PDU structure may reduce a processing time and/or associated latency, for example, if the MAC PDU subheaders are computed before assembling the full MAC PDU.

Figure 4B:
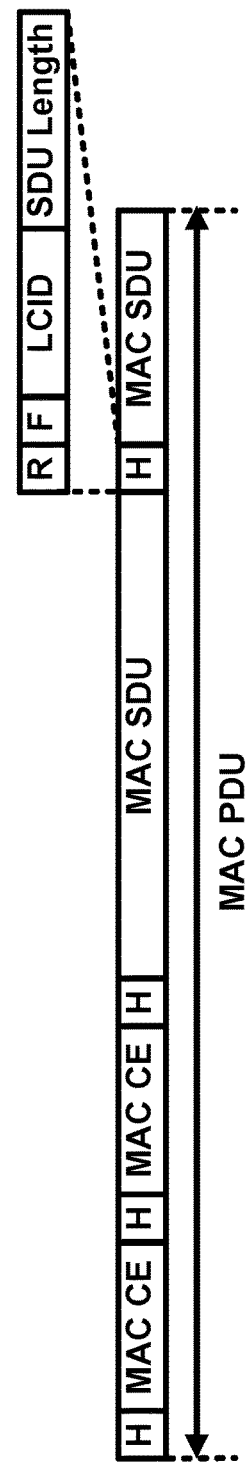
FIG. 4B shows an example format of a Medium Access Control (MAC) subheader in a MAC Protocol Data Unit (PDU).

FIG. 4B shows an example format of a MAC subheader in a MAC PDU. A MAC PDU may comprise a MAC subheader (H) and a MAC SDU. Each of one or more MAC subheaders may comprise an SDU length field for indicating the length (e.g., in bytes) of the MAC SDU to which the MAC subheader corresponds; a logical channel identifier (LCID) field for identifying/indicating the logical channel from which the MAC SDU originated to aid in the demultiplexing process; a flag (F) for indicating the size of the SDU length field; and a reserved bit (R) field for future use.

One or more MAC control elements (CEs) may be added to, or inserted into, the MAC PDU by a MAC layer, such as MAC 223 or MAC 222. As shown in FIG. 4B, two MAC CEs may be inserted/added before two MAC PDUs. The MAC CEs may be inserted/added at the beginning of a MAC PDU for downlink transmissions (as shown in FIG. 4B). One or more MAC CEs may be inserted/added at the end of a MAC PDU for uplink transmissions. MAC CEs may be used for in band control signaling. Example MAC CEs may comprise scheduling-related MAC CEs, such as buffer status reports and power headroom reports; activation/deactivation MAC CEs (e.g., MAC CEs for activation/deactivation of PDCP duplication detection, channel state information (CSI) reporting, sounding reference signal (SRS) transmission, and prior configured components); discontinuous reception (DRX)-related MAC CEs; timing advance MAC CEs; and random access-related MAC CEs. A MAC CE may be preceded by a MAC subheader with a similar format as described for the MAC subheader for MAC SDUs and may be identified with a reserved value in the LCID field that indicates the type of control information included in the corresponding MAC CE.

FIG. 5A shows an example mapping for downlink channels. The mapping for uplink channels may comprise mapping between channels (e.g., logical channels, transport channels, and physical channels) for downlink. FIG. 5B shows an example mapping for uplink channels. The mapping for uplink channels may comprise mapping between channels (e.g., logical channels, transport channels, and physical channels) for uplink. Information may be passed through/via channels between the RLC, the MAC, and the PHY layers of a protocol stack (e.g., the NR protocol stack). A logical channel may be used between the RLC and the MAC layers. The logical channel may be classified/indicated as a control channel that may carry control and/or configuration information (e.g., in the NR control plane), or as a traffic channel that may carry data (e.g., in the NR user plane). A logical channel may be classified/indicated as a dedicated logical channel that may be dedicated to a specific wireless device, and/or as a common logical channel that may be used by more than one wireless device (e.g., a group of wireless device).

A logical channel may be defined by the type of information it carries. The set of logical channels (e.g., in an NR configuration) may comprise one or more channels described below. A paging control channel (PCCH) may comprise/carry one or more paging messages used to page a wireless device whose location is not known to the network on a cell level. A broadcast control channel (BCCH) may comprise/carry system information messages in the form of a master information block (MIB) and several system information blocks (SIBs). The system information messages may be used by wireless devices to obtain information about how a cell is configured and how to operate within the cell. A common control channel (CCCH) may comprise/carry control messages together with random access. A dedicated control channel (DCCH) may comprise/carry control messages to/from a specific wireless device to configure the wireless device with configuration information. A dedicated traffic channel (DTCH) may comprise/carry user data to/from a specific wireless device.

Transport channels may be used between the MAC and PHY layers. Transport channels may be defined by how the information they carry is sent/transmitted (e.g., via an over the air interface). The set of transport channels (e.g., that may be defined by an NR configuration or any other configuration) may comprise one or more of the following channels. A paging channel (PCH) may comprise/carry paging messages that originated from the PCCH. A broadcast channel (BCH) may comprise/carry the MIB from the BCCH. A downlink shared channel (DL-SCH) may comprise/carry downlink data and signaling messages, including the SIBs from the BCCH. An uplink shared channel (UL-SCH) may comprise/carry uplink data and signaling messages. A random access channel (RACH) may provide a wireless device with an access to the network without any prior scheduling.

The PHY layer may use physical channels to pass/transfer information between processing levels of the PHY layer. A physical channel may have an associated set of time-frequency resources for carrying the information of one or more transport channels. The PHY layer may generate control information to support the low-level operation of the PHY layer. The PHY layer may provide/transfer the control information to the lower levels of the PHY layer via physical control channels (e.g., referred to as L1/L2 control channels). The set of physical channels and physical control channels (e.g., that may be defined by an NR configuration or any other configuration) may comprise one or more of the following channels. A physical broadcast channel (PBCH) may comprise/carry the MIB from the BCH. A physical downlink shared channel (PDSCH) may comprise/carry downlink data and signaling messages from the DL-SCH, as well as paging messages from the PCH. A physical downlink control channel (PDCCH) may comprise/carry downlink control information (DCI), which may comprise downlink scheduling commands, uplink scheduling grants, and uplink power control commands A physical uplink shared channel (PUSCH) may comprise/carry uplink data and signaling messages from the UL-SCH and in some instances uplink control information (UCI) as described below. A physical uplink control channel (PUCCH) may comprise/carry UCI, which may comprise HARQ acknowledgments, channel quality indicators (CQI), pre-coding matrix indicators (PMI), rank indicators (RI), and scheduling requests (SR). A physical random access channel (PRACH) may be used for random access.

The physical layer may generate physical signals to support the low-level operation of the physical layer, which may be similar to the physical control channels. As shown in FIG. 5A and FIG. 5B, the physical layer signals (e.g., that may be defined by an NR configuration or any other configuration) may comprise primary synchronization signals (PSS), secondary synchronization signals (SSS), channel state information reference signals (CSI-RS), demodulation reference signals (DM-RS), sounding reference signals (SRS), phase-tracking reference signals (PT RS), and/or any other signals.

One or more of the channels (e.g., logical channels, transport channels, physical channels, etc.) may be used to carry out functions associated with the control plan protocol stack (e.g., NR control plane protocol stack). FIG. 2B shows an example control plane configuration (e.g., an NR control plane protocol stack). As shown in FIG. 2B, the control plane configuration (e.g., the NR control plane protocol stack) may use substantially the same/similar one or more protocol layers (e.g., PHY 211 and 221, MAC 212 and 222, RLC 213 and 223, and PDCP 214 and 224) as the example user plane configuration (e.g., the NR user plane protocol stack). Similar four protocol layers may comprise the PHYs 211 and 221, the MACs 212 and 222, the RLCs 213 and 223, and the PDCPs 214 and 224. The control plane configuration (e.g., the NR control plane stack) may have radio resource controls (RRCs) 216 and 226 and NAS protocols 217 and 237 at the top of the control plane configuration (e.g., the NR control plane protocol stack), for example, instead of having the SDAPs 215 and 225. The control plane configuration may comprise an AMF 230 comprising the NAS protocol 237.

The NAS protocols 217 and 237 may provide control plane functionality between the wireless device 210 and the AMF 230 (e.g., the AMF 158A or any other AMF) and/or, more generally, between the wireless device 210 and a CN (e.g., the CN 152 or any other CN). The NAS protocols 217 and 237 may provide control plane functionality between the wireless device 210 and the AMF 230 via signaling messages, referred to as NAS messages. There may be no direct path between the wireless device 210 and the AMF 230 via which the NAS messages may be transported. The NAS messages may be transported using the AS of the Uu and NG interfaces. The NAS protocols 217 and 237 may provide control plane functionality, such as authentication, security, a connection setup, mobility management, session management, and/or any other functionality.

The RRCs 216 and 226 may provide/configure control plane functionality between the wireless device 210 and the base station 220 and/or, more generally, between the wireless device 210 and the RAN (e.g., the base station 220). The RRC layers 216 and 226 may provide/configure control plane functionality between the wireless device 210 and the base station 220 via signaling messages, which may be referred to as RRC messages. The RRC messages may be transmitted between the wireless device 210 and the RAN (e.g., the base station 220) using signaling radio bearers and the same/similar PDCP, RLC, MAC, and PHY protocol layers. The MAC layer may multiplex control-plane and user-plane data into the same TB. The RRC layers 216 and 226 may provide/configure control plane functionality, such as one or more of the following functionalities: broadcast of system information related to AS and NAS; paging initiated by the CN or the RAN; establishment, maintenance and release of an RRC connection between the wireless device 210 and the RAN (e.g., the base station 220); security functions including key management; establishment, configuration, maintenance and release of signaling radio bearers and data radio bearers; mobility functions; QoS management functions; wireless device measurement reporting (e.g., the wireless device measurement reporting) and control of the reporting; detection of and recovery from radio link failure (RLF); and/or NAS message transfer. As part of establishing an RRC connection, RRC layers 216 and 226 may establish an RRC context, which may involve configuring parameters for communication between the wireless device 210 and the RAN (e.g., the base station 220).

Figure 6:
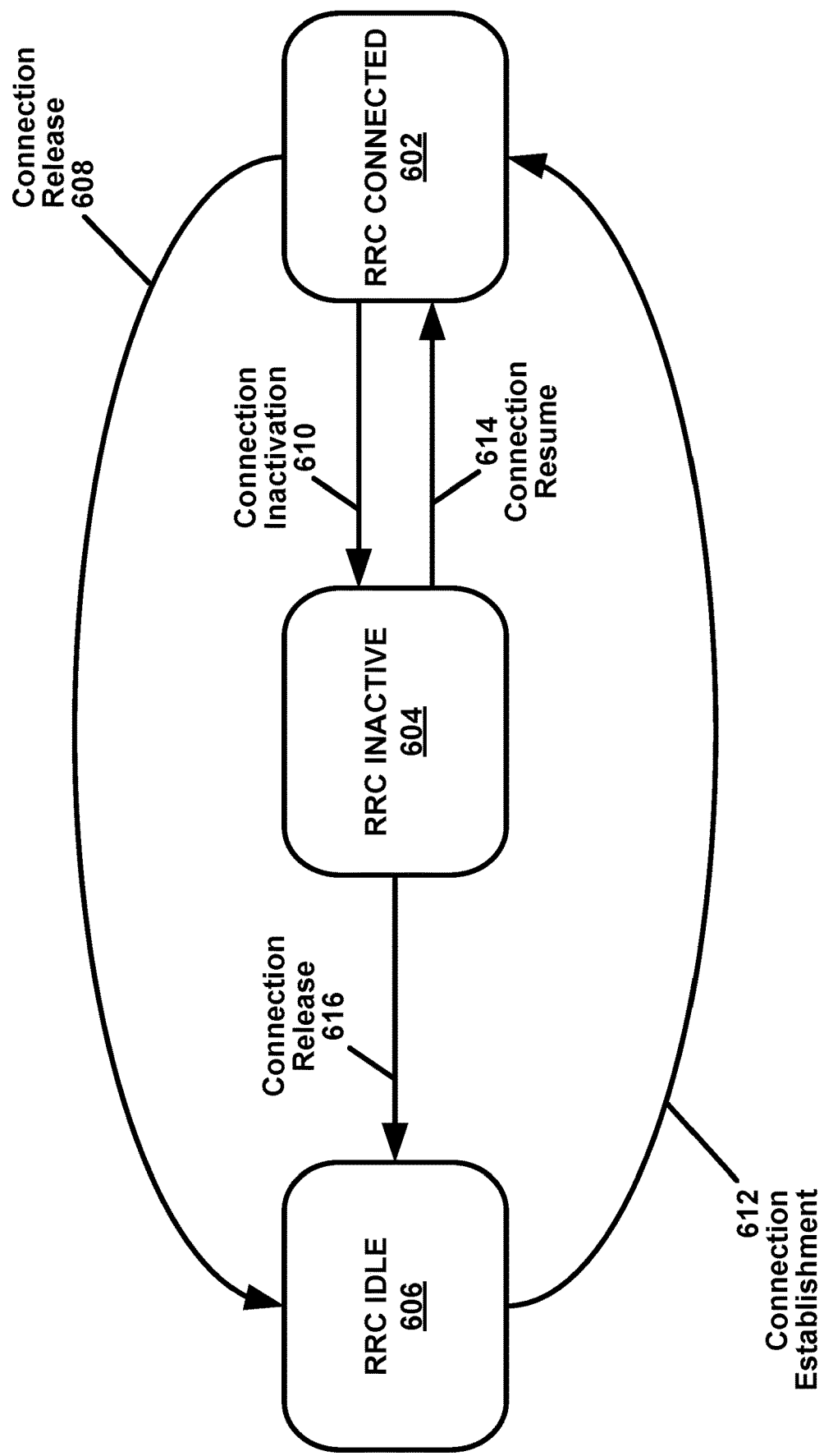
FIG. 6 shows example radio resource control (RRC) states and RRC state transitions.

FIG. 6 shows example RRC states and RRC state transitions. An RRC state of a wireless device may be changed to another RRC state (e.g., RRC state transitions of a wireless device). The wireless device may be substantially the same or similar to the wireless device 106, 210, or any other wireless device. A wireless device may be in at least one of a plurality of states, such as three RRC states comprising RRC connected 602 (e.g., RRC_CONNECTED), RRC idle 606 (e.g., RRC_IDLE), and RRC inactive 604 (e.g., RRC_INACTIVE). The RRC inactive 604 may be RRC connected but inactive.

An RRC connection may be established for the wireless device. For example, this may be during an RRC connected state. During the RRC connected state (e.g., during the RRC connected 602), the wireless device may have an established RRC context and may have at least one RRC connection with a base station. The base station may be similar to one of the one or more base stations (e.g., one or more base stations of the RAN 104 shown in FIG. 1A, one of the gNBs 160 or ng-eNBs 162 shown in FIG. 1B, the base station 220 shown in FIG. 2A and FIG. 2B, or any other base stations). The base station with which the wireless device is connected (e.g., has established an RRC connection) may have the RRC context for the wireless device. The RRC context, which may be referred to as a wireless device context (e.g., the UE context), may comprise parameters for communication between the wireless device and the base station. These parameters may comprise, for example, one or more of: AS contexts; radio link configuration parameters; bearer configuration information (e.g., relating to a data radio bearer, a signaling radio bearer, a logical channel, a QoS flow, and/or a PDU session); security information; and/or layer configuration information (e.g., PHY, MAC, RLC, PDCP, and/or SDAP layer configuration information). During the RRC connected state (e.g., the RRC connected 602), mobility of the wireless device may be managed/controlled by an RAN (e.g., the RAN 104 or the NG RAN 154). The wireless device may measure received signal levels (e.g., reference signal levels, reference signal received power, reference signal received quality, received signal strength indicator, etc.) based on one or more signals sent from a serving cell and neighboring cells. The wireless device may report these measurements to a serving base station (e.g., the base station currently serving the wireless device). The serving base station of the wireless device may request a handover to a cell of one of the neighboring base stations, for example, based on the reported measurements. The RRC state may transition from the RRC connected state (e.g., RRC connected 602) to an RRC idle state (e.g., the RRC idle 606) via a connection release procedure 608. The RRC state may transition from the RRC connected state (e.g., RRC connected 602) to the RRC inactive state (e.g., RRC inactive 604) via a connection inactivation procedure 610.

An RRC context may not be established for the wireless device. For example, this may be during the RRC idle state. During the RRC idle state (e.g., the RRC idle 606), an RRC context may not be established for the wireless device. During the RRC idle state (e.g., the RRC idle 606), the wireless device may not have an RRC connection with the base station. During the RRC idle state (e.g., the RRC idle 606), the wireless device may be in a sleep state for the majority of the time (e.g., to conserve battery power). The wireless device may wake up periodically (e.g., once in every discontinuous reception (DRX) cycle) to monitor for paging messages (e.g., paging messages set from the RAN). Mobility of the wireless device may be managed by the wireless device via a procedure of a cell reselection. The RRC state may transition from the RRC idle state (e.g., the RRC idle 606) to the RRC connected state (e.g., the RRC connected 602) via a connection establishment procedure 612, which may involve a random access procedure.

A previously established RRC context may be maintained for the wireless device. For example, this may be during the RRC inactive state. During the RRC inactive state (e.g., the RRC inactive 604), the RRC context previously established may be maintained in the wireless device and the base station. The maintenance of the RRC context may enable/allow a fast transition to the RRC connected state (e.g., the RRC connected 602) with reduced signaling overhead as compared to the transition from the RRC idle state (e.g., the RRC idle 606) to the RRC connected state (e.g., the RRC connected 602). During the RRC inactive state (e.g., the RRC inactive 604), the wireless device may be in a sleep state and mobility of the wireless device may be managed/controlled by the wireless device via a cell reselection. The RRC state may transition from the RRC inactive state (e.g., the RRC inactive 604) to the RRC connected state (e.g., the RRC connected 602) via a connection resume procedure 614. The RRC state may transition from the RRC inactive state (e.g., the RRC inactive 604) to the RRC idle state (e.g., the RRC idle 606) via a connection release procedure 616 that may be the same as or similar to connection release procedure 608.

An RRC state may be associated with a mobility management mechanism. During the RRC idle state (e.g., RRC idle 606) and the RRC inactive state (e.g., the RRC inactive 604), mobility may be managed/controlled by the wireless device via a cell reselection. The purpose of mobility management during the RRC idle state (e.g., the RRC idle 606) or during the RRC inactive state (e.g., the RRC inactive 604) may be to enable/allow the network to be able to notify the wireless device of an event via a paging message without having to broadcast the paging message over the entire mobile communications network. The mobility management mechanism used during the RRC idle state (e.g., the RRC idle 606) or during the RRC idle state (e.g., the RRC inactive 604) may enable/allow the network to track the wireless device on a cell-group level, for example, so that the paging message may be broadcast over the cells of the cell group that the wireless device currently resides within (e.g. instead of sending the paging message over the entire mobile communication network). The mobility management mechanisms for the RRC idle state (e.g., the RRC idle 606) and the RRC inactive state (e.g., the RRC inactive 604) may track the wireless device on a cell-group level. The mobility management mechanisms may do the tracking, for example, using different granularities of grouping. There may be a plurality of levels of cell-grouping granularity (e.g., three levels of cell-grouping granularity: individual cells; cells within a RAN area identified by a RAN area identifier (RAI); and cells within a group of RAN areas, referred to as a tracking area and identified by a tracking area identifier (TAI)).

Tracking areas may be used to track the wireless device (e.g., tracking the location of the wireless device at the CN level). The CN (e.g., the CN 102, the 5G CN 152, or any other CN) may send to the wireless device a list of TAIs associated with a wireless device registration area (e.g., a UE registration area). A wireless device may perform a registration update with the CN to allow the CN to update the location of the wireless device and provide the wireless device with a new the UE registration area, for example, if the wireless device moves (e.g., via a cell reselection) to a cell associated with a TAI that may not be included in the list of TAIs associated with the UE registration area.

RAN areas may be used to track the wireless device (e.g., the location of the wireless device at the RAN level). For a wireless device in an RRC inactive state (e.g., the RRC inactive 604), the wireless device may be assigned/provided/configured with a RAN notification area. A RAN notification area may comprise one or more cell identities (e.g., a list of RAIs and/or a list of TAIs). A base station may belong to one or more RAN notification areas. A cell may belong to one or more RAN notification areas. A wireless device may perform a notification area update with the RAN to update the RAN notification area of the wireless device, for example, if the wireless device moves (e.g., via a cell reselection) to a cell not included in the RAN notification area assigned/provided/configured to the wireless device.

A base station storing an RRC context for a wireless device or a last serving base station of the wireless device may be referred to as an anchor base station. An anchor base station may maintain an RRC context for the wireless device at least during a period of time that the wireless device stays in a RAN notification area of the anchor base station and/or during a period of time that the wireless device stays in an RRC inactive state (e.g., RRC inactive 604).

A base station (e.g., gNBs 160 in FIG. 1B or any other base station) may be split in two parts: a central unit (e.g., a base station central unit, such as a gNB CU) and one or more distributed units (e.g., a base station distributed unit, such as a gNB DU). A base station central unit (CU) may be coupled to one or more base station distributed units (DUs) using an F1 interface (e.g., an F1 interface defined in an NR configuration). The base station CU may comprise the RRC, the PDCP, and the SDAP layers. A base station distributed unit (DU) may comprise the RLC, the MAC, and the PHY layers.

The physical signals and physical channels (e.g., described with respect to FIG. 5A and FIG. 5B) may be mapped onto one or more symbols (e.g., orthogonal frequency divisional multiplexing (OFDM) symbols in an NR configuration or any other symbols). OFDM is a multicarrier communication scheme that transmits data over F orthogonal subcarriers (or tones). The data may be mapped to a series of complex symbols (e.g., M-quadrature amplitude modulation (M-QAM) symbols or M-phase shift keying (M PSK) symbols or any other modulated symbols), referred to as source symbols, and divided into F parallel symbol streams, for example, before transmission of the data. The F parallel symbol streams may be treated as if they are in the frequency domain. The F parallel symbols may be used as inputs to an Inverse Fast Fourier Transform (IFFT) block that transforms them into the time domain. The IFFT block may take in F source symbols at a time, one from each of the F parallel symbol streams. The IFFT block may use each source symbol to modulate the amplitude and phase of one of F sinusoidal basis functions that correspond to the F orthogonal subcarriers. The output of the IFFT block may be F time-domain samples that represent the summation of the F orthogonal subcarriers. The F time-domain samples may form a single OFDM symbol. An OFDM symbol provided/output by the IFFT block may be sent/transmitted over the air interface on a carrier frequency, for example, after one or more processes (e.g., addition of a cyclic prefix) and up-conversion. The F parallel symbol streams may be mixed, for example, using a Fast Fourier Transform (FFT) block before being processed by the IFFT block. This operation may produce Discrete Fourier Transform (DFT)-precoded OFDM symbols and may be used by one or more wireless devices in the uplink to reduce the peak to average power ratio (PAPR). Inverse processing may be performed on the OFDM symbol at a receiver using an FFT block to recover the data mapped to the source symbols.

Figure 7:
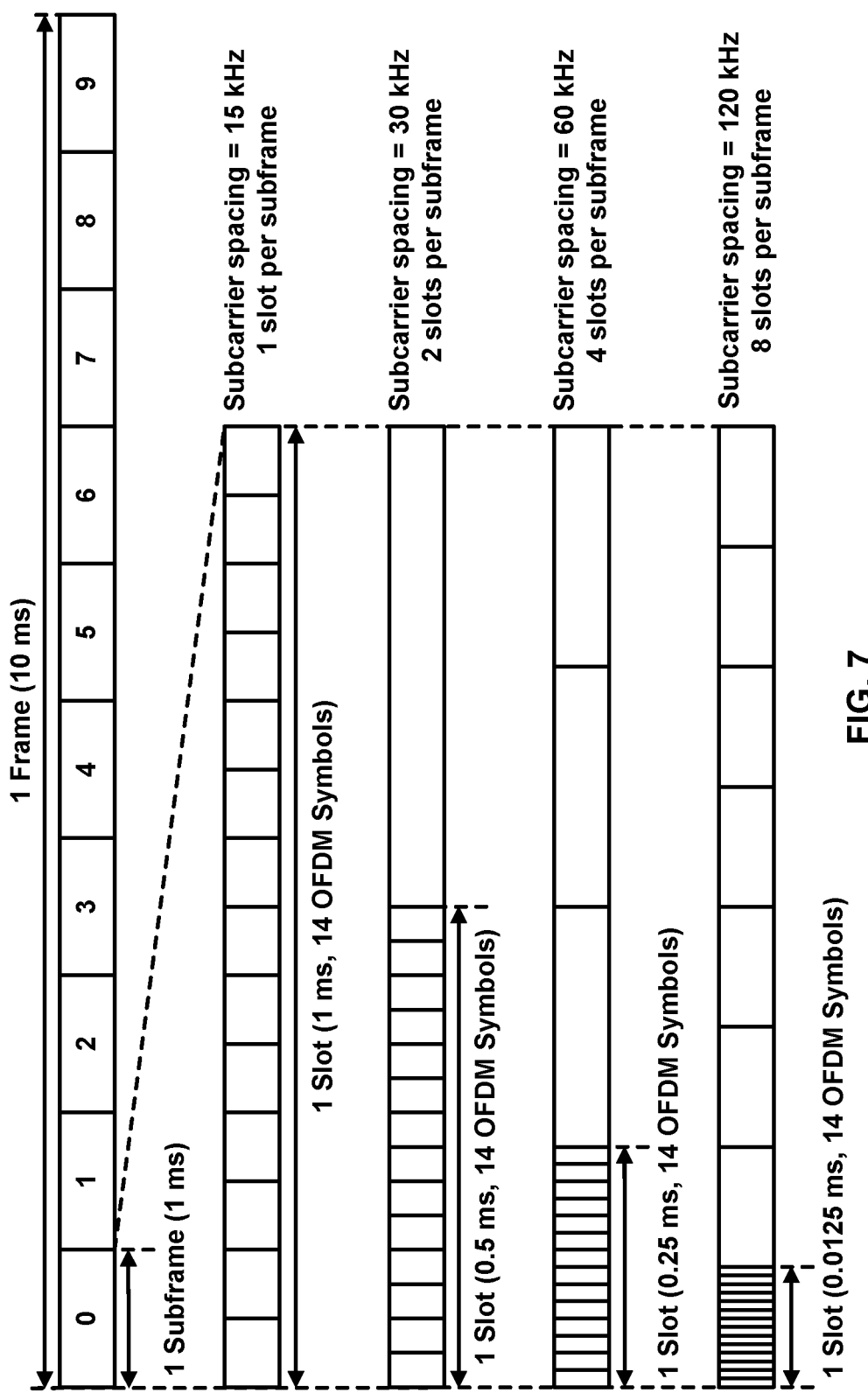
FIG. 7 shows an example configuration of a frame.

FIG. 7 shows an example configuration of a frame. The frame may comprise, for example, an NR radio frame into which OFDM symbols may be grouped. A frame (e.g., an NR radio frame) may be identified/indicated by a system frame number (SFN) or any other value. The SFN may repeat with a period of 1024 frames. One NR frame may be 10 milliseconds (ms) in duration and may comprise 10 subframes that are 1 ms in duration. A subframe may be divided into one or more slots (e.g., depending on numerologies and/or different subcarrier spacings). Each of the one or more slots may comprise, for example, 14 OFDM symbols per slot. Any quantity of symbols, slots, or duration may be used for any time interval.

The duration of a slot may depend on the numerology used for the OFDM symbols of the slot. A flexible numerology may be supported, for example, to accommodate different deployments (e.g., cells with carrier frequencies below 1 GHz up to cells with carrier frequencies in the mm-wave range). A flexible numerology may be supported, for example, in an NR configuration or any other radio configurations. A numerology may be defined in terms of subcarrier spacing and/or cyclic prefix duration. Subcarrier spacings may be scaled up by powers of two from a baseline subcarrier spacing of 15 kHz. Cyclic prefix durations may be scaled down by powers of two from a baseline cyclic prefix duration of 4.7 μs, for example, for a numerology in an NR configuration or any other radio configurations. Numerologies may be defined with the following subcarrier spacing/cyclic prefix duration combinations: 15 kHz/4.7 μs; 30 kHz/2.3 μs; 60 kHz/1.2 μs; 120 kHz/0.59 μs; 240 kHz/0.29 μs, and/or any other subcarrier spacing/cyclic prefix duration combinations.

A slot may have a fixed number/quantity of OFDM symbols (e.g., 14 OFDM symbols). A numerology with a higher subcarrier spacing may have a shorter slot duration and more slots per subframe. Examples of numerology-dependent slot duration and slots-per-subframe transmission structure are shown in FIG. 7 (the numerology with a subcarrier spacing of 240 kHz is not shown in FIG. 7). A subframe (e.g., in an NR configuration) may be used as a numerology-independent time reference. A slot may be used as the unit upon which uplink and downlink transmissions are scheduled. Scheduling (e.g., in an NR configuration) may be decoupled from the slot duration. Scheduling may start at any OFDM symbol. Scheduling may last for as many symbols as needed for a transmission, for example, to support low latency. These partial slot transmissions may be referred to as mini-slot or sub-slot transmissions.

Figure 8:
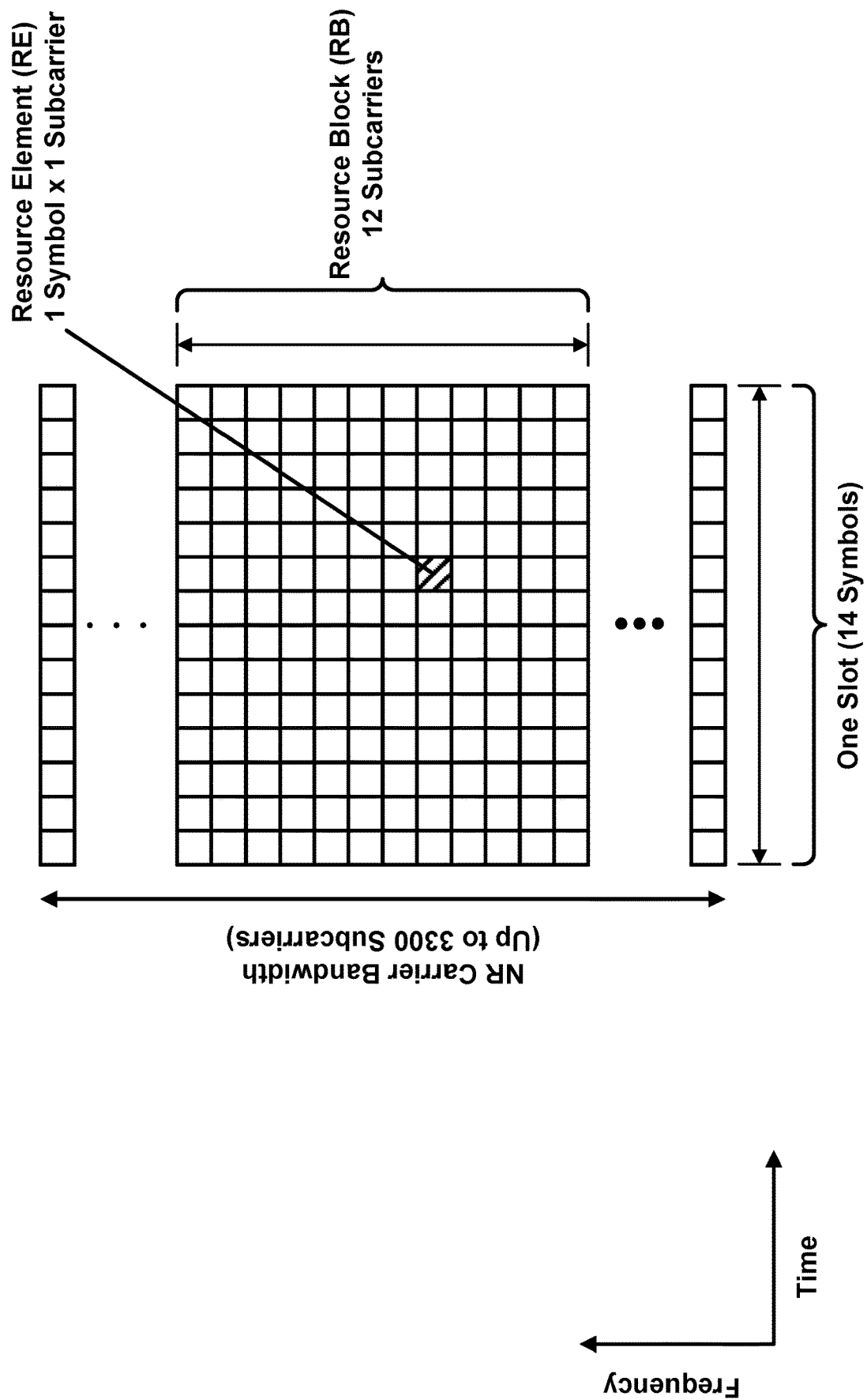
FIG. 8 shows an example resource configuration of one or more carriers.

FIG. 8 shows an example resource configuration of one or more carriers. The resource configuration of may comprise a slot in the time and frequency domain for an NR carrier or any other carrier. The slot may comprise resource elements (REs) and resource blocks (RBs). A resource element (RE) may be the smallest physical resource (e.g., in an NR configuration). An RE may span one OFDM symbol in the time domain by one subcarrier in the frequency domain, such as shown in FIG. 8. An RB may span twelve consecutive REs in the frequency domain, such as shown in FIG. 8. A carrier (e.g., an NR carrier) may be limited to a width of a certain quantity of RBs and/or subcarriers (e.g., 275 RBs or 275×12=3300 subcarriers). Such limitation(s), if used, may limit the carrier (e.g., NR carrier) frequency based on subcarrier spacing (e.g., carrier frequency of 50, 100, 200, and 400 MHz for subcarrier spacings of 15, 30, 60, and 120 kHz, respectively). A 400 MHz bandwidth may be set based on a 400 MHz per carrier bandwidth limit. Any other bandwidth may be set based on a per carrier bandwidth limit.

A single numerology may be used across the entire bandwidth of a carrier (e.g., an NR such as shown in FIG. 8). In other example configurations, multiple numerologies may be supported on the same carrier. NR and/or other access technologies may support wide carrier bandwidths (e.g., up to 400 MHz for a subcarrier spacing of 120 kHz). Not all wireless devices may be able to receive the full carrier bandwidth (e.g., due to hardware limitations and/or different wireless device capabilities). Receiving and/or utilizing the full carrier bandwidth may be prohibitive, for example, in terms of wireless device power consumption. A wireless device may adapt the size of the receive bandwidth of the wireless device, for example, based on the amount of traffic the wireless device is scheduled to receive (e.g., to reduce power consumption and/or for other purposes). Such an adaptation may be referred to as bandwidth adaptation.

Configuration of one or more bandwidth parts (BWPs) may support one or more wireless devices not capable of receiving the full carrier bandwidth. BWPs may support bandwidth adaptation, for example, for such wireless devices not capable of receiving the full carrier bandwidth. A BWP (e.g., a BWP of an NR configuration) may be defined by a subset of contiguous RBs on a carrier. A wireless device may be configured (e.g., via an RRC layer) with one or more downlink BWPs per serving cell and one or more uplink BWPs per serving cell (e.g., up to four downlink BWPs per serving cell and up to four uplink BWPs per serving cell). One or more of the configured BWPs for a serving cell may be active, for example, at a given time. The one or more BWPs may be referred to as active BWPs of the serving cell. A serving cell may have one or more first active BWPs in the uplink carrier and one or more second active BWPs in the secondary uplink carrier, for example, if the serving cell is configured with a secondary uplink carrier.

A downlink BWP from a set of configured downlink BWPs may be linked with an uplink BWP from a set of configured uplink BWPs (e.g., for unpaired spectra). A downlink BWP and an uplink BWP may be linked, for example, if a downlink BWP index of the downlink BWP and an uplink BWP index of the uplink BWP are the same. A wireless device may expect that the center frequency for a downlink BWP is the same as the center frequency for an uplink BWP (e.g., for unpaired spectra).

A base station may configure a wireless device with one or more control resource sets (CORESETs) for at least one search space. The base station may configure the wireless device with one or more CORESETS, for example, for a downlink BWP in a set of configured downlink BWPs on a primary cell (PCell) or on a secondary cell (SCell). A search space may comprise a set of locations in the time and frequency domains where the wireless device may monitor/find/detect/identify control information. The search space may be a wireless device-specific search space (e.g., a UE-specific search space) or a common search space (e.g., potentially usable by a plurality of wireless devices or a group of wireless user devices). A base station may configure a group of wireless devices with a common search space, on a PCell or on a primary secondary cell (PSCell), in an active downlink BWP.

A base station may configure a wireless device with one or more resource sets for one or more PUCCH transmissions, for example, for an uplink BWP in a set of configured uplink BWPs. A wireless device may receive downlink receptions (e.g., PDCCH or PDSCH) in a downlink BWP, for example, according to a configured numerology (e.g., a configured subcarrier spacing and/or a configured cyclic prefix duration) for the downlink BWP. The wireless device may send/transmit uplink transmissions (e.g., PUCCH or PUSCH) in an uplink BWP, for example, according to a configured numerology (e.g., a configured subcarrier spacing and/or a configured cyclic prefix length for the uplink BWP).

One or more BWP indicator fields may be provided/comprised in Downlink Control Information (DCI). A value of a BWP indicator field may indicate which BWP in a set of configured BWPs is an active downlink BWP for one or more downlink receptions. The value of the one or more BWP indicator fields may indicate an active uplink BWP for one or more uplink transmissions.

A base station may semi-statically configure a wireless device with a default downlink BWP within a set of configured downlink BWPs associated with a PCell. A default downlink BWP may be an initial active downlink BWP, for example, if the base station does not provide/configure a default downlink BWP to/for the wireless device. The wireless device may determine which BWP is the initial active downlink BWP, for example, based on a CORESET configuration obtained using the PBCH.

A base station may configure a wireless device with a BWP inactivity timer value for a PCell. The wireless device may start or restart a BWP inactivity timer at any appropriate time. The wireless device may start or restart the BWP inactivity timer, for example, if one or more conditions are satisfied. The one or more conditions may comprise at least one of: the wireless device detects DCI indicating an active downlink BWP other than a default downlink BWP for a paired spectra operation; the wireless device detects DCI indicating an active downlink BWP other than a default downlink BWP for an unpaired spectra operation; and/or the wireless device detects DCI indicating an active uplink BWP other than a default uplink BWP for an unpaired spectra operation. The wireless device may start/run the BWP inactivity timer toward expiration (e.g., increment from zero to the BWP inactivity timer value, or decrement from the BWP inactivity timer value to zero), for example, if the wireless device does not detect DCI during a time interval (e.g., 1 ms or 0.5 ms). The wireless device may switch from the active downlink BWP to the default downlink BWP, for example, if the BWP inactivity timer expires.

A base station may semi-statically configure a wireless device with one or more BWPs. A wireless device may switch an active BWP from a first BWP to a second BWP, for example, after or in response to receiving DCI indicating the second BWP as an active BWP. A wireless device may switch an active BWP from a first BWP to a second BWP, for example, after or in response to an expiry of the BWP inactivity timer (e.g., if the second BWP is the default BWP).

A downlink BWP switching may refer to switching an active downlink BWP from a first downlink BWP to a second downlink BWP (e.g., the second downlink BWP is activated and the first downlink BWP is deactivated). An uplink BWP switching may refer to switching an active uplink BWP from a first uplink BWP to a second uplink BWP (e.g., the second uplink BWP is activated and the first uplink BWP is deactivated). Downlink and uplink BWP switching may be performed independently (e.g., in paired spectrum/spectra). Downlink and uplink BWP switching may be performed simultaneously (e.g., in unpaired spectrum/spectra). Switching between configured BWPs may occur, for example, based on RRC signaling, DCI signaling, expiration of a BWP inactivity timer, and/or an initiation of random access.

Figure 9:
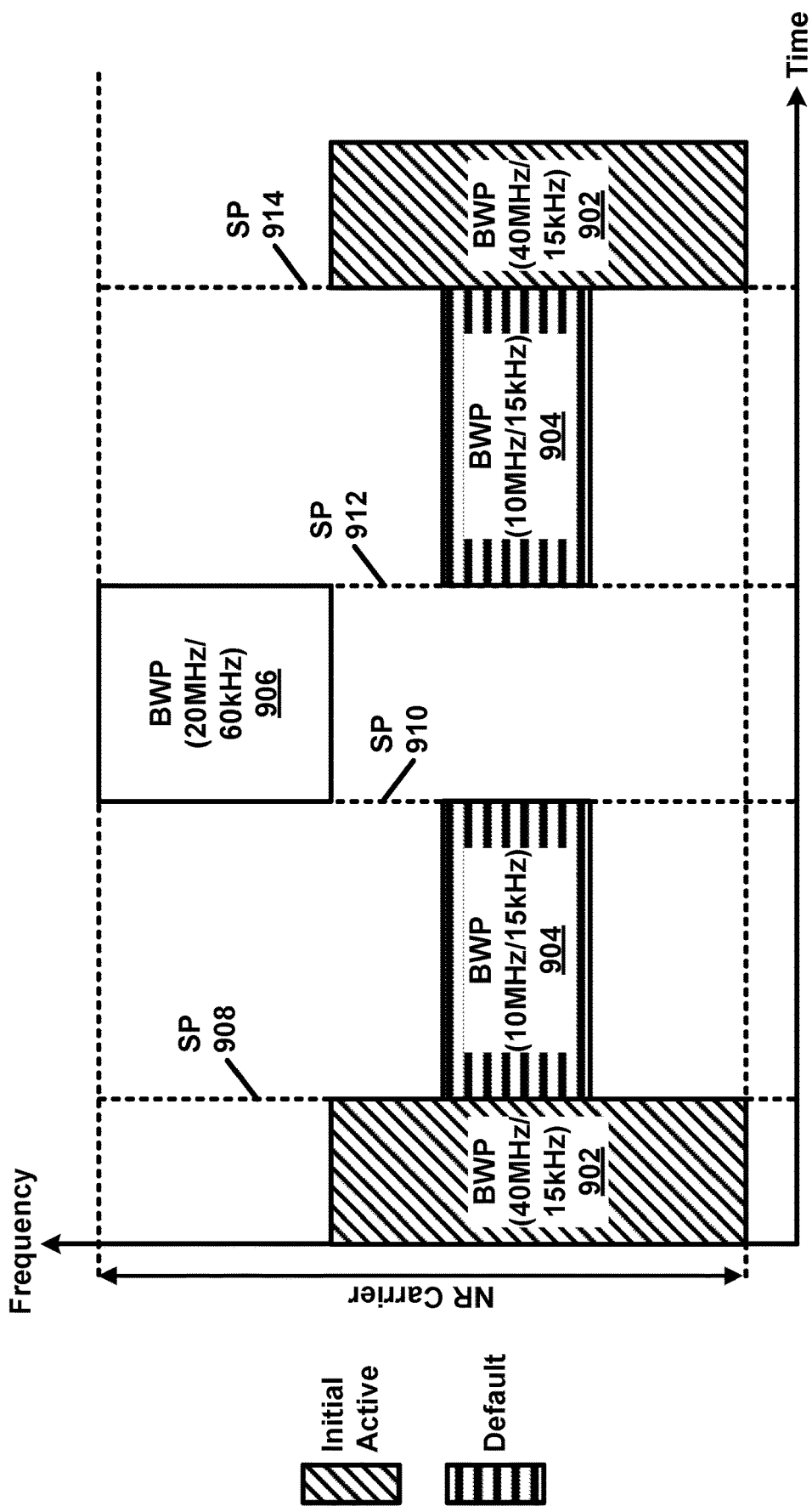
FIG. 9 shows an example configuration of bandwidth parts (BWPs).

FIG. 9 shows an example of configured BWPs. Bandwidth adaptation using multiple BWPs (e.g., three configured BWPs for an NR carrier) may be available. A wireless device configured with multiple BWPs (e.g., the three BWPs) may switch from one BWP to another BWP at a switching point. The BWPs may comprise: a BWP 902 having a bandwidth of 40 MHz and a subcarrier spacing of 15 kHz; a BWP 904 having a bandwidth of 10 MHz and a subcarrier spacing of 15 kHz; and a BWP 906 having a bandwidth of 20 MHz and a subcarrier spacing of 60 kHz. The BWP 902 may be an initial active BWP, and the BWP 904 may be a default BWP. The wireless device may switch between BWPs at switching points. The wireless device may switch from the BWP 902 to the BWP 904 at a switching point 908. The switching at the switching point 908 may occur for any suitable reasons. The switching at a switching point 908 may occur, for example, after or in response to an expiry of a BWP inactivity timer (e.g., indicating switching to the default BWP). The switching at the switching point 908 may occur, for example, after or in response to receiving DCI indicating BWP 904 as the active BWP. The wireless device may switch at a switching point 910 from an active BWP 904 to the BWP 906, for example, after or in response receiving DCI indicating BWP 906 as a new active BWP. The wireless device may switch at a switching point 912 from an active BWP 906 to the BWP 904, for example, after or in response to an expiry of a BWP inactivity timer. The wireless device may switch at the switching point 912 from an active BWP 906 to the BWP 904, for example, after or in response receiving DCI indicating BWP 904 as a new active BWP. The wireless device may switch at a switching point 914 from an active BWP 904 to the BWP 902, for example, after or in response receiving DCI indicating the BWP 902 as a new active BWP.

Wireless device procedures for switching BWPs on a secondary cell may be the same/similar as those on a primary cell, for example, if the wireless device is configured for a secondary cell with a default downlink BWP in a set of configured downlink BWPs and a timer value. The wireless device may use the timer value and the default downlink BWP for the secondary cell in the same/similar manner as the wireless device uses the timer value and/or default BWPs for a primary cell. The timer value (e.g., the BWP inactivity timer) may be configured per cell (e.g., for one or more BWPs), for example, via RRC signaling or any other signaling. One or more active BWPs may switch to another BWP, for example, based on an expiration of the BWP inactivity timer.

Two or more carriers may be aggregated and data may be simultaneously transmitted to/from the same wireless device using carrier aggregation (CA) (e.g., to increase data rates). The aggregated carriers in CA may be referred to as component carriers (CCs). There may be a number/quantity of serving cells for the wireless device (e.g., one serving cell for a CC), for example, if CA is configured/used. The CCs may have multiple configurations in the frequency domain.

Figure 10A:
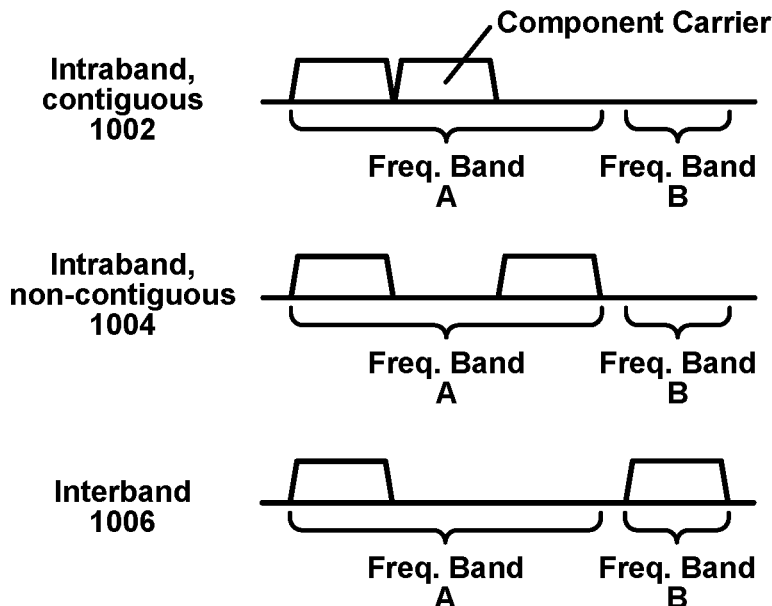
FIG. 10A shows example carrier aggregation configurations based on component carriers.

FIG. 10A shows example CA configurations based on CCs. As shown in FIG. 10A, three types of CA configurations may comprise an intraband (contiguous) configuration 1002, an intraband (non-contiguous) configuration 1004, and/or an interband configuration 1006. In the intraband (contiguous) configuration 1002, two CCs may be aggregated in the same frequency band (frequency band A) and may be located directly adjacent to each other within the frequency band. In the intraband (non-contiguous) configuration 1004, two CCs may be aggregated in the same frequency band (frequency band A) but may be separated from each other in the frequency band by a gap. In the interband configuration 1006, two CCs may be located in different frequency bands (e.g., frequency band A and frequency band B, respectively).

A network may set the maximum quantity of CCs that can be aggregated (e.g., up to 32 CCs may be aggregated in NR, or any other quantity may be aggregated in other systems). The aggregated CCs may have the same or different bandwidths, subcarrier spacing, and/or duplexing schemes (TDD, FDD, or any other duplexing schemes). A serving cell for a wireless device using CA may have a downlink CC. One or more uplink CCs may be optionally configured for a serving cell (e.g., for FDD). The ability to aggregate more downlink carriers than uplink carriers may be useful, for example, if the wireless device has more data traffic in the downlink than in the uplink.

One of the aggregated cells for a wireless device may be referred to as a primary cell (PCell), for example, if a CA is configured. The PCell may be the serving cell that the wireless initially connects to or access to, for example, during or at an RRC connection establishment, an RRC connection reestablishment, and/or a handover. The PCell may provide/configure the wireless device with NAS mobility information and the security input. Wireless device may have different PCells. For the downlink, the carrier corresponding to the PCell may be referred to as the downlink primary CC (DL PCC). For the uplink, the carrier corresponding to the PCell may be referred to as the uplink primary CC (UL PCC). The other aggregated cells (e.g., associated with CCs other than the DL PCC and UL PCC) for the wireless device may be referred to as secondary cells (SCells). The SCells may be configured, for example, after the PCell is configured for the wireless device. An SCell may be configured via an RRC connection reconfiguration procedure. For the downlink, the carrier corresponding to an SCell may be referred to as a downlink secondary CC (DL SCC). For the uplink, the carrier corresponding to the SCell may be referred to as the uplink secondary CC (UL SCC).

Configured SCells for a wireless device may be activated or deactivated, for example, based on traffic and channel conditions. Deactivation of an SCell may cause the wireless device to stop PDCCH and PDSCH reception on the SCell and PUSCH, SRS, and CQI transmissions on the SCell. Configured SCells may be activated or deactivated, for example, using a MAC CE (e.g., the MAC CE described with respect to FIG. 4B). A MAC CE may use a bitmap (e.g., one bit per SCell) to indicate which SCells (e.g., in a subset of configured SCells) for the wireless device are activated or deactivated. Configured SCells may be deactivated, for example, after or in response to an expiration of an SCell deactivation timer (e.g., one SCell deactivation timer per SCell may be configured).

DCI may comprise control information, such as scheduling assignments and scheduling grants, for a cell. DCI may be sent/transmitted via the cell corresponding to the scheduling assignments and/or scheduling grants, which may be referred to as a self-scheduling. DCI comprising control information for a cell may be sent/transmitted via another cell, which may be referred to as a cross-carrier scheduling. Uplink control information (UCI) may comprise control information, such as HARQ acknowledgments and channel state feedback (e.g., CQI, PMI, and/or RI) for aggregated cells. UCI may be transmitted via an uplink control channel (e.g., a PUCCH) of the PCell or a certain SCell (e.g., an SCell configured with PUCCH). For a larger number of aggregated downlink CCs, the PUCCH of the PCell may become overloaded. Cells may be divided into multiple PUCCH groups.

Figure 10B:
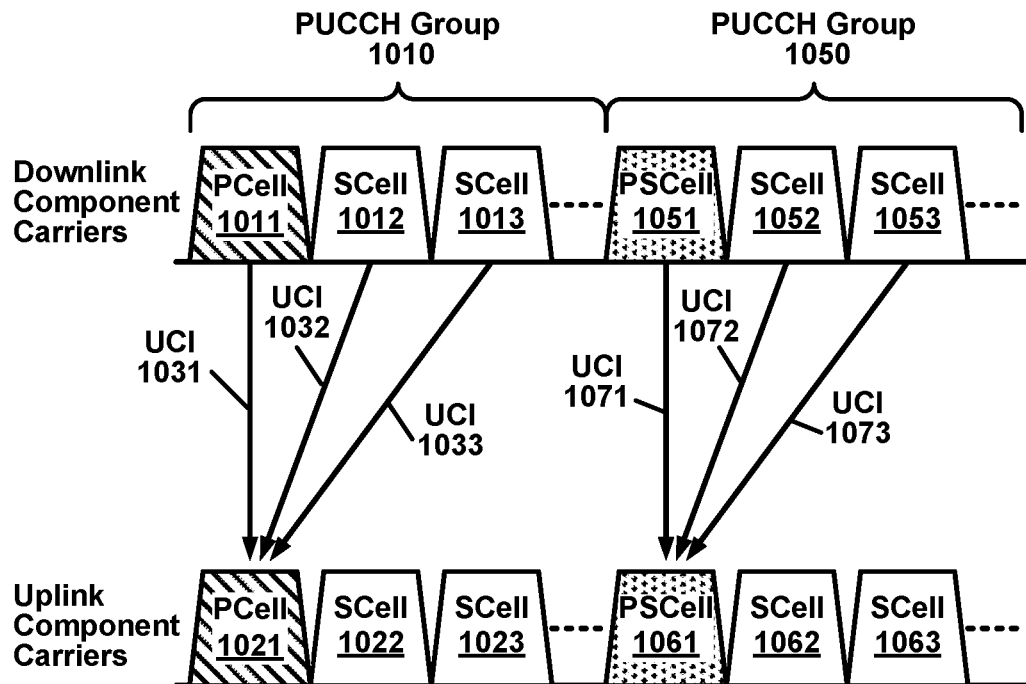
FIG. 10B shows example group of cells.

FIG. 10B shows example group of cells. Aggregated cells may be configured into one or more PUCCH groups (e.g., as shown in FIG. 10B). One or more cell groups or one or more uplink control channel groups (e.g., a PUCCH group 1010 and a PUCCH group 1050) may comprise one or more downlink CCs, respectively. The PUCCH group 1010 may comprise one or more downlink CCs, for example, three downlink CCs: a PCell 1011 (e.g., a DL PCC), an SCell 1012 (e.g., a DL SCC), and an SCell 1013 (e.g., a DL SCC). The PUCCH group 1050 may comprise one or more downlink CCs, for example, three downlink CCs: a PUCCH SCell (or PSCell) 1051 (e.g., a DL SCC), an SCell 1052 (e.g., a DL SCC), and an SCell 1053 (e.g., a DL SCC). One or more uplink CCs of the PUCCH group 1010 may be configured as a PCell 1021 (e.g., a UL PCC), an SCell 1022 (e.g., a UL SCC), and an SCell 1023 (e.g., a UL SCC). One or more uplink CCs of the PUCCH group 1050 may be configured as a PUCCH SCell (or PSCell) 1061 (e.g., a UL SCC), an SCell 1062 (e.g., a UL SCC), and an SCell 1063 (e.g., a UL SCC). UCI related to the downlink CCs of the PUCCH group 1010, shown as UCI 1031, UCI 1032, and UCI 1033, may be transmitted via the uplink of the PCell 1021 (e.g., via the PUCCH of the PCell 1021). UCI related to the downlink CCs of the PUCCH group 1050, shown as UCI 1071, UCI 1072, and UCI 1073, may be sent/transmitted via the uplink of the PUCCH SCell (or PSCell) 1061 (e.g., via the PUCCH of the PUCCH SCell 1061). A single uplink PCell may be configured to send/transmit UCI relating to the six downlink CCs, for example, if the aggregated cells shown in FIG. 10B are not divided into the PUCCH group 1010 and the PUCCH group 1050. The PCell 1021 may become overloaded, for example, if the UCIs 1031, 1032, 1033, 1071, 1072, and 1073 are sent/transmitted via the PCell 1021. By dividing transmissions of UCI between the PCell 1021 and the PUCCH SCell (or PSCell) 1061, overloading may be prevented and/or reduced.

A PCell may comprise a downlink carrier (e.g., the PCell 1011) and an uplink carrier (e.g., the PCell 1021). An SCell may comprise only a downlink carrier. A cell, comprising a downlink carrier and optionally an uplink carrier, may be assigned with a physical cell ID and a cell index. The physical cell ID or the cell index may indicate/identify a downlink carrier and/or an uplink carrier of the cell, for example, depending on the context in which the physical cell ID is used. A physical cell ID may be determined, for example, using a synchronization signal (e.g., PSS and/or SSS) transmitted via a downlink component carrier. A cell index may be determined, for example, using one or more RRC messages. A physical cell ID may be referred to as a carrier ID, and a cell index may be referred to as a carrier index. A first physical cell ID for a first downlink carrier may refer to the first physical cell ID for a cell comprising the first downlink carrier. Substantially the same/similar concept may apply to, for example, a carrier activation. Activation of a first carrier may refer to activation of a cell comprising the first carrier.

A multi-carrier nature of a PHY layer may be exposed/indicated to a MAC layer (e.g., in a CA configuration). A HARQ entity may operate on a serving cell. A transport block may be generated per assignment/grant per serving cell. A transport block and potential HARQ retransmissions of the transport block may be mapped to a serving cell.

For the downlink, a base station may send/transmit (e.g., unicast, multicast, and/or broadcast), to one or more wireless devices, one or more reference signals (RSs) (e.g., PSS, SSS, CSI-RS, DM-RS, and/or PT-RS). For the uplink, the one or more wireless devices may send/transmit one or more RSs to the base station (e.g., DM-RS, PT-RS, and/or SRS). The PSS and the SSS may be sent/transmitted by the base station and used by the one or more wireless devices to synchronize the one or more wireless devices with the base station. A synchronization signal (SS)/physical broadcast channel (PBCH) block may comprise the PSS, the SSS, and the PBCH. The base station may periodically send/transmit a burst of SS/PBCH blocks, which may be referred to as SSBs.

Figure 11A:
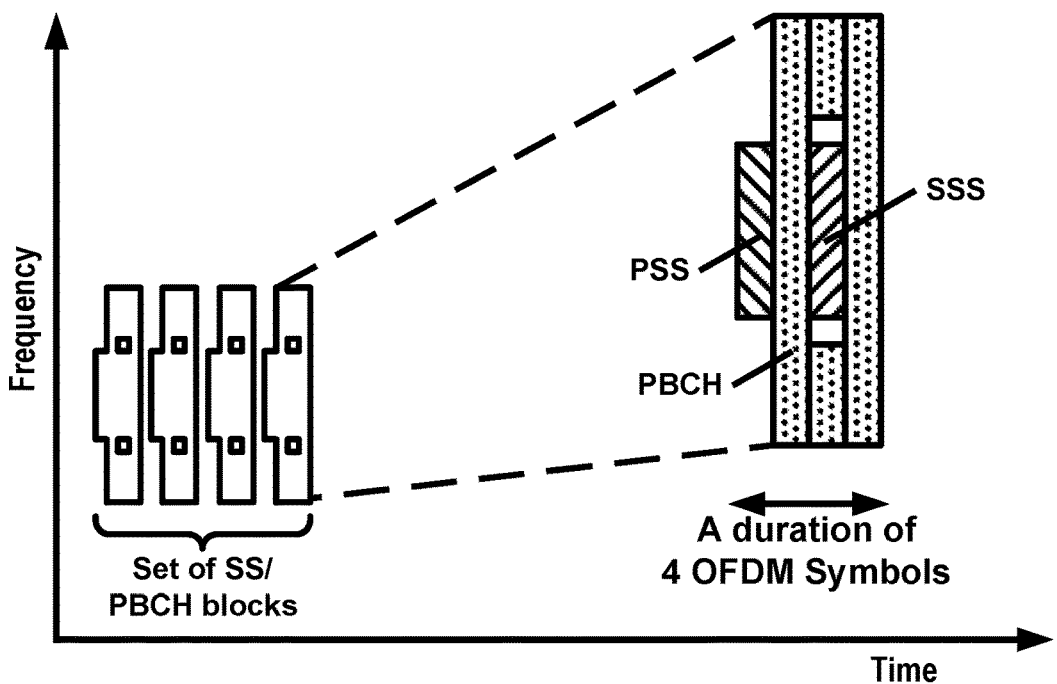
FIG. 11A shows an example mapping of one or more synchronization signal/physical broadcast channel (SS/PBCH) blocks.

FIG. 11A shows an example mapping of one or more SS/PBCH blocks. A burst of SS/PBCH blocks may comprise one or more SS/PBCH blocks (e.g., 4 SS/PBCH blocks, as shown in FIG. 11A). Bursts may be sent/transmitted periodically (e.g., every 2 frames, 20 ms, or any other durations). A burst may be restricted to a half-frame (e.g., a first half-frame having a duration of 5 ms). Such parameters (e.g., the number of SS/PBCH blocks per burst, periodicity of bursts, position of the burst within the frame) may be configured, for example, based on at least one of: a carrier frequency of a cell in which the SS/PBCH block is sent/transmitted; a numerology or subcarrier spacing of the cell; a configuration by the network (e.g., using RRC signaling); and/or any other suitable factor(s). A wireless device may assume a subcarrier spacing for the SS/PBCH block based on the carrier frequency being monitored, for example, unless the radio network configured the wireless device to assume a different subcarrier spacing.

The SS/PBCH block may span one or more OFDM symbols in the time domain (e.g., 4 OFDM symbols, as shown in FIG. 11A or any other quantity/number of symbols) and may span one or more subcarriers in the frequency domain (e.g., 240 contiguous subcarriers or any other quantity/number of subcarriers). The PSS, the SSS, and the PBCH may have a common center frequency. The PSS may be sent/transmitted first and may span, for example, 1 OFDM symbol and 127 subcarriers. The SSS may be sent/transmitted after the PSS (e.g., two symbols later) and may span 1 OFDM symbol and 127 subcarriers. The PBCH may be sent/transmitted after the PSS (e.g., across the next 3 OFDM symbols) and may span 240 subcarriers (e.g., in the second and fourth OFDM symbols as shown in FIG. 11A) and/or may span fewer than 240 subcarriers (e.g., in the third OFDM symbols as shown in FIG. 11A).

The location of the SS/PBCH block in the time and frequency domains may not be known to the wireless device (e.g., if the wireless device is searching for the cell). The wireless device may monitor a carrier for the PSS, for example, to find and select the cell. The wireless device may monitor a frequency location within the carrier. The wireless device may search for the PSS at a different frequency location within the carrier, for example, if the PSS is not found after a certain duration (e.g., 20 ms). The wireless device may search for the PSS at a different frequency location within the carrier, for example, as indicated by a synchronization raster. The wireless device may determine the locations of the SSS and the PBCH, respectively, for example, based on a known structure of the SS/PBCH block if the PSS is found at a location in the time and frequency domains. The SS/PBCH block may be a cell-defining SS block (CD-SSB). A primary cell may be associated with a CD-SSB. The CD-SSB may be located on a synchronization raster. A cell selection/search and/or reselection may be based on the CD-SSB.

The SS/PBCH block may be used by the wireless device to determine one or more parameters of the cell. The wireless device may determine a physical cell identifier (PCI) of the cell, for example, based on the sequences of the PSS and the SSS, respectively. The wireless device may determine a location of a frame boundary of the cell, for example, based on the location of the SS/PBCH block. The SS/PBCH block may indicate that it has been sent/transmitted in accordance with a transmission pattern. An SS/PBCH block in the transmission pattern may be a known distance from the frame boundary (e.g., a predefined distance for a RAN configuration among one or more networks, one or more base stations, and one or more wireless devices).

The PBCH may use a QPSK modulation and/or forward error correction (FEC). The FEC may use polar coding. One or more symbols spanned by the PBCH may comprise/carry one or more DM-RSs for demodulation of the PBCH. The PBCH may comprise an indication of a current system frame number (SFN) of the cell and/or a SS/PBCH block timing index. These parameters may facilitate time synchronization of the wireless device to the base station. The PBCH may comprise a MIB used to send/transmit to the wireless device one or more parameters. The MIB may be used by the wireless device to locate remaining minimum system information (RMSI) associated with the cell. The RMSI may comprise a System Information Block Type 1 (SIB1). The SIB1 may comprise information for the wireless device to access the cell. The wireless device may use one or more parameters of the MIB to monitor a PDCCH, which may be used to schedule a PDSCH. The PDSCH may comprise the SIB1. The SIB1 may be decoded using parameters provided/comprised in the MIB. The PBCH may indicate an absence of SIB1. The wireless device may be pointed to a frequency, for example, based on the PBCH indicating the absence of SIB1. The wireless device may search for an SS/PBCH block at the frequency to which the wireless device is pointed.

The wireless device may assume that one or more SS/PBCH blocks sent/transmitted with a same SS/PBCH block index are quasi co-located (QCLed) (e.g., having substantially the same/similar Doppler spread, Doppler shift, average gain, average delay, and/or spatial Rx parameters). The wireless device may not assume QCL for SS/PBCH block transmissions having different SS/PBCH block indices. SS/PBCH blocks (e.g., those within a half-frame) may be sent/transmitted in spatial directions (e.g., using different beams that span a coverage area of the cell). A first SS/PBCH block may be sent/transmitted in a first spatial direction using a first beam, a second SS/PBCH block may be sent/transmitted in a second spatial direction using a second beam, a third SS/PBCH block may be sent/transmitted in a third spatial direction using a third beam, a fourth SS/PBCH block may be sent/transmitted in a fourth spatial direction using a fourth beam, etc.

A base station may send/transmit a plurality of SS/PBCH blocks, for example, within a frequency span of a carrier. A first PCI of a first SS/PBCH block of the plurality of SS/PBCH blocks may be different from a second PCI of a second SS/PBCH block of the plurality of SS/PBCH blocks. The PCIs of SS/PBCH blocks sent/transmitted in different frequency locations may be different or substantially the same.

The CSI-RS may be sent/transmitted by the base station and used by the wireless device to acquire/obtain/determine channel state information (CSI). The base station may configure the wireless device with one or more CSI-RSs for channel estimation or any other suitable purpose. The base station may configure a wireless device with one or more of the same/similar CSI-RSs. The wireless device may measure the one or more CSI-RSs. The wireless device may estimate a downlink channel state and/or generate a CSI report, for example, based on the measuring of the one or more downlink CSI-RSs. The wireless device may send/transmit the CSI report to the base station (e.g., based on periodic CSI reporting, semi-persistent CSI reporting, and/or aperiodic CSI reporting). The base station may use feedback provided by the wireless device (e.g., the estimated downlink channel state) to perform a link adaptation.

The base station may semi-statically configure the wireless device with one or more CSI-RS resource sets. A CSI-RS resource may be associated with a location in the time and frequency domains and a periodicity. The base station may selectively activate and/or deactivate a CSI-RS resource. The base station may indicate to the wireless device that a CSI-RS resource in the CSI-RS resource set is activated and/or deactivated.

The base station may configure the wireless device to report CSI measurements. The base station may configure the wireless device to provide CSI reports periodically, aperiodically, or semi-persistently. For periodic CSI reporting, the wireless device may be configured with a timing and/or periodicity of a plurality of CSI reports. For aperiodic CSI reporting, the base station may request a CSI report. The base station may command the wireless device to measure a configured CSI-RS resource and provide a CSI report relating to the measurement(s). For semi-persistent CSI reporting, the base station may configure the wireless device to send/transmit periodically, and selectively activate or deactivate the periodic reporting (e.g., via one or more activation/deactivation MAC CEs and/or one or more DCIs). The base station may configure the wireless device with a CSI-RS resource set and CSI reports, for example, using RRC signaling.

The CSI-RS configuration may comprise one or more parameters indicating, for example, up to 32 antenna ports (or any other quantity of antenna ports). The wireless device may be configured to use/employ the same OFDM symbols for a downlink CSI-RS and a CORESET, for example, if the downlink CSI-RS and CORESET are spatially QCLed and resource elements associated with the downlink CSI-RS are outside of the physical resource blocks (PRBs) configured for the CORESET. The wireless device may be configured to use/employ the same OFDM symbols for a downlink CSI-RS and SS/PBCH blocks, for example, if the downlink CSI-RS and SS/PBCH blocks are spatially QCLed and resource elements associated with the downlink CSI-RS are outside of PRBs configured for the SS/PBCH blocks.

Downlink DM-RSs may be sent/transmitted by a base station and received/used by a wireless device for a channel estimation. The downlink DM-RSs may be used for coherent demodulation of one or more downlink physical channels (e.g., PDSCH). A network (e.g., an NR network) may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., one or two adjacent OFDM symbols). A base station may semi-statically configure the wireless device with a number/quantity (e.g. a maximum number/quantity) of front-loaded DM-RS symbols for a PDSCH. A DM-RS configuration may support one or more DM-RS ports. A DM-RS configuration may support up to eight orthogonal downlink DM-RS ports per wireless device (e.g., for single user-MIMO). A DM-RS configuration may support up to 4 orthogonal downlink DM-RS ports per wireless device (e.g., for multiuser-MIMO). A radio network may support (e.g., at least for CP-OFDM) a common DM-RS structure for downlink and uplink. A DM-RS location, a DM-RS pattern, and/or a scrambling sequence may be the same or different. The base station may send/transmit a downlink DM-RS and a corresponding PDSCH, for example, using the same precoding matrix. The wireless device may use the one or more downlink DM-RSs for coherent demodulation/channel estimation of the PDSCH.

A transmitter (e.g., a transmitter of a base station) may use a precoder matrices for a part of a transmission bandwidth. The transmitter may use a first precoder matrix for a first bandwidth and a second precoder matrix for a second bandwidth. The first precoder matrix and the second precoder matrix may be different, for example, based on the first bandwidth being different from the second bandwidth. The wireless device may assume that a same precoding matrix is used across a set of PRBs. The set of PRBs may be determined/indicated/identified/denoted as a precoding resource block group (PRG).

A PDSCH may comprise one or more layers. The wireless device may assume that at least one symbol with DM-RS is present on a layer of the one or more layers of the PDSCH. A higher layer may configure one or more DM-RSs for a PDSCH (e.g., up to 3 DMRSs for the PDSCH). Downlink PT-RS may be sent/transmitted by a base station and used by a wireless device, for example, for a phase-noise compensation. Whether a downlink PT-RS is present or not may depend on an RRC configuration. The presence and/or the pattern of the downlink PT-RS may be configured on a wireless device-specific basis, for example, using a combination of RRC signaling and/or an association with one or more parameters used/employed for other purposes (e.g., modulation and coding scheme (MCS)), which may be indicated by DCI. A dynamic presence of a downlink PT-RS, if configured, may be associated with one or more DCI parameters comprising at least MCS. A network (e.g., an NR network) may support a plurality of PT-RS densities defined in the time and/or frequency domains. A frequency domain density (if configured/present) may be associated with at least one configuration of a scheduled bandwidth. The wireless device may assume a same precoding for a DM-RS port and a PT-RS port. The quantity/number of PT-RS ports may be fewer than the quantity/number of DM-RS ports in a scheduled resource. Downlink PT-RS may be configured/allocated/confined in the scheduled time/frequency duration for the wireless device. Downlink PT-RS may be sent/transmitted via symbols, for example, to facilitate a phase tracking at the receiver.

The wireless device may send/transmit an uplink DM-RS to a base station, for example, for a channel estimation. The base station may use the uplink DM-RS for coherent demodulation of one or more uplink physical channels. The wireless device may send/transmit an uplink DM-RS with a PUSCH and/or a PUCCH. The uplink DM-RS may span a range of frequencies that is similar to a range of frequencies associated with the corresponding physical channel. The base station may configure the wireless device with one or more uplink DM-RS configurations. At least one DM-RS configuration may support a front-loaded DM-RS pattern. The front-loaded DM-RS may be mapped over one or more OFDM symbols (e.g., one or two adjacent OFDM symbols). One or more uplink DM-RSs may be configured to send/transmit at one or more symbols of a PUSCH and/or a PUCCH. The base station may semi-statically configure the wireless device with a number/quantity (e.g. the maximum number/quantity) of front-loaded DM-RS symbols for the PUSCH and/or the PUCCH, which the wireless device may use to schedule a single-symbol DM-RS and/or a double-symbol DM-RS. A network (e.g., an NR network) may support (e.g., for cyclic prefix orthogonal frequency division multiplexing (CP-OFDM)) a common DM-RS structure for downlink and uplink. A DM-RS location, a DM-RS pattern, and/or a scrambling sequence for the DM-RS may be substantially the same or different.

A PUSCH may comprise one or more layers. A wireless device may send/transmit at least one symbol with DM-RS present on a layer of the one or more layers of the PUSCH. A higher layer may configure one or more DM-RSs (e.g., up to three DMRSs) for the PUSCH. Uplink PT-RS (which may be used by a base station for a phase tracking and/or a phase-noise compensation) may or may not be present, for example, depending on an RRC configuration of the wireless device. The presence and/or the pattern of an uplink PT-RS may be configured on a wireless device-specific basis (e.g., a UE-specific basis), for example, by a combination of RRC signaling and/or one or more parameters configured/ employed for other purposes (e.g., MCS), which may be indicated by DCI. A dynamic presence of an uplink PT-RS, if configured, may be associated with one or more DCI parameters comprising at least MCS. A radio network may support a plurality of uplink PT-RS densities defined in time/frequency domain. A frequency domain density (if configured/present) may be associated with at least one configuration of a scheduled bandwidth. The wireless device may assume a same precoding for a DM-RS port and a PT-RS port. A quantity/number of PT-RS ports may be less than a quantity/number of DM-RS ports in a scheduled resource. An uplink PT-RS may be configured/allocated/ confined in the scheduled time/frequency duration for the wireless device.

One or more SRSs may be sent/transmitted by a wireless device to a base station, for example, for a channel state estimation to support uplink channel dependent scheduling and/or a link adaptation. SRS sent/transmitted by the wireless device may enable/allow a base station to estimate an uplink channel state at one or more frequencies. A scheduler at the base station may use/employ the estimated uplink channel state to assign one or more resource blocks for an uplink PUSCH transmission for the wireless device. The base station may semi-statically configure the wireless device with one or more SRS resource sets. For an SRS resource set, the base station may configure the wireless device with one or more SRS resources. An SRS resource set applicability may be configured, for example, by a higher layer (e.g., RRC) parameter. An SRS resource in a SRS resource set of the one or more SRS resource sets (e.g., with the same/similar time domain behavior, periodic, aperiodic, and/or the like) may be sent/transmitted at a time instant (e.g., simultaneously), for example, if a higher layer parameter indicates beam management. The wireless device may send/transmit one or more SRS resources in SRS resource sets. A network (e.g., an NR network) may support aperiodic, periodic, and/or semi-persistent SRS transmissions. The wireless device may send/transmit SRS resources, for example, based on one or more trigger types. The one or more trigger types may comprise higher layer signaling (e.g., RRC) and/or one or more DCI formats. At least one DCI format may be used/employed for the wireless device to select at least one of one or more configured SRS resource sets. An SRS trigger type 0 may refer to an SRS triggered based on higher layer signaling. An SRS trigger type 1 may refer to an SRS triggered based on one or more DCI formats. The wireless device may be configured to send/transmit an SRS, for example, after a transmission of a PUSCH and a corresponding uplink DM-RS if a PUSCH and an SRS are sent/transmitted in a same slot. A base station may semi-statically configure a wireless device with one or more SRS configuration parameters indicating at least one of following: a SRS resource configuration identifier; a number of SRS ports; time domain behavior of an SRS resource configuration (e.g., an indication of periodic, semi-persistent, or aperiodic SRS); slot, mini-slot, and/or subframe level periodicity; an offset for a periodic and/or an aperiodic SRS resource; a number of OFDM symbols in an SRS resource; a starting OFDM symbol of an SRS resource; an SRS bandwidth; a frequency hopping bandwidth; a cyclic shift; and/or an SRS sequence ID.

An antenna port may be determined/defined such that the channel over which a symbol on the antenna port is conveyed can be inferred from the channel over which another symbol on the same antenna port is conveyed. The receiver may infer/determine the channel (e.g., fading gain, multipath delay, and/or the like) for conveying a second symbol on an antenna port, from the channel for conveying a first symbol on the antenna port, for example, if the first symbol and the second symbol are sent/transmitted on the same antenna port. A first antenna port and a second antenna port may be referred to as quasi co-located (QCLed), for example, if one or more large-scale properties of the channel over which a first symbol on the first antenna port is conveyed may be inferred from the channel over which a second symbol on a second antenna port is conveyed. The one or more large-scale properties may comprise at least one of: a delay spread; a Doppler spread; a Doppler shift; an average gain; an average delay; and/or spatial Receiving (Rx) parameters.

Channels that use beamforming may require beam management. Beam management may comprise a beam measurement, a beam selection, and/or a beam indication. A beam may be associated with one or more reference signals. A beam may be identified by one or more beamformed reference signals. The wireless device may perform a downlink beam measurement, for example, based on one or more downlink reference signals (e.g., a CSI-RS) and generate a beam measurement report. The wireless device may perform the downlink beam measurement procedure, for example, after an RRC connection is set up with a base station.

Figure 11B:
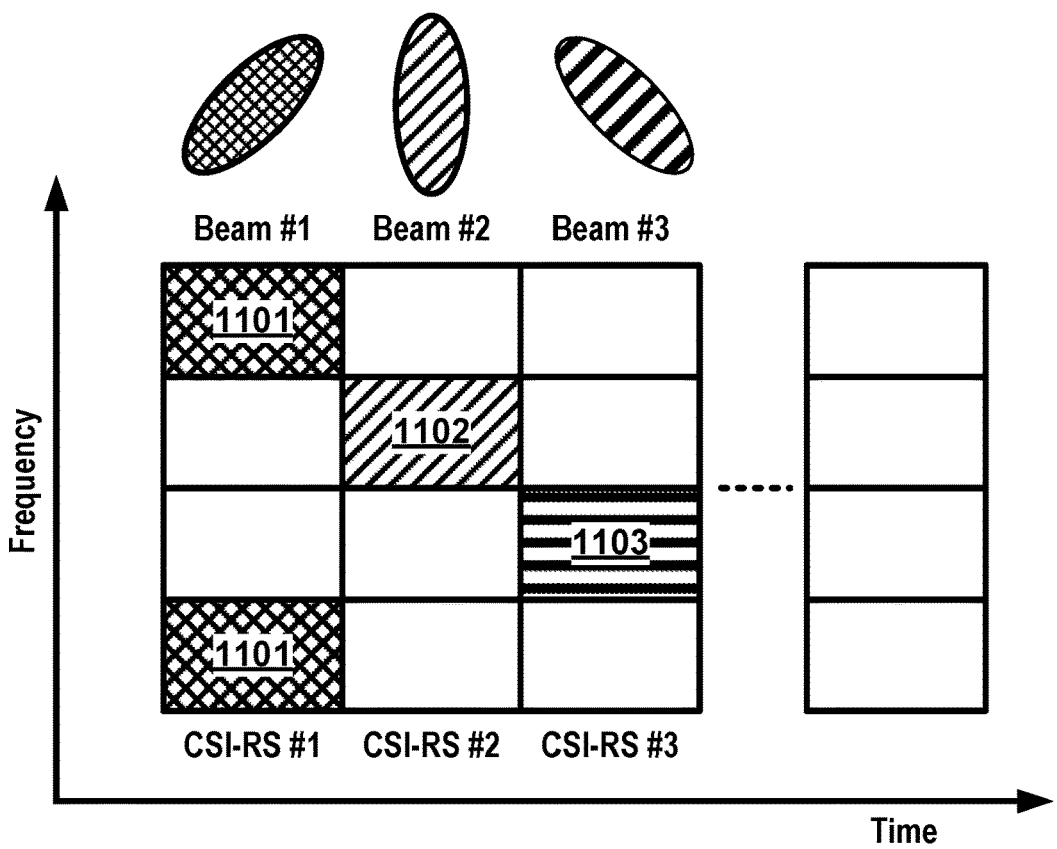
FIG. 11B shows an example mapping of one or more channel state information reference signals (CSI-RSs).

FIG. 11B shows an example mapping of one or more CSI-RSs. The CSI-RSs may be mapped in the time and frequency domains. Each rectangular block shown in FIG. 11B may correspond to a resource block (RB) within a bandwidth of a cell. A base station may send/transmit one or more RRC messages comprising CSI-RS resource configuration parameters indicating one or more CSI-RSs. One or more of parameters may be configured by higher layer signaling (e.g., RRC and/or MAC signaling) for a CSI-RS resource configuration. The one or more of the parameters may comprise at least one of: a CSI-RS resource configuration identity, a number of CSI-RS ports, a CSI-RS configuration (e.g., symbol and resource element (RE) locations in a subframe), a CSI-RS subframe configuration (e.g., a subframe location, an offset, and periodicity in a radio frame), a CSI-RS power parameter, a CSI-RS sequence parameter, a code division multiplexing (CDM) type parameter, a frequency density, a transmission comb, quasi co-location (QCL) parameters (e.g., QCL-scramblingidentity, crs-portscount, mbsfn-subframeconfiglist, csi-rs-configZPid, qcl-csi-rs-configNZPid), and/or other radio resource parameters.

One or more beams may be configured for a wireless device in a wireless device-specific configuration. Three beams are shown in FIG. 11B (beam #1, beam #2, and beam #3), but more or fewer beams may be configured. Beam #1 may be allocated with CSI-RS 1101 that may be sent/transmitted in one or more subcarriers in an RB of a first symbol. Beam #2 may be allocated with CSI-RS 1102 that may be sent/transmitted in one or more subcarriers in an RB of a second symbol. Beam #3 may be allocated with CSI-RS 1103 that may be sent/transmitted in one or more subcarriers in an RB of a third symbol. A base station may use other subcarriers in the same RB (e.g., those that are not used to send/transmit CSI-RS 1101) to transmit another CSI-RS associated with a beam for another wireless device, for example, by using frequency division multiplexing (FDM). Beams used for a wireless device may be configured such that beams for the wireless device use symbols different from symbols used by beams of other wireless devices, for example, by using time domain multiplexing (TDM). A wireless device may be served with beams in orthogonal symbols (e.g., no overlapping symbols), for example, by using the TDM.

CSI-RSs (e.g., CSI-RSs 1101, 1102, 1103) may be sent/transmitted by the base station and used by the wireless device for one or more measurements. The wireless device may measure an RSRP of configured CSI-RS resources. The base station may configure the wireless device with a reporting configuration, and the wireless device may report the RSRP measurements to a network (e.g., via one or more base stations) based on the reporting configuration. The base station may determine, based on the reported measurement results, one or more transmission configuration indication (TCI) states comprising a number of reference signals. The base station may indicate one or more TCI states to the wireless device (e.g., via RRC signaling, a MAC CE, and/or DCI). The wireless device may receive a downlink transmission with an Rx beam determined based on the one or more TCI states. The wireless device may or may not have a capability of beam correspondence. The wireless device may determine a spatial domain filter of a transmit (Tx) beam, for example, based on a spatial domain filter of the corresponding Rx beam, if the wireless device has the capability of beam correspondence. The wireless device may perform an uplink beam selection procedure to determine the spatial domain filter of the Tx beam, for example, if the wireless device does not have the capability of beam correspondence. The wireless device may perform the uplink beam selection procedure, for example, based on one or more sounding reference signal (SRS) resources configured to the wireless device by the base station. The base station may select and indicate uplink beams for the wireless device, for example, based on measurements of the one or more SRS resources sent/transmitted by the wireless device.

A wireless device may determine/assess (e.g., measure) a channel quality of one or more beam pair links, for example, in a beam management procedure. A beam pair link may comprise a Tx beam of a base station and an Rx beam of the wireless device. The Tx beam of the base station may send/transmit a downlink signal, and the Rx beam of the wireless device may receive the downlink signal. The wireless device may send/transmit a beam measurement report, for example, based on the assessment/determination. The beam measurement report may indicate one or more beam pair quality parameters comprising at least one of: one or more beam identifications (e.g., a beam index, a reference signal index, or the like), an RSRP, a precoding matrix indicator (PMI), a channel quality indicator (CQI), and/or a rank indicator (RI).

FIG. 12A shows examples of downlink beam management procedures. One or more downlink beam management procedures (e.g., downlink beam management procedures P1, P2, and P3) may be performed. Procedure P1 may enable a measurement (e.g., a wireless device measurement) on Tx beams of a TRP (or multiple TRPs) (e.g., to support a selection of one or more base station Tx beams and/or wireless device Rx beams). The Tx beams of a base station and the Rx beams of a wireless device are shown as ovals in the top row of P1 and bottom row of P1, respectively. Beamforming (e.g., at a TRP) may comprise a Tx beam sweep for a set of beams (e.g., the beam sweeps shown, in the top rows of P1 and P2, as ovals rotated in a counterclockwise direction indicated by the dashed arrows). Beamforming (e.g., at a wireless device) may comprise an Rx beam sweep for a set of beams (e.g., the beam sweeps shown, in the bottom rows of P1 and P3, as ovals rotated in a clockwise direction indicated by the dashed arrows). Procedure P2 may be used to enable a measurement (e.g., a wireless device measurement) on Tx beams of a TRP (shown, in the top row of P2, as ovals rotated in a counterclockwise direction indicated by the dashed arrow). The wireless device and/or the base station may perform procedure P2, for example, using a smaller set of beams than the set of beams used in procedure P1, or using narrower beams than the beams used in procedure P1. Procedure P2 may be referred to as a beam refinement. The wireless device may perform procedure P3 for an Rx beam determination, for example, by using the same Tx beam(s) of the base station and sweeping Rx beam(s) of the wireless device.

FIG. 12B shows examples of uplink beam management procedures. One or more uplink beam management procedures (e.g., uplink beam management procedures U1, U2, and U3) may be performed. Procedure U1 may be used to enable a base station to perform a measurement on Tx beams of a wireless device (e.g., to support a selection of one or more Tx beams of the wireless device and/or Rx beams of the base station). The Tx beams of the wireless device and the Rx beams of the base station are shown as ovals in the top row of U1 and bottom row of U1, respectively). Beamforming (e.g., at the wireless device) may comprise one or more beam sweeps, for example, a Tx beam sweep from a set of beams (shown, in the bottom rows of U1 and U3, as ovals rotated in a clockwise direction indicated by the dashed arrows). Beamforming (e.g., at the base station) may comprise one or more beam sweeps, for example, an Rx beam sweep from a set of beams (shown, in the top rows of U1 and U2, as ovals rotated in a counter-clockwise direction indicated by the dashed arrows). Procedure U2 may be used to enable the base station to adjust its Rx beam, for example, if the UE uses a fixed Tx beam. The wireless device and/or the base station may perform procedure U2, for example, using a smaller set of beams than the set of beams used in procedure P1, or using narrower beams than the beams used in procedure P1. Procedure U2 may be referred to as a beam refinement. The wireless device may perform procedure U3 to adjust its Tx beam, for example, if the base station uses a fixed Rx beam.

A wireless device may initiate/start/perform a beam failure recovery (BFR) procedure, for example, based on detecting a beam failure. The wireless device may send/transmit a BFR request (e.g., a preamble, UCI, an SR, a MAC CE, and/or the like), for example, based on the initiating the BFR procedure. The wireless device may detect the beam failure, for example, based on a determination that a quality of beam pair link(s) of an associated control channel is unsatisfactory (e.g., having an error rate higher than an error rate threshold, a received signal power lower than a received signal power threshold, an expiration of a timer, and/or the like).

The wireless device may measure a quality of a beam pair link, for example, using one or more reference signals (RSs) comprising one or more SS/PBCH blocks, one or more CSI-RS resources, and/or one or more DM-RSs. A quality of the beam pair link may be based on one or more of a block error rate (BLER), an RSRP value, a signal to interference plus noise ratio (SINR) value, an RSRQ value, and/or a CSI value measured on RS resources. The base station may indicate that an RS resource is QCLed with one or more DM-RSs of a channel (e.g., a control channel, a shared data channel, and/or the like). The RS resource and the one or more DM-RSs of the channel may be QCLed, for example, if the channel characteristics (e.g., Doppler shift, Doppler spread, an average delay, delay spread, a spatial Rx parameter, fading, and/or the like) from a transmission via the RS resource to the wireless device are similar or the same as the channel characteristics from a transmission via the channel to the wireless device.

A network (e.g., an NR network comprising a gNB and/or an ng-eNB) and/or the wireless device may initiate/start/perform a random access procedure. A wireless device in an RRC idle (e.g., an RRC_IDLE) state and/or an RRC inactive (e.g., an RRC_INACTIVE) state may initiate/perform the random access procedure to request a connection setup to a network. The wireless device may initiate/start/perform the random access procedure from an RRC connected (e.g., an RRC_CONNECTED) state. The wireless device may initiate/start/perform the random access procedure to request uplink resources (e.g., for uplink transmission of an SR if there is no PUCCH resource available) and/or acquire/obtain/determine an uplink timing (e.g., if an uplink synchronization status is non-synchronized). The wireless device may initiate/start/perform the random access procedure to request one or more system information blocks (SIBs) (e.g., other system information blocks, such as SIB2, SIB3, and/or the like). The wireless device may initiate/start/perform the random access procedure for a beam failure recovery request. A network may initiate/start/perform a random access procedure, for example, for a handover and/or for establishing time alignment for an SCell addition.

Figure 13C:
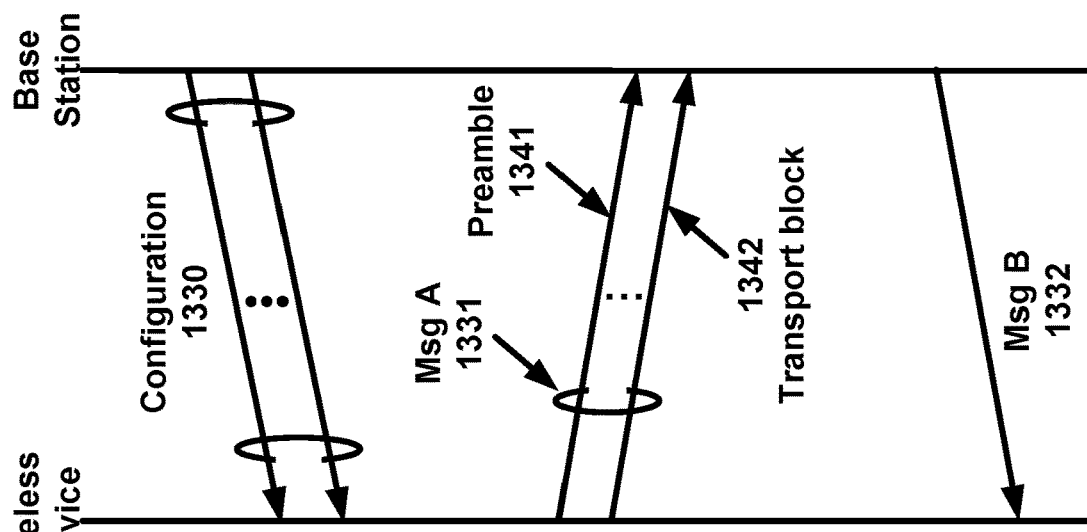
FIG. 13C shows an example two-step random access procedure.
Figure 13B:
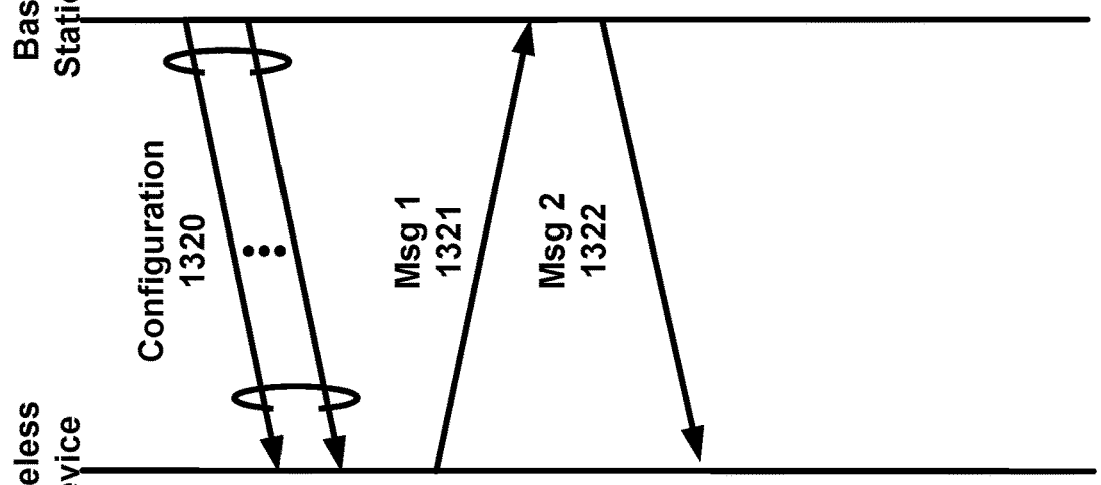
FIG. 13B shows an example two-step random access procedure.
Figure 13A:
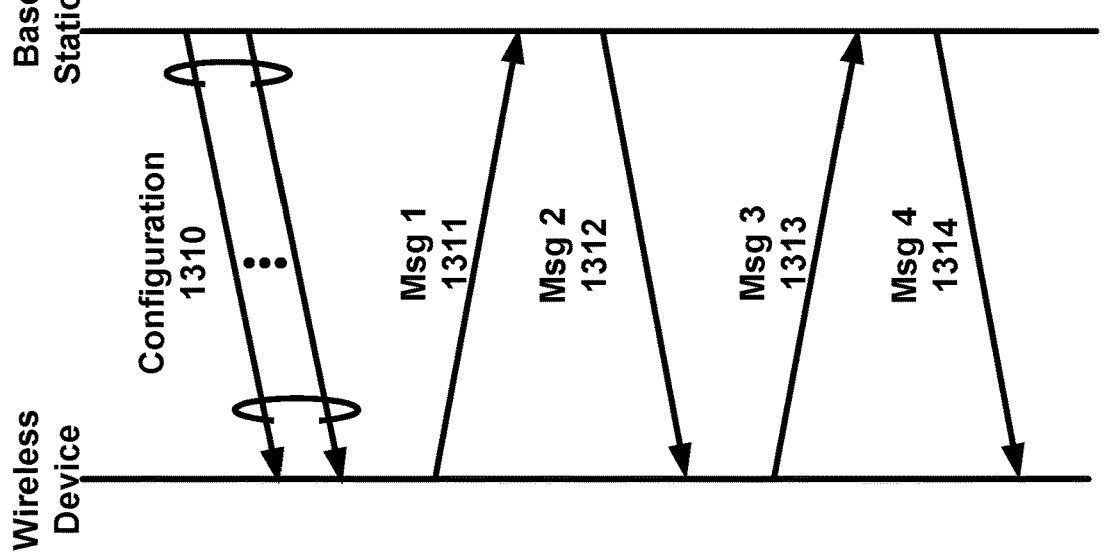
FIG. 13A shows an example four-step random access procedure.

FIG. 13A shows an example four-step random access procedure. The four-step random access procedure may comprise a four-step contention-based random access procedure. A base station may send/transmit a configuration message 1310 to a wireless device, for example, before initiating the random access procedure. The four-step random access procedure may comprise transmissions of four messages comprising: a first message (e.g., Msg 1 1311), a second message (e.g., Msg 2 1312), a third message (e.g., Msg 3 1313), and a fourth message (e.g., Msg 4 1314). The first message (e.g., Msg 1 1311) may comprise a preamble (or a random access preamble). The first message (e.g., Msg 1 1311) may be referred to as a preamble. The second message (e.g., Msg 2 1312) may comprise as a random access response (RAR). The second message (e.g., Msg 2 1312) may be referred to as an RAR.

The configuration message 1310 may be sent/transmitted, for example, using one or more RRC messages. The one or more RRC messages may indicate one or more random access channel (RACH) parameters to the wireless device. The one or more RACH parameters may comprise at least one of: general parameters for one or more random access procedures (e.g., RACH-configGeneral); cell-specific parameters (e.g., RACH-ConfigCommon); and/or dedicated parameters (e.g., RACH-configDedicated). The base station may send/transmit (e.g., broadcast or multicast) the one or more RRC messages to one or more wireless devices. The one or more RRC messages may be wireless device-specific. The one or more RRC messages that are wireless device-specific may be, for example, dedicated RRC messages sent/transmitted to a wireless device in an RRC connected (e.g., an RRC_CONNECTED) state and/or in an RRC inactive (e.g., an RRC_INACTIVE) state. The wireless devices may determine, based on the one or more RACH parameters, a time-frequency resource and/or an uplink transmit power for transmission of the first message (e.g., Msg 1 1311) and/or the third message (e.g., Msg 3 1313).

The wireless device may determine a reception timing and a downlink channel for receiving the second message (e.g., Msg 2 1312) and the fourth message (e.g., Msg 4 1314), for example, based on the one or more RACH parameters.

The one or more RACH parameters provided/configured/comprised in the configuration message 1310 may indicate one or more Physical RACH (PRACH) occasions available for transmission of the first message (e.g., Msg 1 1311). The one or more PRACH occasions may be predefined (e.g., by a network comprising one or more base stations). The one or more RACH parameters may indicate one or more available sets of one or more PRACH occasions (e.g., prach-ConfigIndex). The one or more RACH parameters may indicate an association between (a) one or more PRACH occasions and (b) one or more reference signals. The one or more RACH parameters may indicate an association between (a) one or more preambles and (b) one or more reference signals. The one or more reference signals may be SS/PBCH blocks and/or CSI-RSs. The one or more RACH parameters may indicate a quantity/number of SS/PBCH blocks mapped to a PRACH occasion and/or a quantity/number of preambles mapped to a SS/PBCH blocks.

The one or more RACH parameters provided/configured/comprised in the configuration message 1310 may be used to determine an uplink transmit power of first message (e.g., Msg 1 1311) and/or third message (e.g., Msg 3 1313). The one or more RACH parameters may indicate a reference power for a preamble transmission (e.g., a received target power and/or an initial power of the preamble transmission). There may be one or more power offsets indicated by the one or more RACH parameters. The one or more RACH parameters may indicate: a power ramping step; a power offset between SSB and CSI-RS; a power offset between transmissions of the first message (e.g., Msg 1 1311) and the third message (e.g., Msg 3 1313); and/or a power offset value between preamble groups. The one or more RACH parameters may indicate one or more thresholds, for example, based on which the wireless device may determine at least one reference signal (e.g., an SSB and/or CSI-RS) and/or an uplink carrier (e.g., a normal uplink (NUL) carrier and/or a supplemental uplink (SUL) carrier).

The first message (e.g., Msg 1 1311) may comprise one or more preamble transmissions (e.g., a preamble transmission and one or more preamble retransmissions). An RRC message may be used to configure one or more preamble groups (e.g., group A and/or group B). A preamble group may comprise one or more preambles. The wireless device may determine the preamble group, for example, based on a pathloss measurement and/or a size of the third message (e.g., Msg 3 1313). The wireless device may measure an RSRP of one or more reference signals (e.g., SSBs and/or CSI-RSs) and determine at least one reference signal having an RSRP above an RSRP threshold (e.g., rsrp-ThresholdSSB and/or rsrp-ThresholdCSI-RS). The wireless device may select at least one preamble associated with the one or more reference signals and/or a selected preamble group, for example, if the association between the one or more preambles and the at least one reference signal is configured by an RRC message.

The wireless device may determine the preamble, for example, based on the one or more RACH parameters provided/configured/comprised in the configuration message 1310. The wireless device may determine the preamble, for example, based on a pathloss measurement, an RSRP measurement, and/or a size of the third message (e.g., Msg 3 1313). The one or more RACH parameters may indicate: a preamble format; a maximum quantity/number of preamble transmissions; and/or one or more thresholds for determining one or more preamble groups (e.g., group A and group B). A base station may use the one or more RACH parameters to configure the wireless device with an association between one or more preambles and one or more reference signals (e.g., SSBs and/or CSI-RSs). The wireless device may determine the preamble to be comprised in first message (e.g., Msg 1 1311), for example, based on the association if the association is configured. The first message (e.g., Msg 1 1311) may be sent/transmitted to the base station via one or more PRACH occasions. The wireless device may use one or more reference signals (e.g., SSBs and/or CSI-RSs) for selection of the preamble and for determining of the PRACH occasion. One or more RACH parameters (e.g., ra-ssb-OccasionMskIndex and/or ra-OccasionList) may indicate an association between the PRACH occasions and the one or more reference signals.

The wireless device may perform a preamble retransmission, for example, if no response is received after or in response to a preamble transmission (e.g., for a period of time, such as a monitoring window for monitoring an RAR). The wireless device may increase an uplink transmit power for the preamble retransmission. The wireless device may select an initial preamble transmit power, for example, based on a pathloss measurement and/or a target received preamble power configured by the network. The wireless device may determine to resend/retransmit a preamble and may ramp up the uplink transmit power. The wireless device may receive one or more RACH parameters (e.g., PREAMBLE_POWER_RAMPING_STEP) indicating a ramping step for the preamble retransmission. The ramping step may be an amount of incremental increase in uplink transmit power for a retransmission. The wireless device may ramp up the uplink transmit power, for example, if the wireless device determines a reference signal (e.g., SSB and/or CSI-RS) that is the same as a previous preamble transmission. The wireless device may count the quantity/number of preamble transmissions and/or retransmissions, for example, using a counter parameter (e.g., PREAMBLE_TRANSMISSION_COUNTER). The wireless device may determine that a random access procedure has been completed unsuccessfully, for example, if the quantity/number of preamble transmissions exceeds a threshold configured by the one or more RACH parameters (e.g., preambleTransMax) without receiving a successful response (e.g., an RAR).

The second message (e.g., Msg 2 1312) (e.g., received by the wireless device) may comprise an RAR. The second message (e.g., Msg 2 1312) may comprise multiple RARs corresponding to multiple wireless devices. The second message (e.g., Msg 2 1312) may be received, for example, after or in response to the transmitting of the first message (e.g., Msg 1 1311). The second message (e.g., Msg 2 1312) may be scheduled on the DL-SCH and may be indicated by a PDCCH, for example, using a random access radio network temporary identifier (RA RNTI). The second message (e.g., Msg 2 1312) may indicate that the first message (e.g., Msg 1 1311) was received by the base station. The second message (e.g., Msg 2 1312) may comprise a time-alignment command that may be used by the wireless device to adjust the transmission timing of the wireless device, a scheduling grant for transmission of the third message (e.g., Msg 3 1313), and/or a Temporary Cell RNTI (TC-RNTI). The wireless device may determine/start a time window (e.g., ra-ResponseWindow) to monitor a PDCCH for the second message (e.g., Msg 2 1312), for example, after transmitting the first message (e.g., Msg 1 1311) (e.g., a preamble). The wireless device may determine the start time of the time window, for example, based on a PRACH occasion that the wireless device uses to send/transmit the first message (e.g., Msg 1 1311) (e.g., the preamble). The wireless device may start the time window one or more symbols after the last symbol of the first message (e.g., Msg 1 1311) comprising the preamble (e.g., the symbol in which the first message (e.g., Msg 1 1311) comprising the preamble transmission was completed or at a first PDCCH occasion from an end of a preamble transmission). The one or more symbols may be determined based on a numerology. The PDCCH may be mapped in a common search space (e.g., a Type 1-PDCCH common search space) configured by an RRC message. The wireless device may identify/determine the RAR, for example, based on an RNTI. Radio network temporary identifiers (RNTIs) may be used depending on one or more events initiating/starting the random access procedure. The wireless device may use a RA-RNTI, for example, for one or more communications associated with random access or any other purpose. The RA-RNTI may be associated with PRACH occasions in which the wireless device sends/transmits a preamble. The wireless device may determine the RA-RNTI, for example, based on at least one of: an OFDM symbol index; a slot index; a frequency domain index; and/or a UL carrier indicator of the PRACH occasions. An example RA-RNTI may be determined as follows:

$$\text{RA-RNTI} = 1 + s\_id + 14 \times t\_id + 14 \times 80 \times f\_id + 14 \times 80 \times 8 \times ul\_carrier\_id$$

where s_id may be an index of a first OFDM symbol of the PRACH occasion (e.g., 0≤s_id<14), t_id may be an index of a first slot of the PRACH occasion in a system frame (e.g., 0≤t_id<80), f_id may be an index of the PRACH occasion in the frequency domain (e.g., 0≤f_id<8), and ul_carrier_id may be a UL carrier used for a preamble transmission (e.g., 0 for an NUL carrier, and 1 for an SUL carrier).

The wireless device may send/transmit the third message (e.g., Msg 3 1313), for example, after or in response to a successful reception of the second message (e.g., Msg 2 1312) (e.g., using resources identified in the Msg 2 1312). The third message (e.g., Msg 3 1313) may be used, for example, for contention resolution in the contention-based random access procedure. A plurality of wireless devices may send/transmit the same preamble to a base station, and the base station may send/transmit an RAR that corresponds to a wireless device. Collisions may occur, for example, if the plurality of wireless device interpret the RAR as corresponding to themselves. Contention resolution (e.g., using the third message (e.g., Msg 3 1313) and the fourth message (e.g., Msg 4 1314)) may be used to increase the likelihood that the wireless device does not incorrectly use an identity of another the wireless device. The wireless device may comprise a device identifier in the third message (e.g., Msg 3 1313) (e.g., a C-RNTI if assigned, a TC RNTI comprised in the second message (e.g., Msg 2 1312), and/or any other suitable identifier), for example, to perform contention resolution.

The fourth message (e.g., Msg 4 1314) may be received, for example, after or in response to the transmitting of the third message (e.g., Msg 3 1313). The base station may address the wireless on the PDCCH (e.g., the base station may send the PDCCH to the wireless device) using a C-RNTI, for example, If the C-RNTI was included in the third message (e.g., Msg 3 1313). The random access procedure may be determined to be successfully completed, for example, if the unique C RNTI of the wireless device is detected on the PDCCH (e.g., the PDCCH is scrambled by the C-RNTI). fourth message (e.g., Msg 4 1314) may be received using a DL-SCH associated with a TC RNTI, for example, if the TC RNTI is comprised in the third message (e.g., Msg 3 1313) (e.g., if the wireless device is in an RRC idle (e.g., an RRC_IDLE) state or not otherwise connected to the base station). The wireless device may determine that the contention resolution is successful and/or the wireless device may determine that the random access procedure is successfully completed, for example, if a MAC PDU is successfully decoded and a MAC PDU comprises the wireless device contention resolution identity MAC CE that matches or otherwise corresponds with the CCCH SDU sent/transmitted in third message (e.g., Msg 3 1313).

The wireless device may be configured with an SUL carrier and/or an NUL carrier. An initial access (e.g., random access) may be supported via an uplink carrier. A base station may configure the wireless device with multiple RACH configurations (e.g., two separate RACH configurations comprising: one for an SUL carrier and the other for an NUL carrier). For random access in a cell configured with an SUL carrier, the network may indicate which carrier to use (NUL or SUL). The wireless device may determine to use the SUL carrier, for example, if a measured quality of one or more reference signals (e.g., one or more reference signals associated with the NUL carrier) is lower than a broadcast threshold. Uplink transmissions of the random access procedure (e.g., the first message (e.g., Msg 1 1311) and/or the third message (e.g., Msg 3 1313)) may remain on, or may be performed via, the selected carrier. The wireless device may switch an uplink carrier during the random access procedure (e.g., between the Msg 1 1311 and the Msg 3 1313). The wireless device may determine and/or switch an uplink carrier for the first message (e.g., Msg 1 1311) and/or the third message (e.g., Msg 3 1313), for example, based on a channel clear assessment (e.g., a listen-before-talk).

FIG. 13B shows a two-step random access procedure. The two-step random access procedure may comprise a two-step contention-free random access procedure. Similar to the four-step contention-based random access procedure, a base station may, prior to initiation of the procedure, send/transmit a configuration message 1320 to the wireless device. The configuration message 1320 may be analogous in some respects to the configuration message 1310. The procedure shown in FIG. 13B may comprise transmissions of two messages: a first message (e.g., Msg 1 1321) and a second message (e.g., Msg 2 1322). The first message (e.g., Msg 1 1321) and the second message (e.g., Msg 2 1322) may be analogous in some respects to the first message (e.g., Msg 1 1311) and a second message (e.g., Msg 2 1312), respectively. The two-step contention-free random access procedure may not comprise messages analogous to the third message (e.g., Msg 3 1313) and/or the fourth message (e.g., Msg 4 1314).

The two-step (e.g., contention-free) random access procedure may be configured/initiated for a beam failure recovery, other SI request, an SCell addition, and/or a handover. A base station may indicate, or assign to, the wireless device a preamble to be used for the first message (e.g., Msg 1 1321). The wireless device may receive, from the base station via a PDCCH and/or an RRC, an indication of the preamble (e.g., ra-PreambleIndex).

The wireless device may start a time window (e.g., ra-ResponseWindow) to monitor a PDCCH for the RAR, for example, after or in response to sending/transmitting the preamble. The base station may configure the wireless device with one or more beam failure recovery parameters, such as a separate time window and/or a separate PDCCH in a search space indicated by an RRC message (e.g., recoverySearchSpaceId). The base station may configure the one or more beam failure recovery parameters, for example, in association with a beam failure recovery request. The separate time window for monitoring the PDCCH and/or an RAR may be configured to start after transmitting a beam failure recovery request (e.g., the window may start any quantity of symbols and/or slots after transmitting the beam failure recovery request). The wireless device may monitor for a PDCCH transmission addressed to a Cell RNTI (C-RNTI) on the search space. During the two-step (e.g., contention-free) random access procedure, the wireless device may determine that a random access procedure is successful, for example, after or in response to transmitting first message (e.g., Msg 1 1321) and receiving a corresponding second message (e.g., Msg 2 1322). The wireless device may determine that a random access procedure has successfully been completed, for example, if a PDCCH transmission is addressed to a corresponding C-RNTI. The wireless device may determine that a random access procedure has successfully been completed, for example, if the wireless device receives an RAR comprising a preamble identifier corresponding to a preamble sent/transmitted by the wireless device and/or the RAR comprises a MAC sub-PDU with the preamble identifier. The wireless device may determine the response as an indication of an acknowledgement for an SI request.

FIG. 13C shows an example two-step random access procedure. Similar to the random access procedures shown in FIGS. 13A and 13B, a base station may, prior to initiation of the procedure, send/transmit a configuration message 1330 to the wireless device. The configuration message 1330 may be analogous in some respects to the configuration message 1310 and/or the configuration message 1320. The procedure shown in FIG. 13C may comprise transmissions of multiple messages (e.g., two messages comprising: a first message (e.g., Msg A 1331) and a second message (e.g., Msg B 1332)).

Msg A 1320 may be sent/transmitted in an uplink transmission by the wireless device. Msg A 1320 may comprise one or more transmissions of a preamble 1341 and/or one or more transmissions of a transport block 1342. The transport block 1342 may comprise contents that are similar and/or equivalent to the contents of the third message (e.g., Msg 3 1313) (e.g., shown in FIG. 13A). The transport block 1342 may comprise UCI (e.g., an SR, a HARQ ACK/NACK, and/or the like). The wireless device may receive the second message (e.g., Msg B 1332), for example, after or in response to transmitting the first message (e.g., Msg A 1331). The second message (e.g., Msg B 1332) may comprise contents that are similar and/or equivalent to the contents of the second message (e.g., Msg 2 1312) (e.g., an RAR shown in FIG. 13A), the contents of the second message (e.g., Msg 2 1322) (e.g., an RAR shown in FIG. 13B) and/or the fourth message (e.g., Msg 4 1314) (e.g., shown in FIG. 13A).

The wireless device may start/initiate the two-step random access procedure (e.g., the two-step random access procedure shown in FIG. 13C) for a licensed spectrum and/or an unlicensed spectrum. The wireless device may determine, based on one or more factors, whether to start/initiate the two-step random access procedure. The one or more factors may comprise at least one of: a radio access technology in use (e.g., LTE, NR, and/or the like); whether the wireless device has a valid TA or not; a cell size; the RRC state of the wireless device; a type of spectrum (e.g., licensed vs. unlicensed); and/or any other suitable factors.

The wireless device may determine, based on two-step RACH parameters comprised in the configuration message 1330, a radio resource and/or an uplink transmit power for the preamble 1341 and/or the transport block 1342 (e.g., comprised in the first message (e.g., Msg A 1331)). The RACH parameters may indicate an MCS, a time-frequency resource, and/or a power control for the preamble 1341 and/or the transport block 1342. A time-frequency resource for transmission of the preamble 1341 (e.g., a PRACH) and a time-frequency resource for transmission of the transport block 1342 (e.g., a PUSCH) may be multiplexed using FDM, TDM, and/or CDM. The RACH parameters may enable the wireless device to determine a reception timing and a downlink channel for monitoring for and/or receiving second message (e.g., Msg B 1332).

The transport block 1342 may comprise data (e.g., delay-sensitive data), an identifier of the wireless device, security information, and/or device information (e.g., an International Mobile Subscriber Identity (IMSI)). The base station may send/transmit the second message (e.g., Msg B 1332) as a response to the first message (e.g., Msg A 1331). The second message (e.g., Msg B 1332) may comprise at least one of: a preamble identifier; a timing advance command; a power control command; an uplink grant (e.g., a radio resource assignment and/or an MCS); a wireless device identifier (e.g., a UE identifier for contention resolution); and/or an RNTI (e.g., a C-RNTI or a TC-RNTI). The wireless device may determine that the two-step random access procedure is successfully completed, for example, if a preamble identifier in the second message (e.g., Msg B 1332) corresponds to, or is matched to, a preamble sent/transmitted by the wireless device and/or the identifier of the wireless device in second message (e.g., Msg B 1332) corresponds to, or is matched to, the identifier of the wireless device in the first message (e.g., Msg A 1331) (e.g., the transport block 1342).

A wireless device and a base station may exchange control signaling (e.g., control information). The control signaling may be referred to as L1/L2 control signaling and may originate from the PHY layer (e.g., layer 1) and/or the MAC layer (e.g., layer 2) of the wireless device or the base station. The control signaling may comprise downlink control signaling sent/transmitted from the base station to the wireless device and/or uplink control signaling sent/transmitted from the wireless device to the base station.

The downlink control signaling may comprise at least one of: a downlink scheduling assignment; an uplink scheduling grant indicating uplink radio resources and/or a transport format; slot format information; a preemption indication; a power control command; and/or any other suitable signaling. The wireless device may receive the downlink control signaling in a payload sent/transmitted by the base station via a PDCCH. The payload sent/transmitted via the PDCCH may be referred to as downlink control information (DCI). The PDCCH may be a group common PDCCH (GC-PDCCH) that is common to a group of wireless devices. The GC-PDCCH may be scrambled by a group common RNTI.

A base station may attach one or more cyclic redundancy check (CRC) parity bits to DCI, for example, in order to facilitate detection of transmission errors. The base station may scramble the CRC parity bits with an identifier of a wireless device (or an identifier of a group of wireless devices), for example, if the DCI is intended for the wireless device (or the group of the wireless devices). Scrambling the CRC parity bits with the identifier may comprise Modulo-2 addition (or an exclusive-OR operation) of the identifier value and the CRC parity bits. The identifier may comprise a 16-bit value of an RNTI.

DCIs may be used for different purposes. A purpose may be indicated by the type of an RNTI used to scramble the CRC parity bits. DCI having CRC parity bits scrambled with a paging RNTI (P-RNTI) may indicate paging information and/or a system information change notification. The P-RNTI may be predefined as "FFFE" in hexadecimal. DCI having CRC parity bits scrambled with a system information RNTI (SI-RNTI) may indicate a broadcast transmission of the system information. The SI-RNTI may be predefined as "FFFF" in hexadecimal. DCI having CRC parity bits scrambled with a random access RNTI (RA-RNTI) may indicate a random access response (RAR). DCI having CRC parity bits scrambled with a cell RNTI (C-RNTI) may indicate a dynamically scheduled unicast transmission and/or a triggering of PDCCH-ordered random access. DCI having CRC parity bits scrambled with a temporary cell RNTI (TC-RNTI) may indicate a contention resolution (e.g., a Msg 3 analogous to the Msg 3 1313 shown in FIG. 13A). Other RNTIs configured for a wireless device by a base station may comprise a Configured Scheduling RNTI (CS RNTI), a Transmit Power Control-PUCCH RNTI (TPC PUCCH-RNTI), a Transmit Power Control-PUSCH RNTI (TPC-PUSCH-RNTI), a Transmit Power Control-SRS RNTI (TPC-SRS-RNTI), an Interruption RNTI (INT-RNTI), a Slot Format Indication RNTI (SFI-RNTI), a Semi-Persistent CSI RNTI (SP-CSI-RNTI), a Modulation and Coding Scheme Cell RNTI (MCS-C RNTI), and/or the like.

A base station may send/transmit DCIs with one or more DCI formats, for example, depending on the purpose and/or content of the DCIs. DCI format 0_0 may be used for scheduling of a PUSCH in a cell. DCI format 0_0 may be a fallback DCI format (e.g., with compact DCI payloads). DCI format 0_1 may be used for scheduling of a PUSCH in a cell (e.g., with more DCI payloads than DCI format 0_0). DCI format 1_0 may be used for scheduling of a PDSCH in a cell. DCI format 1_0 may be a fallback DCI format (e.g., with compact DCI payloads). DCI format 1_1 may be used for scheduling of a PDSCH in a cell (e.g., with more DCI payloads than DCI format 1_0). DCI format 2_0 may be used for providing a slot format indication to a group of wireless devices. DCI format 2_1 may be used for informing/notifying a group of wireless devices of a physical resource block and/or an OFDM symbol where the group of wireless devices may assume no transmission is intended to the group of wireless devices. DCI format 2_2 may be used for transmission of a transmit power control (TPC) command for PUCCH or PUSCH. DCI format 2_3 may be used for transmission of a group of TPC commands for SRS transmissions by one or more wireless devices. DCI format(s) for new functions may be defined in future releases. DCI formats may have different DCI sizes, or may share the same DCI size.

The base station may process the DCI with channel coding (e.g., polar coding), rate matching, scrambling and/or QPSK modulation, for example, after scrambling the DCI with an RNTI. A base station may map the coded and modulated DCI on resource elements used and/or configured for a PDCCH. The base station may send/transmit the DCI via a PDCCH occupying a number of contiguous control channel elements (CCEs), for example, based on a payload size of the DCI and/or a coverage of the base station. The number of the contiguous CCEs (referred to as aggregation level) may be 1, 2, 4, 8, 16, and/or any other suitable number. A CCE may comprise a number (e.g., 6) of resource-element groups (REGs). A REG may comprise a resource block in an OFDM symbol. The mapping of the coded and modulated DCI on the resource elements may be based on mapping of CCEs and REGs (e.g., CCE-to-REG mapping).

Figure 14A:
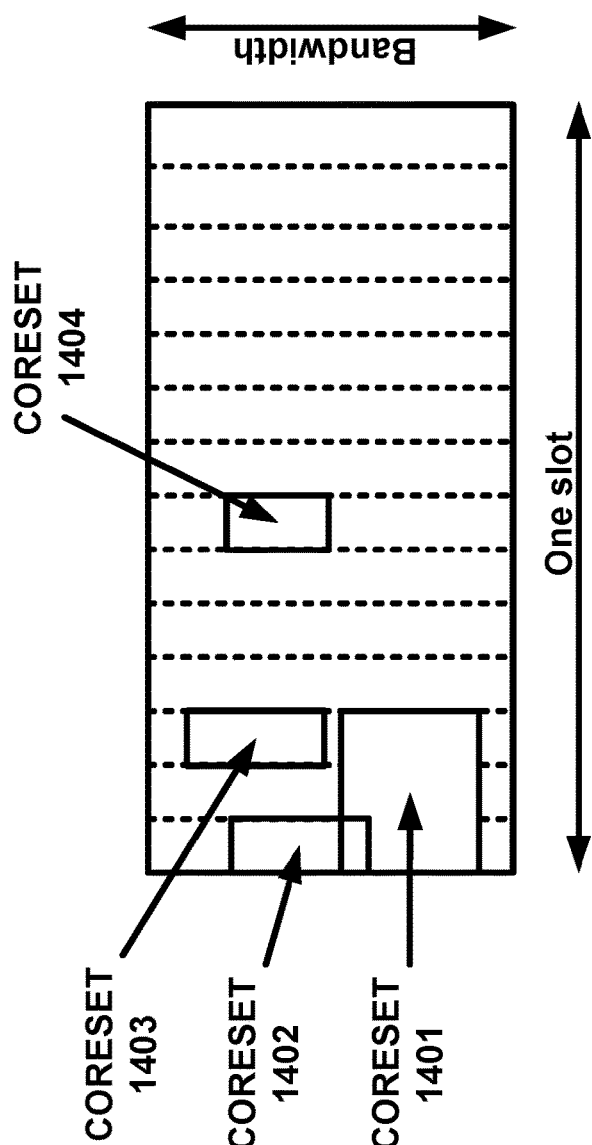
FIG. 14A shows an example of control resource set (CORESET) configurations.

FIG. 14A shows an example of CORESET configurations. The CORESET configurations may be for a bandwidth part or any other frequency bands. The base station may send/transmit DCI via a PDCCH on one or more control resource sets (CORESETs). A CORESET may comprise a time-frequency resource in which the wireless device attempts/tries to decode DCI using one or more search spaces. The base station may configure a size and a location of the CORESET in the time-frequency domain. A first CORESET 1401 and a second CORESET 1402 may occur or may be set/configured at the first symbol in a slot. The first CORESET 1401 may overlap with the second CORESET 1402 in the frequency domain. A third CORESET 1403 may occur or may be set/configured at a third symbol in the slot. A fourth CORESET 1404 may occur or may be set/configured at the seventh symbol in the slot. CORESETs may have a different number of resource blocks in frequency domain.

Figure 14B:
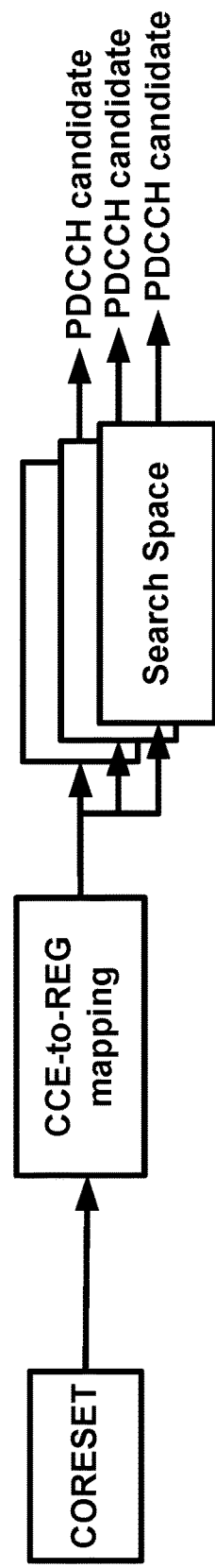
FIG. 14B shows an example of a control channel element to resource element group (CCE-to-REG) mapping.

FIG. 14B shows an example of a CCE-to-REG mapping. The CCE-to-REG mapping may be performed for DCI transmission via a CORESET and PDCCH processing. The CCE-to-REG mapping may be an interleaved mapping (e.g., for the purpose of providing frequency diversity) or a non-interleaved mapping (e.g., for the purposes of facilitating interference coordination and/or frequency-selective transmission of control channels). The base station may perform different or same CCE-to-REG mapping on different CORESETs. A CORESET may be associated with a CCE-to-REG mapping (e.g., by an RRC configuration). A CORESET may be configured with an antenna port QCL parameter. The antenna port QCL parameter may indicate QCL information of a DM-RS for a PDCCH reception via the CORESET.

The base station may send/transmit, to the wireless device, one or more RRC messages comprising configuration parameters of one or more CORESETs and one or more search space sets. The configuration parameters may indicate an association between a search space set and a CORESET. A search space set may comprise a set of PDCCH candidates formed by CCEs (e.g., at a given aggregation level). The configuration parameters may indicate at least one of: a number of PDCCH candidates to be monitored per aggregation level; a PDCCH monitoring periodicity and a PDCCH monitoring pattern; one or more DCI formats to be monitored by the wireless device; and/or whether a search space set is a common search space set or a wireless device-specific search space set (e.g., a UE-specific search space set). A set of CCEs in the common search space set may be predefined and known to the wireless device. A set of CCEs in the wireless device-specific search space set (e.g., the UE-specific search space set) may be configured, for example, based on the identity of the wireless device (e.g., C-RNTI).

As shown in FIG. 14B, the wireless device may determine a time-frequency resource for a CORESET based on one or more RRC messages. The wireless device may determine a CCE-to-REG mapping (e.g., interleaved or non-interleaved, and/or mapping parameters) for the CORESET, for example, based on configuration parameters of the CORESET. The wireless device may determine a number (e.g., at most 10) of search space sets configured on/for the CORESET, for example, based on the one or more RRC messages. The wireless device may monitor a set of PDCCH candidates according to configuration parameters of a search space set.

The wireless device may monitor a set of PDCCH candidates in one or more CORESETs for detecting one or more DCIs. Monitoring may comprise decoding one or more PDCCH candidates of the set of the PDCCH candidates according to the monitored DCI formats. Monitoring may comprise decoding DCI content of one or more PDCCH candidates with possible (or configured) PDCCH locations, possible (or configured) PDCCH formats (e.g., the number of CCEs, the number of PDCCH candidates in common search spaces, and/or the number of PDCCH candidates in the wireless device-specific search spaces) and possible (or configured) DCI formats. The decoding may be referred to as blind decoding. The wireless device may determine DCI as valid for the wireless device, for example, after or in response to CRC checking (e.g., scrambled bits for CRC parity bits of the DCI matching an RNTI value). The wireless device may process information comprised in the DCI (e.g., a scheduling assignment, an uplink grant, power control, a slot format indication, a downlink preemption, and/or the like).

The wireless device may send/transmit uplink control signaling (e.g., UCI) to a base station. The uplink control signaling may comprise HARQ acknowledgements for received DL-SCH transport blocks. The wireless device may send/transmit the HARQ acknowledgements, for example, after or in response to receiving a DL-SCH transport block. Uplink control signaling may comprise CSI indicating a channel quality of a physical downlink channel. The wireless device may send/transmit the CSI to the base station. The base station, based on the received CSI, may determine transmission format parameters (e.g., comprising multi-antenna and beamforming schemes) for downlink transmission(s). Uplink control signaling may comprise scheduling requests (SR). The wireless device may send/transmit an SR indicating that uplink data is available for transmission to the base station. The wireless device may send/transmit UCI (e.g., HARQ acknowledgements (HARQ-ACK), CSI report, SR, and the like) via a PUCCH or a PUSCH. The wireless device may send/transmit the uplink control signaling via a PUCCH using one of several PUCCH formats.

There may be multiple PUCCH formats (e.g., five PUCCH formats). A wireless device may determine a PUCCH format, for example, based on a size of UCI (e.g., a quantity/number of uplink symbols of UCI transmission and a number of UCI bits). PUCCH format 0 may have a length of one or two OFDM symbols and may comprise two or fewer bits. The wireless device may send/transmit UCI via a PUCCH resource, for example, using PUCCH format 0 if the transmission is over/via one or two symbols and the quantity/number of HARQ-ACK information bits with positive or negative SR (HARQ-ACK/SR bits) is one or two. PUCCH format 1 may occupy a number of OFDM symbols (e.g., between four and fourteen OFDM symbols) and may comprise two or fewer bits. The wireless device may use PUCCH format 1, for example, if the transmission is over/via four or more symbols and the number of HARQ-ACK/SR bits is one or two. PUCCH format 2 may occupy one or two OFDM symbols and may comprise more than two bits. The wireless device may use PUCCH format 2, for example, if the transmission is over/via one or two symbols and the quantity/number of UCI bits is two or more. PUCCH format 3 may occupy a number of OFDM symbols (e.g., between four and fourteen OFDM symbols) and may comprise more than two bits. The wireless device may use PUCCH format 3, for example, if the transmission is four or more symbols, the quantity/number of UCI bits is two or more, and the PUCCH resource does not comprise an orthogonal cover code (OCC). PUCCH format 4 may occupy a number of OFDM symbols (e.g., between four and fourteen OFDM symbols) and may comprise more than two bits. The wireless device may use PUCCH format 4, for example, if the transmission is four or more symbols, the quantity/number of UCI bits is two or more, and the PUCCH resource comprises an OCC.

The base station may send/transmit configuration parameters to the wireless device for a plurality of PUCCH resource sets, for example, using an RRC message. The plurality of PUCCH resource sets (e.g., up to four sets in NR, or up to any other quantity of sets in other systems) may be configured on an uplink BWP of a cell. A PUCCH resource set may be configured with a PUCCH resource set index, a plurality of PUCCH resources with a PUCCH resource being identified by a PUCCH resource identifier (e.g., pucch-Resourceid), and/or a number (e.g. a maximum number) of UCI information bits the wireless device may send/transmit using one of the plurality of PUCCH resources in the PUCCH resource set. The wireless device may select one of the plurality of PUCCH resource sets, for example, based on a total bit length of the UCI information bits (e.g., HARQ-ACK, SR, and/or CSI) if configured with a plurality of PUCCH resource sets. The wireless device may select a first PUCCH resource set having a PUCCH resource set index equal to "0," for example, if the total bit length of UCI information bits is two or fewer. The wireless device may select a second PUCCH resource set having a PUCCH resource set index equal to "1," for example, if the total bit length of UCI information bits is greater than two and less than or equal to a first configured value. The wireless device may select a third PUCCH resource set having a PUCCH resource set index equal to "2," for example, if the total bit length of UCI information bits is greater than the first configured value and less than or equal to a second configured value. The wireless device may select a fourth PUCCH resource set having a PUCCH resource set index equal to "3," for example, if the total bit length of UCI information bits is greater than the second configured value and less than or equal to a third value (e.g., 1406, 1706, or any other quantity of bits).

The wireless device may determine a PUCCH resource from the PUCCH resource set for UCI (HARQ-ACK, CSI, and/or SR) transmission, for example, after determining a PUCCH resource set from a plurality of PUCCH resource sets. The wireless device may determine the PUCCH resource, for example, based on a PUCCH resource indicator in DCI (e.g., with DCI format 1_0 or DCI for 1_1) received on/via a PDCCH. An n-bit (e.g., a three-bit) PUCCH resource indicator in the DCI may indicate one of multiple (e.g., eight) PUCCH resources in the PUCCH resource set. The wireless device may send/transmit the UCI (HARQ-ACK, CSI and/or SR) using a PUCCH resource indicated by the PUCCH resource indicator in the DCI, for example, based on the PUCCH resource indicator.

Figure 15A:
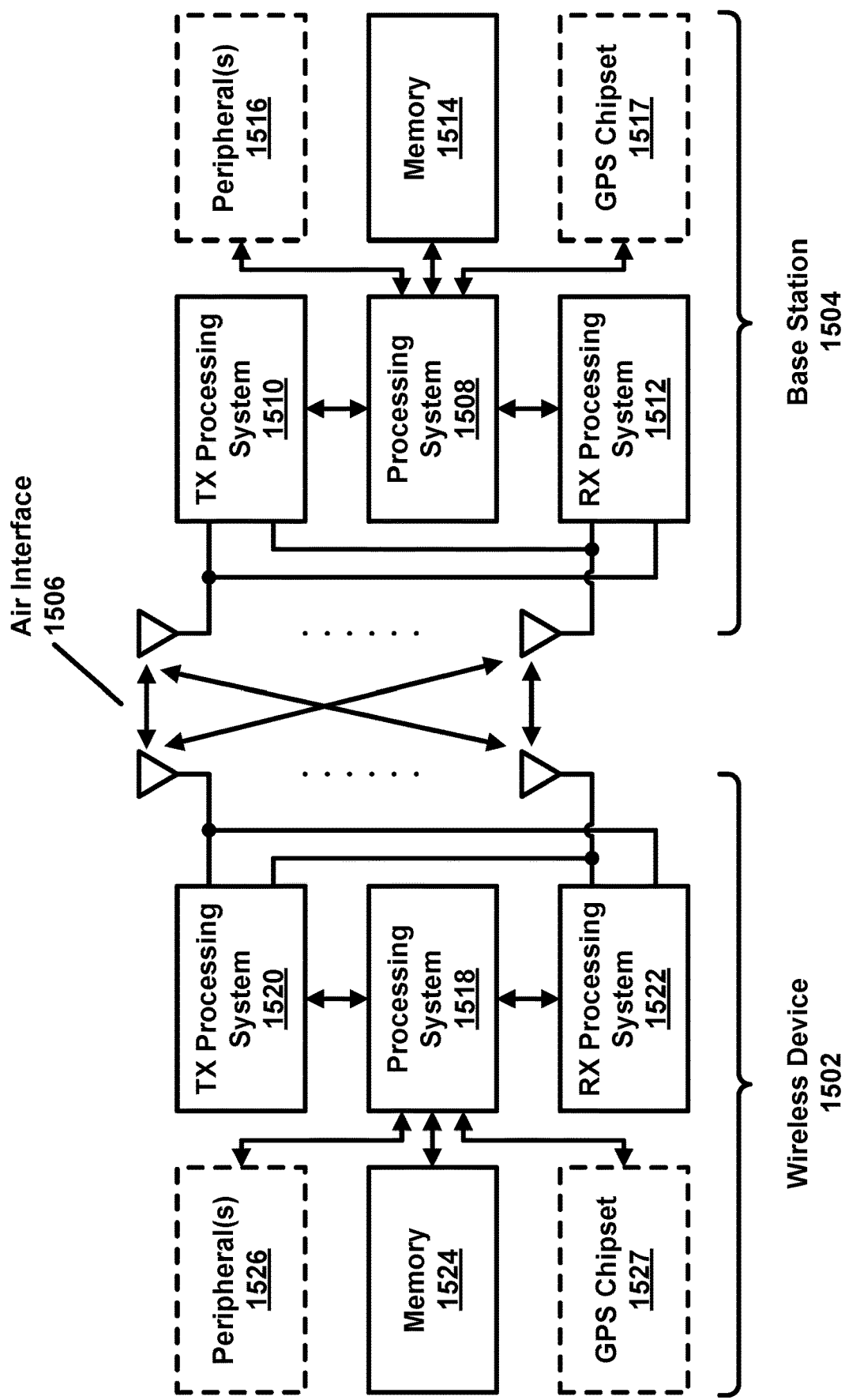
FIG. 15A shows an example of communications between a wireless device and a base station.

FIG. 15A shows an example communications between a wireless device and a base station. A wireless device 1502 and a base station 1504 may be part of a communication network, such as the communication network 100 shown in FIG. 1A, the communication network 150 shown in FIG. 1B, or any other communication network. A communication network may comprise more than one wireless device and/or more than one base station, with substantially the same or similar configurations as those shown in FIG. 15A.

The base station 1504 may connect the wireless device 1502 to a core network (not shown) via radio communications over the air interface (or radio interface) 1506. The communication direction from the base station 1504 to the wireless device 1502 over the air interface 1506 may be referred to as the downlink. The communication direction from the wireless device 1502 to the base station 1504 over the air interface may be referred to as the uplink. Downlink transmissions may be separated from uplink transmissions, for example, using various duplex schemes (e.g., FDD, TDD, and/or some combination of the duplexing techniques).

For the downlink, data to be sent to the wireless device 1502 from the base station 1504 may be provided/transferred/sent to the processing system 1508 of the base station 1504. The data may be provided/transferred/sent to the processing system 1508 by, for example, a core network. For the uplink, data to be sent to the base station 1504 from the wireless device 1502 may be provided/transferred/sent to the processing system 1518 of the wireless device 1502. The processing system 1508 and the processing system 1518 may implement layer 3 and layer 2 OSI functionality to process the data for transmission. Layer 2 may comprise an SDAP layer, a PDCP layer, an RLC layer, and a MAC layer, for example, described with respect to FIG. 2A, FIG. 2B, FIG. 3, and FIG. 4A. Layer 3 may comprise an RRC layer, for example, described with respect to FIG. 2B.

The data to be sent to the wireless device 1502 may be provided/transferred/sent to a transmission processing system 1510 of base station 1504, for example, after being processed by the processing system 1508. The data to be sent to base station 1504 may be provided/transferred/sent to a transmission processing system 1520 of the wireless device 1502, for example, after being processed by the processing system 1518. The transmission processing system 1510 and the transmission processing system 1520 may implement layer 1 OSI functionality. Layer 1 may comprise a PHY layer, for example, described with respect to FIG. 2A, FIG. 2B, FIG. 3, and FIG. 4A. For transmit processing, the PHY layer may perform, for example, forward error correction coding of transport channels, interleaving, rate matching, mapping of transport channels to physical channels, modulation of physical channel, multiple-input multiple-output (MIMO) or multi-antenna processing, and/or the like.

A reception processing system 1512 of the base station 1504 may receive the uplink transmission from the wireless device 1502. The reception processing system 1512 of the base station 1504 may comprise one or more TRPs. A reception processing system 1522 of the wireless device 1502 may receive the downlink transmission from the base station 1504. The reception processing system 1522 of the wireless device 1502 may comprise one or more antenna panels. The reception processing system 1512 and the reception processing system 1522 may implement layer 1 OSI functionality. Layer 1 may include a PHY layer, for example, described with respect to FIG. 2A, FIG. 2B, FIG. 3, and FIG. 4A. For receive processing, the PHY layer may perform, for example, error detection, forward error correction decoding, deinterleaving, demapping of transport channels to physical channels, demodulation of physical channels, MIMO or multi-antenna processing, and/or the like.

The base station 1504 may comprise multiple antennas (e.g., multiple antenna panels, multiple TRPs, etc.). The wireless device 1502 may comprise multiple antennas (e.g., multiple antenna panels, etc.). The multiple antennas may be used to perform one or more MIMO or multi-antenna techniques, such as spatial multiplexing (e.g., single-user MIMO or multi-user MIMO), transmit/receive diversity, and/or beamforming. The wireless device 1502 and/or the base station 1504 may have a single antenna.

The processing system 1508 and the processing system 1518 may be associated with a memory 1514 and a memory 1524, respectively. Memory 1514 and memory 1524 (e.g., one or more non-transitory computer readable mediums) may store computer program instructions or code that may be executed by the processing system 1508 and/or the processing system 1518, respectively, to carry out one or more of the functionalities (e.g., one or more functionalities described herein and other functionalities of general computers, processors, memories, and/or other peripherals). The transmission processing system 1510 and/or the reception processing system 1512 may be coupled to the memory 1514 and/or another memory (e.g., one or more non-transitory computer readable mediums) storing computer program instructions or code that may be executed to carry out one or more of their respective functionalities. The transmission processing system 1520 and/or the reception processing system 1522 may be coupled to the memory 1524 and/or another memory (e.g., one or more non-transitory computer readable mediums) storing computer program instructions or code that may be executed to carry out one or more of their respective functionalities.

The processing system 1508 and/or the processing system 1518 may comprise one or more controllers and/or one or more processors. The one or more controllers and/or one or more processors may comprise, for example, a general-purpose processor, a digital signal processor (DSP), a microcontroller, an application specific integrated circuit (ASIC), a field programmable gate array (FPGA) and/or other programmable logic device, discrete gate and/or transistor logic, discrete hardware components, an on-board unit, or any combination thereof. The processing system 1508 and/or the processing system 1518 may perform at least one of signal coding/processing, data processing, power control, input/output processing, and/or any other functionality that may enable the wireless device 1502 and/or the base station 1504 to operate in a wireless environment.

The processing system 1508 may be connected to one or more peripherals 1516. The processing system 1518 may be connected to one or more peripherals 1526. The one or more peripherals 1516 and the one or more peripherals 1526 may comprise software and/or hardware that provide features and/or functionalities, for example, a speaker, a microphone, a keypad, a display, a touchpad, a power source, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, and/or the like). The processing system 1508 and/or the processing system 1518 may receive input data (e.g., user input data) from, and/or provide output data (e.g., user output data) to, the one or more peripherals 1516 and/or the one or more peripherals 1526. The processing system 1518 in the wireless device 1502 may receive power from a power source and/or may be configured to distribute the power to the other components in the wireless device 1502. The power source may comprise one or more sources of power, for example, a battery, a solar cell, a fuel cell, or any combination thereof. The processing system 1508 may be connected to a Global Positioning System (GPS) chipset 1517. The processing system 1518 may be connected to a Global Positioning System (GPS) chipset 1527. The GPS chipset 1517 and the GPS chipset 1527 may be configured to determine and provide geographic location information of the wireless device 1502 and the base station 1504, respectively.

Figure 15B:
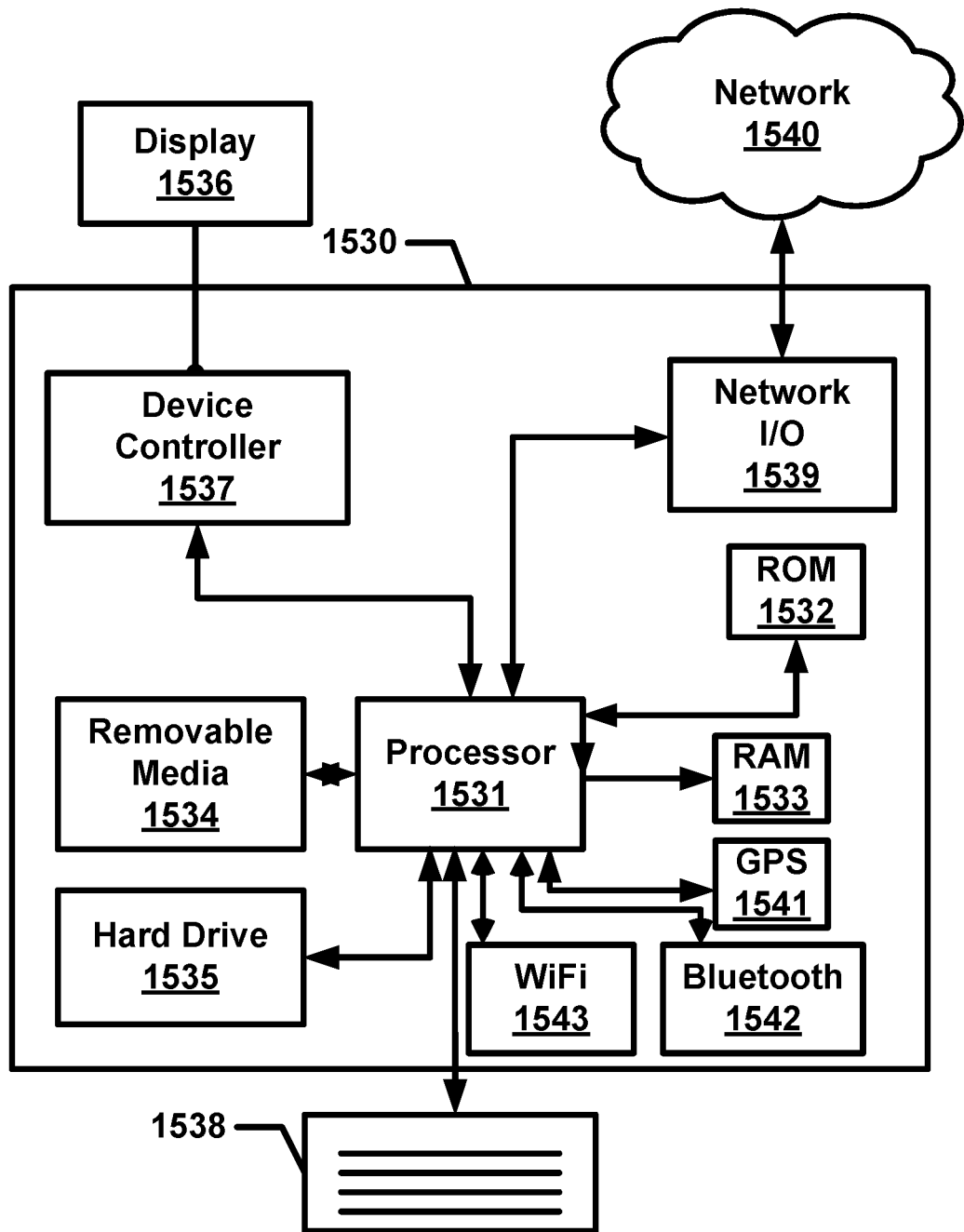
FIG. 15B shows example elements of a computing device that may be used to implement any of the various devices described herein.

FIG. 15B shows example elements of a computing device that may be used to implement any of the various devices described herein, including, for example, the base station 160A, 160B, 162A, 162B, 220, and/or 1504, the wireless device 106, 156A, 156B, 210, and/or 1502, or any other base station, wireless device, AMF, UPF, network device, or computing device described herein. The computing device 1530 may include one or more processors 1531, which may execute instructions stored in the random-access memory (RAM) 1533, the removable media 1534 (such as a Universal Serial Bus (USB) drive, compact disk (CD) or digital versatile disk (DVD), or floppy disk drive), or any other desired storage medium. Instructions may also be stored in an attached (or internal) hard drive 1535. The computing device 1530 may also include a security processor (not shown), which may execute instructions of one or more computer programs to monitor the processes executing on the processor 1531 and any process that requests access to any hardware and/or software components of the computing device 1530 (e.g., ROM 1532, RAM 1533, the removable media 1534, the hard drive 1535, the device controller 1537, a network interface 1539, a GPS 1541, a Bluetooth interface 1542, a WiFi interface 1543, etc.). The computing device 1530 may include one or more output devices, such as the display 1536 (e.g., a screen, a display device, a monitor, a television, etc.), and may include one or more output device controllers 1537, such as a video processor. There may also be one or more user input devices 1538, such as a remote control, keyboard, mouse, touch screen, microphone, etc. The computing device 1530 may also include one or more network interfaces, such as a network interface 1539, which may be a wired interface, a wireless interface, or a combination of the two. The network interface 1539 may provide an interface for the computing device 1530 to communicate with a network 1540 (e.g., a RAN, or any other network). The network interface 1539 may include a modem (e.g., a cable modem), and the external network 1540 may include communication links, an external network, an in-home network, a provider's wireless, coaxial, fiber, or hybrid fiber/coaxial distribution system (e.g., a DOCSIS network), or any other desired network. Additionally, the computing device 1530 may include a location-detecting device, such as a global positioning system (GPS) microprocessor 1541, which may be configured to receive and process global positioning signals and determine, with possible assistance from an external server and antenna, a geographic position of the computing device 1530.

The example in FIG. 15B may be a hardware configuration, although the components shown may be implemented as software as well. Modifications may be made to add, remove, combine, divide, etc. components of the computing device 1530 as desired. Additionally, the components may be implemented using basic computing devices and components, and the same components (e.g., processor 1531, ROM storage 1532, display 1536, etc.) may be used to implement any of the other computing devices and components described herein. For example, the various components described herein may be implemented using computing devices having components such as a processor executing computer-executable instructions stored on a computer-readable medium, as shown in FIG. 15B. Some or all of the entities described herein may be software based, and may co-exist in a common physical platform (e.g., a requesting entity may be a separate software process and program from a dependent entity, both of which may be executed as software on a common computing device).

FIG. 16A shows an example structure for uplink transmission. Processing of a baseband signal representing a physical uplink shared channel may comprise/perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA), CP-OFDM signal for an antenna port, or any other signals; and/or the like. An SC-FDMA signal for uplink transmission may be generated, for example, if transform precoding is enabled. A CP-OFDM signal for uplink transmission may be generated, for example, if transform precoding is not enabled (e.g., as shown in FIG. 16A). These functions are examples and other mechanisms for uplink transmission may be implemented.

FIG. 16B shows an example structure for modulation and up-conversion of a baseband signal to a carrier frequency. The baseband signal may be a complex-valued SC-FDMA, CP-OFDM baseband signal (or any other baseband signals) for an antenna port and/or a complex-valued Physical Random Access Channel (PRACH) baseband signal. Filtering may be performed/employed, for example, prior to transmission.

FIG. 16C shows an example structure for downlink transmissions. Processing of a baseband signal representing a physical downlink channel may comprise/perform one or more functions. The one or more functions may comprise: scrambling of coded bits in a codeword to be sent/transmitted on/via a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are examples and other mechanisms for downlink transmission may be implemented.

FIG. 16D shows an example structure for modulation and up-conversion of a baseband signal to a carrier frequency. The baseband signal may be a complex-valued OFDM baseband signal for an antenna port or any other signal. Filtering may be performed/employed, for example, prior to transmission.

A wireless device may receive, from a base station, one or more messages (e.g. RRC messages) comprising configuration parameters of a plurality of cells (e.g., a primary cell, one or more secondary cells). The wireless device may communicate with at least one base station (e.g., two or more base stations in dual-connectivity) via the plurality of cells. The one or more messages (e.g. as a part of the configuration parameters) may comprise parameters of PHY, MAC, RLC, PCDP, SDAP, RRC layers for configuring the wireless device. The configuration parameters may comprise parameters for configuring PHY and MAC layer channels, bearers, etc. The configuration parameters may comprise parameters indicating values of timers for PHY, MAC, RLC, PCDP, SDAP, RRC layers, and/or communication channels.

A timer may begin running, for example, once it is started and continue running until it is stopped or until it expires. A timer may be started, for example, if it is not running or restarted if it is running A timer may be associated with a value (e.g., the timer may be started or restarted from a value or may be started from zero and expire once it reaches the value). The duration of a timer may not be updated, for example, until the timer is stopped or expires (e.g., due to BWP switching). A timer may be used to measure a time period/window for a process. With respect to an implementation and/or procedure related to one or more timers or other parameters, it will be understood that there may be multiple ways to implement the one or more timers or other parameters. One or more of the multiple ways to implement a timer may be used to measure a time period/window for the procedure. A random access response window timer may be used for measuring a window of time for receiving a random access response. The time difference between two time stamps may be used, for example, instead of starting a random access response window timer and determine the expiration of the timer. A process for measuring a time window may be restarted, for example, if a timer is restarted. Other example implementations may be configured/provided to restart a measurement of a time window.

Figure 17:
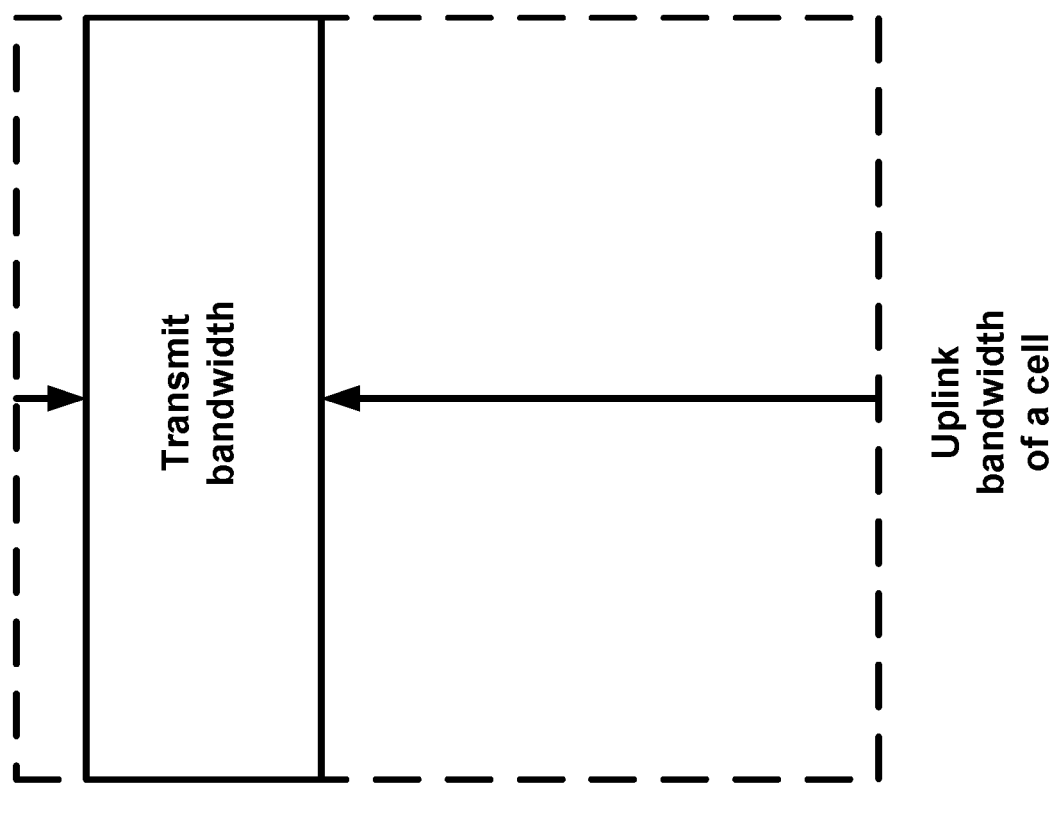
FIG. 17 shows an example of bandwidth adaptation (BA).

FIG. 17 shows an example of bandwidth adaptation (BA). A bandwidth (e.g., a reception/receive bandwidth and/or a transmission/transmit bandwidth) of a wireless device may not be as large as a bandwidth of a cell. A reception/receive bandwidth and/or a transmission/transmit bandwidth of a wireless device may not be as large as a bandwidth of a cell, for example, with BA. The reception/receive bandwidth and/or the transmission/transmit bandwidth of the wireless device may be adjusted. The width of the reception/receive bandwidth and/or the transmission/transmit bandwidth may be configured to change (e.g., to reduced for a period of low activity to save power). The location of a reception/receive bandwidth and/or a transmission/transmit bandwidth may be adjusted in the frequency domain (e.g., to increase scheduling flexibility). The subcarrier spacing (SCS) of a reception/receive bandwidth and/or a transmission/transmit bandwidth may be configured to change (e.g., to allow different services). A subset of the total cell bandwidth of a cell may be referred to as a bandwidth part (BWP). The BA may be achieved by configuring the wireless device with one or more BWPs and/or communicating to the wireless device which of the configured one or more BWPs is currently the active BWP.

A base station (e.g., a gNB, and/or any other base station) may configure a wireless device (e.g., a UE, and/or any other wireless device) with uplink (UL) BWPs and downlink (DL) BWPs. Any device described herein may configure (and/or be configured by) the device (or any other device), for example, by sending/receiving, providing, determining, applying one or more parameter(s), message(s), configuration(s), etc. A base station may configure a wireless device with at least UL BWP(s) and/or at least DL BWP(s), for example, to enable BA via a PCell and/or a PSCell. The base station may configure the wireless device with at least DL BWP(s) and/or at least UL BWP(S) to enable BA via an SCell. The base station may configure the wireless device with at least DL BWP(s) and/or at least UL BWP(s) to enable BA via an SCell, for example, if CA is configured.

An initial BWP may be a BWP used for initial access. An initial BWP may be a BWP used for initial access, for example, for the PCell. The wireless device may use (e.g., send and/or receive via) the initial BWP (e.g., initial UL BWP and/or an initial DL BWP) for the initial access.

An initial BWP may be a BWP configured for the wireless device to first operate at the SCell. An initial BWP may be a BWP configured for the wireless device to first operate at the SCell, for example, for the SCell. An initial BWP may be a BWP configured for the wireless device to first operate at the SCell, for example, if the SCell is activated. The wireless device may use (e.g., send and/or receive via) the initial BWP. The wireless device may use (e.g., send and/or receive via) the initial BWP, for example, based on the SCell being activated.

A base station may configure a wireless device with one or more BWPs. A wireless device may switch a first DL BWP and a first UL BWP of the one or more BWPs independently. A wireless device may switch a first DL BWP and a first UL BWP of the one or more BWPs independently, for example, in paired spectrum (e.g., FDD). A wireless device may switch a second DL BWP and a second UL BWP of the one or more BWPs (e.g., simultaneously or substantially simultaneously). A wireless device may switch a second DL BWP and a second UL BWP of the one or more BWPs simultaneously or substantially simultaneously, for example, in unpaired spectrum (e.g., TDD). Switching between the configured one or more BWPs may be triggered and/or be activated via DCI or an inactivity timer (e.g., BWP inactivity timer). An expiry of the inactivity timer associated with a serving cell may switch an active BWP of the serving cell to a default BWP. An expiry of the inactivity timer associated with a serving cell may switch an active BWP of the serving cell to a default BWP, for example, if the inactivity timer is configured for the serving cell. The default BWP may be configured by the network.

One or more BWPs for UL and DL communications may be active at a time in an active serving cell. For example, an UL BWP for each uplink carrier (e.g., SUL, NUL) and an DL BWP may be active at a time in an active serving cell. An UL BWP for each uplink carrier (e.g., SUL, NUL) and an DL BWP may be active at a time in an active serving cell, for example, for FDD communications. An UL BWP for each uplink carrier (e.g., SUL, NUL) and an DL BWP may be active at a time in an active serving cell, for example, if configured with BA. BWPs other than the UL BWP and the DL BWP that the wireless device may be configured with may be deactivated. Additionally or alternatively, a plurality of UL BWPs and/or a plurality of DL BWPs may be activated.

One or more UL BWP/DL BWP pairs may be active at a time in an active serving cell. For example, a BWP pair comprising an UL BWP and a DL BWP (e.g., DL/UL BWP pair) may be active at a time in an active serving cell. A DL/UL BWP pair may be active at a time in an active serving cell, for example, for TDD systems. BWPs other than the DL/UL BWP pair that the wireless device may be configured with may be deactivated.

Operating on the UL BWP and the DL BWP (or the DL/UL BWP pair) may enable reduction of wireless device power consumption and/or improve battery life. The wireless device may not monitor PDCCH on deactivated BWPs. The wireless device may not send (e.g., transmit) on PUCCH, PRACH, and/or UL-SCH on deactivated BWPs.

A wireless device may monitor a first PDCCH on an active BWP of a serving cell. A wireless device may monitor a first PDCCH on an active BWP of a serving cell, for example, if configured with BA. The wireless device may not monitor a second PDCCH on an entire DL frequency/bandwidth of the cell. The wireless device may not monitor the second PDCCH on deactivated BWPs. A BWP inactivity timer may be used to switch the active BWP to a default BWP of the serving cell. The wireless device may (re)start the BWP inactivity timer. The wireless device may (re)start the BWP inactivity timer, for example, based on successful PDCCH decoding on the serving cell. The wireless device may switch to the default BWP. The wireless device may switch to the default BWP, for example, based on an expiry of the BWP inactivity timer.

A wireless device may be configured with a first set of BWPs (e.g., DL BWP set with at most four BWPs). A wireless device may be configured with a first set of BWPs (e.g., DL BWP set with at most four BWPs), for example, by higher layers (e.g., RRC) using a parameter (e.g., BWP-Downlink). A wireless device may be configured with a first set of BWPs (e.g., DL BWP set with at most four BWPs), for example, for receptions, by the wireless device, in a DL bandwidth for a serving cell. A wireless device may be configured with a first set of BWPs (e.g., DL BWP set with at most four BWPs) for receptions, by the wireless device, in a DL bandwidth for a serving cell, for example, if configured for operation in BWPs of the serving cell.

A wireless device may be configured with a second set of BWPs (e.g., UL BWP set with at most four BWPs). A wireless device may be configured with a second set of BWPs (e.g., UL BWP set with at most four BWPs), for example, by higher layers (e.g., RRC) using a parameter (e.g., BWP-Uplink). A wireless device may be configured with a second set of BWPs (e.g., UL BWP set with at most four BWPs), for example, for transmissions, by the wireless device, in an UL bandwidth for a serving cell. A wireless device may be configured with a second set of BWPs (e.g., UL BWP set with at most four BWPs) for transmissions, by the wireless device, in an UL bandwidth for a serving cell, for example, if configured for operation in BWPs of the serving cell.

A base station may not send, to a wireless device, a parameter for a DL BWP. The base station may not send, for example, a higher layer parameter for the DL BWP (e.g., initialDownlinkBWP). An initial active DL BWP may be defined. An initial active DL BWP may be defined, for example, based on not providing the wireless device with the higher layer parameter initialDownlinkBWP. An initial active DL BWP may be defined, for example, by a location and a number of contiguous PRBs, and an SCS and a cyclic prefix for PDCCH reception in a CORESET for Type0-PDCCH common search space (CSS) set. The contiguous PRBs may start from a first PRB with a lowest index among PRBs of the CORESET for the Type0-PDCCH CSS set.

A base station may send, to a wireless device, a higher layer parameter for a DL BWP. The base station may send, for example, a higher layer parameter for the DL BWP (e.g., initialDownlinkBWP). An initial active DL BWP may be indicated/provided by a higher layer parameter (e.g., initial-DownlinkBWP). An initial active DL BWP may be indicated/provided by the higher layer parameter initialDownlinkBWP, for example, based on the base station providing a wireless device with a higher layer parameter initialDownlinkBWP.

A base station may send, to a wireless device, a parameter for an initial active UL BWP. The base station may send, for example, a higher layer parameter for the initial active UL BWP (e.g., initialUplinkBWP). The base station may send, for example, a higher layer parameter for the initial active UL BWP (e.g., initialUplinkBWP), for example, for using (e.g., sending and/or receiving via) a cell (e.g., PCell, SCell). The base station may send, to the wireless device, a second higher layer parameter for a second initial active UL BWP on the SUL carrier. The base station may send, for example, a second higher layer parameter for a second initial active UL BWP on the SUL carrier (e.g., initialUplinkBWP in supplementaryUplink). The base station may send a second higher layer parameter for a second initial active UL BWP on the SUL carrier (e.g., initialUplinkBWP in supplementaryUplink), for example, if configured with an SUL carrier.

A wireless device may have a dedicated BWP configuration. The wireless device may receive a higher layer parameter (e.g., firstActiveDownlinkBWP-Id). The wireless device may receive a higher layer parameter (e.g., firstActiveDownlinkBWP-Id), for example, based on receiving a message comprising the dedicated BWP configuration. The higher layer parameter may indicate a first active DL BWP for receptions. The wireless device may receive a higher layer parameter (e.g., firstActiveUplinkBWP-Id). The wireless device may receive a higher layer parameter (e.g., firstActiveUplinkBWP-Id), for example, based on receiving a message comprising the dedicated BWP configuration. The higher layer parameter may indicate a first active UL BWP for transmissions via a carrier (e.g., SUL, NUL) of a serving cell (e.g., PCell, SCell).

A base station may configure a wireless device for a serving cell. A base station may configure a wireless device for a serving cell, for example, for a DL BWP in a first set of BWPs or an UL BWP in a second set of BWPs. A base station may configure a wireless device for a serving cell, for example, with at least one of: an SCS indicated/provided by a higher layer parameter subcarrierSpacing; a cyclic prefix indicated/provided by a higher layer parameter cyclicPrefix; an index in the first set of BWPs or in the second set of BWPs by a higher layer parameter bwp-Id; a third set of BWP-common and a fourth set of BWP-dedicated parameters by a higher layer parameter bwp-Common and a higher layer parameter bwp-Dedicated, respectively. The higher layer parameter subcarrierSpacing may indicate one (or more) of the values 15, 30, 60, or 120 kHz (or any other value/frequency). The base station may indicate whether to use the extended cyclic prefix for the BWP, for example, based on the higher layer parameter cyclicPrefix. The wireless device may use the normal cyclic prefix. The wireless device may use the normal cyclic prefix, for example, if the base station does not configure the higher layer parameter cyclicPrefix. The base station may configure the wireless device for the serving cell with a common RB $N_{BWP}^{start}=O_{carrier}+RB_{start}$ and a number of contiguous RBs $N_{BWP}^{size}=L_{RB}$ indicated/provided by a higher layer parameter locationAndBandwidth. The higher layer parameter locationAndBandwidth may indicate an offset $RB_{start}$ and a length $L_{RB}$ as resource indicator value (RIV), setting $N_{BWP}^{size}=275$, and a value $O_{carrier}$ indicated/provided by a higher layer parameter offsetToCarrier for the higher layer parameter subcarrierSpacing.

A DL BWP, from a first set of BWPs, with a DL BWP index indicated/provided by a higher layer parameter (e.g., bwp-Id) may be linked with an UL BWP, from a second set of BWPs, with an UL BWP index indicated/provided by a higher layer parameter (e.g., bwp-Id). A DL BWP, from a first set of BWPs, with a DL BWP index indicated/provided by a higher layer parameter bwp-Id may be linked with an UL BWP, from a second set of BWPs, with an UL BWP index indicated/provided by a higher layer parameter bwp-Id, for example, for an unpaired spectrum operation. A DL BWP, from a first set of BWPs, with a DL BWP index indicated/provided by a higher layer parameter bwp-Id may be linked with an UL BWP, from a second set of BWPs, with an UL BWP index indicated/provided by a higher layer parameter bwp-Id, for example, if the DL BWP index of the DL BWP is the same as the UL BWP index of the UL BWP.

A DL BWP index of a DL BWP may be same as an UL BWP index of an UL BWP. A wireless device may not expect to receive a configuration (e.g., RRC configuration). A wireless device may not expect to receive a configuration (e.g., RRC configuration), for example, for an unpaired spectrum operation. A wireless device may not expect to receive a configuration (e.g., RRC configuration) where a first center frequency for the DL BWP is different from a second center frequency for the UL BWP, for example, based on the DL BWP index of the DL BWP being the same as the UL BWP index of the UL BWP.

A base station may configure a wireless device with one or more CORESETs. A base station may configure a wireless device with one or more CORESETs, for example, for a DL BWP in a first set of BWPs via a serving cell (e.g., PCell). A base station may configure a wireless device with one or more CORESETs, for example, for every type of CSS sets and for UE-specific search space (USS). The wireless device may not expect to be configured without a CSS set via a PCell (or via the PSCell) in an active DL BWP.

A base station may send, to a wireless device, at least one a parameter (e.g., a higher layer parameter controlResource-SetZero and a higher layer parameter searchSpaceZero). The base station may send, for example, a higher layer parameter controlResourceSetZero and a higher layer parameter searchSpaceZero in a higher layer parameter PDCCH-ConfigSIB1 or a higher layer parameter PDCCH-ConfigCommon. The wireless device may determine a CORESET for a search space set from the higher layer parameter controlResourcesetZero. The wireless device may determine a CORESET for a search space set from the higher layer parameter controlResourcesetZero, for example, based on the base station providing a wireless device with a higher layer parameter controlResourceSetZero and a higher layer parameter searchSpaceZero in a higher layer parameter PDCCH-ConfigSIB1 or a higher layer parameter PDCCH-ConfigCommon. The wireless device may determine corresponding PDCCH monitoring occasions. The wireless device may determine corresponding PDCCH monitoring occasions, for example, based on the base station providing a wireless device with a higher layer parameter controlResourceSetZero and a higher layer parameter searchSpaceZero in a higher layer parameter PDCCH-ConfigSIB1 or a higher layer parameter PDCCH-ConfigCommon. An active DL BWP of a serving cell may not be an initial DL BWP of the serving cell. The wireless device may determine the PDCCH monitoring occasions for the search space set. The wireless device may determine the PDCCH monitoring occasions for the search space set, for example, if the active DL BWP is not the initial DL BWP of the serving cell. The wireless device may determine the PDCCH monitoring occasions for the search space set, for example, based on a bandwidth of the CORESET being within the active DL BWP and the active DL BWP having the same SCS configuration and same cyclic prefix as the initial DL BWP.

A base station may configure a wireless device with one or more resource sets (e.g., time-frequency resources/occasions) for PUCCH transmissions. A base station may configure a wireless device with one or more resource sets (e.g., time-frequency resources/occasions) for PUCCH transmissions, for example, for an UL BWP in a second set of BWPs of a serving cell (e.g., PCell or PUCCH SCell).

A wireless device may receive PDCCH and PDSCH in a DL BWP. A wireless device may receive PDCCH and PDSCH in a DL BWP, for example, based on a configured SCS and cyclic prefix length for the DL BWP. A wireless device may send (e.g., transmit) PUCCH and PUSCH in an UL BWP. A wireless device may send (e.g., transmit) PUCCH and PUSCH in an UL BWP, for example, based on a configured SCS and cyclic prefix length for the UL BWP.

A BWP indicator field may be configured in a DCI format (e.g., DCI format 1_1). A value of the BWP indicator field may indicate an active DL BWP, from a first set of BWPs, for one or more DL receptions. The BWP indicator field may indicate a DL BWP different from the active DL BWP. The wireless device may set the DL BWP as a current active DL BWP. The wireless device may set the DL BWP as a current active DL BWP, for example, based on the BWP indicator field indicating the DL BWP different from the active DL BWP. The setting the DL BWP as a current active DL BWP may comprise activating the DL BWP and deactivating the active DL BWP.

A BWP indicator field may be configured in a DCI format (e.g., DCI format 0_1). A value of the BWP indicator field may indicate an active UL BWP, from a second set of BWPs, for one or more UL transmissions. The BWP indicator field may indicate an UL BWP different from the active UL BWP. The wireless device may set the UL BWP as a current active UL BWP. The wireless device may set the UL BWP as a current active UL BWP, for example, based on the BWP indicator field indicating the UL BWP different from the active UL BWP. The setting the UL BWP as a current active UL BWP may comprise activating the UL BWP and deactivating the active UL BWP.

A DCI format (e.g., DCI format 1_1) indicating an active DL BWP change may comprise a time domain resource assignment field. The time domain resource assignment field may indicate/provide a slot offset value for a PDSCH reception. The slot offset value may be smaller than a delay required by a wireless device for the active DL BWP change. The wireless device may not expect to detect the DCI format indicating the active DL BWP change. The wireless device may not expect to detect the DCI format indicating the active DL BWP change, for example, based on the slot offset value being smaller than the delay required by the wireless device for the active DL BWP change.

A DCI format (e.g., DCI format 0_1) indicating an active UL BWP change may comprise a time domain resource assignment field. The time domain resource assignment field may indicate/provide a slot offset value for a PUSCH transmission. The slot offset value may be smaller than a delay required by a wireless device for the active UL BWP change. The wireless device may not expect to detect the DCI format indicating the active UL BWP change. The wireless device may not expect to detect the DCI format indicating the active UL BWP change, for example, based on the slot offset value being smaller than the delay required by the wireless device for the active UL BWP change.

A wireless device may receive a PDCCH in a slot of a scheduling cell. The wireless device may detect a DCI format (e.g., DCI format 1_1). The wireless device may detect a DCI format (e.g., DCI format 1_1), for example, in the PDCCH of the scheduling cell. The wireless device may detect a DCI format (e.g., DCI format 1_1), for example, indicating an active DL BWP change for a serving cell. The DCI format may comprise a time domain resource assignment field. The time domain resource assignment field may indicate/provide a slot offset value for a PDSCH transmission. The slot offset value may indicate a second slot. The wireless device may not be required to receive or send (e.g., transmit) in the serving cell for a time duration from the end of a third symbol of the slot until the beginning of the second slot. The wireless device may not be required to receive or send (e.g., transmit) in the serving cell for a time duration from the end of a third symbol of the slot until the beginning of the second slot, for example, based on detecting the DCI format indicating the active DL BWP change.

A wireless device may receive a PDCCH in a slot of a scheduling cell. The wireless device may detect a DCI format (e.g., DCI format 0_1). The wireless device may detect a DCI format (e.g., DCI format 0_1), for example, in the PDCCH of the scheduling cell. The wireless device may detect a DCI format (e.g., DCI format 0_1), for example, indicating an active UL BWP change for a serving cell. The DCI format may comprise a time domain resource assignment field. The time domain resource assignment field may indicate/provide a slot offset value for a PUSCH transmission. The slot offset value may indicate a second slot. The wireless device may not be required to receive or send (e.g., transmit) in the serving cell for a time duration from the end of a third symbol of the slot until the beginning of the second slot. The wireless device may not be required to receive or send (e.g., transmit) in the serving cell for a time duration from the end of a third symbol of the slot until the beginning of the second slot, for example, based on detecting the DCI format indicating the active UL BWP change.

A wireless device may determine (e.g., detect, expect to detect, etc.) a DCI format (e.g., DCI format 0_1) indicating active UL BWP change/switch or a DCI format (e.g., DCI format 1_1) indicating active DL BWP change/switch. A wireless device may determine (e.g., detect, expect to detect, etc.) a DCI format (e.g., DCI format 0_1) indicating active UL BWP change/switch or a DCI format (e.g., DCI format 1_1) indicating active DL BWP change/switch, for example, if a corresponding PDCCH for the detected DCI format (e.g., DCI format 0_1) or the detected DCI format (e.g., DCI format 1_1) is received within a first quantity of symbols (e.g., 3 symbols or any other quantity of symbols) of a slot. A wireless device may not determine (e.g., may not detect, may not expect to detect, etc.) a DCI format (e.g., DCI format 0_1) indicating active UL BWP change/switch or a DCI format (e.g., DCI format 1_1) indicating active DL BWP change/switch. A wireless device may not determine (e.g., may not detect, may not expect to detect, etc.) a DCI format (e.g., DCI format 0_1) indicating active UL BWP change/switch or a DCI format (e.g., DCI format 1_1) indicating active DL BWP change/switch, for example, if a corresponding PDCCH is received after a first quantity of symbols (e.g., 3 symbols or any other quantity of symbols) of a slot.

An active DL BWP change may comprise switching from the active DL BWP of a serving cell to another DL BWP of the serving cell. The switching from the active DL BWP to the DL BWP may comprise setting the DL BWP as a current active DL BWP and/or deactivating the active DL BWP. An active UL BWP change may comprise switching from the active UL BWP of a serving cell to another UL BWP of the serving cell. The switching from the active UL BWP to the UL BWP may comprise setting the UL BWP as a current active UL BWP and deactivating the active UL BWP.

A base station may send, to a wireless device, a parameter associated with a default BWP. The base station may send, for example, a parameter associated with the default BWP (e.g., defaultDownlinkBWP-Id). The base station may send a parameter associated with the default BWP (e.g., default-DownlinkBWP-Id), for example, for a serving cell (e.g., PCell, SCell). The higher layer parameter (e.g., default-DownlinkBWP-Id) may indicate a default DL BWP among the first set of (configured) BWPs of the serving cell.

A base station may not send, to a wireless device, a parameter associated with a default BWP. The base station may not send, for example, a parameter associated with the default BWP (e.g., defaultDownlinkBWP-Id). The wireless device may set the initial active DL BWP as a default DL BWP. The wireless device may set the initial active DL BWP as a default DL BWP, for example, based on not being provided with and/or receiving a higher layer parameter (e.g., defaultDownlinkBWP-Id). The default DL BWP may be the initial active DL BWP. The default DL BWP may be the initial active DL BWP, for example, based on not being provided with and/or receiving a higher layer parameter (e.g., defaultDownlinkBWP-Id).

A base station may send, to a wireless device, a parameter associated with inactivity. The base station may send, for example, a parameter associated with BWP inactivity (e.g., BWP-InactivityTimer). The parameter (e.g., BWP-InactivityTimer) may indicate a BWP inactivity timer with a timer value for a serving cell (e.g., PCell, SCell). The wireless device may decrement the BWP inactivity timer at the end of a subframe for frequency range 1 (FR1) (e.g., sub-6 GHz, 410 MHz to 7125 MHz, or any other frequency range) or at the end of a half subframe for frequency range 2 (FR2) (e.g., millimeter-waves, 24.25 GHz to 52.6 GHz, or any other frequency range). The wireless device may decrement the BWP inactivity timer at the end of a subframe for FR1 (e.g., sub-6 GHz) or at the end of a half subframe for FR2 (e.g., millimeter-waves), for example, if provided with the higher layer parameter BWP-InactivityTimer and the BWP inactivity timer is running. The wireless device may decrement the BWP inactivity timer at the end of a subframe for FR1 (e.g., sub-6 GHz) or at the end of a half subframe for FR2 (e.g., millimeter-waves), for example, based on not restarting the BWP inactivity timer for an interval of the subframe for the FR1 or an interval of the half subframe for the FR2.

A wireless device may perform an active DL BWP change for a serving cell. A wireless device may perform an active DL BWP change for a serving cell, for example, based on an expiry of a BWP inactivity timer associated with the serving cell. The wireless device may not be required to receive or send (e.g., transmit) in the serving cell for a time duration from the beginning of a subframe for FR1 or of half of a subframe for FR2. The time duration may start after (e.g., immediately after) the expiry of the BWP inactivity timer and may last until the beginning of a slot where the wireless device can receive and/or send (e.g., transmit).

A base station may send, to a wireless device, a parameter associated with an active DL BWP. The base station may send, for example, a parameter associated with the active DL BWP (e.g., firstActiveDownlinkBWP-Id) of a serving cell (e.g., SCell). The parameter (e.g., firstActiveDownlinkBWP-Id) may indicate a DL BWP of the serving cell (e.g., SCell). The wireless device may use the DL BWP as a first active DL BWP of the serving cell. The wireless device may use the DL BWP as a first active DL BWP of the serving cell, for example, based on being provided the DL BWP by a higher layer parameter (e.g., firstActiveDownlinkBWP-Id).

A base station may send, to a wireless device, a parameter associated with an active UL BWP. The base station may send, for example, a parameter associated with the active UL BWP (e.g., firstActiveUplinkBWP-Id) via a carrier (e.g., SUL, NUL) of a serving cell (e.g., SCell). The parameter (e.g., firstActiveUplinkBWP-Id) may indicate an UL BWP. The wireless device may use the UL BWP as a first active UL BWP via the carrier of the serving cell. The wireless device may use the UL BWP as a first active UL BWP via the carrier of the serving cell, for example, based on being provided the UL BWP by a higher layer parameter (e.g., firstActiveUplinkBWP-Id).

A wireless device may not send (e.g., may not transmit) HARQ-ACK information. For example, a wireless device may not (e.g., may not determine, may not expect, etc.) to send (e.g., transmit) a PUCCH transmission with HARQ-ACK information via a PUCCH resource indicated by DCI (e.g., indicated by a DCI format 1_0 or by a DCI format 1_1). A wireless device may not send (e.g., transmit) a PUCCH with HARQ-ACK information via a PUCCH resource indicated by a DCI format 1_0 or a DCI format 1_1, for example, for paired spectrum operation. A wireless device may determine not to send, (e.g., may not expect to send (e.g., transmit)) a PUCCH with HARQ-ACK information via a PUCCH resource indicated by DCI (e.g., indicated by a DCI format 1_0 or by a DCI format 1_1), for example, if the wireless device changes its active UL BWP via a PCell between a time of a detection of the DCI (e.g., DCI format 1_0 or the DCI format 1_1) and a time of a corresponding PUCCH transmission with the HARQ-ACK information.

A wireless device may not monitor a PDCCH. A wireless device may not monitor the PDCCH, for example, if the wireless device performs RRM measurements over a bandwidth that is not within the active DL BWP for the wireless device.

A wireless device may be configured with one or more BWPs for a serving cell (e.g., PCell, SCell). The serving cell may be configured with at most a first number/quantity (e.g., four or any other quantity) of BWPs. There may be one active BWP at any point in time. There may be one active BWP at any point in time, for example, for an activated serving cell. Additionally or alternatively, a plurality of BWPs may be active at a time.

A BWP switching for a serving cell may be used to activate an inactive BWP and deactivate an active BWP at a time. The BWP switching may be controlled by a PDCCH transmission indicating a downlink assignment or an uplink grant. The BWP switching may be controlled by an inactivity timer (e.g., bwp-InactivityTimer). The BWP switching may be controlled by a MAC entity. The BWP switching may be controlled by a MAC entity, for example, based on initiating a random access procedure. The BWP switching may be controlled by RRC signaling.

The wireless device may activate a DL BWP indicated by a parameter (e.g., firstActiveDownlinkBWP-Id) and/or an UL BWP indicated by a parameter (e.g., firstActiveUplinkBWP-Id). The wireless device may activate a DL BWP indicated by the firstActiveDownlinkBWP-Id and/or an UL BWP indicated by the firstActiveUplinkBWP-Id, for example, based on RRC (re)configuration of firstActiveDownlinkBWP-Id (e.g., included in RRC signaling) and/or firstActiveUplinkBWP-Id (e.g., included in RRC signaling) for a serving cell (e.g., SpCell). The wireless device may activate a DL BWP indicated by the firstActiveDownlinkBWP-Id and/or an UL BWP indicated by the firstActiveUplinkBWP-Id, for example, without receiving a PDCCH indicating a downlink assignment or an uplink grant. The wireless device may activate a DL BWP indicated by the firstActiveDownlinkBWP-Id and/or an UL BWP indicated by the firstActiveUplinkBWP-Id. The wireless device may activate a DL BWP indicated by the firstActiveDownlinkBWP-Id and/or an UL BWP indicated by the firstActiveUplinkBWP-Id, for example, based on an activation of an SCell. The wireless device may activate a DL BWP indicated by the firstActiveDownlinkBWP-Id and/or an UL BWP indicated by the firstActiveUplinkBWP-Id, for example, without receiving a PDCCH indicating a downlink assignment or an uplink grant.

An active BWP for a serving cell may be indicated by RRC signaling and/or PDCCH transmission. A DL BWP may be paired with a UL BWP. A DL BWP may be paired with a UL BWP, for example, for unpaired spectrum (e.g., TDD). BWP switching may be common (e.g., simultaneous) for the UL BWP and the DL BWP. BWP switching may be common (e.g., simultaneous) for the UL BWP and the DL BWP, for example, for unpaired spectrum (e.g., TDD).

A wireless device may perform, using an active BWP of an activated serving cell (e.g., PCell, SCell) configured with one or more BWPs, at least one of: sending (e.g., transmitting) on UL-SCH via the active BWP; sending (e.g., transmitting) on RACH on the active BWP if PRACH occasions are configured; monitoring a PDCCH on the active BWP; sending (e.g., transmitting), if configured, PUCCH on the active BWP; reporting CSI for the active BWP; sending (e.g., transmitting), if configured, SRS on the active BWP; receiving DL-SCH on the active BWP; (re)initializing any suspended configured uplink grants of configured grant Type 1 on the active BWP according to a stored configuration, if any, and to start in a symbol based on some procedures.

A wireless device may not perform, on a deactivated BWP of an activated serving cell configured with one or more BWPs, at least one of: sending (e.g., transmitting) on UL-SCH on the deactivated BWP; sending (e.g., transmitting) on RACH on the deactivated BWP; monitoring a PDCCH on the deactivated BWP; sending (e.g., transmitting) PUCCH on the deactivated BWP; reporting CSI for the deactivated BWP; sending (e.g., transmitting) SRS on the deactivated BWP, receiving DL-SCH on the deactivated BWP. A wireless device may clear any configured downlink assignment and configured uplink grant of configured grant Type 2 on a deactivated BWP. A wireless device may clear any configured downlink assignment and configured uplink grant of configured grant Type 2 on the deactivated BWP, for example, for the deactivated BWP of an activated serving cell configured with one or more BWPs. A wireless device may suspend any configured uplink grant of configured Type 1 on a deactivated (or inactive) BWP. A wireless device may suspend any configured uplink grant of configured Type 1 on a deactivated (or inactive) BWP, for example, for the deactivated BWP of an activated serving cell configured with one or more BWPs A wireless device may initiate a random access procedure (e.g., contention-based random access, contention-free random access) via a serving cell (e.g., PCell, SCell). The base station may configure PRACH occasions for an active UL BWP of the serving cell of the wireless device. The active UL BWP may be identified with an UL BWP ID (e.g., bwp-Id configured by higher layers (e.g., RRC)). The serving cell may be an SpCell. An active DL BWP of the serving cell of the wireless device may be identified with a DL BWP ID (e.g., bwp-Id configured by higher layers (e.g., RRC)). The UL BWP ID may be different from the DL BWP ID. A MAC entity of the wireless device may switch from the active DL BWP to a DL BWP, of the serving cell, identified with a second DL BWP ID. A MAC entity of the wireless device may switch from the active DL BWP to a DL BWP, of the serving cell, identified with a second DL BWP ID, for example, if the wireless device initiates the random access procedure, the base station configures PRACH occasions for the active UL BWP, and the serving cell is an SpCell. A MAC entity of the wireless device may switch from the active DL BWP to a DL BWP, of the serving cell, identified with a second DL BWP ID, for example, based on the DL BWP ID of the active DL BWP being different from the UL BWP ID of the active UL BWP. The switching from the active DL BWP to the DL BWP may comprise setting the DL BWP as a second active DL BWP of the serving cell. The second DL BWP ID may be the same as the UL BWP ID. The MAC entity may perform the random access procedure on the DL BWP (e.g., the second active DL BWP) of the serving cell (e.g., SpCell) and the active UL BWP of the serving cell. The MAC entity may perform the random access procedure on the DL BWP (e.g., the second active DL BWP) of the serving cell (e.g., SpCell) and the active UL BWP of the serving cell, for example, based on switching from the active DL BWP to a DL BWP, of the serving cell, identified with a second DL BWP ID. The wireless device may stop a BWP inactivity timer (e.g., bwp-InactivityTimer configured by higher layers (e.g., RRC)) associated with the DL BWP of the serving cell. The wireless device may stop a BWP inactivity timer (e.g., bwp-InactivityTimer configured by higher layers (e.g., RRC)) associated with the DL BWP of the serving cell, for example, based on initiating the random access procedure. The wireless device may stop a BWP inactivity timer (e.g., bwp-InactivityTimer configured by higher layers (e.g., RRC)) associated with the DL BWP of the serving cell, for example, if the BWP inactivity timer is running.

The base station may configure PRACH occasions for an active UL BWP of the serving cell of the wireless device. The serving cell may not be an SpCell. The serving cell may be an SCell. A MAC entity of the wireless device may perform the random access procedure on a first active DL BWP of an SpCell (e.g., PCell) and the active UL BWP of the serving cell. A MAC entity of the wireless device may perform the random access procedure on a first active DL BWP of an SpCell (e.g., PCell) and the active UL BWP of the serving cell, for example, if the wireless device initiates the random access procedure, the base station configures PRACH occasions for the active UL BWP, and the serving cell is not an SpCell. The wireless device may stop a second BWP inactivity timer (e.g., bwp-InactivityTimer configured by higher layers (e.g., RRC)) associated with a second active DL BWP of the serving cell. The wireless device may stop a second BWP inactivity timer (e.g., bwp-InactivityTimer configured by higher layers (e.g., RRC)) associated with a second active DL BWP of the serving cell, for example, based on initiating the random access procedure. The wireless device may stop a second BWP inactivity timer (e.g., bwp-InactivityTimer configured by higher layers (e.g., RRC)) associated with a second active DL BWP of the serving cell, for example, if the second BWP inactivity timer is running. The wireless device may stop a first BWP inactivity timer (e.g., bwp-InactivityTimer configured by higher layers (e.g., RRC)) associated with the first active DL BWP of the SpCell. The wireless device may stop a first BWP inactivity timer (e.g., bwp-InactivityTimer configured by higher layers (e.g., RRC)) associated with the first active DL BWP of the SpCell, for example, based on initiating the random access procedure and the serving cell being the SCell. The wireless device may stop a first BWP inactivity timer (e.g., bwp-InactivityTimer configured by higher layers (e.g., RRC)) associated with the first active DL BWP of the SpCell, for example, if the first BWP inactivity timer is running.

The base station may not configure PRACH occasions for an active UL BWP of the serving cell of the wireless device. A wireless device (e.g., a MAC entity of a wireless device) may switch from the active UL BWP to an UL BWP (e.g., initial UL BWP) of the serving cell. A wireless device (e.g., a MAC entity of the wireless device) may switch from the active UL BWP to an UL BWP (e.g., initial UL BWP) of the serving cell, for example, if the wireless device initiates the random access procedure on the serving cell. A wireless device (e.g., a MAC entity of the wireless device) may switch from the active UL BWP to an UL BWP (e.g., initial UL BWP) of the serving cell, for example, based on the PRACH occasions not being configured for the active UL BWP of the serving cell. The UL BWP may be indicated by an RRC signaling (e.g., initialUplinkBWP). The switching from the active UL BWP to the UL BWP may comprise setting the UL BWP as a current active UL BWP of the serving cell. The serving cell may be an SpCell. The wireless device (e.g., the MAC entity of the wireless device) may switch from an active DL BWP of the serving cell to a DL BWP (e.g., initial DL BWP) of the serving cell. The wireless device (e.g., the MAC entity of the wireless device) may switch from an active DL BWP of the serving cell to a DL BWP (e.g., initial DL BWP) of the serving cell, for example, if the wireless device initiates the random access procedure on the serving cell and the PRACH occasions are not configured for the active UL BWP of the serving cell. The wireless device (e.g., the MAC entity of the wireless device) may switch from an active DL BWP of the serving cell to a DL BWP (e.g., initial DL BWP) of the serving cell, for example, based on the serving cell being an SpCell. The DL BWP may be indicated by RRC signaling (e.g., initialDownlinkBWP). The switching from the active DL BWP to the DL BWP may comprise setting the DL BWP as a current active DL BWP of the serving cell. The wireless device (e.g., the MAC entity of the wireless device) may perform the random access procedure on the UL BWP of the serving cell and the DL BWP of the serving cell. The wireless device (e.g., the MAC entity of the wireless device) may perform the random access procedure on the UL BWP of the serving cell and the DL BWP of the serving cell, for example, based on switching from the active DL BWP to the DL BWP. The wireless device may stop a BWP inactivity timer (e.g., bwp-InactivityTimer configured by higher layers (e.g., RRC)) associated with the DL BWP (e.g., the current active DL BWP) of the serving cell. The wireless device may stop a BWP inactivity timer (e.g., bwp-InactivityTimer configured by higher layers (e.g., RRC)) associated with the DL BWP (e.g., the current active DL BWP) of the serving cell, for example, based on initiating the random access procedure. The wireless device may stop a BWP inactivity timer (e.g., bwp-InactivityTimer configured by higher layers (e.g., RRC)) associated with the DL BWP (e.g., the current active DL BWP) of the serving cell, for example, if the BWP inactivity timer is running.

The base station may not configure PRACH occasions for an active UL BWP of the serving cell (e.g., SCell) of the wireless device. A MAC entity of the wireless device may switch from the active UL BWP to an UL BWP (e.g., initial UL BWP) of the serving cell. A wireless device (e.g., the MAC entity of the wireless device) may switch from the active UL BWP to an UL BWP (e.g., initial UL BWP) of the serving cell, for example, if the wireless device initiates the random access procedure on the serving cell. A wireless device (e.g., the MAC entity of the wireless device) may switch from the active UL BWP to an UL BWP (e.g., initial UL BWP) of the serving cell, for example, based on the PRACH occasions not being configured for the active UL BWP of the serving cell. The UL BWP may be indicated by RRC signaling (e.g., initialUplinkBWP). The switching from the active UL BWP to the UL BWP may comprise setting the UL BWP as a current active UL BWP of the serving cell. The serving cell may not be an SpCell. The serving cell may be an SCell. The MAC entity may perform the random access procedure on the UL BWP of the serving cell and an active DL BWP of an SpCell. The wireless device (e.g., the MAC entity of the wireless device) may perform the random access procedure on the UL BWP of the serving cell and an active DL BWP of an SpCell, for example, based on the serving cell not being the SpCell. The wireless device may stop a second BWP inactivity timer (e.g., bwp-InactivityTimer configured by higher layers (e.g., RRC)) associated with a second active DL BWP of the serving cell. The wireless device may stop a second BWP inactivity timer (e.g., bwp-InactivityTimer configured by higher layers (e.g., RRC)) associated with a second active DL BWP of the serving cell, for example, based on initiating the random access procedure. The wireless device may stop a second BWP inactivity timer (e.g., bwp-InactivityTimer configured by higher layers (e.g., RRC)) associated with a second active DL BWP of the serving cell, for example, if the second BWP inactivity timer is running. The wireless device may stop a first BWP inactivity timer (e.g., bwp-InactivityTimer configured by higher layers (e.g., RRC)) associated with the active DL BWP of the SpCell. The wireless device may stop a first BWP inactivity timer (e.g., bwp-InactivityTimer configured by higher layers (e.g., RRC)) associated with the active DL BWP of the SpCell, for example, based on initiating the random access procedure and the serving cell being the SCell. The wireless device may stop a first BWP inactivity timer (e.g., bwp-InactivityTimer configured by higher layers (e.g., RRC)) associated with the active DL BWP of the SpCell, for example, if the first BWP inactivity timer is running.

A wireless device (e.g., the MAC entity of the wireless device) may receive a PDCCH transmission for a BWP switching (e.g., UL BWP and/or DL BWP switching) of a serving cell. There may not be an ongoing random access procedure associated with the serving cell. There may not be an ongoing random access procedure associated with the serving cell, for example, if the wireless device (e.g., the MAC entity of the wireless device) receives the PDCCH transmission. The wireless device (e.g., the MAC entity of the wireless device) may perform the BWP switching to a BWP, of the serving cell, indicated by the PDCCH transmission. The wireless device (e.g., the MAC entity of the wireless device) may perform the BWP switching to a BWP, of the serving cell, indicated by the PDCCH transmission, for example, based on there not being an ongoing random access procedure associated with the serving cell. The wireless device (e.g., the MAC entity of the wireless device) may perform the BWP switching to a BWP, of the serving cell, indicated by the PDCCH transmission, for example, if the MAC entity receives the PDCCH transmission for the BWP switching of the serving cell.

A wireless device (e.g., the MAC entity of the wireless device) may receive a PDCCH transmission for a BWP switching (e.g., UL BWP and/or DL BWP switching) of a serving cell. The PDCCH transmission may be addressed to C-RNTI of the wireless device. There may be an ongoing random access procedure associated with the serving cell. The wireless device may complete the ongoing random access procedure associated with the serving cell (successfully). The wireless device may complete the ongoing random access procedure associated with the serving cell (successfully), for example, based on receiving the PDCCH transmission addressed to the C-RNTI. The wireless device (e.g., the MAC entity of the wireless device) may perform the BWP switching to a BWP, of the serving cell, indicated by the PDCCH transmission. The wireless device (e.g., the MAC entity of the wireless device) may perform the BWP switching to a BWP, of the serving cell, indicated by the PDCCH transmission, for example, based on completing the ongoing random access procedure associated with the serving cell (successfully).

A wireless device (e.g., a MAC entity of the wireless device) may receive a PDCCH transmission for a BWP switching (e.g., UL BWP and/or DL BWP switching) for a serving cell. There may be an ongoing random access procedure associated with the serving cell in the wireless device (e.g., in a MAC entity of the wireless device). There may be an ongoing random access procedure associated with the serving cell in the MAC entity, for example, if the wireless device receives the PDCCH transmission. The wireless device may determine whether to perform the BWP switching or ignore the PDCCH transmission for the BWP switching. The wireless device may ignore the PDCCH transmission indicating the BWP switching, for example, if there is an ongoing random access procedure. The wireless device may perform the BWP switching, for example, if there is an ongoing random access procedure. The wireless device may terminate, abort, and/or stop the ongoing random access procedure, for example, if the wireless device determines to perform the BWP switching based on the PDCCH transmission received in performing the ongoing random access procedure.

The wireless device (e.g., the MAC entity of the wireless device) may perform the BWP switching. The wireless device (e.g., the MAC entity of the wireless device) may perform the BWP switching, for example, based on receiving the PDCCH transmission for the BWP switching (e.g., other than successful contention resolution for the random access procedure). The performing the BWP switching may comprise switching to a BWP indicated by the PDCCH transmission. The wireless device (e.g., the MAC entity of the wireless device) may stop the ongoing random access procedure and may initiate a second random access procedure after the performing the BWP switching. The wireless device (e.g., the MAC entity of the wireless device) may stop the ongoing random access procedure and may initiate a second random access procedure after the performing the BWP switching, for example, based on performing the BWP switching.

The wireless device (e.g., the MAC entity of the wireless device) may ignore a PDCCH transmission for the BWP switching. The wireless device (e.g., the MAC entity of the wireless device) may continue with the ongoing random access procedure on the serving cell. The wireless device (e.g., the MAC entity of the wireless device) may continue with the ongoing random access procedure on the serving cell, for example, based on ignoring a PDCCH transmission for the BWP switching.

A base station may configure an activated serving cell of a wireless device with a BWP inactivity timer. The base station may configure the wireless device with a default DL BWP ID for the activated serving cell (e.g., via RRC signaling including defaultDownlinkBWP-Id parameter). An active DL BWP of the activated serving cell may not be a BWP indicated by the default DL BWP ID. The base station may not configure the wireless device with a default DL BWP ID for the activated serving cell (e.g., via RRC signaling including defaultDownlinkBWP-Id parameter). An active DL BWP of the activated serving cell may not be an initial DL BWP (e.g., via RRC signaling including initialDownlinkBWP parameter) of the activated serving cell.

The wireless device may start or restart the BWP inactivity timer associated with the active DL BWP of the activated serving cell. The wireless device may start or restart the BWP inactivity timer associated with the active DL BWP of the activated serving cell, for example, if the base station configures the wireless device with the default DL BWP ID and the active DL BWP of the activated serving cell is not the BWP indicated by the default DL BWP ID. The wireless device may start or restart the BWP inactivity timer associated with the active DL BWP of the activated serving cell, for example, if the base station does not configure the wireless device with the default DL BWP ID and the active DL BWP is not the initial DL BWP. The wireless device may start or restart the BWP inactivity timer associated with the active DL BWP of the activated serving cell, for example, based on receiving a PDCCH, on the active DL BWP, indicating a downlink assignment or an uplink grant. The PDCCH may be addressed to C-RNTI. The PDCCH may be addressed to CS-RNTI.

The wireless device may start or restart the BWP inactivity timer associated with the active DL BWP of the activated serving cell. The wireless device may start or restart the BWP inactivity timer associated with the active DL BWP of the activated serving cell, for example, if the base station configures the wireless device with the default DL BWP ID and the active DL BWP of the activated serving cell is not the BWP indicated by the default DL BWP ID. The wireless device may start or restart the BWP inactivity timer associated with the active DL BWP of the activated serving cell, for example, if the base station does not configure the wireless device with the default DL BWP ID and the active DL BWP is not the initial DL BWP. The wireless device may start or restart the BWP inactivity timer associated with the active DL BWP of the activated serving cell, for example, based on receiving a PDCCH transmission, for the active DL BWP, indicating a downlink assignment or an uplink grant. The PDCCH transmission may be addressed to C-RNTI. The PDCCH may be addressed to CS-RNTI.

The wireless device may receive a PDCCH transmission. The wireless device may receive a PDCCH, for example, if there is no ongoing random access procedure associated with the activated serving cell. The wireless device may receive a PDCCH transmission, for example, if there is an ongoing random access procedure associated with the activated serving cell and the ongoing random access procedure is completed successfully. The ongoing random access procedure may be completed successfully, for example, based on receiving the PDCCH transmission addressed to a C-RNTI of the wireless device.

The wireless device may start or restart the BWP inactivity timer associated with the active DL BWP of the activated serving cell. The wireless device may start or restart the BWP inactivity timer associated with the active DL BWP of the activated serving cell, for example, if the base station configures the wireless device with the default DL BWP ID and the active DL BWP of the activated serving cell is not the BWP indicated by the default DL BWP ID. The wireless device may start or restart the BWP inactivity timer associated with the active DL BWP of the activated serving cell, for example, if the base station does not configure the wireless device with the default DL BWP ID and the active DL BWP is not the initial DL BWP. The wireless device may start or restart the BWP inactivity timer associated with the active DL BWP of the activated serving cell, for example, based on sending (e.g., transmitting) a first MAC PDU in a configured uplink grant or receiving a second MAC PDU in a configured downlink assignment.

The wireless device may send (e.g., transmit) the first MAC PDU and/or receive the second MAC PDU. The wireless device may send (e.g., transmit) the first MAC PDU and/or receive the second MAC PDU, for example, if there is no ongoing random access procedure associated with the activated serving cell.

The BWP inactivity timer associated with the active DL BWP of the activated serving cell may expire. The base station may configure the wireless device with the default DL BWP ID. A wireless device (e.g., the MAC entity of the wireless device) may perform BWP switching to a BWP indicated by the default DL BWP ID. A wireless device (e.g., the MAC entity of the wireless device) may perform BWP switching to a BWP indicated by the default DL BWP ID, for example, if the base station configures the wireless device with the default DL BWP ID. A wireless device (e.g., the MAC entity of the wireless device) may perform BWP switching to a BWP indicated by the default DL BWP ID, for example, based on the BWP inactivity timer expiring.

The base station may not configure the wireless device with the default DL BWP ID. A wireless device (e.g., the MAC entity of the wireless device) may perform BWP switching to the initial DL BWP (e.g., initialDownlinkBWP in RRC signaling). A wireless device (e.g., the MAC entity of the wireless device) may perform BWP switching to the initial DL BWP (e.g., initialDownlinkBWP in RRC signaling), for example, if the base station does not configure the wireless device with the default DL BWP ID. A wireless device (e.g., the MAC entity of the wireless device) may perform BWP switching to the initial DL BWP (e.g., initialDownlinkBWP in RRC signaling), for example, based on the BWP inactivity timer expiring.

A wireless device may initiate a random access procedure on an SCell. The wireless device may monitor for an RAR for the random access procedure on an SpCell. The SCell and the SpCell may be associated with the random access procedure. The SCell and the SpCell may be associated with the random access procedure, for example, if the wireless device initiates the random access procedure on the SCell. The SCell and the SpCell may be associated with the random access procedure, for example, based on monitoring the RAR to the SpCell.

A wireless device may receive a PDCCH transmission for a BWP switching (e.g., UL and/or DL BWP switching). A wireless device (e.g., the MAC entity of the wireless device) may switch from a first active DL BWP of the activated serving cell to a BWP (e.g., DL BWP) of the activated serving cell. A wireless device (e.g., the MAC entity of the wireless device) may switch from a first active DL BWP of the activated serving cell to a BWP (e.g., DL BWP) of the activated serving cell, for example, based on receiving the PDCCH. The switching from the first active DL BWP to the BWP may comprise setting the BWP as a current active DL BWP of the activated serving cell. The wireless device may deactivate the first active DL BWP. The wireless device may deactivate the first active DL BWP, for example, based on switching from the first active DL BWP to the BWP.

The base station may configure the wireless device with a default DL BWP ID. The BWP may not be indicated (or identified) by the default DL BWP ID. The wireless device may start or restart the BWP inactivity timer associated with the BWP (e.g., the current active DL BWP). The wireless device may start or restart the BWP inactivity timer associated with the BWP (e.g., the current active DL BWP), for example, if the base station configures the wireless device with the default DL BWP ID and the MAC entity of the wireless device switches from the first active DL BWP of the activated serving cell to the BWP. The wireless device may start or restart the BWP inactivity timer associated with the BWP (e.g., the current active DL BWP), for example, based on the BWP not being the default DL BWP (or the BWP not being indicated by the default DL BWP ID).

The base station may not configure the wireless device with a default DL BWP ID. The BWP may not be the initial DL BWP of the activated serving cell. The wireless device may start or restart the BWP inactivity timer associated with the BWP (e.g., the current active DL BWP). The wireless device may start or restart the BWP inactivity timer associated with the BWP (e.g., the current active DL BWP), for example, if the base station does not configure the wireless device with the default DL BWP ID and the wireless device (e.g., the MAC entity of the wireless device) switches from the first active DL BWP of the activated serving cell to the BWP. The wireless device may start or restart the BWP inactivity timer associated with the BWP (e.g., the current active DL BWP), for example, based on the BWP not being the initial DL BWP.

A base station may configure a wireless device with an SCell. A base station may configure a wireless device with an SCell, for example, if configured with CA. A wireless device may receive an SCell Activation/Deactivation MAC CE activating the SCell. The SCell may be deactivated prior to the receiving the SCell Activation/Deactivation MAC CE. The wireless device may activate a DL BWP of the SCell and activate an UL BWP of the SCell. The wireless device may activate a DL BWP of the SCell and activate an UL BWP of the SCell, for example, if a wireless device receives the SCell Activation/Deactivation MAC CE activating the SCell. The wireless device may activate a DL BWP of the SCell and activate an UL BWP of the SCell, for example, based on the SCell being deactivated prior to the receiving the SCell Activation/Deactivation MAC CE. The DL BWP may be indicated by the firstActiveDownlinkBWP-Id. The UL BWP may be indicated by the firstActiveUplinkBWP-Id.

The base station may configure a wireless device with a BWP inactivity timer for the activated SCell. An sCellDeactivationTimer associated with the activated SCell may expire. The wireless device may stop the BWP inactivity timer associated with the activated SCell. The wireless device may stop the BWP inactivity timer associated with the activated SCell, for example, based on the sCellDeactivationTimer expiring. The wireless device may deactivate an active DL BWP (e.g., and an active UL BWP if exists) associated with the activated SCell. The wireless device may deactivate an active DL BWP (e.g., and an active UL BWP if exists) associated with the activated SCell, for example, based on the sCellDeactivationTimer expiring.

A DL BWP index (ID) may be an identifier for a DL BWP. One or more parameters in an RRC configuration may use the DL BWP ID to associate the one or more parameters with the DL BWP. The DL BWP ID=0 may be associated with the initial DL BWP. An UL BWP index (ID) may be an identifier for an UL BWP. One or more parameters in an RRC configuration may use the UL BWP ID to associate the one or more parameters with the UL BWP. The UL BWP ID=0 may be associated with the initial UL BWP.

A parameter (e.g., firstActiveDownlinkBWP-Id) may indicate an ID of a DL BWP to be activated. A higher layer parameter firstActiveDownlinkBWP-Id may indicate an ID of a DL BWP to be activated, for example, if a higher layer parameter firstActiveDownlinkBWP-Id is configured for an SpCell. A higher layer parameter firstActiveDownlinkBWP-Id may indicate an ID of a DL BWP to be activated, for example, based on performing the reconfiguration.

A parameter (e.g., firstActiveDownlinkBWP-Id) may indicate an ID of a DL BWP to be used. A higher layer parameter firstActiveDownlinkBWP-Id may indicate an ID of a DL BWP to be used, for example, if a higher layer parameter firstActiveDownlinkBWP-Id is configured for an SCell. A higher layer parameter firstActiveDownlinkBWP-Id may indicate an ID of a DL BWP to be used, for example, based on MAC-activation of the SCell.

A parameter (e.g., firstActiveUplinkBWP-Id) may indicate an ID of an UL BWP to be activated. A higher layer parameter firstActiveUplinkBWP-Id may indicate an ID of an UL BWP to be activated, for example, if a higher layer parameter firstActiveUplinkBWP-Id is configured for an SpCell. A higher layer parameter firstActiveUplinkBWP-Id may indicate an ID of an UL BWP to be activated, for example, based on performing the reconfiguration.

A parameter (e.g., firstActiveUplinkBWP-Id) may indicate an ID of an UL BWP to be used. A higher layer parameter firstActiveUplinkBWP-Id may indicate an ID of an UL BWP to be used, for example, if a higher layer parameter firstActiveUplinkBWP-Id is configured for an SCell. A higher layer parameter firstActiveUplinkBWP-Id may indicate an ID of an UL BWP to be used, for example, based on MAC-activation of the SCell.

A wireless device, to execute a reconfiguration with sync, may determine/consider an UL BWP indicated in a parameter (e.g., firstActiveUplinkBWP-Id) to be an active UL BWP. A wireless device, to execute a reconfiguration with sync, may determine/consider a DL BWP indicated in a higher layer parameter firstActiveDownlinkBWP-Id to be an active DL BWP.

A base station may send (e.g., transmit) an indication to a wireless device to switch active BWP. A base station may send (e.g., transmit) an indication to a wireless device to switch active BWP, for example, via one or more RRC messages, DCI, and/or timer-based BWP switch. The wireless device may use BWP switch delay requirements. The wireless device may use BWP switch delay requirements, for example, based on capabilities of the wireless device. The wireless device may complete the switch of active DL and/or UL BWP within the predefined delay.

A wireless device may use active BWP switch delay requirements for DCI and timer-based BWP switching. The BWP switching may be based on a single CC. The wireless device may be able to receive PDSCH (for DL active BWP switch) or may send (e.g., transmit) PUSCH (for UL active BWP switch) on the new BWP on the serving cell on which BWP switch on the first DL or UL slot occurs. The wireless device may be able to receive PDSCH (for DL active BWP switch) or may send (e.g., transmit) PUSCH (for UL active BWP switch) on the new BWP on the serving cell on which BWP switch on the first DL or UL slot occurs, for example, for DCI-based BWP switch. The wireless device may be able to receive PDSCH (for DL active BWP switch) or may send (e.g., transmit) PUSCH (for UL active BWP switch) on the new BWP on the serving cell on which BWP switch on the first DL or UL slot occurs, for example, based on the wireless device receiving BWP switching request at DL slot n via a serving cell. The wireless device may be able to receive PDSCH (for DL active BWP switch) or may send (e.g., transmit) PUSCH (for UL active BWP switch) on the new BWP on the serving cell on which BWP switch on the first DL or UL slot occurs, for example, based on the beginning of DL slot n+$T_{BWPswitchDelay}$.

The wireless device may not send (e.g., may not transmit) UL signals or receive DL signals. The wireless device may not send (e.g., may not transmit) UL signals or receive DL signals, for example, for time duration $T_{BWPswitchDelay}$ on the cell where DCI-based BWP switch occurs. The wireless device may not follow the requirements (e.g., BWP switch delay requirements). The wireless device may not follow the requirements (e.g., BWP switch delay requirements), for example, if performing a DCI-based BWP switch between the BWPs in disjoint channel bandwidths or in partially overlapping channel bandwidths.

The wireless device may start BWP switch at DL slot n. The wireless device may start BWP switch at DL slot n, for example, for timer-based BWP switch. The wireless device may start BWP switch at DL slot n, for example, where n is the beginning of a DL subframe (FR1) or DL half-subframe (FR2). The wireless device may start BWP switch at DL slot n, for example, based on the expiry of a BWP-inactivity timer (e.g., bwp-InactivityTimer) via a serving cell. The wireless device may receive PDSCH (for DL active BWP switch) or may send (e.g., transmit) PUSCH (for UL active BWP switch) on the new BWP on the serving cell on which BWP switch on the first DL or UL slot occurs. The wireless device may receive PDSCH (for DL active BWP switch) or may send (e.g., transmit) PUSCH (for UL active BWP switch) on the new BWP on the serving cell on which BWP switch on the first DL or UL slot occurs, for example, based on the beginning of DL slot n+$T_{BWPswitchDelay}$.

The wireless device may not send (e.g., may not transmit) UL signals or receive DL signals. The wireless device may not send (e.g., may not transmit) UL signals or receive DL signals, for example, based on the expiry of the bwp-InactivityTimer on the cell where timer-based BWP switch occurs.

The wireless device may finish BWP switch within the time duration $T_{BWPswitchDelay}$. The wireless device may finish BWP switch within the time duration $T_{BWPswitchDelay}$, for example, based on capability of the wireless device bwp-SwitchingDelay. The time duration $T_{BWPswitchDelay}$ may be based on capability of the wireless device, numerology, and/or slot length. A wireless device which supports type 1 BWP switch delay may support 1 slot, 2 slots, 3 slots, and 6 slots BWP switch delay for 15 kHz, 30 kHz, 60 khz, and 120 kHz, respectively. A wireless device which supports type 2 BWP switch delay may support 3 slots, 5 slots, 9 slots, and 18 slots BWP switch delay for 15 kHz, 30 kHz, 60 khz, and 120 kHz, respectively.

The wireless device may use old TCI-states. The wireless device may use old TCI-states, for example, if a wireless device does not have required TCI-state information to receive PDCCH and PDSCH transmissions in a new BWP. The wireless device may use old TCI-states, for example, before the BWP switch. The wireless device may use old TCI-states, for example, until a new MAC CE updating the required TCI-state information for PDCCH and PDSCH transmissions is received after the BWP switch.

The wireless device may receive PDCCH and PDSCH transmissions with old TCI-states. The wireless device may receive PDCCH and PDSCH transmissions with old TCI-states, for example, if a wireless device has the information on the required TCI-state information to receive PDCCH and PDSCH transmissions in the new BWP. The wireless device may receive PDCCH and PDSCH transmissions with old TCI-states, for example, before TCI switching delay and new TCI-states after TCI switching delay.

A wireless device may use active BWP switch delay requirements for RRC-based BWP switch delay. The wireless device may receive PDSCH/PDCCH transmission (for DL active BWP switch) or send (e.g., transmit) PUSCH (for UL active BWP switch) on the new BWP on the serving cell on which BWP switch occurs on the first DL or UL slot. The wireless device may receive PDSCH/PDCCH transmission (for DL active BWP switch) or send (e.g., transmit) PUSCH (for UL active BWP switch) on the new BWP on the serving cell on which BWP switch occurs on the first DL or UL slot, for example, for RRC-based BWP switch. The wireless device may receive PDSCH/PDCCH transmission (for DL active BWP switch) or send (e.g., transmit) PUSCH (for UL active BWP switch) on the new BWP on the serving cell on which BWP switch occurs on the first DL or UL slot, for example, based on the wireless device receiving RRC reconfiguration involving active BWP switching or parameter change of its active BWP. The wireless device may receive PDSCH/PDCCH transmission (for DL active BWP switch) or send (e.g., transmit) PUSCH (for UL active BWP switch) on the new BWP on the serving cell on which BWP switch occurs on the first DL or UL slot, for example, based on the beginning of DL slot $$DL\ slot\ n + \frac{T_{RRCprocessingDelay} + T_{BWPswitchDelayRRC}}{NR\ Slot\ length},$$

where DL slot n is the last slot comprising the RRC command, $T_{RRCprocessingDelay}$ is the length of the RRC procedure delay in milliseconds, and $T_{BWPswitchDelayRRC}=6$ MS is the time used by the wireless device to perform BWP switch. The wireless device may not send (e.g., transmit) UL signals or receive DL signals for the time defined by $T_{RRCprocessingDelay}+T_{BWPswitchDelayRRC}$ on the cell where RRC-based BWP switch occurs.

The wireless device may be configured with one or more SRS resource sets. The wireless device may be configured with one or more SRS resource sets, for example, as configured by the higher layer parameter SRS-ResourceSet. A wireless device may be configured with SRS resources (e.g., by the higher layer parameter SRS-Resource). A wireless device may be configured with SRS resources (e.g., by the higher layer parameter SRS-Resource), for example, for each SRS resource set. A wireless device may be configured with SRS resources (e.g., by the higher layer parameter SRS-Resource), for example, where the maximum value of K may be indicated by SRS_capability. The SRS resource set applicability may be configured by the higher layer parameter usage in SRS-ResourceSet. One SRS resource in each of multiple SRS sets may be sent (e.g., transmitted) at a given time (e.g., at a given time instant). One SRS resource in each of multiple SRS sets may be sent (e.g., transmitted) at a given time instant, for example, if the higher layer parameter usage is set to 'BeamManagement' or another indication. The SRS resources in different SRS resource sets with the same time domain behavior in the same BWP may be sent (e.g., transmitted) simultaneously. The SRS resources in different SRS resource sets with the same time domain behavior in the same BWP may be sent (e.g., transmitted) simultaneously, for example, if the higher layer parameter usage is set to 'BeamManagement' or another indication.

At least one state of the DCI field may be used to select at least one out of the configured SRS resource set(s). At least one state of the DCI field may be used to select at least one out of the configured SRS resource set(s), for example, for aperiodic SRS.

The SRS parameters may be configured (e.g., semi-statically configured) by an SRS parameter (e.g., SRS-Resource). A parameter (e.g., srs-ResourceId) may determine SRS resource configuration identity. A number/quantity of SRS ports may be defined by a parameter (e.g., nrofSRS-Ports). A time domain behavior of SRS resource configuration may be indicated by the higher layer parameter resourceType, which may be for periodic, semi-persistent, and/or aperiodic SRS transmission. A slot level periodicity and a slot level offset may be defined by the higher layer parameters periodicityAndOffset-p or periodicityAndOffset-sp for an SRS resource of type periodic or semi-persistent. The wireless device may not expect to be configured with SRS resources in the same SRS resource set (e.g., SRS-ResourceSet) with different slot level periodicities. A slot level offset may be defined by the higher layer parameter slotOffset. A slot level offset may be defined by the higher layer parameter slotOffset, for example, for an SRS-ResourceSet configured with higher layer parameter resourceType set to 'aperiodic'. A number of OFDM symbols in the SRS resource and starting OFDM symbol of the SRS resource within a slot including repetition factor R may be defined by the higher layer parameter resourceMapping. SRS bandwidth $B_{SRS}$ and $C_{SRS}$, may be defined by the higher layer parameter freqHopping. A frequency hopping bandwidth, $b_{hop}$, may be defined by the higher layer parameter freqHopping. Defining frequency domain position and configurable shift may be defined by the higher layer parameters freqDomainPosition and freqDomainShift, respectively. Cyclic shift may be defined by the higher layer parameter cyclicShift-n2 or cyclicShift-n4 for transmission comb value 2 and 4, respectively. A transmission comb value may be defined by the higher layer parameter transmissionComb. A transmission comb offset may be defined by the higher layer parameter combOffset-n2 or combOffset-n4 for transmission comb value 2 or 4, respectively. An SRS sequence ID may be defined by the higher layer parameter sequenceId. The configuration of the spatial relation between a reference RS and the target SRS, defined by the higher layer parameter spatialRelationInfo, may comprise the ID of the reference RS. The configuration of the spatial relation between a reference RS and the target SRS, defined by the higher layer parameter spatialRelationInfo, may comprise the ID of the reference RS, for example, if configured. The reference RS may be an SSB, a CSI-RS configured on the serving cell indicated by higher layer parameter servingCellId (if present), a CSI-RS configured on the same serving cell as the target SRS, an SRS configured on UL BWP indicated by the higher layer parameter uplinkBWP, an SRS configured on the serving cell indicated by the higher layer parameter servingCellId (if present), and/or an SRS configured on the same serving cell as the target SRS.

The wireless device may be configured by a parameter associated with resource mapping (e.g., resourceMapping). The wireless device may be configured by the higher layer parameter resourceMapping, for example, in SRS-Resource with an SRS resource occupying $N_S \in \{1,2,4\}$ adjacent symbols within the last 6 symbols of the slot. The wireless device may be configured by the higher layer parameter resourceMapping, for example, where all antenna ports of the SRS resources are mapped to each symbol of the resource.

The wireless device may be configured to send (e.g., transmit) an SRS. The wireless device may be configured to send (e.g., transmit) an SRS, for example, if PUSCH and SRS transmissions are sent (e.g., transmitted) in the same slot. The wireless device may be configured to send (e.g., transmit) an SRS, for example, based on the transmission of the PUSCH and the corresponding DM-RS.

A wireless device may send (e.g., transmit) a signal (e.g., an SRS) and/or message using the target SRS resource with the same spatial domain transmission filter used for the reception of the downlink reference signal (e.g., SSB and/or CSI-RS). The wireless device may send (e.g., transmit) a signal (e.g., an SRS) and/or message using the target SRS resource with the same spatial domain transmission filter used for the reception of the downlink reference signal (e.g., SSB and/or CSI-RS), for example, if the higher layer parameter resourceType in SRS-Resource is set to 'periodic'. The wireless device may send (e.g., transmit) a signal (e.g., an SRS) and/or message using the target SRS resource with the same spatial domain transmission filter used for the reception of the reference SSB, for example, if the wireless device is configured with the higher layer parameter spatialRelationInfo comprising the ID of a reference 'ssb-Index'. The reference 'ssb-Index' may indicate the reference SSB. The wireless device may send (e.g., transmit) a signal (e.g., an SRS) and/or message using the target SRS resource with the same spatial domain transmission filter used for the reception of the reference CSI-RS, for example, if the higher layer parameter spatialRelationInfo comprises the ID of a reference 'csi-RS-Index'. The reference 'csi-RS-Index' may indicate the reference CSI-RS. The wireless device may send (e.g., transmit) a signal (e.g., an SRS) and/or message using the target SRS resource with the same spatial domain transmission filter used for the reception of the reference periodic CSI-RS or of the reference semi-persistent CSI-RS. The wireless device may send (e.g., transmit) a signal (e.g., an SRS) and/or message using the target SRS resource with the same spatial domain transmission filter used for the transmission of the reference periodic SRS. The wireless device may send (e.g., transmit) a signal (e.g., an SRS) and/or message using the target SRS resource with the same spatial domain transmission filter used for the transmission of the reference signal (e.g., periodic SRS), for example, if the higher layer parameter spatialRelationInfo comprises the ID of a reference 'srs'. The ID of a reference 'srs' may indicate the reference signal (e.g., periodic SRS).

SRS transmission may be based on an SRS resource set. For example, a wireless device may determine (e.g., indicate) an SRS transmission corresponding to a configured SRS resource set starting from slot $n+3N_{slot}^{subframe,\mu}+1$. The wireless device may determine an SRS transmission corresponding to a configured SRS resource set from slot $n+3N_{slot}^{subframe,\mu}+1$, for example, based on one or more conditions such as: if the wireless device is configured with one or more SRS resource configuration(s); if a parameter (e.g., resourceType) in an SRS-Resource is set to 'semi-persistent' or another indication; if the wireless device receives an activation command for an SRS resource; and/or if a HARQ-ACK corresponding to the PDSCH transmission carrying the selection command is sent (e.g., transmitted) in a slot (e.g., in slot n). The activation command may comprise spatial relation determinations indicated/provided by a list of references to reference signal IDs. The activation command may comprise spatial relation determination(s) indicated/provided by a list of references to reference signal IDs, for example, with one per element of the activated SRS resource set. Each ID in the list may refer to a reference SSB, an NZP CSI-RS resource configured on serving cell indicated by Resource Serving Cell ID field in the activation command (if present), an NZP CSI-RS resource configured on same serving cell as the SRS resource set, an SRS resource configured on the serving cell and uplink BWP indicated by Resource Serving Cell ID field and Resource BWP ID field in the activation command (if present), and/or an SRS resource configured on same serving cell and BWP as the SRS resource set. The wireless device may assume that the ID of the reference signal in the activation command overrides the ID configured in spatialRelationInfo. The wireless device may assume that the ID of the reference signal in the activation command overrides the ID configured in spatialRelationInfo, for example, if an SRS resource in the activated resource set is configured with the higher layer parameter spatialRelationInfo. The wireless device may assume that the ID of the reference signal in the activation command overrides the ID configured in spatialRelationInfo, for example, if an SRS resource in the activated resource set is configured with the higher layer parameter spatialRelationInfo. The corresponding actions and wireless device's determination on cessation of SRS transmission corresponding to the deactivated SRS resource set may be used starting from $n+3N_{slot}^{subframe,\mu}+1$. The corresponding actions and wireless device's determination on cessation of SRS transmission corresponding to the deactivated SRS resource set may be used starting from slot $n+3N_{slot}^{subframe,\mu}+1$, for example, if the wireless device receives a deactivation command for an activated SRS resource set. The corresponding actions and wireless device's determination on cessation of SRS transmission corresponding to the deactivated SRS resource set may be used starting from slot $n+3N_{slot}^{subframe,\mu}+1$, for example, if the HARQ-ACK corresponding to the PDSCH carrying the selection command is sent (e.g., transmitted) in slot n. The wireless device may send (e.g., transmit) the target SRS resource with the same spatial domain transmission filter used for the reception of the reference SSB. The wireless device may send (e.g., transmit) the target SRS resource with the same spatial domain transmission filter used for the reception of the reference SSB, for example, if the wireless device is configured with the higher layer parameter spatialRelationInfo comprising the ID of a reference 'ssb-Index'. The wireless device may send (e.g., transmit) the target SRS resource with the same spatial domain transmission filter used for the reception of the reference periodic CSI-RS or of the reference semi-persistent CSI-RS. The wireless device may send (e.g., transmit) the target SRS resource with the same spatial domain transmission filter used for the reception of the reference periodic CSI-RS or of the reference semi-persistent CSI-RS, for example, if the higher layer parameter spatialRelationInfo comprises the ID of a reference 'csi-RS-Index'. The wireless device may send (e.g., transmit) the target SRS resource with the same spatial domain transmission filter used for the transmission of the reference periodic SRS or of the reference semi-persistent SRS. The wireless device may send (e.g., transmit) the target SRS resource with the same spatial domain transmission filter used for the transmission of the reference periodic SRS or of the reference semi-persistent SRS, for example, if the higher layer parameter spatialRelationInfo comprises the ID of a reference 'srs'.

The wireless device may not be configured (and/or may not be expected to be configured) with different time domain behavior for SRS resources in the same SRS resource set. The wireless device may not be configured (and/or may not be expected to be configured) with different time domain behavior between SRS resource and associated SRS resources set.

An SRS request field (e.g., a 2-bit SRS request field, or any other quantity of bits) in DCI (e.g., in DCI format 0_1, 1_1) may indicate the triggered SRS resource set. Bit values of the SRS request field and their associated (or corresponding) SRS resource set may be predefined and/or semi-statistically configured. The SRS request field in a DCI format (e.g., DCI format 2_3) may indicate the triggered SRS resource set. An SRS request field in DCI may indicate the triggered SRS resource set, for example, if the wireless device is configured with higher layer parameter srs-TPC-PDCCH-Group set to 'typeB' or another indication. An SRS request field in DCI (e.g., in DCI format 2_3) may indicate the SRS transmission via a set of serving cells configured by higher layers (e.g., RRC). The SRS request field in DCI (e.g., in DCI format 2_3) may indicate the SRS transmission via a set of serving cells configured by higher layers (e.g., RRC), for example, if the wireless device is configured with higher layer parameter srs-TPC-PDCCH-Group set to 'typeA' or another indication.

A wireless device may not send (e.g., transmit) SRS. A wireless device may not send (e.g., transmit) SRS, for example, for PUCCH and SRS on the same carrier. A wireless device may not send (e.g., transmit) SRS, for example, if semi-persistent and periodic SRS are configured in the same symbol(s) with PUCCH carrying only CSI report(s) or only L1-RSRP report(s). A wireless device may not send (e.g., transmit) SRS, for example, if semi-persistent or periodic SRS is configured or aperiodic SRS is triggered to be sent (e.g., transmitted) in the same symbol(s) with PUCCH carrying HARQ-ACK and/or SR. The SRS symbol(s) that overlap with PUCCH symbol(s) may be dropped. The SRS symbol(s) that overlap with PUCCH symbol(s) may be dropped, for example, if SRS is not sent (e.g., transmitted) due to overlap with PUCCH. PUCCH may not be sent (e.g., transmitted). PUCCH may not be sent (e.g., transmitted), for example, if aperiodic SRS is triggered to be sent (e.g., transmitted) to overlap in the same symbol with PUCCH carrying semi-persistent/periodic CSI report(s) or semi-persistent/periodic L1-RSRP report(s) only.

A wireless device may not be configured (and/or may not be expected to be configured) with SRS. A wireless device may not be configured (and/or may not be expected to be configured) with SRS, for example, from a carrier and PUSCH/UL DM-RS/UL PT-RS/PUCCH formats from a different carrier in the same symbol. A wireless device may not be configured (and/or may not be expected to be configured) with SRS from a carrier and PUSCH/UL DM-RS/UL PT-RS/PUCCH formats from a different carrier in the same symbol, for example, for intra-band CA or in inter-band CA band-band combination where simultaneous SRS and PUCCH/PUSCH transmissions are not allowed.

A wireless device may not send (e.g., transmit) simultaneously SRS resource(s) from a carrier and PRACH from a different carrier. A wireless device may not send (e.g., transmit) simultaneously SRS resource(s) from a carrier and PRACH from a different carrier, for example, for intra-band CA or in inter-band CA band-band combination where simultaneous SRS and PRACH transmissions are not allowed.

The wireless device may send (e.g., transmit) the aperiodic SRS resource and not send (e.g., transmit) the periodic/semi-persistent SRS resource(s) overlapping within the symbol(s). The wireless device may send (e.g., transmit) the aperiodic SRS resource and not send (e.g., transmit) the periodic/semi-persistent SRS resource(s) overlapping within the symbol(s), for example, if an SRS resource with SRS-resourceType set as 'aperiodic' is triggered on the OFDM symbol configured with periodic/semi-persistent SRS transmission. The wireless device may send (e.g., transmit) the semi-persistent SRS resource and not send (e.g., transmit) the periodic SRS resource(s) overlapping within the symbol(s). The wireless device may send (e.g., transmit) the semi-persistent SRS resource and not send (e.g., transmit) the periodic SRS resource(s) overlapping within the symbol(s), for example, if an SRS resource with SRS-resourceType set as 'semi-persistent' is triggered on the OFDM symbol configured with periodic SRS transmission.

The wireless device may use the same priority rules as described above for the guard period. The wireless device may use the same priority rules as described above for the guard period, for example, if the wireless device is configured with the higher layer parameter usage in SRS-ResourceSet set to 'antennaSwitching,' and a guard period of Y symbols is configured. The wireless device may use the same priority rules as described above for the guard period, for example, as if SRS was configured.

Figure 18:
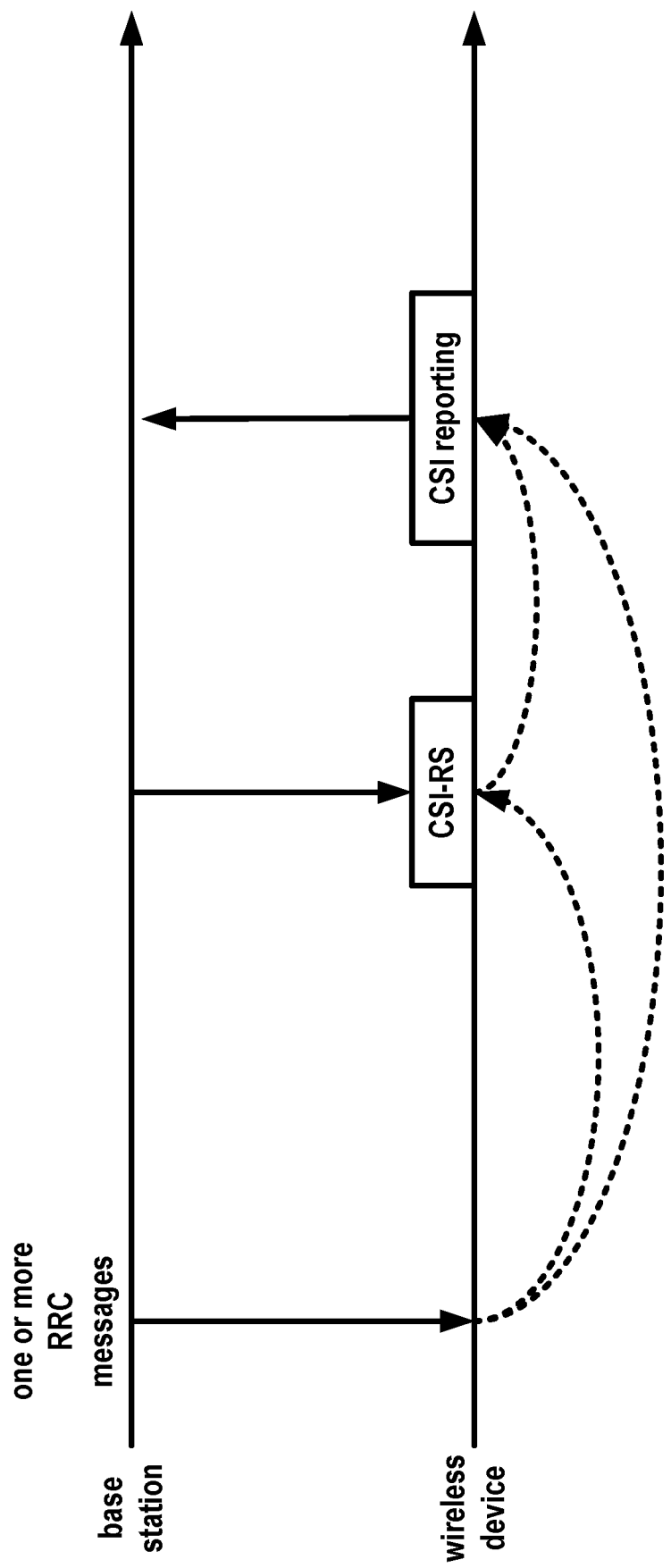
FIG. 18 shows an example of channel state information reference signal (CSI-RS) transmission and channel state information (CSI) reporting.

FIG. 18 shows an example of CSI-RS transmission and CSI reporting. A base station may send (e.g., transmit) one or more RRC messages indicating one or more CSI-RS configurations. The base station may send (e.g., transmit) one or more RRC messages indicating one or more CSI reporting configurations. The base station may send (e.g., transmit) one or more RRC messages indicating one or more CSI reporting configurations, for example, based on the one or more CSI-RS configurations. The wireless device may receive and measure CSI-RS from the base station. The wireless device may receive and measure CSI-RS from the base station, for example, based on the one or more RRC messages. The wireless device may process and generate information for CSI reporting. The wireless device may process and generate information for CSI reporting, for example, based on the RRC messages and the CSI-RS. The wireless device may send (e.g., transmit) CSI reporting. The wireless device may send (e.g., transmit) CSI reporting, for example, based on the information. The wireless device may send (e.g., transmit) CSI reporting via PUCCH. The wireless device may send (e.g., transmit) CSI reporting via PUCCH, for example, for periodic CSI reporting. The wireless device may send (e.g., transmit) CSI reporting via PUCCH or PUSCH. The wireless device may send (e.g., transmit) CSI reporting via PUCCH or PUSCH, for example, for semi-persistent CSI reporting. The base station may send (e.g., transmit) one or more MAC CE messages to activate or deactivate semi-persistent CSI reporting and CSI-RS transmission. The base station may send (e.g., transmit) one or more MAC CE message to activate or deactivate semi-persistent CSI reporting and CSI-RS transmission, for example, for semi-persistent CSI reporting and CSI-RS transmission.

Figure 19:
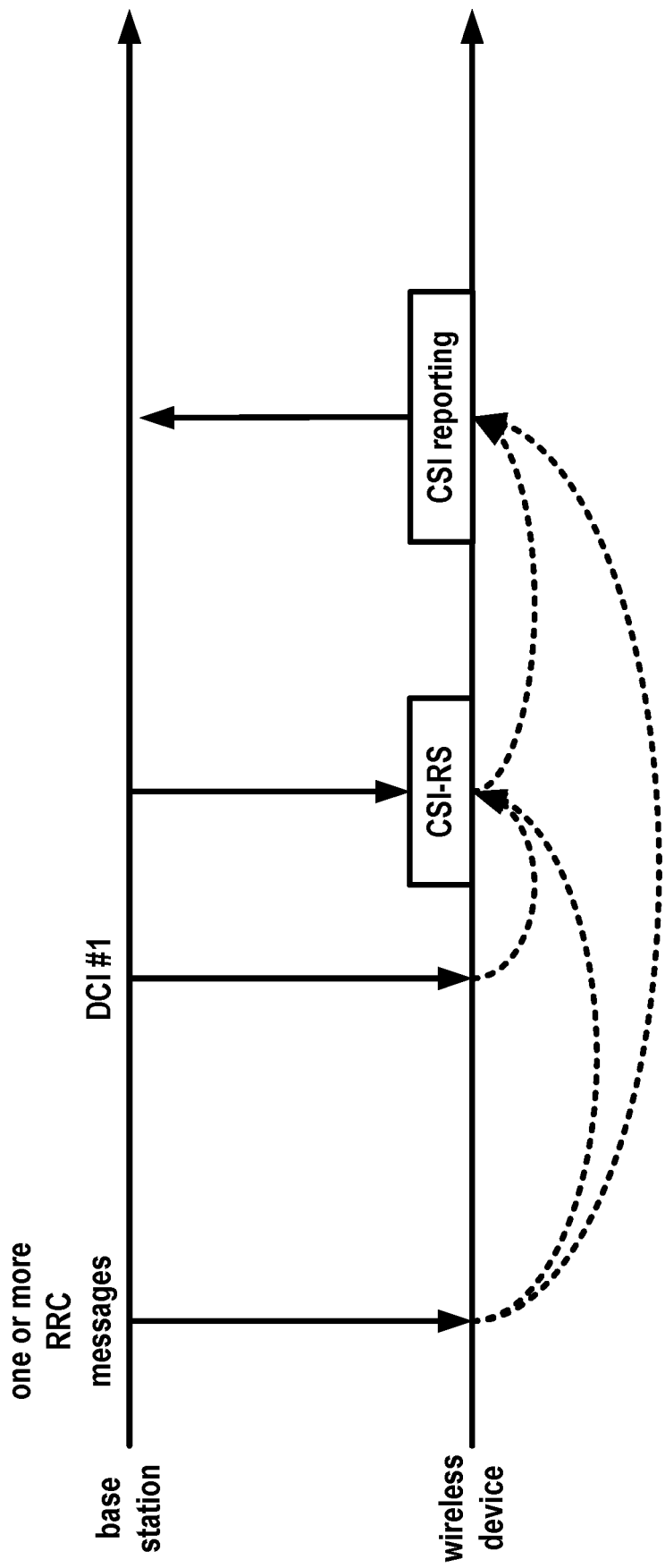
FIG. 19 shows an example of CSI-RS transmission and CSI reporting.

FIG. 19 shows an example of channel state information reference signal (CSI-RS) transmission and CSI reporting. A base station may send (e.g., transmit) one or more RRC messages indicating one or more CSI-RS configurations. The base station may send (e.g., transmit) one or more RRC messages indicating one or more CSI reporting configurations. The base station may send (e.g., transmit) one or more RRC messages indicating one or more CSI reporting configurations, for example, based on the one or more CSI-RS configurations. The base station may send (e.g., transmit) DCI to trigger aperiodic CSI-RS transmission and/or aperiodic CSI reporting. The base station may send (e.g., transmit) DCI to trigger aperiodic CSI-RS transmission and/or aperiodic CSI reporting, for example, based on the one or more RRC messages. The wireless device may receive and measure CSI-RS from the base station. The wireless device may receive and measure CSI-RS from the base station, for example, based on the one or more RRC messages and the DCI. The wireless device may process and generate information for CSI reporting. The wireless device may process and generate information for CSI reporting, for example, based on the RRC messages and the CSI-RS. The wireless device may send (e.g., transmit) CSI reporting via PUSCH. The wireless device may send (e.g., transmit) CSI reporting via PUSCH, for example, based on the information.

A wireless device may use CSI-RS for at least one of: time/frequency tracking, CSI computation, L1-RSRP computation and mobility. A base station may configure a wireless device to monitor a CORESET on one or more symbols. A CSI-RS resource may be associated with a NZP-CSI-RS-ResourceSet. A higher layer parameter repetition of the NZP-CSI-RS-ResourceSet may be set to 'on'. The wireless device may not expect to be configured with a CSI-RS of the CSI-RS resource over the one or more symbols. The wireless device may not expect to be configured with a CSI-RS of the CSI-RS resource over the one or more symbols, for example, based on the CSI-RS resource being associated with the NZP-CSI-RS-ResourceSet with the higher layer parameter repetition set to 'on'.

A higher layer parameter repetition of the NZP-CSI-RS-ResourceSet may not be set to 'on'. A base station may configure a CSI-RS resource and one or more search space sets associated with a CORESET in the same one or more symbols (e.g., OFDM symbols). The wireless device may assume that a CSI-RS of the CSI-RS resource and one or more DM-RS ports of a PDCCH are quasi co-located with 'QCL-TypeD'. The wireless device may assume that a CSI-RS of the CSI-RS resource and one or more DM-RS ports of a PDCCH are quasi co-located with 'QCL-TypeD', for example, based on the higher layer parameter repetition of the NZP-CSI-RS-ResourceSet not being set to 'on' and the CSI-RS resource and the one or more search space sets associated with the CORESET being configured in the same one or more symbols. The base station may send (e.g., transmit) the PDCCH in the one or more search space sets associated with the CORESET.

A higher layer parameter repetition of the NZP-CSI-RS-ResourceSet may not be set to 'on'. A base station may configure a CSI-RS resource of a first cell and one or more search space sets associated with a CORESET of a second cell in the same one or more symbols (e.g., OFDM symbols). The wireless device may assume that a CSI-RS of the CSI-RS resource and one or more DM-RS ports of a PDCCH are quasi co-located with 'QCL-TypeD'. The wireless device may assume that a CSI-RS of the CSI-RS resource and one or more DM-RS ports of a PDCCH are quasi co-located with 'QCL-TypeD', for example, based on the higher layer parameter repetition of the NZP-CSI-RS-ResourceSet not being set to 'on' and the CSI-RS resource and the one or more search space sets associated with the CORESET being configured in the same one or more symbols. The base station may send (e.g., transmit) the PDCCH in the one or more search space sets associated with the CORESET. The first cell and the second cell may be in different intra-band component carriers.

A base station may configure a wireless device with a CSI-RS in a first set of PRBs. The base station may configure the wireless device with one or more search space sets associated with a CORESET in one or more symbols (e.g., OFDM symbols) and in a second set of PRBs. The wireless device may not expect the first set of PRBs and the second set of PRBs to overlap in the one or more symbols.

A base station may configure a wireless device with a CSI-RS resource and an SSB in the same one or more (OFDM) symbols. The wireless device may assume that the CSI-RS resource and the SSB are quasi co-located with a QCL type (e.g., 'QCL-TypeD'). The wireless device may assume that the CSI-RS resource and the SSB are quasi co-located with a QCL type (e.g., 'QCL-TypeD'), for example, based on the CSI-RS resource and the SSB being configured in the same one or more (OFDM) symbols.

A base station may configure the CSI-RS resource in a first set of PRBs for the wireless device. The base station may configure the SSB in a second set of PRBs for the wireless device. The wireless device may not expect the first set of PRBs to overlap with the second set of PRBs.

A base station may configure the CSI-RS resource with a first SCS for the wireless device. The base station may configure the SSB with a second SCS for the wireless device. The wireless device may expect the first SCS and the second SCS to be the same.

A base station may configure a wireless device with a NZP-CSI-RS-ResourceSet. The NZP-CSI-RS-ResourceSet may be configured with a higher layer parameter repetition set to 'on'. The wireless device may assume that the base station sends (e.g., transmits) one or more CSI-RS resources. The wireless device may assume that the base station sends (e.g., transmits) one or more CSI-RS resources, for example, within the NZP-CSI-RS-ResourceSet with the same downlink spatial domain transmission filter. The wireless device may assume that the base station sends (e.g., transmits) one or more CSI-RS resources, for example, based on the NZP-CSI-RS-ResourceSet being configured with the higher layer parameter repetition set to 'on'. The base station may send (e.g., transmit) each CSI-RS resource of the one or more CSI-RS resources in different symbols (e.g., OFDM symbols).

The NZP-CSI-RS-ResourceSet may be configured with a higher layer parameter repetition set to 'off'. The wireless device may not assume that the base station sends (e.g., transmits) one or more CSI-RS resources. The wireless device may not assume that the base station sends (e.g., transmits) one or more CSI-RS resources, for example, within the NZP-CSI-RS-ResourceSet with the same downlink spatial domain transmission filter. The wireless device may not assume that the base station sends (e.g., transmits) one or more CSI-RS resources, for example, based on the NZP-CSI-RS-ResourceSet being configured with the higher layer parameter repetition set to 'off'.

A base station may configure a wireless device with a higher layer parameter groupBasedBeamReporting. The base station may set the higher layer parameter groupBasedBeamReporting to "enabled". The wireless device may report at least two different resource indicators (e.g., CRI, SSBRI) in a single reporting instance for a reporting setting of one or more report settings. The wireless device may report at least two different resource indicators (e.g., CRI, SSBRI) in a single reporting instance for a reporting setting of one or more report settings, for example, based on the higher layer parameter groupBasedBeamReporting set to "enabled". The wireless device may receive at least two RSs (e.g., CSI-RS, SSB) indicated by the at least two different resource indicators simultaneously. The wireless device may receive the at least two RSs simultaneously with a single spatial domain receive filter. The wireless device may receive the at least two RSs simultaneously with a plurality of simultaneous spatial domain receive filters.

A base station may need (additional) one or more wireless device radio access capability information of a wireless device. The base station may initiate a procedure to request the one or more wireless device radio access capability information (e.g., by an information element UECapabilityEnquiry) from the wireless device. The base station may initiate a procedure to request the one or more wireless device radio access capability information (e.g., by an information element UECapabilityEnquiry) from the wireless device, for example, based on needing the one or more wireless device radio access capability information. The wireless device may use an information element (e.g., UECapabilityInformation message) to transfer one or more wireless device radio access capability information requested by the base station. The wireless device may indicate/provide a threshold (e.g., timeDurationForQCL) in FeatureSetDownlink indicating a set of features that the wireless device supports.

A threshold may comprise a minimum number of OFDM symbols required by the wireless device to perform a PDCCH reception with DCI. The threshold may comprise a minimum number of OFDM symbols required by the wireless device to use a spatial QCL information (e.g., TCI-State) received in (or indicated by) the DCI for a processing of a PDSCH scheduled by the DCI. The wireless device may require the minimum number of OFDM symbols between the PDCCH reception and the processing of the PDSCH to use the spatial QCL information, indicated by the DCI, for the PDSCH.

Time and frequency resources that may be used by a wireless device to report CSI may be controlled by a base station. CSI may comprise CQI, PMI, CSI-RS resource indicator (CRI), SS/PBCH Block Resource indicator (SSBRI), layer indicator (LI), rank indicator (RI) and/or L1-RSRP.

A wireless device may be configured by higher layers (e.g., RRC) with N (e.g., N≥1) CSI-ReportConfig Reporting Settings, M (e.g., M≥1) CSI-ResourceConfig Resource Settings, and one or two list(s) of trigger states (given by the higher layer parameters CSI-AperiodicTriggerStateList and CSI-SemiPersistentOnPUSCH-TriggerStateList). A wireless device may be configured by higher layers (e.g., RRC) with N (e.g., N≥1) CSI-ReportConfig Reporting Settings, M (e.g., M≥1) CSI-ResourceConfig Resource Settings, and one or two list(s) of trigger states (given by the higher layer parameters CSI-AperiodicTriggerStateList and CSI-SemiPersistentOnPUSCH-TriggerStateList), for example, for CQI, PMI, CRI, SSBRI, LI, RI, and L1-RSRP. Each trigger state in CSI-AperiodicTriggerStateList may comprise a list of associated CSI-ReportConfigs indicating the Resource Set IDs for channel and optionally for interference. Each trigger state in CSI-SemiPersistentOnPUSCH-TriggerStateList may comprise one associated CSI-ReportConfig.

Each Reporting Setting CSI-ReportConfig may be associated with a single DL BWP (indicated by higher layer parameter BWP-Id) given in the associated CSI-ResourceConfig for channel measurement. Each Reporting Setting CSI-ReportConfig may comprise the parameter(s) for one CSI reporting band: codebook configuration including codebook subset restriction, time-domain behavior, frequency granularity for CQI and PMI, measurement restriction configurations, and the CSI-related quantities to be reported by the wireless device. The CSI-related quantities to be reported by the wireless device may include the layer indicator (LI), L1-RSRP, CRI, and/or SSBRI.

The time domain behavior of the CSI-ReportConfig may be indicated by the higher layer parameter reportConfigType. The time domain behavior of the CSI-ReportConfig may be set to 'aperiodic', 'semiPersistentOnPUCCH', 'semiPersistentOnPUSCH', or 'periodic'. The configured periodicity and slot offset may be used in the numerology of the UL BWP. The configured periodicity and slot offset may be used in the numerology of the UL BWP, for example, for periodic and semiPersistentOnPUCCH/semiPersistentOn-PUSCH CSI reporting. The configured periodicity and slot offset may be used in the numerology of the UL BWP, for example, in which the CSI report is configured to be sent (e.g., transmitted). The higher layer parameter reportQuantity may indicate the CSI-related or L1-RSRP-related quantities to report. The reportFreqConfiguration may indicate the reporting granularity in the frequency domain. The reportFreqConfiguration may indicate the reporting granularity in the frequency domain, for example, including the CSI reporting band and if PMI/CQI reporting is wideband or sub-band. The timeRestrictionForChannelMeasurements parameter in CSI-ReportConfig may be configured to enable time domain restriction for channel measurements. The timeRestrictionForInterferenceMeasurements parameter may be configured to enable time domain restriction for interference measurements. The CSI-ReportConfig may comprise CodebookConfig. CodebookConfig may comprise configuration parameters for Type-I or Type II CSI, including codebook subset restriction and configurations of group-based reporting.

Each CSI resource setting CSI-ResourceConfig may comprise a configuration of a list of S≥1 CSI Resource Sets (given by higher layer parameter csi-RS-ResourceSetList). The list of S≥1 CSI Resource Sets may be comprised of references to either or both of NZP CSI-RS resource set(s) and SSB set(s). The list of S≥1 CSI Resource Sets may be comprised of references to Channel State Information-Interference Measurement (CSI-IM) resource set(s). Each CSI resource setting may be located in the DL BWP identified by the higher layer parameter BWP-id. All CSI resource settings linked to a CSI Report Setting may have the same DL BWP.

The time domain behavior of the CSI-RS resources within a CSI resource setting may be indicated by a parameter (e.g., the higher layer parameter resourceType). The time domain behavior of the CSI-RS resources within a CSI resource setting may be set to aperiodic, periodic, or semi-persistent. The number of CSI-RS Resource Sets configured may be limited to S=1. The number of CSI-RS Resource Sets configured may be limited to S=1, for example, for periodic and semi-persistent CSI resource settings. The configured periodicity and slot offset may be given in the numerology of its associated DL BWP. The configured periodicity and slot offset may be given in the numerology of its associated DL BWP, for example, for periodic and semi-persistent CSI resource settings. The configured periodicity and slot offset may be given in the numerology of its associated DL BWP, for example, as given by BWP-id. The same time domain behavior may be configured for the CSI-ResourceConfigs. The same time domain behavior may be configured for the CSI-ResourceConfigs, for example, if a wireless device is configured with multiple CSI-ResourceConfigs consisting of the same NZP CSI-RS resource ID. The same time-domain behavior may be configured for the CSI-ResourceConfigs, for example, if a wireless device is configured with multiple CSI-ResourceConfigs consisting of the same CSI-IM resource ID. All CSI resource settings linked to a CSI Report Setting may have the same time domain behavior.

The CSI-IM resource may be configured via higher layer signaling for one or more CSI resource settings for channel and interference measurement. The NZP CSI-RS resource may be configured via higher layer signaling for one or more CSI resource settings, for example, for channel measurement. The NZP CSI-RS resource for channel measurement may be configured via higher layer signaling for one or more CSI resource settings for example, for interference measurement.

The wireless device may determine that the NZP CSI-RS resource(s) for channel measurement and the CSI-IM resource(s) for interference measurement (e.g., configured for one CSI reporting) are resource-wise QCLed with respect to 'QCL-TypeD'. The wireless device may assume that the NZP CSI-RS resource for channel measurement and the CSI-IM resource and/or NZP CSI-RS resource(s) for interference measurement configured for one CSI reporting are QCLed with respect to 'QCL-TypeD'. The wireless device may assume that the NZP CSI-RS resource for channel measurement and the CSI-IM resource and/or NZP CSI-RS resource(s) for interference measurement configured for one CSI reporting are QCLed with respect to 'QCL-TypeD', for example, if NZP CSI-RS resource(s) is used for interference measurement.

The wireless device may calculate CSI parameters (if reported) assuming the dependencies between CSI parameters (if reported). LI may be calculated conditioned on the reported CQI, PMI, RI, and/or CRI. CQI may be calculated conditioned on the reported PMI, RI, and CRI. PMI may be calculated conditioned on the reported RI and/or CRI. RI may be calculated conditioned on the reported CRI.

The reporting configuration for CSI may be aperiodic (using PUSCH), periodic (using PUCCH) or semi-persistent (using PUCCH, and DCI activated PUSCH). The CSI-RS Resources may be periodic, semi-persistent, or aperiodic. Periodic, semi-persistent, or aperiodic CSI reporting may be supported. Periodic, semi-persistent, or aperiodic CSI reporting may be supported, for example, if periodic CSI-RS is configured. Semi-persistent or aperiodic CSI reporting may be supported. Semi-persistent or aperiodic CSI reporting may be supported, for example, if semi-persistent CSI-RS is configured. Periodic CSI reporting may not be supported. Periodic CSI reporting may not be supported, for example, if semi-persistent CSI-RS is configured. Aperiodic CSI reporting may be supported. Aperiodic CSI reporting may be supported, for example, if aperiodic CSI-RS is configured. Dynamic triggering/activation may not be supported. Dynamic triggering/activation may not be supported, for example, for periodic CSI reporting. The wireless device may receive an activation command. The wireless device may receive an activation command, for example, for semi-persistent CSI reporting on PUCCH. The wireless device may receive triggering on DCI. The wireless device may receive triggering on DCI, for example, for semi-persistent CSI reporting on PUSCH. Aperiodic CSI reporting may be triggered by DCI. Periodic CSI-RS may be configured by higher layers (e.g., RRC). Semi-persistent CSI-RS may be activated and deactivated by MAC CE. Aperiodic CSI-RS may be configured and triggered/activated with MAC CE and DCI.

The wireless device may determine a CRI from the supported set of CRI values. The wireless device may report the CRI in each CRI report. The wireless may determine a CRI from the supported set of CRI values and report the number in each CRI report, for example, if the wireless device is configured with higher layer parameter NZP-CSI-RS-ResourceSet and if the higher layer parameter repetition is set to 'off'. CRI may not be reported. CRI may not be reported, for example, if the higher layer parameter repetition is set to 'on'. CRI reporting may not be supported. CRI reporting may not be supported, for example, if the higher layer parameter codebookType is set to 'typeII' or to 'typeII-PortSelection'.

The periodicity (measured in slots) may be configured by a parameter (e.g., the higher layer parameter reportSlotConfig). The periodicity (measured in slots) may be configured by the higher layer parameter reportSlotConfig, for example, for a periodic or semi-persistent CSI report on PUCCH. The allowed slot offsets may be configured by the higher layer parameter reportSlotOffsetList. The allowed slot offsets may be configured by the higher layer parameter reportSlotOffsetList, for example, for a semi-persistent or aperiodic CSI report on PUSCH. The offset may be selected in the activating/triggering DCI.

A wireless device may be configured via higher layer signaling with one out of two possible subband sizes. A wireless device may be configured via higher layer signaling with one out of two possible subband sizes, for example, for CSI reporting. A wireless device may be configured via higher layer signaling with one out of two possible subband sizes, for example, where a subband is defined as $N_{PRB}^{SB}$ contiguous PRBs and depends on the total number of PRBs in the BWP.

The reportFreqConfiguration comprised in a CSI-ReportConfig may indicate the frequency granularity of the CSI Report. A CSI Reporting Setting configuration may define a CSI reporting band as a subset of subbands of the BWP. The reportFreqConfiguration may indicate the csi-ReportingBand, wideband CQI/subband CQI reporting, and/or wideband PMI/subband PMI reporting.

The csi-ReportingBand may indicate a contiguous or non-contiguous subset of subbands in the BWP. The csi-ReportingB and may indicate a contiguous or non-contiguous subset of subbands in the BWP, for example, for which CSI will be reported. A wireless device may not be configured (and/or may not be expected to be configured) with csi-ReportingBand which comprises a subband where a CSI-RS resource linked to the CSI Report setting has the frequency density of each CSI-RS port per PRB in the subband less than the configured density of the CSI-RS resource. A wireless device may not be configured (and/or may not be expected to be configured) with csi-ReportingB and which comprises a subband where not all PRBs in the subband have the CSI-IM REs present. A wireless device may not be configured (and/or may not be expected to be configured) with csi-ReportingB and which comprises a subband where not all PRBs in the subband have the CSI-IM REs present, for example, if a CSI-IM resource is linked to the CSI Report Setting.

Wideband CQI or subband CQI reporting may be indicated as configured by a parameter (e.g., the higher layer parameter cqi-FormatIndicator). A wideband CQI may be reported for each codeword for the entire CSI reporting band. A wideband CQI may be reported for each codeword for the entire CSI reporting band, for example, if wideband CQI reporting is configured. One CQI for each codeword may be reported for each subband in the CSI reporting band. One CQI for each codeword may be reported for each subband in the CSI reporting band, for example, if subband CQI reporting is configured.

Wideband PMI or subband PMI reporting may be indicated as configured by a parameter (e.g., the higher layer parameter pmi-FormatIndicator). A wideband PMI may be reported for the entire CSI reporting band. A wideband PMI may be reported for the entire CSI reporting band, for example, if wideband PMI reporting is configured. A single wideband indication (e.g., i1) may be reported for the entire CSI reporting band and one subband indication (e.g., i2) may be reported for each subband in the CSI reporting band. A single wideband indication (e.g., i1) may be reported for the entire CSI reporting band and one subband indication (e.g., i2) may be reported for each subband in the CSI reporting band, for example, if subband PMI reporting is configured with 2 antenna ports. A PMI may be reported for each subband in the CSI reporting band. A PMI may be reported for each subband in the CSI reporting band, for example, if subband PMIs are configured with 2 antenna ports.

A CSI Reporting Setting may have a wideband frequency-granularity. A CSI Reporting Setting may have a wideband frequency-granularity, for example, if reportQuantity is set to 'cri-RI-PMI-CQI' or 'cri-RI-LI-PMI-CQI'. A CSI Reporting Setting may have a wideband frequency-granularity, for example, if cqi-FormatIndicator indicates single CQI reporting and pmi-FormatIndicator indicates single PMI reporting. A CSI Reporting Setting may have a wideband frequency-granularity, for example, if reportQuantity is set to 'cri-RI-i1', 'cri-RI-CQI', or 'cri-RI-i1-CQI' and cqi-FormatIndicator indicates single CQI reporting. A CSI Reporting Setting may have a wideband frequency-granularity, for example, if reportQuantity is set to 'cri-RSRP' or 'ssb-Index-RSRP'. The CSI Reporting Setting may have a subband frequency-granularity.

A wireless device may report CSI. The wireless device may report CSI, for example, if both CSI-IM and NZP CSI-RS resources are configured as periodic or semi-persistent. The wireless device may report CSI if both CSI-IM and NZP CSI-RS resources are configured as periodic or semi-persistent, for example, if a wireless device is configured with semi-persistent CSI reporting. The wireless device may report CSI if both CSI-IM and NZP CSI-RS resources are configured as periodic, semi-persistent, or aperiodic. The wireless device may report CSI if both CSI-IM and NZP CSI-RS resources are configured as periodic, semi-persistent, or aperiodic, for example, if a wireless device is configured with aperiodic CSI reporting.

A wireless device configured with DCI (e.g., DCI 0_1) may not expect to be triggered with multiple CSI reports with the same configuration (e.g., CSI-ReportConfigId). Each trigger state configured using the higher layer parameter CSI-AperiodicTriggerState may be associated with one or multiple CSI-ReportConfig. Each trigger state configured using the higher layer parameter CSI-AperiodicTriggerState may be associated with one or multiple CSI-ReportConfig, for example, for aperiodic CSI. Each trigger state configured using the higher layer parameter CSI-AperiodicTriggerState may be associated with one or multiple CSI-ReportConfig, for example, where each CSI-ReportConfig is linked to periodic, or semi-persistent, or aperiodic resource setting(s).

A resource setting (given by higher layer parameter resourcesForChannelMeasurement) may be for channel measurement for L1-RSRP computation. The resource setting (given by higher layer parameter resourcesForChannelMeasurement) may be for channel measurement for L1-RSRP computation, for example, if one resource setting is configured. A first resource setting (given by higher layer parameter resourcesForChannelMeasurement) may be for channel measurement and a second resource setting (given by either higher layer parameter csi-IM-ResourcesForInterference or higher layer parameter nzp-CSI-RS-ResourcesForInterference) may be for interference measurement performed on CSI-IM or on NZP CSI-RS. The first resource setting (given by higher layer parameter resourcesForChannelMeasurement) may be for channel measurement and the second resource setting (given by either higher layer parameter csi-IM-ResourcesForInterference or higher layer parameter nzp-CSI-RS-ResourcesForInterference) may be for interference measurement performed on CSI-IM or on NZP CSI-RS, for example, if two resource settings are configured. A first resource setting (higher layer parameter resourcesForChannelMeasurement) may be for channel measurement, a second resource setting (given by higher layer parameter csi-IM-ResourcesForInterference) may be for CSI-IM-based interference measurement, and a third resource setting (given by higher layer parameter nzp-CSI-RS-ResourcesForInterference) may be for NZP CSI-RS-based interference measurement. The first resource setting (higher layer parameter resourcesForChannelMeasurement) may be for channel measurement, the second resource setting (given by higher layer parameter csi-IM-ResourcesForInterference) may be for CSI-IM-based interference measurement, and the third resource setting (given by higher layer parameter nzp-CSI-RS-ResourcesForInterference) may be for NZP CSI-RS-based interference measurement, for example, if three resource settings are configured.

A CSI report configuration (e.g., each CSI-ReportConfig) may be linked to periodic or semi-persistent resource setting(s). Each CSI-ReportConfig may be linked to periodic or semi-persistent resource setting(s), for example, for semi-persistent or periodic CSI. The resource setting may be for channel measurement for L1-RSRP computation. A resource setting may be for channel measurement for L1-RSRP computation, for example, if one resource setting (given by higher layer parameter resourcesForChannelMeasurement) is configured. A first resource setting (given by higher layer parameter resourcesForChannelMeasurement) may be for channel measurement and a second resource setting (given by higher layer parameter csi-IM-ResourcesForInterference) may be used for interference measurement performed on CSI-IM. The first resource setting (given by higher layer parameter resourcesForChannelMeasurement) may be for channel measurement and the second resource setting (given by higher layer parameter csi-IM-ResourcesForInterference) may be used for interference measurement performed on CSI-IM, for example, if two resource settings are configured. A wireless device may not be configured (and/or may not be expected to be configured) with more than one CSI-RS resource in a resource set for channel measurement for a CSI-ReportConfig with the higher layer parameter codebookType set to 'typeII' or to 'typeII-PortSelection'. A wireless device may not be configured (and/or may not be expected to be configured) with more than 64 NZP CSI-RS resources in resource setting for channel measurement for a CSI-ReportConfig with the higher layer parameter reportQuantity set to 'none', 'cri-RI-CQI', 'cri-RSRP' or 'ssb-Index-RSRP'. Each CSI-RS resource for channel measurement may be resource-wise associated with a CSI-IM resource. Each CSI-RS resource for channel measurement may be resource-wise associated with a CSI-IM resource, for example, if interference measurement is performed on CSI-IM. Each CSI-RS resource for channel measurement may be resource-wise associated with a CSI-IM resource, for example, by the ordering of the CSI-RS resource and CSI-IM resource in the corresponding resource sets. The number of CSI-RS resources for channel measurement may equal to the number of CSI-IM resources. A wireless device may not expect to be configured with more than one NZP CSI-RS resource in the associated resource set within the resource setting for channel measurement. A wireless device may not expect to be configured with more than one NZP CSI-RS resource in the associated resource set within the resource setting for channel measurement, for example, if interference measurement is performed on NZP CSI-RS. The wireless device configured with the higher layer parameter nzp-CSI-RS-ResourcesForInterference may expect no more than 18 NZP CSI-RS ports configured in a NZP CSI-RS resource set.

A wireless device may determine each NZP CSI-RS port configured for interference measurement corresponds to an interference transmission layer. A wireless device may determine each NZP CSI-RS port configured for interference measurement corresponds to an interference transmission layer, for example, for CSI measurement(s). All interference transmission layers on NZP CSI-RS ports for interference measurement may comprise the associated EPRE ratios and other interference signal on REs of NZP CSI-RS resource for channel measurement, NZP CSI-RS resource for interference measurement, or CSI-IM resource for interference measurement.

A wireless device may be configured with a CSI report configuration (e.g., CSI-ReportConfig). A wireless device may be configured with a CSI-ReportConfig, for example, with the higher layer parameter reportQuantity set to 'none', 'cri-RI-PMI-CQI', 'cri-RI-i1', 'cri-RI-i1-CQI', 'cri-RI-CQI', 'cri-RSRP', 'ssb-Index-RSRP', or 'cri-RI-LI-PMI-CQI'. The wireless device may not report any quantity for the CSI-ReportConfig. The wireless device may not report any quantity for the CSI-ReportConfig, for example, if the wireless device is configured with a CSI-ReportConfig with the higher layer parameter reportQuantity set to 'none'. The wireless device may report a preferred precoder matrix for the entire reporting band or a preferred precoder matrix per subband. The wireless device may report a preferred precoder matrix for the entire reporting band or a preferred precoder matrix per subband, for example, if the wireless device is configured with a CSI-ReportConfig with the higher layer parameter reportQuantity set to 'cri-RI-PMI-CQI', or 'cri-RI-LI-PMI-CQI'.

The wireless device may expect, for a CSI-ReportConfig, to be configured with higher layer parameter codebookType set to 'typeI-SinglePanel' and pmi-FormatIndicator configured for wideband PMI reporting. The wireless device may expect, for a CSI-ReportConfig, to be configured with higher layer parameter codebookType set to 'typeI-SinglePanel' and pmi-FormatIndicator configured for wideband PMI reporting, for example, if the wireless device is configured with a CSI-ReportConfig with the higher layer parameter reportQuantity set to 'cri-RI-i1'. The wireless device may report a PMI consisting of a single wideband indication (e.g., i1) for the entire CSI reporting band. The wireless device may report a PMI consisting of a single wideband indication (e.g., i1) for the entire CSI reporting band, for example, if the wireless device is configured with a CSI-ReportConfig with the higher layer parameter reportQuantity set to 'cri-RI-i1'.

The wireless device may expect, for a CSI-ReportConfig, to be configured with higher layer parameter codebookType set to 'typeI-SinglePanel' and pmi-FormatIndicator configured for wideband PMI reporting. The wireless device may expect, for a CSI-ReportConfig, to be configured with higher layer parameter codebookType set to 'typeI-SinglePanel' and pmi-FormatIndicator configured for wideband PMI reporting, for example, if the wireless device is configured with a CSI-ReportConfig with the higher layer parameter reportQuantity set to 'cri-RI-i1-CQI'. The wireless device may report a PMI consisting of a single wideband indication (e.g., i1) for the entire CSI reporting band. The wireless device may report a PMI consisting of a single wideband indication (e.g., i1) for the entire CSI reporting band, for example, if the wireless device is configured with a CSI-ReportConfig with the higher layer parameter reportQuantity set to 'cri-RI-i1-CQI'. The CQI may be calculated conditioned on the reported i1 assuming PDSCH transmission with $N_p \geq 1$ precoders (e.g., corresponding to the same i1 but different i2). The wireless device may assume that one precoder is randomly selected from the set of precoders for each PRG on PDSCH, where the PRG size for CQI calculation is configured by the higher layer parameter pdsch-BundleSizeForCSI.

Ports (e.g., r ports) may be indicated in the order of layer ordering for rank r. r ports may be indicated in the order of layer ordering for rank r, for example, if the wireless device is configured with a CSI-ReportConfig with the higher layer parameter reportQuantity set to 'cri-RI-CQI' and if the wireless device is configured with higher layer parameter non-PMI-PortIndication comprised in a CSI-ReportConfig. Each CSI-RS resource in the CSI resource setting may be linked to the CSI-ReportConfig. Each CSI-RS resource in the CSI resource setting may be linked to the CSI-ReportConfig, for example, if the wireless device is configured with a CSI-ReportConfig with the higher layer parameter reportQuantity set to 'cri-RI-CQI' and if the wireless device is configured with higher layer parameter non-PMI-PortIndication comprised in a CSI-ReportConfig. Each CSI-RS resource in the CSI resource setting may be linked to the CSI-ReportConfig, for example, based on the order of the associated NZP-CSI-RS-ResourceId in the linked CSI resource setting for channel measurement given by higher layer parameter resourcesForChannelMeasurement. The configured higher layer parameter non-PMI-PortIndication may comprise a sequence $p_0^{(1)}$, $p_0^{(2)}$, $p_1^{(2)}$, $p_0^{(3)}$, $p_1^{(3)}$, $p_2^{(3)}$, ..., $p_0^{(R)}$, $p_1^{(R)}$, ..., $p_{R-1}^{(R)}$ of port indices, where $p_0^{(v)}, \ldots, p_{v-1}^{(v)}$ are the CSI-RS port indices associated with rank v and $R \in \{1, 2, \ldots, P\}$ where $P \in \{1,2,4,8\}$ is the number of ports in the CSI-RS resource. The wireless device may only report RI corresponding to the configured fields of PortIndexFor8Ranks.

The wireless device may determine/assume, for each CSI-RS resource in the CSI resource setting linked to the CSI-ReportConfig, that the CSI-RS port indices $p_0^{(v)}, \ldots, p_{v-1}^{(v)} = \{0, \ldots, v-1\}$ may be associated with ranks v=1, 2, ..., P where $P \in \{1,2,4,8\}$ is the number of ports in the CSI-RS resource. The wireless device may assume, for each CSI-RS resource in the CSI resource setting linked to the CSI-ReportConfig, that the CSI-RS port indices $p_0^{(v)}, \ldots, p_{v-1}^{(v)} = \{0, \ldots, v-1\}$ may be associated with ranks v=1, 2, ..., P where $P \in \{1,2,4,8\}$ is the number of ports in the CSI-RS resource, for example, if the wireless device is configured with a CSI-ReportConfig with the higher layer parameter reportQuantity set to 'cri-RI-CQI', and if the wireless device is not configured with higher layer parameter non-PMI-PortIndication.

The wireless device may use the ports indicated for a rank for the selected CSI-RS resource. The wireless device may use the ports indicated for a rank for the selected CSI-RS resource, for example, if calculating the CQI for the rank and if the wireless device is configured with a CSI-ReportConfig with the higher layer parameter reportQuantity set to 'cri-RI-CQI'. The precoder for the indicated ports shall be assumed to be the identity matrix scaled by $1/\sqrt{v}$.

The wireless device may not be not required to update measurements for more than 64 CSI-RS and/or SSB resources. The wireless device may not be not required to update measurements for more than 64 CSI-RS and/or SSB resources, for example, if the wireless device is configured with a CSI-ReportConfig with the higher layer parameter reportQuantity set to 'cri-RSRP' or 'ssb-Index-RSRP', and if the wireless device is configured with the higher layer parameter groupBasedBeamReporting set to 'disabled'. The wireless device may report in a single report nrofReportedRS (higher layer configured) different CRI or SSBRI for each report setting. The wireless device may report in a single report nrofReportedRS (higher layer configured) different CRI or SSBRI for each report setting, for example, if the wireless device is configured with a CSI-ReportConfig with the higher layer parameter reportQuantity set to 'cri-RSRP' or 'ssb-Index-RSRP', and if the wireless device is configured with the higher layer parameter groupBasedBeamReporting set to 'disabled'.

The wireless device may not be required to update measurements for more than 64 CSI-RS and/or SSB resources. The wireless device may not be required to update measurements for more than 64 CSI-RS and/or SSB resources, for example, if the wireless device is configured with a CSI-ReportConfig with the higher layer parameter reportQuantity set to 'cri-RSRP' or 'ssb-Index-RSRP', and if the wireless device is configured with the higher layer parameter groupBasedBeamReporting set to 'enabled'. The wireless device may report in a single reporting instance two different CRI or SSBRI for each report setting. The wireless device may report in a single reporting instance two different CRI or SSBRI for each report setting, for example, if the wireless device is configured with a CSI-ReportConfig with the higher layer parameter reportQuantity set to 'cri-RSRP' or 'ssb-Index-RSRP', and if the wireless device is configured with the higher layer parameter groupBasedBeamReporting set to 'enabled'. The wireless device may report in a single reporting instance two different CRI or SSBRI for each report setting, for example, where CSI-RS and/or SSB resources can be received simultaneously by the wireless device either with a single spatial domain receive filter, or with multiple simultaneous spatial domain receive filters.

The wireless device may derive the CSI parameters other than CRI conditioned on the reported CRI. The wireless device may derive the CSI parameters other than CRI conditioned on the reported CRI, for example, if the wireless device is configured with a CSI-ReportConfig with the higher layer parameter reportQuantity set to 'cri-RSRP', 'cri-RI-PMI-CQI', 'cri-RI-i1', 'cri-RI-i1-CQI', 'cri-RI-CQI' or 'cri-RI-LI-PMI-CQI', and K_s≥1 resources are configured in the corresponding resource set for channel measurement. The wireless device may derive the CSI parameters other than CRI conditioned on the reported CRI, for example, where CRI k (k≥0) corresponds to the configured $(k+1)^{th}$ entry of associated nzp-CSI-RSResource in the corresponding nzp-CSI-RS-ResourceSet for channel measurement, and CRI k (k≥0) corresponds to the $(k+1)^{th}$ entry of associated csi-IM-Resource in the corresponding csi-IM-ResourceSet (if configured). Each resource may comprise a quantity of CSI-RS ports (e.g., at most 16 CSI-RS ports), for example, if K_s=2 CSI-RS resources are configured. Each resource may comprise a quantity of CSI-RS ports (e.g., at most 8 CSI-RS ports), for example, if 2<K_s≤8 CSI-RS resources are configured.

The wireless device may report SSBRI. The wireless device may report SSBRI, for example, if the wireless device is configured with a CSI-ReportConfig with the higher layer parameter reportQuantity set to 'ssb-Index-RSRP'. The wireless device may report SSBRI, for example, where SSBRI k (k≥0) corresponds to the configured $(k+1)^{th}$ entry of the associated csi-SSB-ResourceList in the corresponding CSI-SSB-ResourceSet.

The wireless device may not be configured (and/or may not be expected to be configured) with more than 8 CSI-RS resources in a CSI-RS resource set comprised within a resource setting that is linked to the CSI-ReportConfig. The wireless device may not be configured (and/or may not be expected to be configured) with more than 8 CSI-RS resources in a CSI-RS resource set comprised within a resource setting that is linked to the CSI-ReportConfig, for example, if the wireless device is configured with a CSI-ReportConfig with the higher layer parameter reportQuantity set to 'cri-RI-PMI-CQI', ' cri-RI-i1', 'cri-RI-i1-CQI', 'cri-RI-CQI', or 'cri-RI-LI-PMI-CQI'.

The wireless device may not be configured (and/or may not be expected to be configured) with more than 16 CSI-RS resources in a CSI-RS resource set comprised within the resource setting. The wireless device may not be configured (and/or may not be expected to be configured) with more than 16 CSI-RS resources in a CSI-RS resource set comprised within the resource setting, for example, if the wireless device is configured with a CSI-ReportConfig with higher layer parameter reportQuantity set to 'cri-RSRP' or 'none' and the CSI-ReportConfig is linked to a resource setting configured with the higher layer parameter resourceType set to 'aperiodic'.

The LI may indicate which column of the precoder matrix of the reported PMI corresponds to the strongest layer of the codeword corresponding to the largest reported wideband CQI. The LI may correspond to strongest layer of the first codeword. The LI may correspond to strongest layer of the first codeword, for example, if two wideband CQIs are reported and have equal value.

The wireless device may be configured with CSI-RS resources, SSB resources, or both CSI-RS and SSB resources. The wireless device may be configured with CSI-RS resources, SS/PBCH Block resources, or both CSI-RS and SSB resources, for example, for L1-RSRP computation. The wireless device may be configured with CSI-RS resources, SS/PBCH Block resources, or both CSI-RS and SSB resources, for example, if resource-wise quasi co-located with 'QCL-TypeC' and 'QCL-TypeD' (if applicable). The wireless device may, for example, be configured with CSI-RS resource setting up to 16 CSI-RS resource sets having up to 64 resources within each set. The total number of different CSI-RS resources over all resource sets may be a quantity (e.g., may be no more than 128). The reported L1-RSRP value may be defined by a 7-bit value in the range [440, −44] dBm with 1 dB step size. The reported L1-RSRP value may be defined by a 7-bit value in the range [440, −44] dBm with 1 dB step size, for example, for L1-RSRP reporting. The reported L1-RSRP value may be defined by a 7-bit value in the range [440, −44] dBm with 1 dB step size, for example, if the higher layer parameter nrofReportedRS in CSI-ReportConfig is configured to be one. The wireless device may use differential L1-RSRP-based reporting. The wireless device may use differential L1-RSRP-based reporting, for example, if the higher layer parameter nrofReportedRS is configured to be larger than one, or if the higher layer parameter groupBasedBeamReporting is configured as 'enabled'. The wireless device may use differential L1-RSRP-based reporting, for example, where the largest measured value of L1-RSRP may be quantized to a 7-bit value in the range [440, −44] dBm with 1 dB step size. The differential L1-RSRP may be quantized to a 4-bit value. The differential L1-RSRP value may be computed with 2 dB step size with a reference to the largest measured L1-RSRP value, which may be part of the same L1-RSRP reporting instance.

Trigger states for reporting setting(s) (e.g., configured with the higher layer parameter reportConfigType set to 'aperiodic') and/or resource setting for channel and/or interference measurement on one or more component carriers may be configured using a parameter (e.g., the higher layer parameter CSI-AperiodicTriggerStateList). Trigger states for Reporting Setting(s) (configured with the higher layer parameter reportConfigType set to 'aperiodic') and/or Resource Setting for channel and/or interference measurement on one or more component carriers may be configured using the higher layer parameter CSI-AperiodicTriggerStateList, for example, for CSI-RS resource sets associated with resource settings configured with the higher layer parameter resourceType set to 'aperiodic', 'periodic', or 'semi-persistent'. A single set of CSI triggering states may be higher layer configured. A single set of CSI triggering states may be higher layer configured, for example, for aperiodic CSI report triggering. A single set of CSI triggering states may be higher layer configured, for example, wherein the CSI triggering states may be associated with any candidate DL BWP. A wireless device may not receive (and/or may not be expected to receive) more than one DCI with non-zero CSI request per slot. A wireless device may not be configured (and/or may not be expected to be configured) with different TCI-StateId's for the same aperiodic CSI-RS resource ID configured in multiple aperiodic CSI-RS resource sets with the same triggering offset in the same aperiodic trigger state. A wireless device may not receive (and/or may not be expected to receive) more than one aperiodic CSI report request for transmission in a given slot. A wireless device may not be triggered (and/or may not be expected to be triggered) with a CSI report for a non-active DL BWP. A trigger state may be initiated using the CSI request field in DCI.

A CSI may not be requested. No CSI may be requested, for example, if all the bits of CSI request field in DCI are set to zero. The wireless device may receive a subselection indication used to map up to $2^{N_{TS}}-1$ trigger states to the codepoints of the CSI request field in DCI. The wireless device may receive a subselection indication used to map trigger states (e.g., up to $2^{N_{TS}}-1$ trigger states) to the codepoints of the CSI request field in DCI, for example, if the number of configured CSI triggering states in CSI-AperiodicTriggerStateList is greater than $2^{N_{TS}}-1$. The wireless device may receive a subselection indication used to map up to $2^{N_{TS}}-1$ trigger states to the codepoints of the CSI request field in DCI, for example, where $N_{TS}$ is the number of bits in the DCI CSI request field. $N_{TS}$ may be configured by the higher layer parameter reportTriggerSize. $N_{TS}$ may be configured by the higher layer parameter reportTriggerSize, for example, where $N_{TS} \in \{0, 1, 2, 3, 4, 5, 6\}$. The corresponding action and assumption of the wireless device on the mapping of the selected CSI trigger state(s) to the codepoint(s) of DCI CSI request field may be used starting from the first slot that is after slot $n+3N_{slot}^{subframe,\mu}$. The corresponding action and assumption of the wireless device on the mapping of the selected CSI trigger state(s) to the codepoint(s) of DCI CSI request field may be used starting from the first slot that is after slot $n+3N_{slot}^{subframe,\mu}$, for example, if the HARQ/ACK corresponding to the PDSCH carrying the subselection indication is sent (e.g., transmitted) in the slot n. The CSI request field in DCI may directly indicate the triggering state. The CSI request field in DCI may directly indicate the triggering state, for example, if the number of CSI triggering states in CSI-AperiodicTriggerStateList is less than or equal to $2^{N_{TS}}-1$. The quasi co-location configuration of quasi co-location RS source(s) and quasi co-location type(s) may be indicated to the wireless device through higher layer signaling of qcl-info which comprises a list of references to TCI states (e.g., TCI-State's) for the aperiodic CSI-RS resources associated with the CSI triggering state. The wireless device may be indicated the quasi co-location configuration of quasi co-location RS source(s) and quasi co-location type(s) through higher layer signaling of qcl-info which comprises a list of references to TCI-State's for the aperiodic CSI-RS resources associated with the CSI triggering state, for example, for each aperiodic CSI-RS resource in a CSI-RS resource set associated with each CSI triggering state. An RS may be an SSB located in the same or different CC/DL BWP or a CSI-RS resource configured as periodic or semi-persistent located in the same or different CC/DL BWP. An RS may be an SSB located in the same or different CC/DL BWP or a CSI-RS resource configured as periodic or semi-persistent located in the same or different CC/DL BWP, for example, if a state referred to in the list is configured with a reference to the RS associated with 'QCL-TypeD'. The wireless device may use the QCL assumption of the other DL signal. The wireless device may use the QCL assumption of the other DL signal, for example, if the scheduling offset between the last symbol of the PDCCH carrying the triggering DCI and the first symbol of the aperiodic CSI-RS resources in a NZP-CSI-RS-Resource-Set configured without higher layer parameter trs-Info and without the higher layer parameter repetition is smaller than the reported threshold beamSwitchTiming by the wireless device. The wireless device may use the QCL assumption of the other DL signal, for example, if the reported value is one of the values of {14, 28, 48}. The wireless device may use the QCL assumption of the other DL signal, for example, if there is any other DL signal with an indicated TCI state in the same symbols as the CSI-RS. The wireless device may use the QCL assumption of the other DL signal, for example, if receiving the aperiodic CSI-RS. The other DL signal may refer to PDSCH scheduled with offset larger than or equal to the threshold timeDurationForQCL aperiodic CSI-RS scheduled with offset larger than or equal to the wireless device reported threshold beamSwitchTiming if the reported value is one of the values {14, 28, 48}, periodic CSI-RS, and/or semi-persistent CSI-RS. The wireless device may use the QCL assumption used for the CORESET associated with a monitored search space with the lowest CORESET-ID in the latest slot in which one or more CORESETs within the active BWP of the serving cell are monitored. The wireless device may use the QCL assumption used for the CORESET associated with a monitored search space with the lowest CORESET-ID in the latest slot in which one or more CORESETs within the active BWP of the serving cell are monitored, for example, if receiving the aperiodic CSI-RS.

The wireless device may use (and/or may be expected to use) the QCL assumptions in the indicated TCI states for the aperiodic CSI-RS resources in the CSI triggering state indicated by the CSI trigger field in DCI. The wireless device may be use (and/or may be expected to use) the QCL assumptions in the indicated TCI states for the aperiodic CSI-RS resources in the CSI triggering state indicated by the CSI trigger field in DCI, for example, if the scheduling offset between the last symbol of the PDCCH carrying the triggering DCI and the first symbol of the aperiodic CSI-RS resources is equal to or greater than the reported threshold beamSwitchTiming by the wireless device. The wireless device may use (and/or may be expected to use) the QCL assumptions in the indicated TCI states for the aperiodic CSI-RS resources in the CSI triggering state indicated by the CSI trigger field in DCI, for example, if the reported value is one of the values of {14, 28, 48}.

A non-zero codepoint of the CSI request field in the DCI may be mapped to a CSI triggering state. A non-zero codepoint of the CSI request field in the DCI may be mapped to a CSI triggering state, for example, according to the order of the associated positions of the up to $2^{N_{TS}}-1$ trigger states in CSI-AperiodicTriggerStateList with codepoint '1' mapped to the triggering state in the first position.

One of the aperiodic CSI-RS resource sets from the resource setting may be associated with the trigger state. One of the aperiodic CSI-RS resource sets from the resource setting may be associated with the trigger state, for example, for a wireless device configured with the higher layer parameter CSI-AperiodicTriggerStateList. One of the aperiodic CSI-RS resource sets from the resource setting may be associated with the trigger state, for example, if a resource setting linked to a CSI-ReportConfig has multiple aperiodic resource sets. The wireless device may be higher layer configured per trigger state per resource setting to select the one CSI-IM/NZP CSI-RS resource set from the resource setting. The wireless device may be higher layer configured per trigger state per resource setting to select the one CSI-IM/NZP CSI-RS resource set from the resource setting, for example, for a wireless device configured with the higher layer parameter CSI-AperiodicTriggerStateList. The wireless device may be higher layer configured per trigger state per resource setting to select the one CSI-IM/NZP CSI-RS resource set from the resource setting, for example, if a resource setting linked to a CSI-ReportConfig has multiple aperiodic resource sets.

The CSI-RS offset may be configured per resource set by the higher layer parameter aperiodicTriggeringOffset. The CSI-RS offset may be configured per resource set by the higher layer parameter aperiodicTriggeringOffset, for example, if aperiodic CSI-RS is used with aperiodic reporting. The CSI-RS triggering offset may have the values of {0, 1, 2, 3, 4, 16, 24} slots. The CSI-RS triggering offset may be fixed to zero. The CSI-RS triggering offset may be fixed to zero, for example, if all the associated trigger states do not have the higher layer parameter qcl-Type set to 'QCL-TypeD' in the corresponding TCI states. The aperiodic triggering offset of the CSI-IM may follow offset of the associated NZP CSI-RS for channel measurement.

The wireless device may determine and/or expect that aperiodic CSI-RS is sent (e.g., transmitted) from a base station before the OFDM symbol(s) carrying a DCI triggering the aperiodic CSI-RS. A wireless device may not be configured (and/or may not be expected to be configured) with a different aperiodic triggering offset of the NZP CSI-RS for interference measurement from the associated NZP CSI-RS for channel measurement. A wireless device may not be configured (and/or may not be expected to be configured) with a different aperiodic triggering offset of the NZP CSI-RS for interference measurement from the associated NZP CSI-RS for channel measurement, for example, if interference measurement is performed on aperiodic NZP CSI-RS.

The wireless device may not send (and/or may not be expected to send (e.g., transmit)) more than one aperiodic CSI report triggered by different DCIs on overlapping OFDM symbols. The wireless device may not send (and/or may not be expected to send (e.g., transmit)) more than one aperiodic CSI report triggered by different DCIs on overlapping OFDM symbols, for example, if the wireless device is configured with a single carrier for uplink.

A set of trigger states may be configured by a parameter (e.g., CSI-SemiPersistentOnPUSCH-TriggerStateList). A set of trigger states may be higher layer configured by CSI-SemiPersistentOnPUSCH-TriggerStateList, for example, for semi-persistent reporting on PUSCH. A set of trigger states may be higher layer configured by CSI-SemiPersistentOnPUSCH-TriggerStateList, for example, where the CSI request field in DCI scrambled with SP-CSI-RNTI may activate one of the trigger states. A wireless device may not receive (and/or may not be expected to receive) DCI scrambled with SP-CSI-RNTI activating one semi-persistent CSI report with the same CSI-ReportConfigId as in a semi-persistent CSI report which may be activated by a previously received DCI scrambled with SP-CSI-RNTI.

The PUCCH resource used for sending (e.g., transmitting) the CSI report may be configured by a parameter (reportConfigType). The PUCCH resource used for sending (e.g., transmitting) the CSI report may be configured by reportConfigType, for example, for semi-persistent reporting on PUCCH. Semi-persistent reporting on PUCCH may be activated by an activation command. Semi-persistent reporting on PUCCH may be activated by an activation command, for example, which selects one of the semi-persistent Reporting Settings for use by the wireless device on the PUCCH. The indicated semi-persistent Reporting Setting may be used starting from the first slot that is after slot $n+3N_{slot}^{subframe,\mu}$. The indicated semi-persistent Reporting Setting may be used starting from the first slot that is after slot $n+3N_{slot}^{subframe,\mu}$, for example, if the HARQ-ACK corresponding to the PDSCH carrying the activation command is sent (e.g., transmitted) in slot n.

The corresponding actions and assumptions of a wireless device (e.g., comprising QCL assumptions indicated/provided by a list of reference to TCI-State's, one per activated resource) on CSI-RS/CSI-IM transmission corresponding to the configured CSI-RS/CSI-IM resource configuration(s) may be used starting from the first slot that is after slot $n+3N_{slot}^{subframe,\mu}$. The corresponding actions and assumptions of a wireless device (including QCL assumptions indicated/provided by a list of reference to TCI-State's, one per activated resource) on CSI-RS/CSI-IM transmission corresponding to the configured CSI-RS/CSI-IM resource configuration(s) may be used starting from the first slot that is after slot $n+3N_{slot}^{subframe,\mu}$, for example, for the wireless device configured with CSI resource setting(s) where the higher layer parameter resourceType set to 'semiPersistent', if a wireless device receives an activation command, for CSI-RS resource set(s) for channel measurement and CSI-IM/NZP CSI-RS resource set(s) for interference measurement associated with configured CSI resource setting(s), and if the HARQ-ACK corresponding to the PDSCH carrying the selection command is sent (e.g., transmitted) in slot n. An RS may be an SSB and/or a periodic or semi-persistent CSI-RS located in same or different CC/DL BWP. An RS may be an SSB and/or a periodic or semi-persistent CSI-RS located in same or different CC/DL BWP, for example, if a TCI-State referred to in the list is configured with a reference to the RS that is associated with 'QCL-TypeD'.

The corresponding actions and assumption of a wireless device on cessation of CSI-RS/CSI-IM transmission corresponding to the deactivated CSI-RS/CSI-IM resource set(s) may be used starting from the first slot that is after slot $n+3N_{slot}^{subframe,\mu}$. The corresponding actions and assumption of a wireless device on cessation of CSI-RS/CSI-IM transmission corresponding to the deactivated CSI-RS/CSI-IM resource set(s) may be used starting from the first slot that is after slot $n+3N_{slot}^{subframe,\mu}$, for example, if the wireless device is configured with CSI resource setting(s) where the higher layer parameter resourceType set to 'semiPersistent', if the wireless device receives a deactivation command, for activated CSI-RS/CSI-IM resource set(s) associated with configured CSI resource setting(s), and if the HARQ-ACK corresponding to the PDSCH carrying the deactivation command is sent (e.g., transmitted) in slot n.

A codepoint of the CSI request field in the DCI may be mapped to a SP-CSI triggering state. A codepoint of the CSI request field in the DCI may be mapped to a SP-CSI triggering state, for example, according to the order of the positions of the configured trigger states in CSI-SemiPersistentOnPUSCH-TriggerStateList, with codepoint '0' mapped to the triggering state in the first position. A wireless device may validate, for semi-persistent CSI activation or release, a DL semi-persistent assignment PDCCH on DCI. A wireless device may validate, for semi-persistent CSI activation or release, a DL semi-persistent assignment PDCCH on DCI, for example, if the CRC parity bits of the DCI format are scrambled with a SP-CSI-RNTI indicated/provided by higher layer parameter sp-CSI-RNTI and special fields for the DCI format are set.

A wireless device may consider the information in the DCI format as a valid activation or valid release of semi-persistent CSI transmission on a PUSCH. The wireless device may consider the information in the DCI format as a valid activation or valid release of semi-persistent CSI transmission on PUSCH, for example, if validation is achieved. The wireless device may activate or deactivate a CSI Reporting Setting indicated by CSI request field in the DCI. The wireless device may activate or deactivate a CSI Reporting Setting indicated by CSI request field in the DCI, for example, if validation is achieved. The wireless device may consider the DCI format as having been detected with a non-matching CRC. The wireless device may consider the DCI format as having been detected with a non-matching CRC, for example, if validation is not achieved.

The activated semi-persistent CSI-RS/CSI-IM resource set or the activated semi-persistent ZP CSI-RS resource set configurations may be determined as active. The activated semi-persistent CSI-RS/CSI-IM resource set or the activated semi-persistent ZP CSI-RS resource set configurations may be considered to be active, for example, if the wireless device has an active semi-persistent CSI-RS/CSI-IM resource configuration, or an active semi-persistent ZP CSI-RS resource set configuration, and has not received a deactivation command. The activated semi-persistent CSI-RS/CSI-IM resource set or the activated semi-persistent ZP CSI-RS resource set configurations may be determined as active, for example, if the corresponding DL BWP is active. The activated semi-persistent CSI-RS/CSI-IM resource set or the activated semi-persistent ZP CSI-RS resource set configurations may be determined as suspended. The following configurations in the carrier in activated state may be deactivated and/or may require re-activation configuration(s), for example, if the wireless device is configured with carrier deactivation: semi-persistent CSI-RS/CSI-IM resource, semi-persistent CSI reporting on PUCCH, semi-persistent SRS, and/or semi-persistent ZP CSI-RS resource set.

A wireless device may derive a CQI index. The wireless device may derive a CQI index, for example, for each CQI value reported in uplink slot n. The wireless device may derive as the CQI index, for each CQI value reported in uplink slot n, a highest CQI index which satisfies one or more conditions. The one or more conditions may comprise a single PDSCH transport block with a combination of modulation scheme, target code rate and transport block size corresponding to the CQI index, and occupying a group of downlink physical resource blocks termed the CSI reference resource, could be received with a transport block error probability not exceeding 0.1, for example, if the higher layer parameter cqi-Table in CSI-ReportConfig configures a mapping table (or relation and/or association) among CQI index, modulation, code rate, and efficiency (which may be referred to as 'table1' or 'table2'). The one or more conditions may comprise a single PDSCH transport block with a combination of modulation scheme, target code rate and transport block size corresponding to the CQI index, and occupying a group of downlink physical resource blocks termed the CSI reference resource, could be received with a transport block error probability not exceeding 0.00001, for example, if the higher layer parameter cqi-Table in CSI-ReportConfig configures a mapping table (or relation and/or association) among CQI index, modulation, code rate, and efficiency (which may be referred to as 'table3').

A wireless device may derive the channel measurements for computing CSI value reported in uplink slot n. A wireless device may derive the channel measurements for computing CSI value reported in uplink slot n, for example, if the wireless device is not configured with higher layer parameter timeRestrictionForChannelMeasurements. A wireless device may derive the channel measurements for computing CSI value reported in uplink slot n, for example, based on the NZP CSI-RS, no later than the CSI reference resource, associated with the CSI resource setting.

A wireless device may derive the channel measurements for computing CSI reported in an uplink slot (e.g., uplink slot n). A wireless device may derive the channel measurements for computing CSI reported in uplink slot n, for example, if the wireless device is configured with higher layer parameter timeRestrictionForChannelMeasurements in CSI-ReportConfig. A wireless device may derive the channel measurements for computing CSI reported in uplink slot n, for example, based on the most recent, no later than the CSI reference resource, occasion of NZP CSI-RS associated with the CSI resource setting.

A wireless device may derive the interference measurements for computing CSI value reported in an uplink slot (e.g., uplink slot n). A wireless device may derive the interference measurements for computing CSI value reported in uplink slot n, for example, if the wireless device is not configured with higher layer parameter timeRestrictionForInterferenceMeasurements. A wireless device may derive the interference measurements for computing CSI value reported in uplink slot n, for example, based on the CSI-IM and/or NZP CSI-RS for interference measurement no later than the CSI reference resource associated with the CSI resource setting.

A wireless device may derive the interference measurements for computing the CSI value reported in an uplink slot (e.g., uplink slot n). A wireless device may derive the interference measurements for computing the CSI value reported in uplink slot n, for example, if the wireless device is configured with higher layer parameter timeRestrictionForInterferenceMeasurements in CSI-ReportConfig. A wireless device may derive the interference measurements for computing the CSI value reported in uplink slot n, for example, based on the most recent, no later than the CSI reference resource, occasion of CSI-IM and/or NZP CSI-RS for interference measurement associated with the CSI resource setting.

A sub-band differential CQI may be defined as sub-band Offset level(s)=sub-band CQI index (s)—wideband CQI index. The sub-band differential CQI may comprise 2-bits, or any other quantity of bits. A sub-band differential CQI may be defined as sub-band Offset level(s)=sub-band CQI index (s)—wideband CQI index, for example, for each sub-band index s.

A combination of modulation scheme and transport block size may correspond to a CQI index. A combination of modulation scheme and transport block size may correspond to a CQI index, for example, if the combination could be signaled for transmission on the PDSCH in the CSI reference resource based on a determination of transport block size. The modulation scheme may be indicated by the CQI index. The combination of transport block size and modulation scheme may result in the effective channel code rate. The combination of transport block size and modulation scheme may result in the effective channel code rate, for example, if used for the reference resource. The combination of transport block size and modulation scheme may result in the effective channel code rate, for example, which is the closest possible to the code rate indicated by the CQI index. The combination of transport block size and modulation scheme with the smallest of such transport block sizes may be relevant. The combination of transport block size and modulation scheme with the smallest of such transport block sizes may be relevant, for example, if more than one combination of transport block size and modulation scheme results in an effective channel code rate equally close to the code rate indicated by the CQI index.

A base station and/or a wireless device may deactivate and/or suspend configurations of a BWP. The base station and/or the wireless device may deactivate and/or suspend CORESETs of the BWP. The base station and/or the wireless device may deactivate and/or suspend CORESETs of the BWP, for example, based on deactivation of the BWP. The base station and/or the wireless device may deactivate and/or suspend reference signals (e.g., semi-persistent CSI-RS and/or semi-persistent SRS) and CSI reporting (e.g., CSI reporting using PUCCH and/or PUSCH). The base station and/or the wireless device may deactivate and/or suspend reference signals (e.g., semi-persistent CSI-RS and/or semi-persistent SRS) and CSI reporting (e.g., CSI reporting using PUCCH and/or PUSCH), for example, based on the deactivation of the BWP. The base station and/or the wireless device may deactivate and/or suspend configured grant transmissions (e.g., PUCCH and/or PUSCH). The base station and/or the wireless device may deactivate and/or suspend configured grant transmissions (e.g., PUCCH and/or PUSCH), for example, based on the deactivation of the BWP.

A wireless device may receive a PDSCH transmission with up to 8 transmission layers from a base station. The base station may map a block of vectors $[x^{(0)}(i) \ldots x^{(v-1)}(i)]^T$, $i=0, 1, \ldots, M_{symb}^{layer}-1$ to antenna ports according to $$\begin{bmatrix} y^{(p_0)}(i) \\ \vdots \\ y^{(p_{v-1})}(i) \end{bmatrix} = \begin{bmatrix} x^{(0)}(i) \\ \vdots \\ x^{(v-1)}(i) \end{bmatrix}$$

where $i=0, 1, \ldots, M_{symb}^{ap}-1$, $M_{symb}^{ap}$ is a number of modulation symbols to send (e.g., transmit) per antenna port for a physical channel and is equal to a number of modulation symbols to send (e.g., transmit) per layer for a physical channel $M_{symb}^{layer}$. The wireless device may determine a set of antenna ports $\{p_0, \ldots, p_{v-1}\}$, for example, where v is a number of transmission layers of PDSCH. The wireless device may determine the number of transmission layers of PDSCH. The number of transmission layers of PDSCH may be 1. The number of transmission layers of PDSCH may be 1, for example, if the base station schedules PDSCH by DCI format 1_0. The number of transmission layers of PDSCH may be a number of indicated DM-RS ports by antenna port(s) field in DCI format 1_1. The number of transmission layers of PDSCH may be a number of indicated DM-RS ports by antenna port(s) field in DCI format 1_1, for example, if the base station schedules PDSCH by DCI format 1_1. The base station may configure a number of transmission layers in an RRC message. The base station may configure a number of transmission layers in an RRC message, for example, for higher layer configured PDSCH transmission.

A base station may configure a maximum number/quantity of transmission layers in an RRC message. The wireless device may activate (or deactivate) one or more antennas. The wireless device may activate (or deactivate) one or more antennas, for example, if the number of transmission layers increases (or decreases). The maximum number of transmission layers may be per wireless device and/or per BWP. The base station may indicate a maximum number of transmission layers in DCI. The wireless device may activate or deactivate one or more antennas. The wireless device may activate or deactivate one or more antennas, for example, based on the indicated value. The base station may configure a plurality of BWPs and a maximum number of transmission layers corresponding to each of the plurality of BWPs. The base station may send (e.g., transmit) DCI to activate one of the plurality of BWPs. The base station may send (e.g., transmit) DCI to activate one of the plurality of BWPs, for example, based on configuring the plurality of BWPs. The wireless device may activate or deactivate one or more antennas. The wireless device may activate or deactivate one or more antennas, for example, based on the maximum number of transmission layers associated with the activated BWP.

A wireless device may use one or more wireless resources (e.g., wireless resources herein may comprise one or more BWP, subset(s) of available bandwidth, and/or any other wireless resource). The wireless device may use one or more wireless resources in a manner such as to conserve bandwidth and/or power. A wireless device may switch the wireless resource(s) being used. A wireless device may switch the wireless resource(s) being used, for example, based on a message (e.g., control information message) from a base station. Wireless resource switching (e.g., BWP switching) may be performed based on current/expected power and/or bandwidth requirements. For example, some BWPs may have a lower data capacity and/or may require less power to monitor and/or send transmissions. Wireless resource switching may include deactivating a wireless resource and/or activating another wireless resource (e.g., as active BWP). There may be a certain amount of switching delay (e.g., activation time duration) for wireless resource switching, for example, if BWP switching is initiated. The switching delay may be used by the base station and/or the wireless device to reconfigure (and/or activate/deactivate and/or modify) antennas, filters, channel resources, and/or any other resource(s)/component(s). The base station and/or the wireless device may not use, and/or may refrain from using, (e.g., may not send and/or receive transmissions via) an activated resource (e.g., activated BWP), for example, based on the switching delay (e.g., at least until expiration of the switching delay). The switching delay (e.g., for BWP switching) may reduce data transmission capacity between the base station and the wireless device. The switching delays from multiple switching operations (e.g., multiple BWP switching operations) may accumulate to reduce data transmission capacity and/or increase signaling overhead.

As described herein, one or more steps/actions may be performed by a wireless device and/or a base station to reduce and/or otherwise address the switching delays and problems associated with wireless resource switching (e.g., BWP switching). The required delay for switching (e.g., switching delay) may be determined, for example, based on a change of configuration parameters. BWP switching that comprises antenna reconfiguration, for example, may take a longer duration of time (e.g., a longer switching delay) than BWP switching that comprises antenna activation and/or deactivation. Wireless resources (e.g., BWPs) may be associated with one or more common configuration parameters. The delay required for wireless resource switching may be shorter as a number/quantity of common configuration parameters shared between the BWPs becomes larger. The one or more common configuration parameters may comprise one or more of reference signal configuration, frequency location and/or bandwidth, SCS, shared channel resources, and/or control channel resources. The wireless resources may be grouped based on the one or more common configuration parameters. The wireless device and/or the base station may determine if wireless resources are in the same or different groups. The switching delay may be determined based on the wireless resource being in the same or different groups (e.g., BWP groups). Switching delays for wireless resource switching and/or signaling overhead may be reduced, for example, if switching is between wireless resources of the same wireless resource group. Delay(s) for wireless resource switching and/or signaling overhead may be reduced, for example, based on a reduction of configuration parameter changes associated with switching between wireless resources of the same wireless resource group. The base station may communicate the groups of the wireless resources to the wireless device, for example, which may reduce signaling overhead. Rather than applying a default delay for a switching operation, a one or more wireless resources may be activated within a different delay that may be determined based on whether at least a first wireless resource and at least a second wireless resource are in a same group (e.g., a same BWP group), which may provide advantages such as reduced switching delays and/or reduced signaling overhead.

A wireless device may receive a wireless resource switching request (e.g., a BWP switching request) at DL slot n from a base station. The wireless device may activate a BWP within n+BWP switch delay (e.g., $T_{BWPswitchDelay}$) and deactivate a previous BWP. A BWP may be considered activated, for example, if a wireless device is able to receive PDCCH and/or PDSCH and/or send (e.g., transmit) PUCCH and/or PUSCH on the BWP. A base station may switch the BWP to a new BWP with changed configurations. A base station may switch the BWP to a new BWP with changed configurations, for example, if the base station changes a portion of a BWP's configurations (e.g., a maximum number of transmission layers) of a wireless device. The base station may keep a portion of configurations of the BWP the same and change some other configuration parameters. The base station and the wireless device may require smaller delay for switching between BWPs than the BWP switch delay (e.g., $T_{BWPswitchDelay}$). The base station and the wireless device may require smaller delay for switching between BWPs than the BWP switch delay (e.g., $T_{BWPswitchDelay}$), for example, based on the wireless device maintaining some of the configuration parameters for BWP switching. Switching BWPs to change a portion of a BWP's configurations may result in unnecessary BWP switch delay and downlink signaling overhead. BWP configuration signaling may increase signaling overhead and/or may not indicate/provide a means to reduce BWP switch delay.

An RRC message format and/or a procedure may be used (e.g., by a base station and/or a wireless device) to reduce BWP switching delay. The RRC message format and/or procedure may be used, for example, if the base station changes a portion of a BWP's configurations. The RRC message format may indicate two or more BWPs in a BWP group. A wireless device may activate a first BWP and deactivate a second BWP of the BWP group. The wireless device may activate the first BWP within a time duration of a BWP switch delay (also referred to as an "activation time duration"). The time duration of the BWP switch delay may be determined based on whether the first BWP and the second BWP are in the same BWP group. The BWP switch delay may be determined to be a first BWP switch delay for switching between BWPs of the same BWP group. The BWP switch delay may be determined to be a second BWP switch delay for switching between BWPs that are not of the same BWP group. BWPs of the same BWP group may comprise one or more common BWP configuration parameters.

FIG. 20A shows an example of BWP switching. A wireless device may receive one or more RRC messages. The wireless device may receive one or more RRC messages, for example, indicating a plurality of BWPs (e.g., BWP A, B, and/or C). The plurality of BWPs may comprise a first BWP (e.g., BWP A) and a second BWP (e.g., BWP B). The RRC message may indicate the BWP group(s) for one or more of the first BWP and the second BWP. The wireless device may receive DCI (e.g., DCI #1) and PDSCH (e.g., PDSCH #1). The wireless device may receive DCI (e.g., DCI #1) and PDSCH (e.g., PDSCH #1), for example, based on an activated BWP (e.g., BWP A). The wireless device may receive DCI (e.g., DCI #2) indicating switching from the first BWP to the second BWP as an active BWP. The field in the DCI may comprise a BWP indicator with 0, 1, or 2 bits as determined by the number of UL BWPs (e.g., DCI format 0_1) or the number/quantity of DL BWPs (e.g., DCI format 1_1). The indication may be based on the field in FIG. 23.

FIG. 20B shows an example of BWP switching. A wireless device may receive one or more RRC messages indicating a plurality of BWPs (e.g., BWP A, B and C). The plurality of BWPs may comprise a first BWP (e.g., BWP A) and a second BWP (e.g., BWP C). The RRC message may indicate the BWP group(s) for the first BWP and the second BWP. The wireless device may receive DCI (e.g., DCI #1) and PDSCH (e.g., PDSCH #1). The wireless device may receive DCI (e.g., DCI #1) and PDSCH transmission (e.g., PDSCH #1), for example, based on an activated BWP (e.g., BWP A). The wireless device may receive DCI (e.g., DCI #2) indicating switching from the first BWP to the second BWP as an active BWP. The field in the DCI may comprise a BWP indicator with 0, 1, or 2 bits as determined by the number of UL BWPs (e.g., DCI format 0_1) or the number of DL BWPs (e.g., DCI format 1_1). The indication may be based on the field in FIG. 23.

Figure 21:
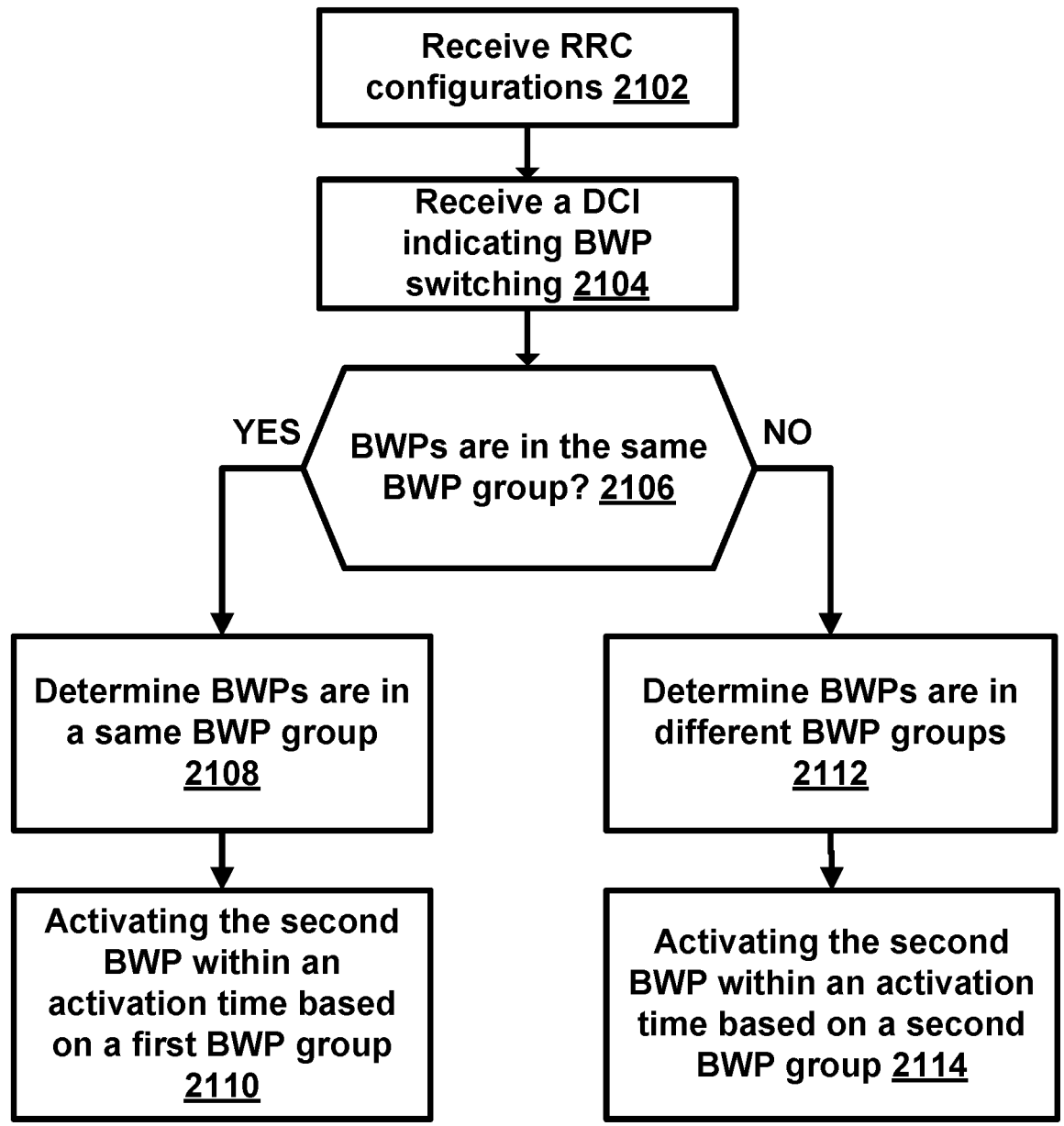
FIG. 21 shows an example method for BWP switching by a wireless device.

FIG. 21 shows an example method for BWP switching by a wireless device. The method shown in FIG. 21 may comprise, for example, some or all of the operations shown in FIG. 20A and/or some or all of the operations shown in FIG. 20B. At step 2102, a wireless device may receive one or more RRC configurations. The one or more RRC configurations may indicate a plurality of BWPs of at least one BWP group. The plurality of BWPs may comprise a first BWP and a second BWP. The one or more RRC configurations may indicate the BWP group(s) for the first BWP and the second BWP. At step 2104, the wireless device may receive DCI. The DCI may indicate BWP switching from the first BWP to the second BWP. At step 2106, the wireless device may determine if the first BWP and the second BWP are in the same BWP group. At step 2108, the wireless device may determine that the first BWP and the second BWP are in the same BWP group (e.g., a first BWP group). At step 2110, the wireless device may activate a second BWP within a first activation time, for example, based on a first BWP group comprising the first BWP and the second BWP. At step 2112, the wireless device may determine that the first BWP and the second BWP are in different BWP groups. At step 2114, the wireless device may activate a second BWP within a second activation time, for example, based on the first BWP and the second BWP being in different BWP groups. The first activation time and/or the second activation time may be predefined and/or may be semi-statistically configured.

Figure 22:
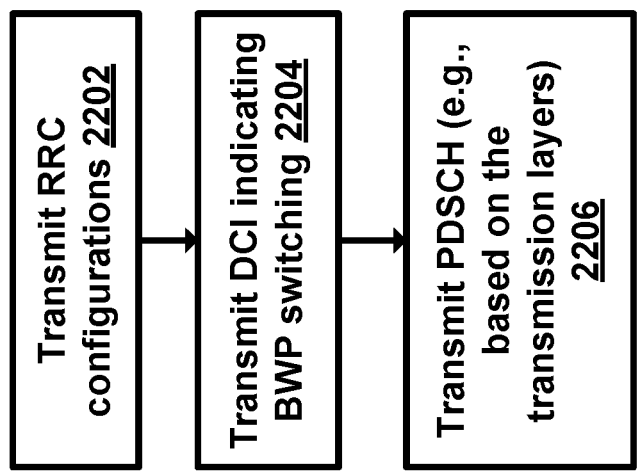
FIG. 22 shows an example method for BWP switching by a base station.

FIG. 22 shows an example method for BWP switching by a base station. The method shown in FIG. 22 may comprise, for example, some or all of the operations shown in FIG. 20A and/or some or all of the operations shown in FIG. 20B. At step 2202, a base station may send one or more RRC configurations. The one or more RRC configurations may indicate a plurality of BWPs. The one or more RRC configurations may indicate the BWP group(s) of the plurality of BWPs. The plurality of BWPs may comprise a first BWP and a second BWP. At step 2204, the base station may send DCI. The DCI may indicate BWP switching from the first BWP to the second BWP. The DCI may indicate a maximum number of transmission layers, for example, associated with the second BWP. At step 2206, the base station may send PDSCH. The base station may send PDSCH, for example, based on the maximum number of transmission layers. The base station may send PDSCH, for example, via the second BWP.

FIG. 23 shows an example BWP indication field. One or more BWP indicator fields may be provided/comprised in DCI. The BWP indicator field may indicate the active BWP (e.g., active UL BWP of one or more UL BWPs, active DL BWP of one or more DL BWPs). The BWP indicator field may comprise a BWP indicator with 0, 1, or 2 bits as determined by the number of UL BWPs (e.g., DCI format 0_1) or the number of DL BWPs (e.g., DCI format 1_1). A BWP indicator may use n bits to represent $2^n$ BWPs.

FIG. 24 shows an example table of activation time duration for BWP switching. The wireless device may activate the second BWP (e.g., BWP B) within an activation time duration for the second BWP. The activation time duration for the second BWP may be determined based on whether the first BWP and the second BWP are in a same BWP group. The activation time duration may be based on the table in FIG. 24, for example, if the first BWP (e.g., BWP A) and the second BWP (e.g., BWP B) are not in a same BWP group. BWP switch delay may be 1, 2, 3 or 6 slots (or any other quantity of slots) for SCS 15 kHz, 30 kHz, 60 kHz or 120 kHz (or any other value), respectively. BWP switch delay may be 1, 2, 3 or 6 slots (or any other quantity of slots) for SCS 15 kHz, 30 kHz, 60 kHz or 120 kHz (or any other value), respectively, for example, if the wireless device reported Type 1 via wireless device capability. BWP switch delay may be 3, 5, 9 or 18 slots (or any other quantity of slots) for SCS 15 kHz, 30 kHz, 60 kHz or 120 kHz (or any other value), respectively. BWP switch delay may be 3, 5, 9 or 18 slots (or any other quantity of slots) for SCS 15 kHz, 30 kHz, 60 kHz or 120 kHz (or any other value), respectively, for example, if the wireless device reported Type 2 via wireless device capability. The BWP switch delay may depend on the wireless device capability. The wireless device may receive a PDSCH transmission (e.g., PDSCH #2) via the second BWP. The wireless device may receive a PDSCH transmission (e.g., PDSCH #2) via the second BWP, for example, based on the activation of the second BWP. The BWP switch delay may be determined by the larger of the BWP switch delays for the SCS before the BWP switch and for the SCS after the BWP switch. The BWP switch delay may be determined by the larger of the BWP switch delays for the SCS before the BWP switch and for the SCS after the BWP switch, for example, if the BWP switch involves a change in SCS.

FIG. 25 shows an example table of activation time duration for BWP switching. A wireless device may activate the second BWP (e.g., BWP C) within an activation time duration for the second BWP. The activation time duration for the second BWP may be determined based on whether the first BWP and the second BWP are in a same BWP group. The activation time duration may be based on the table in FIG. 25, for example, if the first BWP (e.g., BWP A) and the second BWP (e.g., BWP C) are in a same BWP group. The table in FIG. 25 may comprise shorter time durations than FIG. 24. The BWP switch delay may depend on the wireless device capability. The BWP switch delay may be determined by the larger of the BWP switch delays for the SCS before the BWP switch and for the SCS after the BWP switch. The BWP switch delay may be determined by the larger of the BWP switch delays for the SCS before the BWP switch and for the SCS after the BWP switch, for example, if the BWP switch involves a change in SCS.

FIG. 26 shows an example table of activation time duration for BWP switching. BWP switch delay may be 0, 1, 2 or 3 slots (or any other quantity of slots) for SCS 15 kHz, 30 kHz, 60 kHz or 120 kHz (or any other value), respectively. BWP switch delay may be 0, 1, 2 or 3 slots (or any other quantity of slots) for SCS 15 kHz, 30 kHz, 60 kHz or 120 kHz (or any other value), respectively, for example, if the wireless device reported Type 1 via wireless device capability. BWP switch delay may be 1, 3, 5, or 9 slots (or any other quantity of slots) for SCS 15 kHz, 30 kHz, 60 kHz or 120 kHz (or any other value), respectively. BWP switch delay may be 1, 3, 5, or 9 slots (or any other quantity of slots) for SCS 15 kHz, 30 kHz, 60 kHz or 120 kHz (or any other value), respectively, for example, if the wireless device reported Type 2 via wireless device capability. A table may be used for both the same BWP group and the different BWP group. Each wireless device capability type (e.g., Type 1 or Type 2) may have separate row for BWP switching within a same group or a different group, respectively. Each wireless device capability type (e.g., Type 1 or Type 2) may have separate row for BWP switching within a same group or a different group, respectively, for example, as shown in FIG. 26. The wireless device may indicate the time duration for the same group as a time difference or a ratio between the time duration of the same group and the time duration of the different group. The wireless device may indicate the different or the ratio via the one or more RRC message as a wireless device capability information. The wireless device may receive a PDSCH (e.g., PDSCH #2) via the second BWP. The wireless device may receive a PDSCH (e.g., PDSCH #2) via the second BWP, for example, based on the activation of the second BWP. The wireless device and/or the base station may use the contents of the Tables of FIG. 24, FIG. 25, and/or FIG. 26 to determine BWP switch delay.

BWPs of the same BWP group may comprise one or more common BWP configuration parameters. BWPs of the same BWP group may comprise a common BWP group identity. The one or more common BWP configuration parameters may comprise one or more of reference signal configuration, frequency location and/or bandwidth, SCS, shared channel resources, and/or control channel resources. The reference signal configuration may comprise one or more of SRS configuration and/or CSI-RS configuration. The SRS configuration may comprise one or more of SRS resource sets and/or SRS resources. The CSI-RS configuration may comprise one or more of CSI-RS resource sets and/or CSI-RS resources. The shared channel resources may comprise one or more of PUSCH configuration(s) and/or PDSCH configuration(s). The PUSCH configuration(s) may comprise one or more of data scrambling identity and/or uplink DM-RS configs. The PDSCH configuration(s) may comprise one or more of data scrambling identity, downlink DM-RS configs, power control configuration(s), frequency hopping configuration(s), resource allocation type, aggregation factor, MCS table, transform precoder configuration(s), codebook subset, and/or maximum number of transmission layers. The control channel resources may comprise one or more of PUCCH configuration(s) and/or PDCCH configuration(s). The PUCCH configuration(s) may comprise one or more of PUCCH resource sets, PUCCH resources, power control configs, formats, scheduling request resources, and/or spatial relation information. The PDCCH configuration(s) may comprise one or more of CORESETs, search spaces, downlink preemption, and/or power control configs.

BWPs of the same BWP group may be connected via a reference ID (e.g., a BWP group indicator or identifier) in the one or more RRC messages. A first BWP may comprise a same reference ID as a second BWP. The wireless device may activate the second BWP within an activation time duration for a same group. The wireless device may activate the second BWP within an activation time duration for a same group, for example, based on the reference ID.

BWPs of the same BWP group may share one or more common BWP configuration parameters. A first BWP of the BWP group may comprise BWP configuration parameters. Other BWPs than the first BWP may not comprise the BWP configuration parameters. The wireless device may activate the other BWPs. The wireless device may activate the other BWPs, for example, based on the BWP configuration parameters of the first BWP. The BWP configuration parameters may comprise one or more of reference signal configuration, frequency location and/or bandwidth, SCS, shared channel resources, and/or control channel resources. The reference signal configuration may comprise one or more of SRS configuration and/or CSI-RS configuration. The SRS configuration may comprise one or more of SRS resource sets and/or SRS resources. The CSI-RS configuration may comprise one or more of CSI-RS resource sets and/or CSI-RS resources. The shared channel resources may comprise one or more of PUSCH configuration(s) and/or PDSCH configuration(s). The PUSCH configuration(s) may comprise one or more of data scrambling identity and/or uplink DM-RS configs. The PDSCH configuration(s) may comprise one or more of data scrambling identity, downlink DM-RS configs, power control configuration(s), frequency hopping configuration(s), resource allocation type, aggregation factor, MCS table, transform precoder configuration(s), codebook subset, and/or maximum number of transmission layers. The control channel resources may comprise one or more of PUCCH configuration(s) and/or PDCCH configuration(s). The PUCCH configuration(s) may comprise one or more of PUCCH resource sets, PUCCH resources, power control configs, formats, scheduling request resources, and/or spatial relation information. The PDCCH configuration(s) may comprise one or more of CORESETs, search spaces, downlink preemption, and/or power control configs.

A wireless device may receive a BWP switching request from a base station. The wireless device may activate a BWP and deactivate a previous BWP. The wireless device may activate a BWP and deactivate a previous BWP, for example, based on the BWP switching request. A BWP may be considered activated, for example, if a wireless device is able to receive PDCCH and/or PDSCH and/or send (e.g., transmit) PUCCH and/or PUSCH on the BWP. The base station and/or the wireless device may activate, for the newly-activated BWP, one or more of the same configurations previously activated for the deactivated BWP. The base station and/or the wireless device may activate, for the newly-activated BWP, the same deactivated or suspended CORESETs of the previously-activated BWP. The base station and/or the wireless device may activate, for the newly-activated BWP, the same deactivated or suspended CORESETs of the previously-activated BWP, for example, based on the activation of the BWP. The base station and/or the wireless device may activate, for the newly-activated BWP, the same deactivated or suspended reference signals (e.g., semi-persistent CSI-RS and/or semi-persistent SRS) and CSI reporting (e.g., CSI reporting using PUCCH and/or PUSCH) of the previously-activated BWP. The base station and/or the wireless device may activate, for the newly-activated BWP, the same deactivated or suspended reference signals (e.g., semi-persistent CSI-RS and/or semi-persistent SRS) and CSI reporting (e.g., CSI reporting using PUCCH and/or PUSCH) of the previously-activated BWP, for example, based on the activation of the BWP. The base station and/or the wireless device may activate, for the newly-activated BWP, the same deactivated and/or suspended configured grant transmissions (e.g., PUCCH and/or PUSCH) of the previously-activated BWP. The base station and/or the wireless device may activate, for the newly-activated BWP, the same deactivated and/or suspended configured grant transmissions (e.g., PUCCH and/or PUSCH) of the previously-activated BWP, for example, based on the activation of the BWP. Unnecessary delay and signaling overhead may be incurred. Unnecessary delay and signaling overhead may be incurred, for example, if the wireless device activates one or more of the same configurations, for the newly-activated BWP, as previously activated for the deactivated BWP.

A procedure may be used, for example, by a base station and/or a wireless device. The procedure may be used, for example, if the base station changes a portion of a BWP's configurations. The procedure may be used, for example, without incurring unnecessary delay and signaling overhead. A wireless device may activate a first BWP and deactivate a second BWP. The wireless device may determine that the first BWP and the second BWP are in a same BWP group. The wireless device may activate the second BWP. The wireless device may deactivate a first portion of configurations of the first BWP and maintain activation of a second portion of the configurations of the first BWP. The wireless device may deactivate a first portion of configurations of the first BWP and maintain activation of a second portion of the configurations of the first BWP, for example, based on determining that the first BWP and the second BWP are in a same BWP group. The wireless device may deactivate a first portion of configurations of the first BWP and maintain activation of a second portion of the configurations of the first BWP, for example, if the first BWP and the second BWP are in a same BWP group. The wireless device may deactivate all configurations of the first BWP. The wireless device may deactivate all configurations of the first BWP, for example, based on determining that the first BWP and the second BWP are not in the same BWP group. The wireless device may deactivate all configurations of the first BWP, for example, if the first BWP and the second BWP are not in the same BWP group.

FIG. 27A shows an example of BWP switching. A wireless device may receive one or more RRC messages indicating a plurality of BWPs (e.g., BWP A, B and C). The plurality of BWPs may comprise a first BWP (e.g., BWP A) and a second BWP (e.g., BWP B). The RRC message may indicate the BWP group(s) for the first BWP and the second BWP. The wireless device may receive DCI (e.g., DCI #1) and PDSCH (e.g., PDSCH #1). The wireless device may receive DCI (e.g., DCI #1) and a PDSCH transmission (e.g., PDSCH #1), for example, based on an activated BWP (e.g., BWP A). The wireless device may receive DCI (e.g., DCI #2) indicating switching from the first BWP to the second BWP as an active BWP. The field in the DCI may comprise a BWP indicator with 0, 1, or 2 bits as determined by the number of UL BWPs (e.g., DCI format 0_1) or the number of DL BWPs (e.g., DCI format 1_1). The indication may be based on the field in FIG. 23. The wireless device may determine that the first BWP and the second BWP are in different BWP groups. The wireless device may activate the second BWP. The wireless device may activate the second BWP, for example, based on determining that the first BWP and the second BWP are in different BWP groups. The wireless device may activate the second BWP, for example, based on deactivating configurations of the first BWP. The wireless device may receive a PDSCH transmission (e.g., PDSCH #2) via the second BWP. The wireless device may receive a PDSCH transmission (e.g., PDSCH #2) via the second BWP, for example, based on the activation of the second BWP.

FIG. 27B shows an example of BWP switching. A wireless device may receive one or more RRC messages indicating a plurality of BWPs (e.g., BWP A, B and C). The plurality of BWPs may comprise a first BWP (e.g., BWP A) and a second BWP (e.g., BWP C). The wireless device may receive DCI (e.g., DCI #1) and a PDSCH transmission (e.g., PDSCH #1). The wireless device may receive DCI (e.g., DCI #1) and a PDSCH transmission (e.g., PDSCH #1), for example, based on an activated BWP (e.g., BWP A). The wireless device may receive DCI (e.g., DCI #2) indicating switching from the first BWP to the second BWP as an active BWP. The field in the DCI may comprise a BWP indicator with 0, 1, or 2 bits as determined by the number of UL BWPs (e.g., DCI format 0_1) or the number of DL BWPs (e.g., DCI format 1_1). The indication may be based on the field in FIG. 23. The wireless device may determine that the first BWP and the second BWP are in a same BWP group. The wireless device may determine that the first BWP and the second BWP are in a same BWP group, for example, based on the one or more RRC configurations. The wireless device may activate the second BWP. The wireless device may activate the second BWP, for example, based on determining that the first BWP and the second BWP are in a same BWP group. The wireless device may activate the second BWP, for example, based on deactivating a first portion of configurations of the first BWP and maintaining activation of a second portion of the configurations of the first BWP. The wireless device may receive a PDSCH transmission (e.g., PDSCH #2) via the second BWP. The wireless device may receive a PDSCH transmission (e.g., PDSCH #2) via the second BWP, for example, based on the activation of the second BWP.

Figure 28:
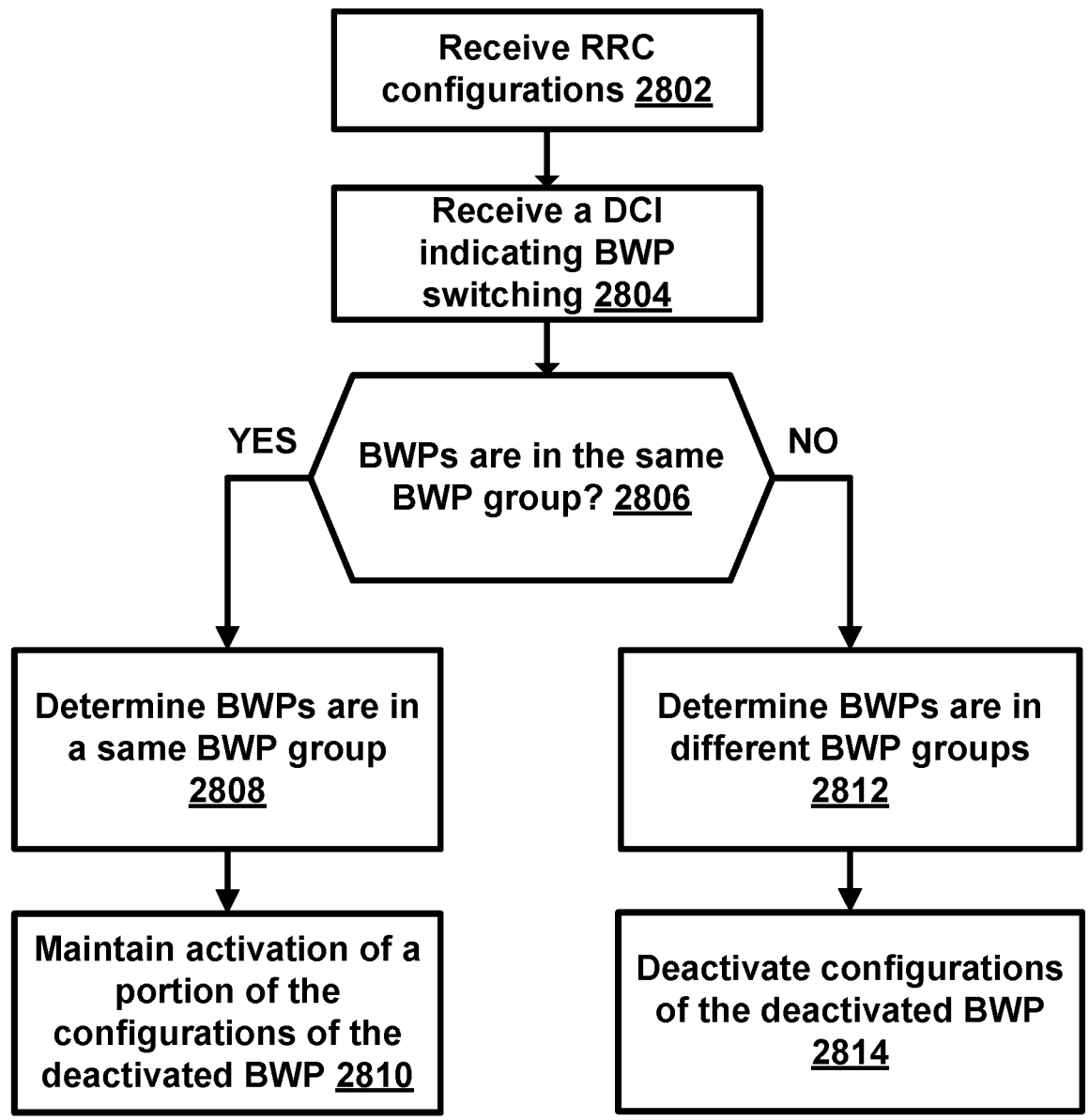
FIG. 28 shows an example method for maintaining BWP configuration by a wireless device.

FIG. 28 shows an example method for maintaining a BWP configuration by a wireless device. The method shown in FIG. 28 may comprise, for example, some or all of the operations shown in FIG. 27A and/or some or all of the operations shown in FIG. 27B. At step 2802, a wireless device may receive one or more RRC configurations. The one or more RRC configurations may indicate a plurality of BWPs of at least one BWP group. The plurality of BWPs may comprise a first BWP and a second BWP. The one or more RRC configurations may indicate the BWP group(s) for the first BWP and the second BWP. At step 2804, the wireless device may receive DCI. The DCI may indicate BWP switching from the first BWP to the second BWP. At step 2806, the wireless device may determine if the first BWP and the second BWP are in the same BWP group. At step 2808, the wireless device may determine that the first BWP and the second BWP are in a same BWP group. The wireless device may determine that the first BWP and the second BWP are in a same BWP group, for example, based on the one or more RRC configurations. At step 2810, the wireless device may activate the second BWP. The wireless device may activate the second BWP, for example, based on determining that the first BWP and the second BWP are in a same BWP group. The wireless device may activate the second BWP, for example, based on deactivating a first portion of configurations of the first BWP and maintaining activation of a second portion of the configurations of the first BWP. At step 2812, the wireless device may determine that the first BWP and the second BWP are in different BWP groups. At step 2814, the wireless device may activate the second BWP. The wireless device may activate the second BWP, for example, based on determining that the first BWP and the second BWP are in different BWP groups. The wireless device may activate the second BWP, for example, based on deactivating configurations of the first BWP.

Figure 29:
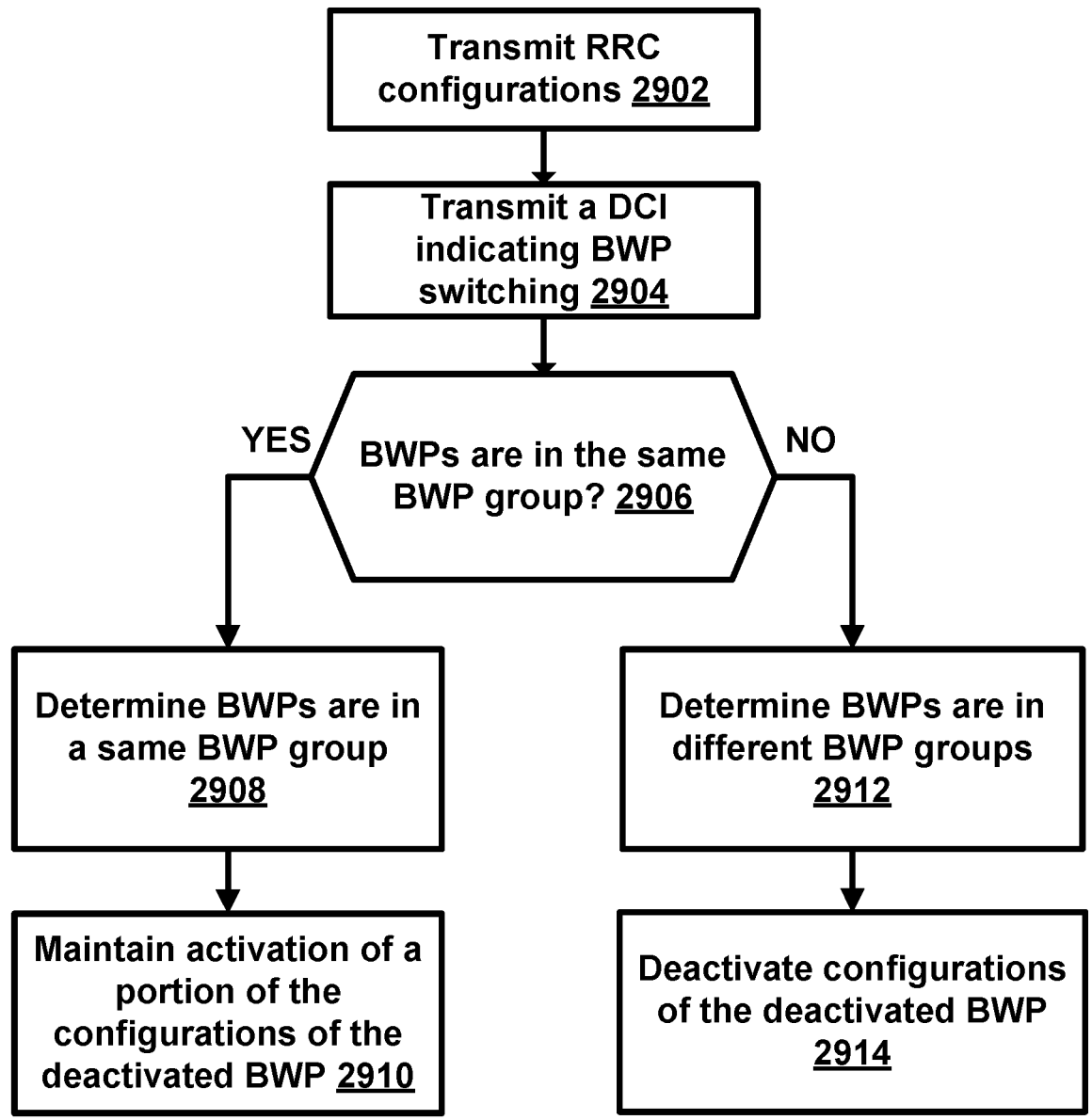
FIG. 29 shows an example method for maintaining BWP configuration by a base station.

FIG. 29 shows an example method for maintaining BWP configuration by a base station. The method shown in FIG. 29 may comprise, for example, some or all of the operations shown in FIG. 27A and/or some or all of the operations shown in FIG. 27B. At step 2902, a base station may send one or more RRC configurations. The one or more RRC configurations may indicate a plurality of BWPs of at least one BWP group. The plurality of BWPs may comprise a first BWP and a second BWP. The one or more RRC configurations may indicate the BWP group(s) for the first BWP and the second BWP. At step 2904, the base station may send DCI. The DCI may indicate BWP switching from the first BWP to the second BWP. At step 2906, the wireless device may determine if the first BWP and the second BWP are in the same BWP group. At step 2908, the base station may determine that the first BWP and the second BWP are in a same BWP group. At step 2910, the base station may activate the second BWP. The base station may activate the second BWP, for example, based on determining that the first BWP and the second BWP are in a same BWP group. The base station may activate the second BWP, for example, based on deactivating a first portion of configurations of the first BWP and maintaining activation of a second portion of the configurations of the first BWP. At step 2912, the base station may determine that the first BWP and the second BWP are in different BWP groups. At step 2914, the base station may activate the second BWP. The base station may activate the second BWP, for example, based on determining that the first BWP and the second BWP are in different BWP groups. The wireless device may activate the second BWP, for example, based on deactivating configurations of the first BWP.

The second portion of the configurations of the first BWP (e.g., as described above for FIG. 27B) may comprise one or more of reference signal configuration, frequency location and/or bandwidth, SCS, shared channel resources, and/or control channel resources. The reference signal configuration may comprise one or more of SRS configuration and/or CSI-RS configuration. The SRS configuration may comprise one or more of SRS resource sets and/or SRS resources. The CSI-RS configuration may comprise one or more of CSI-RS resource sets and/or CSI-RS resources. The shared channel resources may comprise one or more of PUSCH configuration(s) and/or PDSCH configuration(s). The PUSCH configuration(s) may comprise one or more of data scrambling identity and/or uplink DM-RS configs. The PDSCH configuration(s) may comprise one or more of data scrambling identity, downlink DM-RS configs, power control configuration(s), frequency hopping configuration(s), resource allocation type, aggregation factor, MCS table, transform precoder configuration(s), and/or codebook subset. The control channel resources may comprise one or more of PUCCH configuration(s) and/or PDCCH configuration(s). The PUCCH configuration(s) may comprise one or more of PUCCH resource sets, PUCCH resources, power control configs, formats, scheduling request resources, and/or spatial relation information. The PDCCH configuration(s) may comprise one or more of CORESETs, search spaces, downlink preemption, and/or power control configs.

BWPs of the same BWP group may comprise one or more common BWP configuration parameters. BWPs of the same BWP group may comprise a common BWP group identity. The one or more common BWP configuration parameters may comprise one or more of reference signal configuration, frequency location and/or bandwidth, SCS, shared channel resources, and/or control channel resources. The reference signal configuration may comprise one or more of SRS configuration and/or CSI-RS configuration. The SRS configuration may comprise one or more of SRS resource sets and/or SRS resources. The CSI-RS configuration may comprise one or more of CSI-RS resource sets and/or CSI-RS resources. The shared channel resources may comprise one or more of PUSCH configuration(s) and/or PDSCH configuration(s). The PUSCH configuration(s) may comprise one or more of data scrambling identity and/or uplink DM-RS configs. The PDSCH configuration(s) may comprise one or more of data scrambling identity, downlink DM-RS configs, power control configuration(s), frequency hopping configuration(s), resource allocation type, aggregation factor, MCS table, transform precoder configuration(s), codebook subset, and/or maximum number of transmission layers. The control channel resources may comprise one or more of PUCCH configuration(s) and/or PDCCH configuration(s). The PUCCH configuration(s) may comprise one or more of PUCCH resource sets, PUCCH resources, power control configs, formats, scheduling request resources, and/or spatial relation information. The PDCCH configuration(s) may comprise one or more of CORESETs, search spaces, downlink preemption, and/or power control configs.

BWPs of the same BWP group may be associated with/connected via a reference ID (e.g., BWP group indicator or identifier). BWPs of the same BWP group may be connected via a reference ID, for example, in the one or more RRC messages shown in FIGS. 27A and 27B. A first BWP may comprise a same reference ID as a second BWP. The wireless device may activate the second BWP within an activation time duration for a same group. The wireless device may activate the second BWP within an activation time duration for a same group, for example, based on the reference ID.

BWPs of the same BWP group may share one or more common BWP configuration parameters. A first BWP of the BWP group may comprise BWP configuration parameters and other BWPs than the first BWP may not comprise the BWP configuration parameters. The wireless device may activate the other BWPs. The wireless device may activate the other BWPs, for example, based on the BWP configuration parameters of the first BWP. The BWP configuration parameters may comprise one or more of reference signal configuration, frequency location and/or bandwidth, SCS, shared channel resources, and/or control channel resources. The reference signal configuration may comprise one or more of SRS configuration and/or CSI-RS configuration. The SRS configuration may comprise one or more of SRS resource sets and/or SRS resources. The CSI-RS configuration may comprise one or more of CSI-RS resource sets and/or CSI-RS resources. The shared channel resources may comprise one or more of PUSCH configuration(s) and/or PDSCH configuration(s). The PUSCH configuration(s) may comprise one or more of data scrambling identity and/or uplink DM-RS configs. The PDSCH configuration(s) may comprise one or more of data scrambling identity, downlink DM-RS configs, power control configuration(s), frequency hopping configuration(s), resource allocation type, aggregation factor, MCS table, transform precoder configuration(s), codebook subset, and/or maximum number of transmission layers. The control channel resources may comprise one or more of PUCCH configuration(s) and/or PDCCH configuration(s). The PUCCH configuration(s) may comprise one or more of PUCCH resource sets, PUCCH resources, power control configs, formats, scheduling request resources, and/ or spatial relation information. The PDCCH configuration(s) may comprise one or more of CORESETs, search spaces, downlink preemption, and/or power control configs.

Activation of a BWP and/or activation of configurations of the BWP in the present disclosure may mean that one or more of the following is enabled, performed, and/or made possible: sending (e.g., transmitting) uplink shared channel on the BWP, sending (e.g., transmitting) RACH on the BWP (if PRACH occasions are configured), monitoring PDCCH on the BWP, sending (e.g., transmitting) PUCCH on the BWP (if configured), reporting CSI for the BWP, sending (e.g., transmitting) SRS on the BWP (if configured), receiving downlink shared channel on the BWP, and/or (re-) initializing any suspended configured uplink grants of configured grant Type 1 on the active BWP according to stored configuration (if any). Deactivation of a BWP and/or deactivation of configurations of the BWP in the present disclosure may mean that one or more of the following is no longer enabled, performed, and/or possible: sending (e.g., transmitting) uplink shared channel on the BWP, sending (e.g., transmitting) RACH on the BWP, monitoring PDCCH on the BWP, sending (e.g., transmitting) PUCCH on the BWP, reporting CSI for the BWP, sending (e.g., transmitting) SRS on the BWP, and/or receiving downlink shared channel on the BWP. Deactivation of a BWP and/or deactivation of configurations of the BWP in the present disclosure may comprise clearing any configured downlink assignment/ configured grant of configured grant Type 2 on the BWP, suspending any configured uplink grant of configured grant Type 1 on the inactive BWP, suspending semi-persistent CSI reporting (e.g., semi-persistent CSI), suspending CSI-RS (e.g., semi-persistent CSI-RS), dropping CSI report, deactivating CSI reporting, suspending CSI reporting, and/or suspending SRS (e.g., semi-persistent SRS). Maintaining activation of a BWP and/or maintaining activation of configurations of the BWP in the present disclosure may comprise one or more of maintaining transmission of uplink shared channel on the BWP, maintaining transmission of RACH on the BWP (if PRACH occasions are configured), maintaining monitoring of PDCCH on the BWP, maintaining transmission of PUCCH on the BWP (if configured), maintaining reporting of CSI for the BWP, maintaining transmission of SRS on the BWP (if configured), maintaining reception of downlink shared channel on the BWP, maintaining configured uplink grants of configured grant Type 1 on the active BWP according to stored configuration (if any), not suspending any configured uplink grant of configured grant Type 1 on the inactive BWP, not suspending semi-persistent CSI reporting (e.g., semi-persistent CSI), not suspending CSI-RS (e.g., semi-persistent CSI-RS), not dropping CSI report, not deactivating CSI reporting, not suspending CSI reporting, and/or not suspending SRS (e.g., semi-persistent SRS).

A wireless device may receive one or more RRC messages. A wireless device may receive one or more RRC messages, for example, indicating a plurality of BWPs comprising a first BWP and a second BWP. The wireless device may receive DCI indicating switching from the first BWP to the second BWP as an active BWP. The wireless device may activate the second BWP within an activation time duration. The activation time duration may be determined based on whether the second BWP and the first BWP are in a same BWP group. The one or more RRC message may indicate a plurality of BWP groups comprising a first BWP group of the first BWP and a second BWP group of the second BWP. The first BWP group and the second BWP group may comprise the same BWP group. The wireless device may send (e.g., transmit) wireless device capability information indicating a first activation time duration and a second activation time duration for BWP switching. The wireless device capability information may indicate that the first activation time duration is for switching between BWPs of the same BWP group and the second activation time duration is for switching between BWPs that are not of the same BWP group. The second activation time duration may comprise longer timer duration than the first activation time duration. The indication of the second activation time duration may indicate one of a difference between the first activation time duration and the second activation time duration or a ratio of the first activation time duration and the second activation time duration. The wireless device may determine first activation time duration or the second activation time duration. The wireless device may determine first activation time duration or the second activation time duration, for example, based on the difference. The wireless device may determine the first activation time duration or the second activation time duration, for example, based on the ratio between the first activation time and the second activation time. BWPs of the same BWP group may comprise one or more common BWP configuration parameters. The one or more common BWP configuration parameters may comprise a BWP group identity. The one or more common BWP configuration parameters may comprise one or more of reference signal configuration, frequency location and/or bandwidth, SCS, shared channel resources, and/or control channel resources. The reference signal configuration may comprise one or more of SRS configuration and/or CSI-RS configuration. The SRS configuration may comprise one or more of SRS resource sets and/or SRS resources. The CSI-RS configuration may comprise one or more of CSI-RS resource sets and/or CSI-RS resources. The shared channel resources may comprise one or more of PUSCH configuration(s) and/or PDSCH configuration(s). The PUSCH configuration(s) may comprise one or more of data scrambling identity and/or uplink DM-RS configs. The PDSCH configuration(s) may comprise one or more of data scrambling identity, downlink DM-RS configs, power control configuration(s), frequency hopping configuration(s), resource allocation type, aggregation factor, MCS table, transform precoder configuration(s), codebook subset, and/or maximum number of transmission layers. The control channel resources may comprise one or more of PUCCH configuration(s) and/or PDCCH configuration(s). The PUCCH configuration(s) may comprise one or more of PUCCH resource sets, PUCCH resources, power control configs, formats, scheduling request resources, and/or spatial relation information. The PDCCH configuration(s) may comprise one or more of CORESETs, search spaces, downlink preemption, and/or power control configs.

A base station may send (e.g., transmit) one or more RRC messages. A base station may send (e.g., transmit) one or more RRC messages, for example, indicating a plurality of BWPs comprising a first BWP and a second BWP. The base station may send (e.g., transmit) DCI indicating switching from the first BWP to the second BWP as an active BWP. The base station may determine an activation time duration for the second BWP. The base station may determine an activation time duration for the second BWP, for example, based on whether the first BWP and the second BWP are in a same BWP group. The base station may activate the second BWP, for example, based on the activation time duration. The one or more RRC message may indicate a plurality of BWP groups comprising a first BWP group of the first BWP and a second BWP group of the second BWP. The first BWP group and the second BWP group may comprise the same BWP group. The base station may receive wireless device capability information indicating a first activation time duration and a second activation time duration for BWP switching. The wireless device capability information may indicate the first activation time duration is for switching between BWPs of the same BWP group and the second activation time duration is for switching between BWPs that are not of the same BWP group. The second activation time duration may comprise longer timer duration than the first activation time duration. The indication of the second activation time duration may indicate one of a difference between the first activation time duration and the second activation time duration or a ratio of the first activation time duration and the second activation time duration. The base station may determine the first activation time duration or the second activation time duration based on the difference. The base station may determine the first activation time duration or the second activation time duration. The base station may determine the first activation time duration or the second activation time duration, for example, based on the ratio between the first activation time and the second activation time. BWPs of the same BWP group may comprise one or more common BWP configuration parameters. The one or more common BWP configuration parameters may comprise a BWP group identity. The one or more common BWP configuration parameters may comprise one or more of reference signal configuration, frequency location and/or bandwidth, SCS, shared channel resources, and/or control channel resources. The reference signal configuration may comprise one or more of SRS configuration and/or CSI-RS configuration. The SRS configuration may comprise one or more of SRS resource sets and/or SRS resources. The CSI-RS configuration may comprise one or more of CSI-RS resource sets and/or CSI-RS resources. The shared channel resources may comprise one or more of PUSCH configuration(s) and/or PDSCH configuration(s). The PUSCH configuration(s) may comprise one or more of data scrambling identity and/or uplink DM-RS configs. The PDSCH configuration(s) may comprise one or more of data scrambling identity, downlink DM-RS configs, power control configuration(s), frequency hopping configuration(s), resource allocation type, aggregation factor, MCS table, transform precoder configuration(s), codebook subset, and/or maximum number of transmission layers. The control channel resources may comprise one or more of PUCCH configuration(s) and/or PDCCH configuration(s). The PUCCH configuration(s) may comprise one or more of PUCCH resource sets, PUCCH resources, power control configs, formats, scheduling request resources, and/or spatial relation information. The PDCCH configuration(s) may comprise one or more of CORESETs, search spaces, downlink preemption, and/or power control configs.

A wireless device may receive one or more RRC messages indicating a plurality of BWPs. The plurality of BWPs may comprise a first BWP and a second BWP. The wireless device may receive DCI indicating switching from the first BWP to the second BWP as an active BWP. The wireless device may determine that the first BWP and the second BWP are in a same BWP group. The wireless device may activate the second BWP. The wireless device may activate the second BWP, for example, based on determining that the first BWP and the second BWP are in a same BWP group. The wireless device may activate the second BWP, for example, based on deactivating a first portion of configurations of the first BWP and maintaining activation of a second portion of the configurations of the first BWP. The one or more RRC message may indicate a plurality of BWP groups comprising a first BWP group of the first BWP and a second BWP group of the second BWP. The first BWP group and the second BWP group may comprise the same BWP group. BWPs of the same BWP group may comprise one or more common BWP configuration parameters. The one or more common BWP configuration parameters may comprise a BWP group identity. The one or more common BWP configuration parameters may comprise one or more of reference signal configuration, frequency location and/or bandwidth, SCS, shared channel resources, and/or control channel resources. The reference signal configuration may comprise one or more of SRS configuration and/or CSI-RS configuration. The SRS configuration may comprise one or more of SRS resource sets and/or SRS resources. The CSI-RS configuration may comprise one or more of CSI-RS resource sets and/or CSI-RS resources. The shared channel resources may comprise one or more of PUSCH configuration(s) and/or PDSCH configuration(s). The PUSCH configuration(s) may comprise one or more of data scrambling identity and/or uplink DM-RS configs. The PDSCH configuration(s) may comprise one or more of data scrambling identity, downlink DM-RS configs, power control configuration(s), frequency hopping configuration(s), resource allocation type, aggregation factor, MCS table, transform precoder configuration(s), codebook subset, and/or maximum number of transmission layers. The control channel resources may comprise one or more of PUCCH configuration(s) and PDCCH configuration(s). The PUCCH configuration(s) may comprise one or more of PUCCH resource sets, PUCCH resources, power control configs, formats, scheduling request resources, and/or spatial relation information. The PDCCH configuration(s) may comprise one or more of CORESETs, search spaces, downlink preemption, and/or power control configs. The second portion of the configurations of the first BWP may comprise one or more of reference signal configuration, frequency location and/or bandwidth, SCS, shared channel resources, and/or control channel resources. The reference signal configuration may comprise one or more of SRS configuration and/or CSI-RS configuration. The SRS configuration may comprise one or more of SRS resource sets and/or SRS resources. The CSI-RS configuration may comprise one or more of CSI-RS resource sets and/or CSI-RS resources. The shared channel resources may comprise one or more of PUSCH configuration(s) and/or PDSCH configuration(s). The PUSCH configuration(s) may comprise one or more of data scrambling identity and/or uplink DM-RS configs. The PDSCH configuration(s) may comprise one or more of data scrambling identity, downlink DM-RS configs, power control configuration(s), frequency hopping configuration(s), resource allocation type, aggregation factor, MCS table, transform precoder configuration(s), codebook subset, and/or maximum number of transmission layers. The control channel resources may comprise one or more of PUCCH configuration(s) and/or PDCCH configuration(s). The PUCCH configuration(s) may comprise one or more of PUCCH resource sets, PUCCH resources, power control configs, formats, scheduling request resources, and/or spatial relation information. The PDCCH configuration(s) may comprise one or more of CORESETs, search spaces, downlink preemption, and/or power control configs.

A base station may send (e.g., transmit) one or more RRC messages indicating a plurality of BWPs. The plurality of BWPs may comprise a first BWP and a second BWP. The base station may send (e.g., transmit) DCI indicating switching from the first BWP to the second BWP as an active BWP. The base station may determine that the first BWP and the second BWP are in a same BWP group. The base station may activate the second BWP. The base station may activate the second BWP, for example, based on determining that the first BWP and the second BWP are in a same BWP group. The base station may activate the second BWP, for example, based on deactivating a first portion of configurations of the first BWP and maintaining activation of a second portion of the configurations of the first BWP. The one or more RRC message may indicate a plurality of BWP groups comprising a first BWP group of the first BWP and a second BWP group of the second BWP. The first BWP group and the second BWP group may comprise the same BWP group. BWPs of the same BWP group may comprise one or more common BWP configuration parameters. The one or more common BWP configuration parameters may comprise a BWP group identity. The one or more common BWP configuration parameters may comprise one or more of reference signal configuration, frequency location and/or bandwidth, SCS, shared channel resources, and/or control channel resources. The reference signal configuration may comprise one or more of SRS configuration and/or CSI-RS configuration. The SRS configuration may comprise one or more of SRS resource sets and/or SRS resources. The CSI-RS configuration may comprise one or more of CSI-RS resource sets and/or CSI-RS resources. The shared channel resources may comprise one or more of PUSCH configuration(s) and/or PDSCH configuration(s). The PUSCH configuration(s) may comprise one or more of data scrambling identity and/or uplink DM-RS configs. The PDSCH configuration(s) may comprise one or more of data scrambling identity, downlink DM-RS configs, power control configuration(s), frequency hopping configuration(s), resource allocation type, aggregation factor, MCS table, transform precoder configuration(s), codebook subset, and/or maximum number of transmission layers. The control channel resources may comprise one or more of PUCCH configuration(s) and/or PDCCH configuration(s). The PUCCH configuration(s) may comprise one or more of PUCCH resource sets, PUCCH resources, power control configs, formats, scheduling request resources, and/or spatial relation information. The PDCCH configuration(s) may comprise one or more of CORESETs, search spaces, downlink preemption, and/or power control configs. The second portion of the configurations of the first BWP may comprise one or more of reference signal configuration, frequency location and/or bandwidth, SCS, shared channel resources, and/or control channel resources. The reference signal configuration may comprise one or more of SRS configuration and/or CSI-RS configuration. The SRS configuration may comprise one or more of SRS resource sets and/or SRS resources. The CSI-RS configuration may comprise one or more of CSI-RS resource sets and/or CSI-RS resources. The shared channel resources may comprise one or more of PUSCH configuration(s) and/or PDSCH configuration(s). The PUSCH configuration(s) may comprise one or more of data scrambling identity and/or uplink DM-RS configs. The PDSCH configuration(s) may comprise one or more of data scrambling identity, downlink DM-RS configs, power control configuration(s), frequency hopping configuration(s), resource allocation type, aggregation factor, MCS table, transform precoder configuration(s), codebook subset, and/or maximum number of transmission layers. The control channel resources may comprise one or more of PUCCH configuration(s) and/or PDCCH configuration(s). The PUCCH configuration(s) may comprise one or more of PUCCH resource sets, PUCCH resources, power control configs, formats, scheduling request resources, and/or spatial relation information. The PDCCH configuration(s) may comprise one or more of CORESETs, search spaces, downlink preemption, and/or power control configs.

A wireless device may perform a method comprising multiple operations. The wireless device may receive configuration parameters indicating a plurality of bandwidth parts (BWPs). The plurality of BWPs may be grouped into at least one bandwidth part (BWP) group. The plurality of BWPs may comprise a first BWP and a second BWP. The wireless device may determine, based on whether the first BWP and the second BWP are in a same BWP group of the at least one BWP group, a BWP activation time window. The wireless device may switch from the first BWP to the second BWP as an active BWP. Activation of the second BWP may be during a BWP activation time window that is based on whether the first BWP and the second BWP are in a same BWP group of the at least one BWP group. The wireless device may also perform one or more additional operations. The wireless device may send, based on an expiration of the BWP activation time window, a signal via the second BWP. The BWP activation time window may be further based on a numerology of one or both of the first BWP or the second BWP and further based on a BWP switching delay type associated with the wireless device. The wireless device may send information indicating one of a plurality of BWP switching delay types. The BWP activation time window may be further based on the one of the plurality of BWP switching delay types. The BWP activation time window may have a first time value if the first BWP and the second BWP are in the same BWP group. The BWP activation time window may have a second time value if the first BWP and the second BWP are not in the same BWP group. The first time value may be smaller than the second time value. A time associated with the BWP activation time window may be smaller if the first BWP and the second BWP are in the same BWP group than if the first BWP and the second BWP are not in the same BWP group. At least one of the configuration parameters may indicate the at least one BWP group. The switching may comprise maintaining, based on the first BWP and the second BWP being in the same BWP group, activation of at least a portion of configurations of the first BWP. The BWP activation time window may be one of a plurality of time values. The wireless device may determine the BWP activation time window as a first time value of the plurality of time values based on the first BWP and the second BWP being in the same BWP group. The wireless device may determine the BWP activation time window as a second time value of the plurality of time values based on the first BWP and the second BWP being in different BWP groups. The plurality of time values may be predefined. The first BWP and the second BWP may be uplink BWPs. The first BWP and the second BWP may be downlink BWPs. The wireless device may start, based on an expiry of the BWP activation time window, to monitor a downlink control channel of the second BWP. The wireless device may receive, after an expiry of the BWP activation time window, a downlink control information (DCI) via the second BWP. The wireless device may receive a second DCI that indicates to switch from the first BWP to the second BWP as the active BWP. The switching from the first BWP to the second BWP as the active BWP may be based on an expiry of a BWP inactivity timer. The second BWP may be a default BWP. The wireless device may start a BWP inactivity timer in response to activating the second BWP. BWPs of the same BWP group may comprise one or more common BWP configuration parameters. The one or more common BWP configuration parameters may comprise a BWP group identity, the one or more common BWP configuration parameters comprise one or more of: reference signal configuration; frequency location and bandwidth; subcarrier spacing; shared channel resources; and control channel resources. Systems, devices and media may be configured with the method. A wireless device may comprise one or more processors; and memory storing instructions that, when executed, cause the wireless device to perform the described method, additional operations and/or include the additional elements. A system may comprise a wireless device configured to perform the described method, additional operations and/or include the additional elements; and a base station configured to send the configuration parameters. A computer-readable medium may store instructions that, when executed, cause performance of the described method, additional operations and/or include the additional elements.

A base station may perform a method comprising multiple operations. The base station may send configuration parameters indicating a plurality of bandwidth parts (BWPs). The plurality of BWPs may be grouped into at least one bandwidth part (BWP) group. The plurality of BWPs may comprise a first BWP and a second BWP. The base station may determine, based on whether the first BWP and the second BWP are in a same BWP group of the at least one BWP group, a BWP activation time window. The base station may switch from the first BWP to the second BWP as an active BWP. Activation of the second BWP may be during a BWP activation time window that is based on whether the first BWP and the second BWP are in a same BWP group of the at least one BWP group. The base station may also perform one or more additional operations. The BWP activation time window may be further based on a numerology of one or both of the first BWP or the second BWP. The base station may receive information indicating a BWP switching delay type associated with a wireless device. The BWP activation time window may be further based on the one of the plurality of BWP switching delay types. The BWP activation time window may have a first time value if the first BWP and the second BWP are in the same BWP group. The BWP activation time window may have a second time value if the first BWP and the second BWP are not in the same BWP group. The first time value may be smaller than the second time value. A time associated with the BWP activation time window may be smaller if the first BWP and the second BWP are in the same BWP group than if the first BWP and the second BWP are not in the same BWP group. At least one of the configuration parameters may indicate the at least one BWP group. Switching may comprise maintaining, based on the first BWP and the second BWP being in the same BWP group, activation of at least a portion of configurations of the first BWP. The base station may determine, based on one or configurations common to at least some of the plurality of BWPs, which of the plurality of BWPs are in the at least one BWP group. Systems, devices and media may be configured with the method. A base station may comprise one or more processors; and memory storing instructions that, when executed, cause the base station to perform the described method, additional operations and/or include the additional elements. A system may comprise a base station configured to perform the described method, additional operations and/or include the additional elements; and a wireless device configured to communicate with the base station via the first BWP or the second BWP. A computer-readable medium may store instructions that, when executed, cause performance of the described method, additional operations and/or include the additional elements.

A device comprising one or more antennas may perform a method comprising multiple operations. The device may determine a plurality of groups of bandwidth parts (BWPs). The device may send, via a first bandwidth part (BWP) of the plurality of groups of BWPs and using the one or more antennas, a transmission. The device may determine based on whether the first BWP and a second BWP of the plurality of BWPs are in a same group of the plurality of groups, a BWP activation time window. The device may activate, during a BWP activation time window that is based on whether the first BWP and a second BWP of the plurality of BWPs are in a same group of the plurality of groups, the second BWP. The device may send, via the second BWP and after an expiration of the BWP activation time window, a second transmission. The device may also perform one or more additional operations. The device may comprise at least one of: a wireless device or a base station. The device may deactivate at least a first portion of configurations of the first BWP. The device may maintain, based on the first BWP and the second BWP being in the same group, activation of at least a second portion of configurations of the first BWP. The BWP activation time window may be further based on a numerology of one or both of the first BWP or the second BWP. The device may send or receive, using the one or more antennas, configuration parameters indicating the first BWP, the second BWP, and the plurality of groups of BWPs. The BWP activation time window may be further based on a switching delay type associated with a wireless device.

Systems, devices and media may be configured with the method. An apparatus may comprise one or more processors; and memory storing instructions that, when executed, cause the apparatus to perform the described method, additional operations and/or include the additional elements. A system may comprise a wireless device configured to perform the described method, additional operations and/or include the additional elements; and a base station configured to communicate with the wireless device via the first BWP or the second BWP. A system may comprise a base station configured to perform the described method, additional operations and/or include the additional elements; and a wireless device configured to communicate with the base station via the first BWP or the second BWP. A computer-readable medium may store instructions that, when executed, cause performance of the described method, additional operations and/or include the additional elements.

One or more of the operations described herein may be conditional. For example, one or more operations may be performed if certain criteria are met, such as in a wireless device, a base station, a radio environment, a network, a combination of the above, and/or the like. Example criteria may be based on one or more conditions such as wireless device and/or network node configurations, traffic load, initial system set up, packet sizes, traffic characteristics, a combination of the above, and/or the like. If the one or more criteria are met, various examples may be used. It may be possible to implement any portion of the examples described herein in any order and based on any condition.

A base station may communicate with one or more of wireless devices. Wireless devices and/or base stations may support multiple technologies, and/or multiple releases of the same technology. Wireless devices may have some specific capability(ies) depending on wireless device category and/or capability(ies). A base station may comprise multiple sectors, cells, and/or portions of transmission entities. A base station communicating with a plurality of wireless devices may refer to a base station communicating with a subset of the total wireless devices in a coverage area. Wireless devices referred to herein may correspond to a plurality of wireless devices compatible with a given LTE, 5G, or other 3GPP or non-3GPP release with a given capability and in a given sector of a base station. A plurality of wireless devices may refer to a selected plurality of wireless devices, a subset of total wireless devices in a coverage area, and/or any group of wireless devices. Such devices may operate, function, and/or perform based on or according to drawings and/or descriptions herein, and/or the like. There may be a plurality of base stations and/or a plurality of wireless devices in a coverage area that may not comply with the disclosed methods, for example, because those wireless devices and/or base stations may perform based on older releases of LTE, 5G, or other 3GPP or non-3GPP technology.

One or more parameters, fields, and/or information elements (IEs), may comprise one or more information objects, values, and/or any other information. An information object may comprise one or more other objects. At least some (or all) parameters, fields, IEs, and/or the like may be used and can be interchangeable depending on the context. If a meaning or definition is given, such meaning or definition controls.

One or more elements in examples described herein may be implemented as modules. A module may be an element that performs a defined function and/or that has a defined interface to other elements. The modules may be implemented in hardware, software in combination with hardware, firmware, wetware (e.g., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or Lab VIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and/or complex programmable logic devices (CPLDs). Computers, microcontrollers and/or microprocessors may be programmed using languages such as assembly, C, C++ or the like. FPGAs, ASICs and CPLDs are often programmed using hardware description languages (HDL), such as VHSIC hardware description language (VHDL) or Verilog, which may configure connections between internal hardware modules with lesser functionality on a programmable device. The above-mentioned technologies may be used in combination to achieve the result of a functional module.

One or more features described herein may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features described herein, and such data structures are contemplated within the scope of computer executable instructions and computer-usable data described herein.

A non-transitory tangible computer readable media may comprise instructions executable by one or more processors configured to cause operations of multi-carrier communications described herein. An article of manufacture may comprise a non-transitory tangible computer readable machine-accessible medium having instructions encoded thereon for enabling programmable hardware to cause a device (e.g., a wireless device, wireless communicator, a wireless device, a base station, and the like) to allow operation of multi-carrier communications described herein. The device, or one or more devices such as in a system, may include one or more processors, memory, interfaces, and/or the like. Other examples may comprise communication networks comprising devices such as base stations, wireless devices or user equipment (wireless device), servers, switches, antennas, and/or the like. A network may comprise any wireless technology, including but not limited to, cellular, wireless, WiFi, 4G, 5G, any generation of 3GPP or other cellular standard or recommendation, any non-3GPP network, wireless local area networks, wireless personal area networks, wireless ad hoc networks, wireless metropolitan area networks, wireless wide area networks, global area networks, satellite networks, space networks, and any other network using wireless communications. Any device (e.g., a wireless device, a base station, or any other device) or combination of devices may be used to perform any combination of one or more of steps described herein, including, for example, any complementary step or steps of one or more of the above steps.

Although examples are described above, features and/or steps of those examples may be combined, divided, omitted, rearranged, revised, and/or augmented in any desired manner Various alterations, modifications, and improvements will readily occur to those skilled in the art. Such alterations, modifications, and improvements are intended to be part of this description, though not expressly stated herein, and are intended to be within the spirit and scope of the descriptions herein. Accordingly, the foregoing description is by way of example only, and is not limiting.

The invention claimed is:

1. A method comprising:
   receiving, by a wireless device, configuration parameters indicating a plurality of bandwidth parts (BWPs), wherein the plurality of BWPs are grouped into at least one bandwidth part (BWP) group and wherein the plurality of BWPs comprises a first BWP and a second BWP; and
   switching from the first BWP to the second BWP as an active BWP, wherein activation of the second BWP is during a BWP activation time window that has:
      a first duration if the first BWP and the second BWP are in a same BWP group of the at least one BWP group; or
      a second duration, different from the first duration, if the first BWP and the second BWP are not in the same BWP group.

2. The method of claim 1, further comprising sending, based on an expiration of the BWP activation time window, a signal via the second BWP.

3. The method of claim 1, wherein the BWP activation time window is further based on a numerology of one or both of the first BWP or the second BWP.

4. The method of claim 1, further comprising sending information indicating one of a plurality of BWP switching delay types, wherein the BWP activation time window is further based on the one of the plurality of BWP switching delay types.

5. The method of claim 1, wherein the first duration is shorter than the second duration.

6. The method of claim 1, wherein at least one of the configuration parameters indicates the at least one BWP group.

7. The method of claim 1, wherein the switching comprises maintaining for the second BWP, based on the first BWP and the second BWP being in the same BWP group, activation of at least one configuration of the first BWP.

8. A method comprising:
   sending, by a base station, configuration parameters indicating a plurality of bandwidth parts (BWPs), wherein the plurality of BWPs are grouped into at least one bandwidth part (BWP) group and wherein the plurality of BWPs comprises a first BWP and a second BWP; and
   switching from the first BWP to the second BWP as an active BWP, wherein activation of the second BWP is during a BWP activation time window that has:
      a first duration if the first BWP and the second BWP are in a same BWP group of the at least one BWP group; or
      a second duration, different from the first duration, if the first BWP and the second BWP are not in the same BWP group.

9. The method of claim 8, wherein the BWP activation time window is further based on a numerology of one or both of the first BWP or the second BWP.

10. The method of claim 8, further comprising receiving information indicating a BWP switching delay type associated with a wireless device, wherein the BWP activation time window is further based on the one of the plurality of BWP switching delay types.

11. The method of claim 8, wherein the first duration is shorter than the second duration.

12. The method of claim 8, wherein at least one of the configuration parameters indicates the at least one BWP group.

13. The method of claim 8, wherein switching comprises maintaining for the second BWP, based on the first BWP and the second BWP being in the same BWP group, activation of at least one configuration of the first BWP.

14. The method of claim 8, further comprising determining, based on one or more configurations common to at least some of the plurality of BWPs, which of the plurality of BWPs are in the at least one BWP group.

15. A method comprising:
   determining, by a device comprising one or more antennas, a plurality of bandwidth part (BWP) groups;
   sending, via a first BWP of the plurality of BWP groups and using the one or more antennas, a transmission;
   activating, during a BWP activation time window, a second BWP, wherein the BWP activation time window has:
      a first duration if the first BWP and the second BWP are in a same BWP group of the plurality of BWP groups; or
      a second duration, different from the first duration, if the first BWP and the second BWP are not in the same BWP group; and
   sending, via the second BWP and after an expiration of the BWP activation time window, a second transmission.

16. The method of claim 15, wherein the device comprises at least one of: a wireless device or a base station.

17. The method of claim 15, further comprising:
   deactivating at least one configuration of the first BWP; and
   maintaining, based on the first BWP and the second BWP being in the same BWP group, activation of at least a second portion of configurations of the first BWP.

18. The method of claim 15, wherein the BWP activation time window is further based on a numerology of one or both of the first BWP or the second BWP.

19. The method of claim 15, further comprising sending or receiving, using the one or more antennas, configuration parameters indicating the first BWP, the second BWP, and the plurality of BWP groups.

20. The method of claim 15, wherein the BWP activation time window is further based on a switching delay type associated with a wireless device.

21. The method of claim 15, wherein the first duration is shorter than the second duration.

* * * * *

UNITED STATES PATENT AND TRADEMARK OFFICE
CERTIFICATE OF CORRECTION

PATENT NO. : 11,575,491 B2
APPLICATION NO. : 17/125213
DATED : February 7, 2023
INVENTOR(S) : Kwak et al.

It is certified that error appears in the above-identified patent and that said Letters Patent is hereby corrected as shown below:

In the Specification

Column 37, Detailed Description, Line 39:
Delete "1320" and insert --1331-- therefor Column 37, Detailed Description, Line 40:
Delete "1320" and insert --1331-- therefor Column 47, Detailed Description, Line 4:
After "running", insert --.-- therefor Column 65, Detailed Description, Line 45:
Delete "khz," and insert --kHz,-- therefor Column 65, Detailed Description, Line 48:
Delete "khz," and insert --kHz,-- therefor Column 66, Detailed Description, Line 33:
Delete "MS" and insert --ms-- therefor Column 69, Detailed Description, Line 22:
After "from", insert --slot-- therefor Column 77, Detailed Description, Lines 32-33:
Delete "csi-ReportingB and" and insert --csi-ReportingBand-- therefor Column 77, Detailed Description, Lines 42-43:
Delete "csi-ReportingB and" and insert --csi-ReportingBand-- therefor Signed and Sealed this
Thirtieth Day of April, 2024

Katherine Kelly Vidal
*Director of the United States Patent and Trademark Office*

CERTIFICATE OF CORRECTION (continued)
U.S. Pat. No. 11,575,491 B2

Column 77, Detailed Description, Line 46:
Delete "csi-ReportingB and" and insert --csi-ReportingBand-- therefor Column 83, Detailed Description, Line 11:
Delete """ cri-RI-i1'," and insert --'cri-RI-i1',-- therefor Column 83, Detailed Description, Line 47:
Delete "[440," and insert --[-140,-- therefor Column 83, Detailed Description, Line 48:
Delete "[440," and insert --[-140,-- therefor Column 83, Detailed Description, Line 51:
Delete "[440," and insert --[-140,-- therefor Column 83, Detailed Description, Line 62:
Delete "[440," and insert --[-140,-- therefor Column 110, Detailed Description, Line 8:
Delete "Lab VIEWMathScript." and insert --LabVIEWMathScript.-- therefor Column 111, Detailed Description, Lines 11-12:
After "manner", insert --.-- therefor